United States Patent
Suda et al.

(12)

(10) Patent No.: US 6,330,237 B1
(45) Date of Patent: Dec. 11, 2001

(54) TIME SLOT ASSIGNMENT CIRCUIT

(75) Inventors: Yukio Suda; Satoshi Nemoto; Yasuhiro Murakami, all of Yokohama; Masahiro Shioda, Kawasaki, all of (JP)

(73) Assignee: Fujitsu Limited, Kanagawa (JP)

( * ) Notice: Subject to any disclaimer, the term of this patent is extended or adjusted under 35 U.S.C. 154(b) by 0 days.

(21) Appl. No.: 09/150,721

(22) Filed: Sep. 10, 1998

(30) Foreign Application Priority Data

Mar. 20, 1998 (JP) ................................................ 10-071843

(51) Int. Cl.[7] .................................................. H04L 12/50
(52) U.S. Cl. ........................ 370/369; 370/370; 370/371
(58) Field of Search .................................. 370/360, 369, 370/370, 371, 376, 393

(56) References Cited

U.S. PATENT DOCUMENTS

| | | | |
|---|---|---|---|
| 4,170,718 | * 10/1979 | Miyazaki et al. | 370/371 |
| 4,524,441 | * 6/1985 | Simmons et al. | 370/371 |
| 4,569,043 | * 2/1986 | Simmons et al. | 370/371 |
| 4,672,604 | * 6/1987 | Bhatig et al. | 370/376 |
| 4,701,907 | * 10/1987 | Collins | 370/371 |
| 4,845,705 | * 7/1989 | Dorgelo | 370/371 |
| 4,961,187 | * 10/1990 | Gupta | 370/371 |
| 5,459,720 | * 10/1995 | Iliev et al. | 370/393 |

FOREIGN PATENT DOCUMENTS

| | | |
|---|---|---|
| 3-201734 | 9/1991 | (JP) . |
| 5-103356 | 4/1993 | (JP) . |
| 8-111895 | 4/1996 | (JP) . |

* cited by examiner

Primary Examiner—Salvatore Cangialosi
(74) Attorney, Agent, or Firm—Rosenman & Colin LLP

(57) ABSTRACT

A time slot assignment circuit capable of performing channel setting with a high efficiency and with a high degree of freedom of channel setting with respect to a large volume of transmission data and in addition having a small circuit scale and low power consumption, provided a time switch provided with a transmission data memory into which transmission data is sequentially written and performing switching in a time domain with respect to the transmission data, a space switch for performing switching in a space domain with respect to an output thereof, an address control memory which outputs a channel setting address for controlling the two switches, and a channel setting information converting unit for converting a channel setting information from the outside to a channel setting address and an accessing address for the memory.

15 Claims, 93 Drawing Sheets

Fig.8

STS-12 FRAME FORMAT

| # CH | 1<br>1 | 2<br>4 | 3<br>7 | 4<br>10 | 65<br>2 | 66<br>5 | 67<br>8 | 68<br>11 | 129<br>3 | 130<br>6 | 131<br>9 | 132<br>12 |
|---|---|---|---|---|---|---|---|---|---|---|---|---|
| # CH | 5<br>13 | 6<br>16 | 7<br>19 | 8<br>22 | 69<br>14 | 70<br>17 | 71<br>20 | 72<br>23 | 133<br>15 | 134<br>18 | 135<br>21 | 136<br>24 |
| # CH | 9<br>25 | 10<br>28 | 11<br>31 | 12<br>34 | 73<br>26 | 74<br>29 | 75<br>32 | 76<br>35 | 137<br>27 | 138<br>30 | 139<br>33 | 140<br>36 |
| # CH | 13<br>37 | 14<br>40 | 15<br>43 | 16<br>46 | 77<br>38 | 78<br>41 | 79<br>44 | 80<br>47 | 141<br>39 | 142<br>42 | 143<br>45 | 144<br>48 |
| # CH | 17<br>49 | 18<br>52 | 19<br>55 | 20<br>58 | 81<br>50 | 82<br>53 | 83<br>56 | 84<br>59 | 145<br>51 | 146<br>54 | 147<br>57 | 148<br>60 |
| # CH | 21<br>61 | 22<br>64 | 23<br>67 | 24<br>70 | 85<br>62 | 86<br>65 | 87<br>68 | 88<br>71 | 149<br>63 | 150<br>66 | 151<br>69 | 152<br>72 |
| # CH | 25<br>73 | 26<br>76 | 27<br>79 | 28<br>82 | 89<br>74 | 90<br>77 | 91<br>80 | 92<br>83 | 153<br>75 | 154<br>78 | 155<br>81 | 156<br>84 |
| # CH | 29<br>85 | 30<:88 | 31<br>91 | 32<br>94 | 93<br>86 | 94<br>89 | 95<br>92 | 96<br>95 | 157<br>87 | 158<br>90 | 159<br>93 | 160<br>96 |
| # CH | 33<br>97 | 34<br>100 | 35<br>103 | 36<br>106 | 97<br>98 | 98<br>101 | 99<br>104 | 100<br>107 | 161<br>99 | 162<br>102 | 163<br>105 | 164<br>108 |
| # CH | 37<br>109 | 38<br>112 | 39<br>115 | 40<br>118 | 101<br>110 | 102<br>113 | 103<br>116 | 104<br>119 | 165<br>111 | 166<br>114 | 167<br>117 | 168<br>120 |
| # CH | 41<br>121 | 42<br>124 | 43<br>127 | 44<br>130 | 105<br>122 | 106<br>125 | 107<br>128 | 108<br>131 | 169<br>123 | 170<br>126 | 171<br>129 | 172<br>132 |
| # CH | 45<br>133 | 46<br>136 | 47<br>139 | 48<br>142 | 109<br>134 | 110<br>137 | 111<br>140 | 112<br>143 | 173<br>135 | 174<br>138 | 175<br>141 | 176<br>144 |
| # CH | 49<br>145 | 50<br>148 | 51<br>151 | 52<br>154 | 113<br>146 | 114<br>149 | 115<br>152 | 116<br>155 | 177<br>147 | 178<br>150 | 179<br>153 | 180<br>156 |
| # CH | 53<br>157 | 54<br>160 | 55<br>163 | 56<br>166 | 117<br>158 | 118<br>161 | 119<br>164 | 120<br>167 | 181<br>159 | 182<br>162 | 183<br>165 | 184<br>168 |
| # CH | 57<br>169 | 58<br>172 | 59<br>175 | 60<br>178 | 121<br>170 | 122<br>173 | 123<br>176 | 124<br>179 | 185<br>171 | 186<br>174 | 187<br>177 | 188<br>180 |
| # CH | 61<br>181 | 62<br>184 | 63<br>187 | 64<br>190 | 125<br>182 | 126<br>185 | 127<br>188 | 128<br>191 | 189<br>183 | 190<br>186 | 191<br>189 | 192<br>192 |

16 GROUPS

12 CHANNELS

STS-192 FRAME FORMAT

Fig.11

| DATAIN | | | 0h | 1h | 2h | 3h | 4h |
|---|---|---|---|---|---|---|---|
| (71 DOWNTO 64) | LGP1 | # | 1 | 2 | 3 | 4 | 65 |
| | | CH | 1 | 4 | 7 | 10 | 2 |
| | | | 0 | 16 | 32 | 48 | 64 |
| (79 DOWNTO 72) | LGP2 | # | 5 | 6 | 7 | 8 | 69 |
| | | CH | 13 | 16 | 19 | 22 | 14 |
| | | | 1 | 17 | 33 | 49 | 65 |
| (87 DOWNTO 80) | LGP3 | # | 9 | 10 | 11 | 12 | 73 |
| | | CH | 25 | 28 | 31 | 46 | 26 |
| | | | 2 | 18 | 34 | 51 | 66 |
| (95 DOWNTO 88) | LGP4 | # | 13 | 14 | 15 | 12 | 77 |
| | | CH | 37 | 40 | 43 | 34 | 38 |
| | | | 3 | 19 | 35 | 50 | 67 |
| (103 DOWNTO 96) | LGP5 | # | 17 | 18 | 19 | 20 | 81 |
| | | CH | 49 | 52 | 55 | 58 | 50 |
| | | | 4 | 20 | 36 | 52 | 68 |
| (111 DOWNTO 104) | LGP6 | # | 21 | 22 | 23 | 24 | 85 |
| | | CH | 61 | 64 | 67 | 70 | 62 |
| | | | 5 | 21 | 37 | 53 | 69 |
| (119 DOWNTO 112) | LGP7 | # | 25 | 26 | 27 | 28 | 89 |
| | | CH | 73 | 76 | 79 | 82 | 74 |
| | | | 6 | 22 | 38 | 54 | 70 |
| (127 DOWNTO 120) | LGP8 | # | 29 | 30 | 31 | 32 | 93 |
| | | CH | 85 | 88 | 91 | 94 | 86 |
| | | | 7 | 23 | 39 | 55 | 71 |
| | | | 0h | 1h | 2h | 3h | 4h |
| (7 DOWNTO 0) | LGP9 | # | 33 | 34 | 35 | 36 | 97 |
| | | CH | 97 | 100 | 103 | 106 | 98 |
| | | | 8 | 24 | 40 | 56 | 72 |
| (15 DOWNTO 8) | LGP10 | # | 37 | 38 | 39 | 40 | 101 |
| | | CH | 109 | 112 | 115 | 118 | 110 |
| | | | 9 | 25 | 41 | 57 | 73 |
| (23 DOWNTO 16) | LGP11 | # | 41 | 42 | 43 | 44 | 105 |
| | | CH | 121 | 124 | 127 | 130 | 122 |
| | | | 10 | 26 | 42 | 58 | 74 |
| (31 DOWNTO 24) | LGP12 | # | 45 | 46 | 47 | 48 | 109 |
| | | CH | 133 | 136 | 139 | 142 | 134 |
| | | | 11 | 27 | 43 | 59 | 75 |
| (39 DOWNTO 32) | LGP13 | # | 49 | 50 | 51 | 52 | 113 |
| | | CH | 145 | 148 | 151 | 154 | 146 |
| | | | 12 | 28 | 44 | 60 | 76 |
| (47 DOWNTO 40) | LGP14 | # | 53 | 54 | 55 | 56 | 117 |
| | | CH | 157 | 160 | 163 | 166 | 158 |
| | | | 13 | 29 | 45 | 61 | 77 |
| (55 DOWNTO 48) | LGP15 | # | 57 | 58 | 59 | 60 | 121 |
| | | CH | 169 | 172 | 175 | 178 | 170 |
| | | | 14 | 30 | 46 | 62 | 78 |
| (63 DOWNTO 56) | LGP16 | # | 61 | 62 | 63 | 64 | 125 |
| | | CH | 181 | 184 | 187 | 190 | 182 |
| | | | 15 | 31 | 47 | 63 | 79 |

Fig.12

| 5h | 6h | 7h | 8h | 9h | Ah | Bh |
|---|---|---|---|---|---|---|
| 66<br>5<br>80 | 67<br>8<br>96 | 68<br>11<br>112 | 129<br>3<br>128 | 130<br>6<br>144 | 131<br>9<br>160 | 132<br>12<br>176 |
| 70<br>17<br>81 | 71<br>20<br>97 | 72<br>23<br>113 | 133<br>15<br>129 | 134<br>18<br>145 | 135<br>21<br>161 | 136<br>24<br>177 |
| 74<br>29<br>82 | 75<br>32<br>98 | 76<br>35<br>114 | 137<br>27<br>130 | 138<br>30<br>146 | 139<br>33<br>162 | 140<br>36<br>178 |
| 78<br>41<br>83 | 79<br>44<br>99 | 80<br>47<br>115 | 141<br>39<br>131 | 142<br>42<br>147 | 143<br>45<br>163 | 144<br>48<br>179 |
| 82<br>53<br>84 | 83<br>56<br>100 | 84<br>59<br>116 | 145<br>51<br>132 | 146<br>54<br>148 | 147<br>57<br>164 | 148<br>60<br>180 |
| 86<br>65<br>85 | 87<br>68<br>101 | 88<br>71<br>117 | 149<br>63<br>133 | 150<br>66<br>149 | 151<br>69<br>165 | 152<br>72<br>181 |
| 90<br>77<br>86 | 91<br>80<br>102 | 92<br>83<br>118 | 153<br>75<br>134 | 154<br>78<br>150 | 155<br>81<br>166 | 156<br>84<br>182 |
| 94<br>89<br>87 | 95<br>92<br>103 | 96<br>95<br>119 | 157<br>87<br>135 | 158<br>90<br>151 | 159<br>93<br>167 | 160<br>96<br>183 |

| 5h | 6h | 7h | 8h | 9h | Ah | Bh |
|---|---|---|---|---|---|---|
| 98<br>101<br>88 | 99<br>104<br>104 | 100<br>107<br>120 | 161<br>99<br>136 | 162<br>102<br>152 | 163<br>105<br>168 | 164<br>108<br>184 |
| 102<br>113<br>89 | 103<br>116<br>105 | 104<br>119<br>121 | 165<br>111<br>137 | 166<br>114<br>153 | 167<br>117<br>169 | 168<br>120<br>185 |
| 106<br>125<br>90 | 107<br>128<br>106 | 108<br>131<br>122 | 169<br>123<br>138 | 170<br>126<br>154 | 171<br>129<br>170 | 172<br>132<br>186 |
| 110<br>137<br>91 | 111<br>140<br>107 | 112<br>143<br>123 | 173<br>135<br>139 | 174<br>138<br>155 | 175<br>141<br>171 | 176<br>144<br>187 |
| 114<br>149<br>92 | 115<br>152<br>108 | 116<br>155<br>124 | 177<br>147<br>140 | 178<br>150<br>156 | 179<br>153<br>172 | 180<br>156<br>188 |
| 118<br>161<br>93 | 119<br>164<br>109 | 120<br>167<br>125 | 181<br>159<br>141 | 182<br>162<br>157 | 183<br>165<br>173 | 184<br>168<br>189 |
| 122<br>173<br>94 | 123<br>176<br>110 | 124<br>179<br>126 | 185<br>171<br>142 | 186<br>174<br>158 | 187<br>177<br>174 | 188<br>180<br>190 |
| 126<br>185<br>95 | 127<br>188<br>111 | 128<br>191<br>127 | 189<br>183<br>143 | 190<br>186<br>159 | 191<br>189<br>175 | 192<br>192<br>191 |

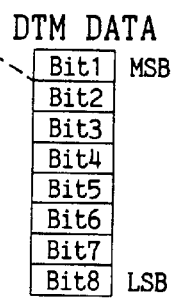

DTM DATA
- Bit1 MSB
- Bit2
- Bit3
- Bit4
- Bit5
- Bit6
- Bit7
- Bit8 LSB

No. FOR SPECIFYING ACM DATA

Fig.13

| DATAOUT | HGP | | 0h | 1h | 2h | 3h |
|---|---|---|---|---|---|---|
| DATAOUT (7 DOWNTO 0) | HGP1 (TSA12 #1) | # / CH | 1 / 1 | 17 / 49 | 33 / 97 | 49 / 145 |
| DATAOUT (15 DOWNTO 8) | HGP9 (TSA12 #2) | # / CH | 9 / 25 | 25 / 73 | 41 / 121 | 57 / 169 |
| DATAOUT (23 DOWNTO 16) | HGP2 (TSA12 #3) | # / CH | 2 / 4 | 18 / 52 | 34 / 100 | 50 / 148 |
| DATAOUT (31 DOWNTO 24) | HGP10 (TSA12 #4) | # / CH | 10 / 28 | 26 / 76 | 42 / 124 | 58 / 172 |
| DATAOUT (39 DOWNTO 32) | HGP3 (TSA12 #5) | # / CH | 3 / 7 | 19 / 55 | 35 / 103 | 51 / 151 |
| DATAOUT (47 DOWNTO 40) | HGP11 (TSA12 #6) | # / CH | 11 / 31 | 27 / 79 | 43 / 127 | 59 / 175 |
| DATAOUT (55 DOWNTO 48) | HGP4 (TSA12 #7) | # / CH | 4 / 10 | 20 / 58 | 36 / 106 | 52 / 154 |
| DATAOUT (63 DOWNTO 56) | HGP12 (TSA12 #8) | # / CH | 12 / 34 | 28 / 82 | 44 / 130 | 60 / 178 |
| | | | 0h | 1h | 2h | 3h |
| DATAOUT (71 DOWNTO 64) | HGP5 (TSA12 #9) | # / CH | 5 / 13 | 21 / 61 | 37 / 109 | 53 / 157 |
| DATAOUT (79 DOWNTO 72) | HGP13 (TSA12 #10) | # / CH | 13 / 37 | 29 / 85 | 45 / 133 | 61 / 181 |
| DATAOUT (87 DOWNTO 80) | HGP6 (TSA12 #11) | # / CH | 6 / 16 | 22 / 64 | 38 / 112 | 54 / 160 |
| DATAOUT (95 DOWNTO 88) | HGP14 (TSA12 #12) | # / CH | 14 / 40 | 30 / 88 | 46 / 136 | 62 / 184 |
| DATAOUT (103 DOWNTO 96) | HGP7 (TSA12 #13) | # / CH | 7 / 19 | 23 / 67 | 39 / 115 | 55 / 163 |
| DATAOUT (111 DOWNTO 104) | HGP15 (TSA12 #14) | # / CH | 15 / 43 | 31 / 91 | 47 / 139 | 63 / 187 |
| DATAOUT (119 DOWNTO 112) | HGP8 (TSA12 #15) | # / CH | 8 / 22 | 24 / 70 | 40 / 118 | 56 / 166 |
| DATAOUT (127 DOWNTO 120) | HGP16 (TSA12 #16) | # / CH | 16 / 46 | 32 / 94 | 48 / 142 | 64 / 190 |

Fig.14

| 4h | 5h | 6h | 7h | 8h | 9h | Ah | Bh |
|----|----|----|----|----|----|----|----|
| 65<br>2 | 81<br>50 | 97<br>98 | 113<br>146 | 129<br>3 | 145<br>51 | 161<br>99 | 177<br>147 |
| 73<br>26 | 89<br>74 | 105<br>122 | 121<br>170 | 137<br>27 | 153<br>75 | 169<br>123 | 185<br>171 |
| 66<br>5 | 82<br>53 | 98<br>101 | 114<br>149 | 130<br>6 | 146<br>54 | 162<br>102 | 178<br>150 |
| 74<br>29 | 90<br>77 | 106<br>125 | 122<br>173 | 138<br>30 | 154<br>78 | 170<br>126 | 186<br>174 |
| 67<br>8 | 83<br>56 | 99<br>104 | 115<br>152 | 131<br>9 | 147<br>57 | 163<br>105 | 179<br>153 |
| 75<br>32 | 91<br>80 | 107<br>128 | 123<br>176 | 139<br>33 | 155<br>81 | 171<br>129 | 187<br>177 |
| 68<br>11 | 84<br>59 | 100<br>107 | 116<br>155 | 132<br>12 | 148<br>60 | 164<br>108 | 180<br>156 |
| 76<br>35 | 92<br>83 | 108<br>131 | 124<br>179 | 140<br>36 | 156<br>84 | 172<br>132 | 188<br>180 |

| 4h | 5h | 6h | 7h | 8h | 9h | Ah | Bh |
|----|----|----|----|----|----|----|----|
| 69<br>14 | 85<br>62 | 101<br>110 | 117<br>158 | 133<br>15 | 149<br>63 | 165<br>111 | 181<br>159 |
| 77<br>38 | 93<br>86 | 109<br>134 | 125<br>182 | 141<br>39 | 157<br>87 | 173<br>135 | 189<br>183 |
| 70<br>17 | 86<>65 | 102<br>113 | 118<br>161 | 134<br>18 | 150<br>66 | 166<br>114 | 182<br>162 |
| 78<br>41 | 94<br>89 | 110<br>137 | 126<br>185 | 142<br>42 | 158<br>90 | 174<br>138 | 190<br>186 |
| 71<br>20 | 87<br>68 | 103<br>116 | 119<br>164 | 135<br>21 | 151<br>69 | 167<br>117 | 183<br>165 |
| 79<br>44 | 95<br>92 | 111<br>140 | 127<br>188 | 143<br>45 | 159<br>93 | 175<br>141 | 191<br>189 |
| 72<br>23 | 88<br>71 | 104<br>119 | 120<br>167 | 136<br>24 | 152<br>72 | 168<br>120 | 184<br>168 |
| 80<br>47 | 96<br>95 | 112<br>143 | 128<br>191 | 144<br>48 | 160<br>96 | 176<br>144 | 192<br>192 |

Fig.34

| | # | 1 | 2 | 3 | 4 | | 66 | 67 | 68 | 129 | 130 | 131 | 132 |
|---|---|---|---|---|---|---|---|---|---|---|---|---|---|
| LGP1 | CH | 1 | 4 | 7 | 10 | | 5 | 8 | 11 | 3 | 6 | 9 | 12 |
| LGP2 | # | 5 | 6 | 7 | 8 | | 69 | 70 | 71 | 72 | 133 | 134 | 135 | 136 |
| | CH | 13 | 16 | 19 | 22 | | 14 | 17 | 20 | 23 | 15 | 18 | 21 | 24 |
| LGP3 | # | 9 | 10 | 11 | 12 | | 73 | 74 | 75 | 76 | 137 | 138 | 139 | 140 |
| | CH | 25 | 28 | 31 | 34 | | 26 | 29 | 32 | 35 | 27 | 30 | 33 | 36 |
| LGP4 | # | 13 | 14 | 15 | 16 | | 77 | 78 | 79 | 80 | 141 | 142 | 143 | 144 |
| | CH | 37 | 40 | 43 | 46 | | 38 | 41 | 44 | 47 | 39 | 42 | 45 | 48 |
| LGP5 | # | 17 | 18 | 19 | 20 | | 81 | 82 | 83 | 84 | 145 | 146 | 147 | 148 |
| | CH | 49 | 52 | 55 | 58 | | 50 | 53 | 56 | 59 | 51 | 54 | 57 | 60 |
| LGP6 | # | 21 | 22 | 23 | 24 | | 85 | 86 | 87 | 88 | 149 | 150 | 151 | 152 |
| | CH | 61 | 64 | 67 | 70 | | 62 | 65 | 68 | 71 | 63 | 66 | 69 | 72 |
| LGP7 | # | 25 | 26 | 27 | 28 | | 89 | 90 | 91 | 92 | 153 | 154 | 155 | 156 |
| | CH | 73 | 76 | 79 | 82 | | 74 | 77 | 80 | 83 | 75 | 78 | 81 | 84 |
| LGP8 | # | 29 | 30 | 31 | 32 | | 93 | 94 | 95 | 96 | 157 | 158 | 159 | 160 |
| | CH | 85 | 88 | 91 | 94 | | 86 | 89 | 92 | 95 | 87 | 90 | 93 | 96 |

Fig. 35

| | | | | | | | | | | | |
|---|---|---|---|---|---|---|---|---|---|---|---|
| LGP9 # | (33) | 34 | 35 | 36 | (97) | 98 | 99 | 100 | (161) | 162 | 163 | 164 |
| LGP9 CH | 97 | 100 | 103 | 106 | 98 | 101 | 104 | 107 | 99 | 102 | 105 | 108 |
| LGP10 # | 37 | 38 | 39 | 40 | 101 | 102 | 103 | 104 | 165 | 166 | 167 | 168 |
| LGP10 CH | 109 | 112 | 115 | 118 | 110 | 113 | 116 | 119 | 111 | 114 | 117 | 120 |
| LGP11 # | 41 | 42 | 43 | 44 | 105 | 106 | 107 | 108 | 169 | 170 | 171 | 172 |
| LGP11 CH | 121 | 124 | 127 | 130 | 122 | 125 | 128 | 131 | 123 | 126 | 129 | 132 |
| LGP12 # | 45 | 46 | 47 | 48 | 109 | 110 | 111 | 112 | 173 | 174 | 175 | 176 |
| LGP12 CH | 133 | 136 | 139 | 142 | 134 | 137 | 140 | 143 | 135 | 138 | 141 | 144 |
| LGP13 # | (49) | 50 | 51 | 52 | (113) | 114 | 115 | 116 | (177) | 178 | 179 | 180 |
| LGP13 CH | 145 | 148 | 151 | 154 | 146 | 149 | 152 | 155 | 147 | 150 | 153 | 156 |
| LGP14 # | 53 | 54 | 55 | 56 | 117 | 118 | 119 | 120 | 181 | 182 | 183 | 184 |
| LGP14 CH | 157 | 160 | 163 | 166 | 158 | 161 | 164 | 167 | 159 | 162 | 165 | 168 |
| LGP15 # | 57 | 58 | 59 | 60 | 121 | 122 | 123 | 124 | 185 | 186 | 187 | 188 |
| LGP15 CH | 169 | 172 | 175 | 178 | 170 | 173 | 176 | 179 | 171 | 174 | 177 | 180 |
| LGP16 # | 61 | 62 | 63 | 64 | 125 | 126 | 127 | 128 | 189 | 190 | 191 | 192 |
| LGP16 CH | 181 | 184 | 187 | 190 | 182 | 185 | 188 | 191 | 183 | 186 | 189 | 192 |

| # | 1 | 1 | 1 |   | 65 | 65 | 65 | 129 | 129 | 129 | 129 |
|---|---|---|---|---|----|----|----|-----|-----|-----|-----|
| CH | 1 | 1 | 1 |   | 2  | 2  | 2  | 3   | 3   | 3   | 3   |
| # | 5 | 5 | 5 |   | 69 | 69 | 69 | 133 | 133 | 133 | 133 |
| CH | 13 | 13 | 13 |   | 14 | 14 | 14 | 15 | 15 | 15 | 15 |

| # | 9 | 9 | 9 | 73 | 73 | 73 | 73 | 137 | 137 | 137 | 137 |
|---|---|---|---|----|----|----|----|-----|-----|-----|-----|
| CH | 25 | 25 | 25 | 26 | 26 | 26 | 26 | 27 | 27 | 27 | 27 |
| # | 13 | 13 | 13 | 77 | 77 | 77 | 77 | 141 | 141 | 141 | 141 |
| CH | 37 | 37 | 37 | 38 | 38 | 38 | 38 | 39 | 39 | 39 | 39 |

| # | 17 | 17 | 17 | 81 | 81 | 81 | 81 | 145 | 145 | 145 | 145 |
|---|----|----|----|----|----|----|----|-----|-----|-----|-----|
| CH | 49 | 49 | 49 | 50 | 50 | 50 | 50 | 51 | 51 | 51 | 51 |
| # | 21 | 21 | 21 | 85 | 85 | 85 | 85 | 149 | 149 | 149 | 149 |
| CH | 61 | 61 | 61 | 62 | 62 | 62 | 62 | 63 | 63 | 63 | 63 |

| # | 25 | 25 | 25 | 89 | 89 | 89 | 89 | 153 | 153 | 153 | 153 |
|---|----|----|----|----|----|----|----|-----|-----|-----|-----|
| CH | 73 | 73 | 73 | 74 | 74 | 74 | 74 | 75 | 75 | 75 | 75 |
| # | 29 | 29 | 29 | 93 | 93 | 93 | 93 | 157 | 157 | 157 | 157 |
| CH | 85 | 85 | 85 | 86 | 86 | 86 | 86 | 87 | 87 | 87 | 87 |

Fig. 37

| # | 33 | 33 | 33 | 33 | 97 | 97 | 97 | 97 | 161 | 161 | 161 | 161 |
| --- | --- | --- | --- | --- | --- | --- | --- | --- | --- | --- | --- | --- |
| CH | 97 | 97 | (97) | 97 | 98 | 98 | 98 | 98 | 99 | 99 | 99 | 99 |
| # | 37 | 37 | 37 | 37 | 101 | 101 | 101 | 101 | 165 | 165 | 165 | 165 |
| CH | 109 | 109 | 109 | 109 | 110 | 110 | 110 | 110 | 111 | 111 | 111 | 111 |
| # | 41 | 41 | 41 | 41 | 105 | 105 | 105 | 105 | 169 | 169 | 169 | 169 |
| CH | 121 | 121 | 121 | 121 | 122 | 122 | 122 | 122 | 123 | 123 | 123 | 123 |
| # | 45 | 45 | 45 | 45 | 109 | 109 | 109 | 109 | 173 | 173 | 173 | 173 |
| CH | 133 | 133 | 133 | 133 | 134 | 134 | 134 | 134 | 135 | 135 | 135 | 135 |
| # | 49 | 49 | (49) | 49 | 113 | 113 | 113 | 113 | 177 | 177 | 177 | (177) |
| CH | 145 | 145 | 145 | 145 | 146 | 146 | (146) | 146 | 147 | 147 | 147 | 147 |
| # | 53 | 53 | 53 | 53 | 117 | 117 | 117 | 117 | 181 | 181 | 181 | 181 |
| CH | 157 | 157 | 157 | 157 | 158 | 158 | 158 | 158 | 159 | 159 | 159 | 159 |
| # | 57 | 57 | 57 | 57 | 121 | 121 | 121 | 121 | 185 | 185 | 185 | 185 |
| CH | 169 | 169 | 169 | 169 | 170 | 170 | 170 | 170 | 171 | 171 | 171 | 171 |
| # | 61 | 61 | 61 | 61 | 125 | 125 | 125 | 125 | 189 | 189 | 189 | 189 |
| CH | 181 | 181 | 181 | 181 | 182 | 182 | 182 | 182 | 183 | 183 | 183 | 183 |

| | # | | | | | | | | | | |
|---|---|---|---|---|---|---|---|---|---|---|---|
| LGP1 | CH | 1 | 17 | 33 | 49 | 65 | 81 | 97 | 113 | 129 | 145 | 161 | 177 |
| | # | | | | | | | | | | |
| LGP2 | CH | 1 | 49 | 97 | 145 | 2 | 50 | 98 | 146 | 3 | 51 | 99 | 147 |
| | # | 9 | 25 | 41 | 57 | 73 | 89 | 105 | 121 | 137 | 153 | 169 | 185 |
| LGP3 | CH | 25 | 73 | 121 | 169 | 26 | 74 | 122 | 170 | 27 | 75 | 123 | 171 |
| | # | 2 | 18 | 34 | 50 | 66 | 82 | 98 | 114 | 130 | 146 | 162 | 178 |
| LGP4 | CH | 4 | 52 | 100 | 148 | 5 | 53 | 101 | 149 | 6 | 54 | 102 | 150 |
| | # | 10 | 26 | 42 | 58 | 74 | 90 | 106 | 122 | 138 | 154 | 170 | 186 |
| LGP5 | CH | 28 | 76 | 124 | 172 | 29 | 77 | 125 | 173 | 30 | 78 | 126 | 174 |
| | # | 3 | 19 | 35 | 51 | 67 | 83 | 99 | 115 | 131 | 147 | 163 | 179 |
| LGP6 | CH | 7 | 55 | 103 | 151 | 8 | 56 | 104 | 152 | 9 | 57 | 105 | 153 |
| | # | 11 | 27 | 43 | 59 | 75 | 91 | 107 | 123 | 139 | 155 | 171 | 187 |
| LGP7 | CH | 31 | 79 | 127 | 175 | 32 | 80 | 128 | 176 | 33 | 81 | 129 | 177 |
| | # | 4 | 20 | 36 | 52 | 68 | 84 | 100 | 116 | 132 | 148 | 164 | 180 |
| LGP8 | CH | 10 | 58 | 106 | 154 | 11 | 59 | 107 | 155 | 12 | 60 | 108 | 156 |
| | # | 12 | 28 | 44 | 60 | 76 | 92 | 108 | 124 | 140 | 156 | 172 | 188 |
| | CH | 34 | 82 | 130 | 178 | 35 | 83 | 131 | 179 | 36 | 84 | 132 | 180 |

LGP9 / LGP10

| # | 5 | 21 | 37 | 53 | 69 | 85 | 101 | 117 | 133 | 149 | 165 | 181 |
|---|---|---|---|---|---|---|---|---|---|---|---|---|
| CH | 13 | 61 | 109 | 157 | 14 | 62 | 110 | 158 | 15 | 63 | 111 | 159 |
| # | 13 | 29 | 45 | 61 | 77 | 93 | 109 | 125 | 141 | 157 | 173 | 189 |
| CH | 37 | 85 | 133 | 181 | 38 | 86 | 134 | 182 | 39 | 87 | 135 | 183 |

LGP11 / LGP12

| # | 6 | 22 | 38 | 54 | 70 | 86 | 102 | 118 | 134 | 150 | 166 | 182 |
|---|---|---|---|---|---|---|---|---|---|---|---|---|
| CH | 16 | 64 | 112 | 160 | 17 | 65 | 113 | 161 | 18 | 66 | 114 | 162 |
| # | 14 | 30 | 46 | 62 | 78 | 94 | 110 | 126 | 142 | 158 | 174 | 190 |
| CH | 40 | 88 | 136 | 184 | 41 | 89 | 137 | 185 | 42 | 90 | 138 | 186 |

LGP13 / LGP14

| # | 7 | 23 | 39 | 55 | 71 | 87 | 103 | 119 | 135 | 151 | 167 | 183 |
|---|---|---|---|---|---|---|---|---|---|---|---|---|
| CH | 19 | 67 | 115 | 163 | 20 | 68 | 116 | 164 | 21 | 69 | 117 | 165 |
| # | 15 | 31 | 47 | 63 | 79 | 95 | 111 | 127 | 143 | 159 | 175 | 191 |
| CH | 43 | 91 | 139 | 187 | 44 | 92 | 140 | 188 | 45 | 93 | 141 | 189 |

LGP15 / LGP16

| # | 8 | 24 | 40 | 56 | 72 | 88 | 104 | 120 | 136 | 152 | 168 | 184 |
|---|---|---|---|---|---|---|---|---|---|---|---|---|
| CH | 22 | 70 | 118 | 166 | 23 | 71 | 119 | 167 | 24 | 72 | 120 | 168 |
| # | 16 | 32 | 48 | 64 | 80 | 96 | 112 | 128 | 144 | 160 | 176 | 192 |
| CH | 46 | 94 | 142 | 190 | 47 | 95 | 143 | 191 | 48 | 96 | 144 | 192 |

Fig.43

| # | | | | | | | | | | | | |
|---|---|---|---|---|---|---|---|---|---|---|---|---|
| CH | (1) | 1 | 1 | 1 | (65) | 65 | 65 | 65 | (129) | 129 | 129 | 129 |
| # | 1 | 1 | 1 | 1 | 2 | 2 | 2 | 2 | 3 | 3 | 3 | 3 |
| CH | 9 | 9 | 9 | 9 | 73 | 73 | 73 | 73 | 137 | 137 | 137 | 137 |
| | 25 | 25 | 25 | 25 | 26 | 26 | 26 | 26 | 27 | 27 | 27 | 27 |
| # | (2) | 2 | 2 | 2 | (66) | 66 | 66 | 66 | 130 | 130 | 130 | 130 |
| CH | 4 | 4 | 4 | 4 | 5 | 5 | 5 | 5 | 6 | 6 | 6 | 6 |
| # | 10 | 10 | 10 | 10 | 74 | 74 | 74 | 74 | 138 | 138 | 138 | 138 |
| CH | 28 | 28 | 28 | 28 | 29 | 29 | 29 | 29 | 30 | 30 | 30 | 30 |
| # | 3 | (3) | 3 | 3 | 67 | (67) | 67 | 67 | 131 | (131) | 131 | 131 |
| CH | 7 | 7 | 7 | 7 | 8 | 8 | 8 | 8 | 9 | 9 | 9 | 9 |
| # | 11 | 11 | 11 | 11 | 75 | 75 | 75 | 75 | 139 | 139 | 139 | 139 |
| CH | 31 | 31 | 31 | 31 | 32 | 32 | 32 | 32 | 33 | 33 | 33 | 33 |
| # | 4 | 4 | (4) | 4 | 68 | 68 | (68) | 68 | 132 | 132 | 132 | (132) |
| CH | 10 | 10 | 10 | 10 | 11 | 11 | 11 | 11 | 12 | 12 | 12 | 12 |
| # | 12 | 12 | 12 | 12 | 76 | 76 | 76 | 76 | 140 | 140 | 140 | 140 |
| CH | 34 | 34 | 34 | 34 | 35 | 35 | 35 | 35 | 36 | 36 | 36 | 36 |

| # | 5 | 5 | 5 | 5 | 69 | 69 | 69 | 69 | 133 | 133 | 133 | 133 |
|---|---|---|---|---|----|----|----|----|-----|-----|-----|-----|
| CH | 13 | 13 | 13 | 13 | 14 | 14 | 14 | 14 | 15 | 15 | 15 | 15 |
| # | 13 | 13 | 13 | 13 | 77 | 77 | 77 | 77 | 141 | 141 | 141 | 141 |
| CH | 37 | 37 | 37 | 37 | 38 | 38 | 38 | 38 | 39 | 39 | 39 | 39 |

| # | 6 | 6 | 6 | 6 | 70 | 70 | 70 | 70 | 134 | 134 | 134 | 134 |
|---|---|---|---|---|----|----|----|----|-----|-----|-----|-----|
| CH | 16 | 16 | 16 | 16 | 17 | 17 | 17 | 17 | 18 | 18 | 18 | 18 |
| # | 14 | 14 | 14 | 14 | 78 | 78 | 78 | 78 | 142 | 142 | 142 | 142 |
| CH | 40 | 40 | 40 | 40 | 41 | 41 | 41 | 41 | 42 | 42 | 42 | 42 |

| # | 7 | 7 | 7 | 7 | 71 | 71 | 71 | 71 | 135 | 135 | 135 | 135 |
|---|---|---|---|---|----|----|----|----|-----|-----|-----|-----|
| CH | 19 | 19 | 19 | 19 | 20 | 20 | 20 | 20 | 21 | 21 | 21 | 21 |
| # | 15 | 15 | 15 | 15 | 79 | 79 | 79 | 79 | 143 | 143 | 143 | 143 |
| CH | 43 | 43 | 43 | 43 | 44 | 44 | 44 | 44 | 45 | 45 | 45 | 45 |

| # | 8 | 8 | 8 | 8 | 72 | 72 | 72 | 72 | 136 | 136 | 136 | 136 |
|---|---|---|---|---|----|----|----|----|-----|-----|-----|-----|
| CH | 22 | 22 | 22 | 22 | 23 | 23 | 23 | 23 | 24 | 24 | 24 | 24 |
| # | 16 | 16 | 16 | 16 | 80 | 80 | 80 | 80 | 144 | 144 | 144 | 144 |
| CH | 46 | 46 | 46 | 46 | 47 | 47 | 47 | 47 | 48 | 48 | 48 | 48 |

Fig.48
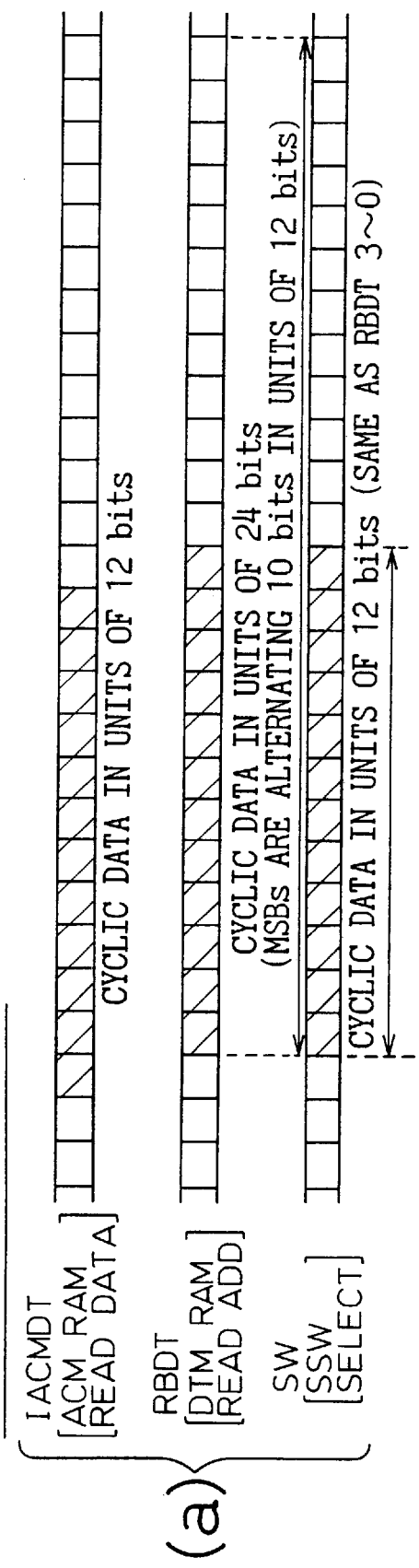
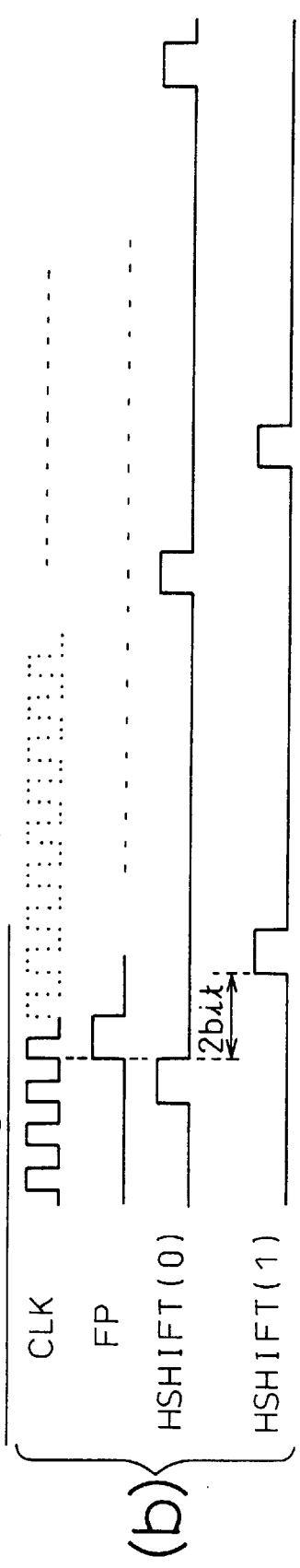

| | ATM CELL SETTING CODE | | | | | | | | NUMBER OF CH | NUMBER OF DTM TIME SLOT / ACM CELL CODE | | | | | | | NUMBER OF SPACE SW |
|---|---|---|---|---|---|---|---|---|---|---|---|---|---|---|---|---|---|
| CH1  | 0 | 0 | 0 | 0 | 0 | 0 | 0 | 0 | 0(00h)  | 0 | 0 | 0 | 0 | 0 | 0 | 0 | 0 |
| CH2  | 0 | 0 | 0 | 0 | 0 | 0 | 0 | 1 | 64(40h) | 0 | 1 | 0 | 0 | 0 | 0 | 0 | 0 |
| CH3  | 0 | 0 | 0 | 0 | 0 | 0 | 1 | 0 | 128 | 1 | 0 | 0 | 0 | 0 | 0 | 0 | 0 |
| CH4  | 0 | 0 | 0 | 0 | 0 | 0 | 1 | 1 | 16  | 0 | 0 | 0 | 1 | 0 | 0 | 0 | 0 |
| CH5  | 0 | 0 | 0 | 0 | 0 | 1 | 0 | 0 | 80  | 0 | 1 | 0 | 1 | 0 | 0 | 0 | 0 |
| CH6  | 0 | 0 | 0 | 0 | 0 | 1 | 0 | 1 | 144 | 1 | 0 | 0 | 1 | 0 | 0 | 0 | 0 |
| CH7  | 0 | 0 | 0 | 0 | 0 | 1 | 1 | 0 | 32  | 0 | 0 | 1 | 0 | 0 | 0 | 0 | 0 |
| CH8  | 0 | 0 | 0 | 0 | 0 | 1 | 1 | 1 | 96  | 0 | 1 | 1 | 0 | 0 | 0 | 0 | 0 |
| CH9  | 0 | 0 | 0 | 0 | 1 | 0 | 0 | 0 | 160 | 1 | 0 | 1 | 0 | 0 | 0 | 0 | 0 |
| CH10 | 0 | 0 | 0 | 0 | 1 | 0 | 0 | 1 | 48  | 0 | 0 | 1 | 1 | 0 | 0 | 0 | 0 |
| CH11 | 0 | 0 | 0 | 0 | 1 | 0 | 1 | 0 | 112 | 0 | 1 | 1 | 1 | 0 | 0 | 0 | 0 |
| CH12 | 0 | 0 | 0 | 0 | 1 | 0 | 1 | 1 | 176 | 1 | 0 | 1 | 1 | 0 | 0 | 0 | 0 |
| CH13 | 0 | 0 | 0 | 0 | 1 | 1 | 0 | 0 | 1   | 0 | 0 | 0 | 0 | 0 | 0 | 0 | 1 |
| CH14 | 0 | 0 | 0 | 0 | 1 | 1 | 0 | 1 | 65  | 0 | 1 | 0 | 0 | 0 | 0 | 0 | 1 |
| CH15 | 0 | 0 | 0 | 0 | 1 | 1 | 1 | 0 | 129 | 1 | 0 | 0 | 0 | 0 | 0 | 0 | 1 |
| CH16 | 0 | 0 | 0 | 0 | 1 | 1 | 1 | 1 | 17  | 0 | 0 | 0 | 1 | 0 | 0 | 0 | 1 |
| CH17 | 0 | 0 | 0 | 1 | 0 | 0 | 0 | 0 | 81  | 0 | 1 | 0 | 1 | 0 | 0 | 0 | 1 |
| CH18 | 0 | 0 | 0 | 1 | 0 | 0 | 0 | 1 | 145 | 1 | 0 | 0 | 1 | 0 | 0 | 0 | 1 |
| CH19 | 0 | 0 | 0 | 1 | 0 | 0 | 1 | 0 | 33  | 0 | 0 | 1 | 0 | 0 | 0 | 0 | 1 |
| CH20 | 0 | 0 | 0 | 1 | 0 | 0 | 1 | 1 | 97  | 0 | 1 | 1 | 0 | 0 | 0 | 0 | 1 |
| CH21 | 0 | 0 | 0 | 1 | 0 | 1 | 0 | 0 | 161 | 1 | 0 | 1 | 0 | 0 | 0 | 0 | 1 |
| CH22 | 0 | 0 | 0 | 1 | 0 | 1 | 0 | 1 | 49  | 0 | 0 | 1 | 1 | 0 | 0 | 0 | 1 |
| CH23 | 0 | 0 | 0 | 1 | 0 | 1 | 1 | 0 | 113 | 0 | 1 | 1 | 1 | 0 | 0 | 0 | 1 |
| CH24 | 0 | 0 | 0 | 1 | 0 | 1 | 1 | 1 | 177 | 1 | 0 | 1 | 1 | 0 | 0 | 0 | 1 |
| CH25 | 0 | 0 | 0 | 1 | 1 | 0 | 0 | 0 | 2   | 0 | 0 | 0 | 0 | 0 | 0 | 1 | 0 |
| CH26 | 0 | 0 | 0 | 1 | 1 | 0 | 0 | 1 | 66  | 0 | 1 | 0 | 0 | 0 | 0 | 1 | 0 |
| CH27 | 0 | 0 | 0 | 1 | 1 | 0 | 1 | 0 | 130 | 1 | 0 | 0 | 0 | 0 | 0 | 1 | 0 |
| CH28 | 0 | 0 | 0 | 1 | 1 | 0 | 1 | 1 | 18  | 0 | 0 | 0 | 1 | 0 | 0 | 1 | 0 |
| CH29 | 0 | 0 | 0 | 1 | 1 | 1 | 0 | 0 | 82  | 0 | 1 | 0 | 1 | 0 | 0 | 1 | 0 |
| CH30 | 0 | 0 | 0 | 1 | 1 | 1 | 0 | 1 | 146 | 1 | 0 | 0 | 1 | 0 | 0 | 1 | 0 |
| CH31 | 0 | 0 | 0 | 1 | 1 | 1 | 1 | 0 | 34  | 0 | 0 | 1 | 0 | 0 | 0 | 1 | 0 |
| CH32 | 0 | 0 | 0 | 1 | 1 | 1 | 1 | 1 | 98  | 0 | 1 | 1 | 0 | 0 | 0 | 1 | 0 |
| CH33 | 0 | 0 | 1 | 0 | 0 | 0 | 0 | 0 | 162 | 1 | 0 | 1 | 0 | 0 | 0 | 1 | 0 |
| CH34 | 0 | 0 | 1 | 0 | 0 | 0 | 0 | 1 | 50  | 0 | 0 | 1 | 1 | 0 | 0 | 1 | 0 |
| CH35 | 0 | 0 | 1 | 0 | 0 | 0 | 1 | 0 | 114 | 0 | 1 | 1 | 1 | 0 | 0 | 1 | 0 |
| CH36 | 0 | 0 | 1 | 0 | 0 | 0 | 1 | 1 | 178 | 1 | 0 | 1 | 1 | 0 | 0 | 1 | 0 |
| CH37 | 0 | 0 | 1 | 0 | 0 | 1 | 0 | 0 | 3   | 0 | 0 | 0 | 0 | 0 | 0 | 1 | 1 |
| CH38 | 0 | 0 | 1 | 0 | 0 | 1 | 0 | 1 | 67  | 0 | 1 | 0 | 0 | 0 | 0 | 1 | 1 |
| CH39 | 0 | 0 | 1 | 0 | 0 | 1 | 1 | 0 | 131 | 1 | 0 | 0 | 0 | 0 | 0 | 1 | 1 |
| CH40 | 0 | 0 | 1 | 0 | 0 | 1 | 1 | 1 | 19  | 0 | 0 | 0 | 1 | 0 | 0 | 1 | 1 |
| CH41 | 0 | 0 | 1 | 0 | 1 | 0 | 0 | 0 | 83  | 0 | 1 | 0 | 1 | 0 | 0 | 1 | 1 |
| CH42 | 0 | 0 | 1 | 0 | 1 | 0 | 0 | 1 | 147 | 1 | 0 | 0 | 1 | 0 | 0 | 1 | 1 |
| CH43 | 0 | 0 | 1 | 0 | 1 | 0 | 1 | 0 | 35  | 0 | 0 | 1 | 0 | 0 | 0 | 1 | 1 |
| CH44 | 0 | 0 | 1 | 0 | 1 | 0 | 1 | 1 | 99  | 0 | 1 | 1 | 0 | 0 | 0 | 1 | 1 |
| CH45 | 0 | 0 | 1 | 0 | 1 | 1 | 0 | 0 | 163 | 1 | 0 | 1 | 0 | 0 | 0 | 1 | 1 |
| CH46 | 0 | 0 | 1 | 0 | 1 | 1 | 0 | 1 | 51  | 0 | 0 | 1 | 1 | 0 | 0 | 1 | 1 |
| CH47 | 0 | 0 | 1 | 0 | 1 | 1 | 1 | 0 | 115 | 0 | 1 | 1 | 1 | 0 | 0 | 1 | 1 |
| CH48 | 0 | 0 | 1 | 0 | 1 | 1 | 1 | 1 | 179 | 1 | 0 | 1 | 1 | 0 | 0 | 1 | 1 |

Fig.67

| | ATM CELL SETTING CODE | | | | | | | | NUMBER OF CH | NUMBER OF DTM TIME SLOT / NUMBER OF SPACE SW / ACM CELL CODE | | | | | | | |
|---|---|---|---|---|---|---|---|---|---|---|---|---|---|---|---|---|---|
| CH49 | 0 | 0 | 1 | 1 | 0 | 0 | 0 | 0 | 4 | 0 | 0 | 0 | 0 | 0 | 1 | 0 | 0 |
| CH50 | 0 | 0 | 1 | 1 | 0 | 0 | 0 | 1 | 68 | 0 | 1 | 0 | 0 | 0 | 1 | 0 | 0 |
| CH51 | 0 | 0 | 1 | 1 | 0 | 0 | 1 | 0 | 132 | 1 | 0 | 0 | 0 | 0 | 1 | 0 | 0 |
| CH52 | 0 | 0 | 1 | 1 | 0 | 0 | 1 | 1 | 20 | 0 | 0 | 0 | 1 | 0 | 1 | 0 | 0 |
| CH53 | 0 | 0 | 1 | 1 | 0 | 1 | 0 | 0 | 84 | 0 | 1 | 0 | 1 | 0 | 1 | 0 | 0 |
| CH54 | 0 | 0 | 1 | 1 | 0 | 1 | 0 | 1 | 148 | 1 | 0 | 0 | 1 | 0 | 1 | 0 | 0 |
| CH55 | 0 | 0 | 1 | 1 | 0 | 1 | 1 | 0 | 36 | 0 | 0 | 1 | 0 | 0 | 1 | 0 | 0 |
| CH56 | 0 | 0 | 1 | 1 | 0 | 1 | 1 | 1 | 100 | 0 | 1 | 1 | 0 | 0 | 1 | 0 | 0 |
| CH57 | 0 | 0 | 1 | 1 | 1 | 0 | 0 | 0 | 164 | 1 | 0 | 1 | 0 | 0 | 1 | 0 | 0 |
| CH58 | 0 | 0 | 1 | 1 | 1 | 0 | 0 | 1 | 52 | 0 | 0 | 1 | 1 | 0 | 1 | 0 | 0 |
| CH59 | 0 | 0 | 1 | 1 | 1 | 0 | 1 | 0 | 116 | 0 | 1 | 1 | 1 | 0 | 1 | 0 | 0 |
| CH60 | 0 | 0 | 1 | 1 | 1 | 0 | 1 | 1 | 180 | 1 | 0 | 1 | 1 | 0 | 1 | 0 | 0 |
| CH61 | 0 | 0 | 1 | 1 | 1 | 1 | 0 | 0 | 5 | 0 | 0 | 0 | 0 | 0 | 1 | 0 | 1 |
| CH62 | 0 | 0 | 1 | 1 | 1 | 1 | 0 | 1 | 69 | 0 | 1 | 0 | 0 | 0 | 1 | 0 | 1 |
| CH63 | 0 | 0 | 1 | 1 | 1 | 1 | 1 | 0 | 133 | 1 | 0 | 0 | 0 | 0 | 1 | 0 | 1 |
| CH64 | 0 | 0 | 1 | 1 | 1 | 1 | 1 | 1 | 21 | 0 | 0 | 0 | 1 | 0 | 1 | 0 | 1 |
| CH65 | 0 | 1 | 0 | 0 | 0 | 0 | 0 | 0 | 85 | 0 | 1 | 0 | 1 | 0 | 1 | 0 | 1 |
| CH66 | 0 | 1 | 0 | 0 | 0 | 0 | 0 | 1 | 149 | 1 | 0 | 0 | 1 | 0 | 1 | 0 | 1 |
| CH67 | 0 | 1 | 0 | 0 | 0 | 0 | 1 | 0 | 37 | 0 | 0 | 1 | 0 | 0 | 1 | 0 | 1 |
| CH68 | 0 | 1 | 0 | 0 | 0 | 0 | 1 | 1 | 101 | 0 | 1 | 1 | 0 | 0 | 1 | 0 | 1 |
| CH69 | 0 | 1 | 0 | 0 | 0 | 1 | 0 | 0 | 165 | 1 | 0 | 1 | 0 | 0 | 1 | 0 | 1 |
| CH70 | 0 | 1 | 0 | 0 | 0 | 1 | 0 | 1 | 53 | 0 | 0 | 1 | 1 | 0 | 1 | 0 | 1 |
| CH71 | 0 | 1 | 0 | 0 | 0 | 1 | 1 | 0 | 117 | 0 | 1 | 1 | 1 | 0 | 1 | 0 | 1 |
| CH72 | 0 | 1 | 0 | 0 | 0 | 1 | 1 | 1 | 181 | 1 | 0 | 1 | 1 | 0 | 1 | 0 | 1 |
| CH73 | 0 | 1 | 0 | 0 | 1 | 0 | 0 | 0 | 6 | 0 | 0 | 0 | 0 | 0 | 1 | 1 | 0 |
| CH74 | 0 | 1 | 0 | 0 | 1 | 0 | 0 | 1 | 70 | 0 | 1 | 0 | 0 | 0 | 1 | 1 | 0 |
| CH75 | 0 | 1 | 0 | 0 | 1 | 0 | 1 | 0 | 134 | 1 | 0 | 0 | 0 | 0 | 1 | 1 | 0 |
| CH76 | 0 | 1 | 0 | 0 | 1 | 0 | 1 | 1 | 22 | 0 | 0 | 0 | 1 | 0 | 1 | 1 | 0 |
| CH77 | 0 | 1 | 0 | 0 | 1 | 1 | 0 | 0 | 86 | 0 | 1 | 0 | 1 | 0 | 1 | 1 | 0 |
| CH78 | 0 | 1 | 0 | 0 | 1 | 1 | 0 | 1 | 150 | 1 | 0 | 0 | 1 | 0 | 1 | 1 | 0 |
| CH79 | 0 | 1 | 0 | 0 | 1 | 1 | 1 | 0 | 38 | 0 | 0 | 1 | 0 | 0 | 1 | 1 | 0 |
| CH80 | 0 | 1 | 0 | 0 | 1 | 1 | 1 | 1 | 102 | 0 | 1 | 1 | 0 | 0 | 1 | 1 | 0 |
| CH81 | 0 | 1 | 0 | 1 | 0 | 0 | 0 | 0 | 166 | 1 | 0 | 1 | 0 | 0 | 1 | 1 | 0 |
| CH82 | 0 | 1 | 0 | 1 | 0 | 0 | 0 | 1 | 54 | 0 | 0 | 1 | 1 | 0 | 1 | 1 | 0 |
| CH83 | 0 | 1 | 0 | 1 | 0 | 0 | 1 | 0 | 118 | 0 | 1 | 1 | 1 | 0 | 1 | 1 | 0 |
| CH84 | 0 | 1 | 0 | 1 | 0 | 0 | 1 | 1 | 182 | 1 | 0 | 1 | 1 | 0 | 1 | 1 | 0 |
| CH85 | 0 | 1 | 0 | 1 | 0 | 1 | 0 | 0 | 7 | 0 | 0 | 0 | 0 | 0 | 1 | 1 | 1 |
| CH86 | 0 | 1 | 0 | 1 | 0 | 1 | 0 | 1 | 71 | 0 | 1 | 0 | 0 | 0 | 1 | 1 | 1 |
| CH87 | 0 | 1 | 0 | 1 | 0 | 1 | 1 | 0 | 135 | 1 | 0 | 0 | 0 | 0 | 1 | 1 | 1 |
| CH88 | 0 | 1 | 0 | 1 | 0 | 1 | 1 | 1 | 23 | 0 | 0 | 0 | 1 | 0 | 1 | 1 | 1 |
| CH89 | 0 | 1 | 0 | 1 | 1 | 0 | 0 | 0 | 87 | 0 | 1 | 0 | 1 | 0 | 1 | 1 | 1 |
| CH90 | 0 | 1 | 0 | 1 | 1 | 0 | 0 | 1 | 151 | 1 | 0 | 0 | 1 | 0 | 1 | 1 | 1 |
| CH91 | 0 | 1 | 0 | 1 | 1 | 0 | 1 | 0 | 39 | 0 | 0 | 1 | 0 | 0 | 1 | 1 | 1 |
| CH92 | 0 | 1 | 0 | 1 | 1 | 0 | 1 | 1 | 103 | 0 | 1 | 1 | 0 | 0 | 1 | 1 | 1 |
| CH93 | 0 | 1 | 0 | 1 | 1 | 1 | 0 | 0 | 167 | 1 | 0 | 1 | 0 | 0 | 1 | 1 | 1 |
| CH94 | 0 | 1 | 0 | 1 | 1 | 1 | 0 | 1 | 55 | 0 | 0 | 1 | 1 | 0 | 1 | 1 | 1 |
| CH95 | 0 | 1 | 0 | 1 | 1 | 1 | 1 | 0 | 119 | 0 | 1 | 1 | 1 | 0 | 1 | 1 | 1 |
| CH96 | 0 | 1 | 0 | 1 | 1 | 1 | 1 | 1 | 183 | 1 | 0 | 1 | 1 | 0 | 1 | 1 | 1 |

Fig.68

ATM CELL SETTING CODE — NUMBER OF CH — NUMBER OF DTM TIME SLOT — NUMBER OF SPACE SW — ACM CELL CODE

| CH | ATM Cell Setting Code | | | | | | | | # CH | ACM Cell Code | | | | | | | |
|---|---|---|---|---|---|---|---|---|---|---|---|---|---|---|---|---|---|
| CH97  | 0 | 1 | 1 | 0 | 0 | 0 | 0 | 0 | 8   | 0 | 0 | 0 | 0 | 1 | 0 | 0 | 0 |
| CH98  | 0 | 1 | 1 | 0 | 0 | 0 | 0 | 0 | 72  | 0 | 1 | 0 | 0 | 1 | 0 | 0 | 0 |
| CH99  | 0 | 1 | 1 | 0 | 0 | 0 | 0 | 1 | 136 | 1 | 0 | 0 | 0 | 1 | 0 | 0 | 0 |
| CH100 | 0 | 1 | 1 | 0 | 0 | 0 | 1 | 0 | 24  | 0 | 0 | 0 | 1 | 1 | 0 | 0 | 0 |
| CH101 | 0 | 1 | 1 | 0 | 0 | 0 | 1 | 1 | 88  | 0 | 1 | 0 | 1 | 1 | 0 | 0 | 0 |
| CH102 | 0 | 1 | 1 | 0 | 0 | 1 | 0 | 0 | 152 | 1 | 0 | 0 | 1 | 1 | 0 | 0 | 0 |
| CH103 | 0 | 1 | 1 | 0 | 0 | 1 | 0 | 1 | 40  | 0 | 0 | 1 | 0 | 1 | 0 | 0 | 0 |
| CH104 | 0 | 1 | 1 | 0 | 0 | 1 | 1 | 0 | 104 | 0 | 1 | 1 | 0 | 1 | 0 | 0 | 0 |
| CH105 | 0 | 1 | 1 | 0 | 0 | 1 | 1 | 1 | 168 | 1 | 0 | 1 | 0 | 1 | 0 | 0 | 0 |
| CH106 | 0 | 1 | 1 | 0 | 1 | 0 | 0 | 0 | 56  | 0 | 0 | 1 | 1 | 1 | 0 | 0 | 0 |
| CH107 | 0 | 1 | 1 | 0 | 1 | 0 | 0 | 1 | 120 | 0 | 1 | 1 | 1 | 1 | 0 | 0 | 0 |
| CH108 | 0 | 1 | 1 | 0 | 1 | 0 | 1 | 0 | 184 | 1 | 0 | 1 | 1 | 1 | 0 | 0 | 0 |
| CH109 | 0 | 1 | 1 | 0 | 1 | 0 | 1 | 1 | 9   | 0 | 0 | 0 | 0 | 1 | 0 | 0 | 1 |
| CH110 | 0 | 1 | 1 | 0 | 1 | 1 | 0 | 0 | 73  | 0 | 1 | 0 | 0 | 1 | 0 | 0 | 1 |
| CH111 | 0 | 1 | 1 | 0 | 1 | 1 | 0 | 1 | 137 | 1 | 0 | 0 | 0 | 1 | 0 | 0 | 1 |
| CH112 | 0 | 1 | 1 | 0 | 1 | 1 | 1 | 0 | 25  | 0 | 0 | 0 | 1 | 1 | 0 | 0 | 1 |
| CH113 | 0 | 1 | 1 | 0 | 1 | 1 | 1 | 1 | 89  | 0 | 1 | 0 | 1 | 1 | 0 | 0 | 1 |
| CH114 | 0 | 1 | 1 | 1 | 0 | 0 | 0 | 0 | 153 | 1 | 0 | 0 | 1 | 1 | 0 | 0 | 1 |
| CH115 | 0 | 1 | 1 | 1 | 0 | 0 | 0 | 1 | 41  | 0 | 0 | 1 | 0 | 1 | 0 | 0 | 1 |
| CH116 | 0 | 1 | 1 | 1 | 0 | 0 | 1 | 0 | 105 | 0 | 1 | 1 | 0 | 1 | 0 | 0 | 1 |
| CH117 | 0 | 1 | 1 | 1 | 0 | 0 | 1 | 1 | 169 | 1 | 0 | 1 | 0 | 1 | 0 | 0 | 1 |
| CH118 | 0 | 1 | 1 | 1 | 0 | 1 | 0 | 0 | 57  | 0 | 0 | 1 | 1 | 1 | 0 | 0 | 1 |
| CH119 | 0 | 1 | 1 | 1 | 0 | 1 | 0 | 1 | 121 | 0 | 1 | 1 | 1 | 1 | 0 | 0 | 1 |
| CH120 | 0 | 1 | 1 | 1 | 0 | 1 | 1 | 0 | 185 | 1 | 0 | 1 | 1 | 1 | 0 | 0 | 1 |
| CH121 | 0 | 1 | 1 | 1 | 0 | 1 | 1 | 1 | 10  | 0 | 0 | 0 | 0 | 1 | 0 | 1 | 0 |
| CH122 | 0 | 1 | 1 | 1 | 1 | 0 | 0 | 0 | 74  | 0 | 1 | 0 | 0 | 1 | 0 | 1 | 0 |
| CH123 | 0 | 1 | 1 | 1 | 1 | 0 | 0 | 1 | 138 | 1 | 0 | 0 | 0 | 1 | 0 | 1 | 0 |
| CH124 | 0 | 1 | 1 | 1 | 1 | 0 | 1 | 0 | 26  | 0 | 0 | 0 | 1 | 1 | 0 | 1 | 0 |
| CH125 | 0 | 1 | 1 | 1 | 1 | 0 | 1 | 1 | 90  | 0 | 1 | 0 | 1 | 1 | 0 | 1 | 0 |
| CH126 | 0 | 1 | 1 | 1 | 1 | 1 | 0 | 0 | 154 | 1 | 0 | 0 | 1 | 1 | 0 | 1 | 0 |
| CH127 | 0 | 1 | 1 | 1 | 1 | 1 | 0 | 1 | 42  | 0 | 0 | 1 | 0 | 1 | 0 | 1 | 0 |
| CH128 | 0 | 1 | 1 | 1 | 1 | 1 | 1 | 0 | 106 | 0 | 1 | 1 | 0 | 1 | 0 | 1 | 0 |
| CH129 | 1 | 0 | 0 | 0 | 0 | 0 | 0 | 0 | 170 | 1 | 0 | 1 | 0 | 1 | 0 | 1 | 0 |
| CH130 | 1 | 0 | 0 | 0 | 0 | 0 | 0 | 1 | 58  | 0 | 0 | 1 | 1 | 1 | 0 | 1 | 0 |
| CH131 | 1 | 0 | 0 | 0 | 0 | 0 | 1 | 0 | 122 | 0 | 1 | 1 | 1 | 1 | 0 | 1 | 0 |
| CH132 | 1 | 0 | 0 | 0 | 0 | 0 | 1 | 1 | 186 | 1 | 0 | 1 | 1 | 1 | 0 | 1 | 0 |
| CH133 | 1 | 0 | 0 | 0 | 0 | 1 | 0 | 0 | 11  | 0 | 0 | 0 | 0 | 1 | 0 | 1 | 1 |
| CH134 | 1 | 0 | 0 | 0 | 0 | 1 | 0 | 1 | 75  | 0 | 1 | 0 | 0 | 1 | 0 | 1 | 1 |
| CH135 | 1 | 0 | 0 | 0 | 0 | 1 | 1 | 0 | 139 | 1 | 0 | 0 | 0 | 1 | 0 | 1 | 1 |
| CH136 | 1 | 0 | 0 | 0 | 0 | 1 | 1 | 1 | 27  | 0 | 0 | 0 | 1 | 1 | 0 | 1 | 1 |
| CH137 | 1 | 0 | 0 | 0 | 1 | 0 | 0 | 0 | 91  | 0 | 1 | 0 | 1 | 1 | 0 | 1 | 1 |
| CH138 | 1 | 0 | 0 | 0 | 1 | 0 | 0 | 1 | 155 | 1 | 0 | 0 | 1 | 1 | 0 | 1 | 1 |
| CH139 | 1 | 0 | 0 | 0 | 1 | 0 | 1 | 0 | 43  | 0 | 0 | 1 | 0 | 1 | 0 | 1 | 1 |
| CH140 | 1 | 0 | 0 | 0 | 1 | 0 | 1 | 1 | 107 | 0 | 1 | 1 | 0 | 1 | 0 | 1 | 1 |
| CH141 | 1 | 0 | 0 | 0 | 1 | 1 | 0 | 0 | 171 | 1 | 0 | 1 | 0 | 1 | 0 | 1 | 1 |
| CH142 | 1 | 0 | 0 | 0 | 1 | 1 | 0 | 1 | 59  | 0 | 0 | 1 | 1 | 1 | 0 | 1 | 1 |
| CH143 | 1 | 0 | 0 | 0 | 1 | 1 | 1 | 0 | 123 | 0 | 1 | 1 | 1 | 1 | 0 | 1 | 1 |
| CH144 | 1 | 0 | 0 | 0 | 1 | 1 | 1 | 1 | 187 | 1 | 0 | 1 | 1 | 1 | 0 | 1 | 1 |

Fig.69

ATM CELL SETTING CODE — NUMBER OF CH — NUMBER OF DTM TIME SLOT / NUMBER OF SPACE SW / ACM CELL CODE

| CH | | | | | | | | | # | | | | | | | |
|---|---|---|---|---|---|---|---|---|---|---|---|---|---|---|---|---|
| CH145 | 1 | 0 | 0 | 1 | 0 | 0 | 0 | 0 | 12 | 0 | 0 | 0 | 0 | 1 | 1 | 0 | 0 |
| CH146 | 1 | 0 | 0 | 1 | 0 | 0 | 0 | 1 | 76 | 0 | 1 | 0 | 0 | 1 | 1 | 0 | 0 |
| CH147 | 1 | 0 | 0 | 1 | 0 | 0 | 1 | 0 | 140 | 1 | 0 | 0 | 0 | 1 | 1 | 0 | 0 |
| CH148 | 1 | 0 | 0 | 1 | 0 | 0 | 1 | 1 | 28 | 0 | 0 | 0 | 1 | 1 | 1 | 0 | 0 |
| CH149 | 1 | 0 | 0 | 1 | 0 | 1 | 0 | 0 | 92 | 0 | 1 | 0 | 1 | 1 | 1 | 0 | 0 |
| CH150 | 1 | 0 | 0 | 1 | 0 | 1 | 0 | 1 | 156 | 1 | 0 | 0 | 1 | 1 | 1 | 0 | 0 |
| CH151 | 1 | 0 | 0 | 1 | 0 | 1 | 1 | 0 | 44 | 0 | 0 | 1 | 0 | 1 | 1 | 0 | 0 |
| CH152 | 1 | 0 | 0 | 1 | 0 | 1 | 1 | 1 | 108 | 0 | 1 | 1 | 0 | 1 | 1 | 0 | 0 |
| CH153 | 1 | 0 | 0 | 1 | 1 | 0 | 0 | 0 | 172 | 1 | 0 | 1 | 0 | 1 | 1 | 0 | 0 |
| CH154 | 1 | 0 | 0 | 1 | 1 | 0 | 0 | 1 | 60 | 0 | 0 | 1 | 1 | 1 | 1 | 0 | 0 |
| CH155 | 1 | 0 | 0 | 1 | 1 | 0 | 1 | 0 | 124 | 0 | 1 | 1 | 1 | 1 | 1 | 0 | 0 |
| CH156 | 1 | 0 | 0 | 1 | 1 | 0 | 1 | 1 | 188 | 1 | 0 | 1 | 1 | 1 | 1 | 0 | 0 |
| CH157 | 1 | 0 | 0 | 1 | 1 | 1 | 0 | 0 | 13 | 0 | 0 | 0 | 0 | 1 | 1 | 0 | 1 |
| CH158 | 1 | 0 | 0 | 1 | 1 | 1 | 0 | 1 | 77 | 0 | 1 | 0 | 0 | 1 | 1 | 0 | 1 |
| CH159 | 1 | 0 | 0 | 1 | 1 | 1 | 1 | 0 | 141 | 1 | 0 | 0 | 0 | 1 | 1 | 0 | 1 |
| CH160 | 1 | 0 | 0 | 1 | 1 | 1 | 1 | 1 | 29 | 0 | 0 | 0 | 1 | 1 | 1 | 0 | 1 |
| CH161 | 1 | 0 | 1 | 0 | 0 | 0 | 0 | 0 | 93 | 0 | 1 | 0 | 1 | 1 | 1 | 0 | 1 |
| CH162 | 1 | 0 | 1 | 0 | 0 | 0 | 0 | 1 | 157 | 1 | 0 | 0 | 1 | 1 | 1 | 0 | 1 |
| CH163 | 1 | 0 | 1 | 0 | 0 | 0 | 1 | 0 | 45 | 0 | 0 | 1 | 0 | 1 | 1 | 0 | 1 |
| CH164 | 1 | 0 | 1 | 0 | 0 | 0 | 1 | 1 | 109 | 0 | 1 | 1 | 0 | 1 | 1 | 0 | 1 |
| CH165 | 1 | 0 | 1 | 0 | 0 | 1 | 0 | 0 | 173 | 1 | 0 | 1 | 0 | 1 | 1 | 0 | 1 |
| CH166 | 1 | 0 | 1 | 0 | 0 | 1 | 0 | 1 | 61 | 0 | 0 | 1 | 1 | 1 | 1 | 0 | 1 |
| CH167 | 1 | 0 | 1 | 0 | 0 | 1 | 1 | 0 | 125 | 0 | 1 | 1 | 1 | 1 | 1 | 0 | 1 |
| CH168 | 1 | 0 | 1 | 0 | 0 | 1 | 1 | 1 | 189 | 1 | 0 | 1 | 1 | 1 | 1 | 0 | 1 |
| CH169 | 1 | 0 | 1 | 0 | 1 | 0 | 0 | 0 | 14 | 0 | 0 | 0 | 0 | 1 | 1 | 1 | 0 |
| CH170 | 1 | 0 | 1 | 0 | 1 | 0 | 0 | 1 | 78 | 0 | 1 | 0 | 0 | 1 | 1 | 1 | 0 |
| CH171 | 1 | 0 | 1 | 0 | 1 | 0 | 1 | 0 | 142 | 1 | 0 | 0 | 0 | 1 | 1 | 1 | 0 |
| CH172 | 1 | 0 | 1 | 0 | 1 | 0 | 1 | 1 | 30 | 0 | 0 | 0 | 1 | 1 | 1 | 1 | 0 |
| CH173 | 1 | 0 | 1 | 0 | 1 | 1 | 0 | 0 | 94 | 0 | 1 | 0 | 1 | 1 | 1 | 1 | 0 |
| CH174 | 1 | 0 | 1 | 0 | 1 | 1 | 0 | 1 | 158 | 1 | 0 | 0 | 1 | 1 | 1 | 1 | 0 |
| CH175 | 1 | 0 | 1 | 0 | 1 | 1 | 1 | 0 | 46 | 0 | 0 | 1 | 0 | 1 | 1 | 1 | 0 |
| CH176 | 1 | 0 | 1 | 0 | 1 | 1 | 1 | 1 | 110 | 0 | 1 | 1 | 0 | 1 | 1 | 1 | 0 |
| CH177 | 1 | 0 | 1 | 1 | 0 | 0 | 0 | 0 | 174 | 1 | 0 | 1 | 0 | 1 | 1 | 1 | 0 |
| CH178 | 1 | 0 | 1 | 1 | 0 | 0 | 0 | 1 | 62 | 0 | 0 | 1 | 1 | 1 | 1 | 1 | 0 |
| CH179 | 1 | 0 | 1 | 1 | 0 | 0 | 1 | 0 | 126 | 0 | 1 | 1 | 1 | 1 | 1 | 1 | 0 |
| CH180 | 1 | 0 | 1 | 1 | 0 | 0 | 1 | 1 | 190 | 1 | 0 | 1 | 1 | 1 | 1 | 1 | 0 |
| CH181 | 1 | 0 | 1 | 1 | 0 | 1 | 0 | 0 | 15 | 0 | 0 | 0 | 0 | 1 | 1 | 1 | 1 |
| CH182 | 1 | 0 | 1 | 1 | 0 | 1 | 0 | 1 | 79 | 0 | 1 | 0 | 0 | 1 | 1 | 1 | 1 |
| CH183 | 1 | 0 | 1 | 1 | 0 | 1 | 1 | 0 | 143 | 1 | 0 | 0 | 0 | 1 | 1 | 1 | 1 |
| CH184 | 1 | 0 | 1 | 1 | 0 | 1 | 1 | 1 | 31 | 0 | 0 | 0 | 1 | 1 | 1 | 1 | 1 |
| CH185 | 1 | 0 | 1 | 1 | 1 | 0 | 0 | 0 | 95 | 0 | 1 | 0 | 1 | 1 | 1 | 1 | 1 |
| CH186 | 1 | 0 | 1 | 1 | 1 | 0 | 0 | 1 | 159 | 1 | 0 | 0 | 1 | 1 | 1 | 1 | 1 |
| CH187 | 1 | 0 | 1 | 1 | 1 | 0 | 1 | 0 | 47 | 0 | 0 | 1 | 0 | 1 | 1 | 1 | 1 |
| CH188 | 1 | 0 | 1 | 1 | 1 | 0 | 1 | 1 | 111 | 0 | 1 | 1 | 0 | 1 | 1 | 1 | 1 |
| CH189 | 1 | 0 | 1 | 1 | 1 | 1 | 0 | 0 | 175 | 1 | 0 | 1 | 0 | 1 | 1 | 1 | 1 |
| CH190 | 1 | 0 | 1 | 1 | 1 | 1 | 0 | 1 | 63 | 0 | 0 | 1 | 1 | 1 | 1 | 1 | 1 |
| CH191 | 1 | 0 | 1 | 1 | 1 | 1 | 1 | 0 | 127 | 0 | 1 | 1 | 1 | 1 | 1 | 1 | 1 |
| CH192 | 1 | 0 | 1 | 1 | 1 | 1 | 1 | 1 | 191 | 1 | 0 | 1 | 1 | 1 | 1 | 1 | 1 |

Fig.70

| | ATM CELL SETTING CODE | | | NUMBER OF CH | | | | NUMBER OF DTM TIME SLOT | ACM CELL CODE | | | | NUMBER OF SPACE SW | | |
|---|---|---|---|---|---|---|---|---|---|---|---|---|---|---|---|
| CH1  | 0 | 0 | 0 | 0 | 0 | 0 | 0 | 0   | 0 | 0 | 0 | 0 | 0 | 0 | 0 |
| CH2  | 0 | 0 | 0 | 0 | 0 | 0 | 0 | 1   | 64 | 0 | 1 | 0 | 0 | 0 | 0 | 0 |
| CH3  | 0 | 0 | 0 | 0 | 0 | 0 | 1 | 0   | 128 | 1 | 0 | 0 | 0 | 0 | 0 | 0 |
| CH4  | 0 | 0 | 0 | 0 | 0 | 0 | 1 | 1   | 2 | 0 | 0 | 0 | 0 | 0 | 1 | 0 |
| CH5  | 0 | 0 | 0 | 0 | 0 | 1 | 0 | 0   | 66 | 0 | 1 | 0 | 0 | 0 | 1 | 0 |
| CH6  | 0 | 0 | 0 | 0 | 0 | 1 | 0 | 1   | 130 | 1 | 0 | 0 | 0 | 0 | 1 | 0 |
| CH7  | 0 | 0 | 0 | 0 | 0 | 1 | 1 | 0   | 4 | 0 | 0 | 0 | 0 | 1 | 0 | 0 |
| CH8  | 0 | 0 | 0 | 0 | 0 | 1 | 1 | 1   | 68 | 0 | 1 | 0 | 0 | 1 | 0 | 0 |
| CH9  | 0 | 0 | 0 | 0 | 1 | 0 | 0 | 0   | 132 | 1 | 0 | 0 | 0 | 1 | 0 | 0 |
| CH10 | 0 | 0 | 0 | 0 | 1 | 0 | 0 | 1   | 6 | 0 | 0 | 0 | 0 | 1 | 1 | 0 |
| CH11 | 0 | 0 | 0 | 0 | 1 | 0 | 1 | 0   | 70 | 0 | 1 | 0 | 0 | 1 | 1 | 0 |
| CH12 | 0 | 0 | 0 | 0 | 1 | 0 | 1 | 1   | 134 | 1 | 0 | 0 | 0 | 1 | 1 | 0 |
| CH13 | 0 | 0 | 0 | 0 | 1 | 1 | 0 | 0   | 8 | 0 | 0 | 0 | 1 | 0 | 0 | 0 |
| CH14 | 0 | 0 | 0 | 0 | 1 | 1 | 0 | 1   | 72 | 0 | 1 | 0 | 1 | 0 | 0 | 0 |
| CH15 | 0 | 0 | 0 | 0 | 1 | 1 | 1 | 0   | 136 | 1 | 0 | 0 | 1 | 0 | 0 | 0 |
| CH16 | 0 | 0 | 0 | 0 | 1 | 1 | 1 | 1   | 10 | 0 | 0 | 0 | 1 | 0 | 1 | 0 |
| CH17 | 0 | 0 | 0 | 1 | 0 | 0 | 0 | 0   | 74 | 0 | 1 | 0 | 1 | 0 | 1 | 0 |
| CH18 | 0 | 0 | 0 | 1 | 0 | 0 | 0 | 1   | 138 | 1 | 0 | 0 | 1 | 0 | 1 | 0 |
| CH19 | 0 | 0 | 0 | 1 | 0 | 0 | 1 | 0   | 12 | 0 | 0 | 0 | 1 | 1 | 0 | 0 |
| CH20 | 0 | 0 | 0 | 1 | 0 | 0 | 1 | 1   | 76 | 0 | 1 | 0 | 1 | 1 | 0 | 0 |
| CH21 | 0 | 0 | 0 | 1 | 0 | 1 | 0 | 0   | 140 | 1 | 0 | 0 | 1 | 1 | 0 | 0 |
| CH22 | 0 | 0 | 0 | 1 | 0 | 1 | 0 | 1   | 14 | 0 | 0 | 0 | 1 | 1 | 1 | 0 |
| CH23 | 0 | 0 | 0 | 1 | 0 | 1 | 1 | 0   | 78 | 0 | 1 | 0 | 1 | 1 | 1 | 0 |
| CH24 | 0 | 0 | 0 | 1 | 0 | 1 | 1 | 1   | 142 | 1 | 0 | 0 | 1 | 1 | 1 | 0 |
| CH25 | 0 | 0 | 0 | 1 | 1 | 0 | 0 | 0   | 1 | 0 | 0 | 0 | 0 | 0 | 0 | 1 |
| CH26 | 0 | 0 | 0 | 1 | 1 | 0 | 0 | 1   | 65 | 0 | 1 | 0 | 0 | 0 | 0 | 1 |
| CH27 | 0 | 0 | 0 | 1 | 1 | 0 | 1 | 0   | 129 | 1 | 0 | 0 | 0 | 0 | 0 | 1 |
| CH28 | 0 | 0 | 0 | 1 | 1 | 0 | 1 | 1   | 3 | 0 | 0 | 0 | 0 | 0 | 1 | 1 |
| CH29 | 0 | 0 | 0 | 1 | 1 | 1 | 0 | 0   | 67 | 0 | 1 | 0 | 0 | 0 | 1 | 1 |
| CH30 | 0 | 0 | 0 | 1 | 1 | 1 | 0 | 1   | 131 | 1 | 0 | 0 | 0 | 0 | 1 | 1 |
| CH31 | 0 | 0 | 0 | 1 | 1 | 1 | 1 | 0   | 5 | 0 | 0 | 0 | 0 | 1 | 0 | 1 |
| CH32 | 0 | 0 | 0 | 1 | 1 | 1 | 1 | 1   | 69 | 0 | 1 | 0 | 0 | 1 | 0 | 1 |
| CH33 | 0 | 0 | 1 | 0 | 0 | 0 | 0 | 0   | 133 | 1 | 0 | 0 | 0 | 1 | 0 | 1 |
| CH34 | 0 | 0 | 1 | 0 | 0 | 0 | 0 | 1   | 7 | 0 | 0 | 0 | 0 | 1 | 1 | 1 |
| CH35 | 0 | 0 | 1 | 0 | 0 | 0 | 1 | 0   | 71 | 0 | 1 | 0 | 0 | 1 | 1 | 1 |
| CH36 | 0 | 0 | 1 | 0 | 0 | 0 | 1 | 1   | 135 | 1 | 0 | 0 | 0 | 1 | 1 | 1 |
| CH37 | 0 | 0 | 1 | 0 | 0 | 1 | 0 | 0   | 9 | 0 | 0 | 0 | 1 | 0 | 0 | 1 |
| CH38 | 0 | 0 | 1 | 0 | 0 | 1 | 0 | 1   | 73 | 0 | 1 | 0 | 1 | 0 | 0 | 1 |
| CH39 | 0 | 0 | 1 | 0 | 0 | 1 | 1 | 0   | 137 | 1 | 0 | 0 | 1 | 0 | 0 | 1 |
| CH40 | 0 | 0 | 1 | 0 | 0 | 1 | 1 | 1   | 11 | 0 | 0 | 0 | 1 | 0 | 1 | 1 |
| CH41 | 0 | 0 | 1 | 0 | 1 | 0 | 0 | 0   | 75 | 0 | 1 | 0 | 1 | 0 | 1 | 1 |
| CH42 | 0 | 0 | 1 | 0 | 1 | 0 | 0 | 1   | 139 | 1 | 0 | 0 | 1 | 0 | 1 | 1 |
| CH43 | 0 | 0 | 1 | 0 | 1 | 0 | 1 | 0   | 13 | 0 | 0 | 0 | 1 | 1 | 0 | 1 |
| CH44 | 0 | 0 | 1 | 0 | 1 | 0 | 1 | 1   | 77 | 0 | 1 | 0 | 1 | 1 | 0 | 1 |
| CH45 | 0 | 0 | 1 | 0 | 1 | 1 | 0 | 0   | 141 | 1 | 0 | 0 | 1 | 1 | 0 | 1 |
| CH46 | 0 | 0 | 1 | 0 | 1 | 1 | 0 | 1   | 15 | 0 | 0 | 0 | 1 | 1 | 1 | 1 |
| CH47 | 0 | 0 | 1 | 0 | 1 | 1 | 1 | 0   | 79 | 0 | 1 | 0 | 1 | 1 | 1 | 1 |
| CH48 | 0 | 0 | 1 | 0 | 1 | 1 | 1 | 1   | 143 | 1 | 0 | 0 | 1 | 1 | 1 | 1 |

Fig.71

| | ATM CELL SETTING CODE | | | | | | | | NUMBER OF CH | NUMBER OF DTM TIME SLOT / ACM CELL CODE | | | | | | | NUMBER OF SPACE SW |
|---|---|---|---|---|---|---|---|---|---|---|---|---|---|---|---|---|---|
| CH49 | 0 | 0 | 1 | 1 | 0 | 0 | 0 | 0 | 16  | 0 | 0 | 0 | 1 | 0 | 0 | 0 | 0 |
| CH50 | 0 | 0 | 1 | 1 | 0 | 0 | 0 | 1 | 80  | 0 | 1 | 0 | 1 | 0 | 0 | 0 | 0 |
| CH51 | 0 | 0 | 1 | 1 | 0 | 0 | 1 | 0 | 144 | 1 | 0 | 0 | 1 | 0 | 0 | 0 | 0 |
| CH52 | 0 | 0 | 1 | 1 | 0 | 0 | 1 | 1 | 18  | 0 | 0 | 0 | 1 | 0 | 0 | 1 | 0 |
| CH53 | 0 | 0 | 1 | 1 | 0 | 1 | 0 | 0 | 82  | 0 | 1 | 0 | 1 | 0 | 0 | 1 | 0 |
| CH54 | 0 | 0 | 1 | 1 | 0 | 1 | 0 | 1 | 146 | 1 | 0 | 0 | 1 | 0 | 0 | 1 | 0 |
| CH55 | 0 | 0 | 1 | 1 | 0 | 1 | 1 | 0 | 20  | 0 | 0 | 0 | 1 | 0 | 1 | 0 | 0 |
| CH56 | 0 | 0 | 1 | 1 | 0 | 1 | 1 | 1 | 84  | 0 | 1 | 0 | 1 | 0 | 1 | 0 | 0 |
| CH57 | 0 | 0 | 1 | 1 | 1 | 0 | 0 | 0 | 148 | 1 | 0 | 0 | 1 | 0 | 1 | 0 | 0 |
| CH58 | 0 | 0 | 1 | 1 | 1 | 0 | 0 | 1 | 22  | 0 | 0 | 0 | 1 | 0 | 1 | 1 | 0 |
| CH59 | 0 | 0 | 1 | 1 | 1 | 0 | 1 | 0 | 86  | 0 | 1 | 0 | 1 | 0 | 1 | 1 | 0 |
| CH60 | 0 | 0 | 1 | 1 | 1 | 0 | 1 | 1 | 150 | 1 | 0 | 0 | 1 | 0 | 1 | 1 | 0 |
| CH61 | 0 | 0 | 1 | 1 | 1 | 1 | 0 | 0 | 24  | 0 | 0 | 0 | 1 | 1 | 0 | 0 | 0 |
| CH62 | 0 | 0 | 1 | 1 | 1 | 1 | 0 | 1 | 88  | 0 | 1 | 0 | 1 | 1 | 0 | 0 | 0 |
| CH63 | 0 | 0 | 1 | 1 | 1 | 1 | 1 | 0 | 152 | 1 | 0 | 0 | 1 | 1 | 0 | 0 | 0 |
| CH64 | 0 | 0 | 1 | 1 | 1 | 1 | 1 | 1 | 26  | 0 | 0 | 0 | 1 | 1 | 0 | 1 | 0 |
| CH65 | 0 | 1 | 0 | 0 | 0 | 0 | 0 | 0 | 90  | 0 | 1 | 0 | 1 | 1 | 0 | 1 | 0 |
| CH66 | 0 | 1 | 0 | 0 | 0 | 0 | 0 | 1 | 154 | 1 | 0 | 0 | 1 | 1 | 0 | 1 | 0 |
| CH67 | 0 | 1 | 0 | 0 | 0 | 0 | 1 | 0 | 28  | 0 | 0 | 0 | 1 | 1 | 1 | 0 | 0 |
| CH68 | 0 | 1 | 0 | 0 | 0 | 0 | 1 | 1 | 92  | 0 | 1 | 0 | 1 | 1 | 1 | 0 | 0 |
| CH69 | 0 | 1 | 0 | 0 | 0 | 1 | 0 | 0 | 156 | 1 | 0 | 0 | 1 | 1 | 1 | 0 | 0 |
| CH70 | 0 | 1 | 0 | 0 | 0 | 1 | 0 | 1 | 30  | 0 | 0 | 0 | 1 | 1 | 1 | 1 | 0 |
| CH71 | 0 | 1 | 0 | 0 | 0 | 1 | 1 | 0 | 94  | 0 | 1 | 0 | 1 | 1 | 1 | 1 | 0 |
| CH72 | 0 | 1 | 0 | 0 | 0 | 1 | 1 | 1 | 158 | 1 | 0 | 0 | 1 | 1 | 1 | 1 | 0 |
| CH73 | 0 | 1 | 0 | 0 | 1 | 0 | 0 | 0 | 17  | 0 | 0 | 0 | 1 | 0 | 0 | 0 | 1 |
| CH74 | 0 | 1 | 0 | 0 | 1 | 0 | 0 | 1 | 81  | 0 | 1 | 0 | 1 | 0 | 0 | 0 | 1 |
| CH75 | 0 | 1 | 0 | 0 | 1 | 0 | 1 | 0 | 145 | 1 | 0 | 0 | 1 | 0 | 0 | 0 | 1 |
| CH76 | 0 | 1 | 0 | 0 | 1 | 0 | 1 | 1 | 19  | 0 | 0 | 0 | 1 | 0 | 0 | 1 | 1 |
| CH77 | 0 | 1 | 0 | 0 | 1 | 1 | 0 | 0 | 83  | 0 | 1 | 0 | 1 | 0 | 0 | 1 | 1 |
| CH78 | 0 | 1 | 0 | 0 | 1 | 1 | 0 | 1 | 147 | 1 | 0 | 0 | 1 | 0 | 0 | 1 | 1 |
| CH79 | 0 | 1 | 0 | 0 | 1 | 1 | 1 | 0 | 21  | 0 | 0 | 0 | 1 | 0 | 1 | 0 | 1 |
| CH80 | 0 | 1 | 0 | 0 | 1 | 1 | 1 | 1 | 85  | 0 | 1 | 0 | 1 | 0 | 1 | 0 | 1 |
| CH81 | 0 | 1 | 0 | 1 | 0 | 0 | 0 | 0 | 149 | 1 | 0 | 0 | 1 | 0 | 1 | 0 | 1 |
| CH82 | 0 | 1 | 0 | 1 | 0 | 0 | 0 | 1 | 23  | 0 | 0 | 0 | 1 | 0 | 1 | 1 | 1 |
| CH83 | 0 | 1 | 0 | 1 | 0 | 0 | 1 | 0 | 87  | 0 | 1 | 0 | 1 | 0 | 1 | 1 | 1 |
| CH84 | 0 | 1 | 0 | 1 | 0 | 0 | 1 | 1 | 151 | 1 | 0 | 0 | 1 | 0 | 1 | 1 | 1 |
| CH85 | 0 | 1 | 0 | 1 | 0 | 1 | 0 | 0 | 25  | 0 | 0 | 0 | 1 | 1 | 0 | 0 | 1 |
| CH86 | 0 | 1 | 0 | 1 | 0 | 1 | 0 | 1 | 89  | 0 | 1 | 0 | 1 | 1 | 0 | 0 | 1 |
| CH87 | 0 | 1 | 0 | 1 | 0 | 1 | 1 | 0 | 153 | 1 | 0 | 0 | 1 | 1 | 0 | 0 | 1 |
| CH88 | 0 | 1 | 0 | 1 | 0 | 1 | 1 | 1 | 27  | 0 | 0 | 0 | 1 | 1 | 0 | 1 | 1 |
| CH89 | 0 | 1 | 0 | 1 | 1 | 0 | 0 | 0 | 91  | 0 | 1 | 0 | 1 | 1 | 0 | 1 | 1 |
| CH90 | 0 | 1 | 0 | 1 | 1 | 0 | 0 | 1 | 155 | 1 | 0 | 0 | 1 | 1 | 0 | 1 | 1 |
| CH91 | 0 | 1 | 0 | 1 | 1 | 0 | 1 | 0 | 29  | 0 | 0 | 0 | 1 | 1 | 1 | 0 | 1 |
| CH92 | 0 | 1 | 0 | 1 | 1 | 0 | 1 | 1 | 93  | 0 | 1 | 0 | 1 | 1 | 1 | 0 | 1 |
| CH93 | 0 | 1 | 0 | 1 | 1 | 1 | 0 | 0 | 157 | 1 | 0 | 0 | 1 | 1 | 1 | 0 | 1 |
| CH94 | 0 | 1 | 0 | 1 | 1 | 1 | 0 | 1 | 31  | 0 | 0 | 0 | 1 | 1 | 1 | 1 | 1 |
| CH95 | 0 | 1 | 0 | 1 | 1 | 1 | 1 | 0 | 95  | 0 | 1 | 0 | 1 | 1 | 1 | 1 | 1 |
| CH96 | 0 | 1 | 0 | 1 | 1 | 1 | 1 | 1 | 159 | 1 | 0 | 0 | 1 | 1 | 1 | 1 | 1 |

Fig. 72

| CH | ATM CELL SETTING CODE | | | | | | | | NUMBER OF CH | NUMBER OF DTM TIME SLOT / ACM CELL CODE | | | | | | | NUMBER OF SPACE SW |
|---|---|---|---|---|---|---|---|---|---|---|---|---|---|---|---|---|---|
| CH97  | 0 | 1 | 1 | 0 | 0 | 0 | 0 | 0 | 32  | 0 | 0 | 1 | 0 | 0 | 0 | 0 | 0 |
| CH98  | 0 | 1 | 1 | 0 | 0 | 0 | 0 | 1 | 96  | 0 | 1 | 1 | 0 | 0 | 0 | 0 | 0 |
| CH99  | 0 | 1 | 1 | 0 | 0 | 0 | 1 | 0 | 160 | 1 | 0 | 1 | 0 | 0 | 0 | 0 | 0 |
| CH100 | 0 | 1 | 1 | 0 | 0 | 0 | 1 | 1 | 34  | 0 | 0 | 1 | 0 | 0 | 0 | 1 | 0 |
| CH101 | 0 | 1 | 1 | 0 | 0 | 1 | 0 | 0 | 98  | 0 | 1 | 1 | 0 | 0 | 0 | 1 | 0 |
| CH102 | 0 | 1 | 1 | 0 | 0 | 1 | 0 | 1 | 162 | 1 | 0 | 1 | 0 | 0 | 0 | 1 | 0 |
| CH103 | 0 | 1 | 1 | 0 | 0 | 1 | 1 | 0 | 36  | 0 | 0 | 1 | 0 | 0 | 1 | 0 | 0 |
| CH104 | 0 | 1 | 1 | 0 | 0 | 1 | 1 | 1 | 100 | 0 | 1 | 1 | 0 | 0 | 1 | 0 | 0 |
| CH105 | 0 | 1 | 1 | 0 | 1 | 0 | 0 | 0 | 164 | 1 | 0 | 1 | 0 | 0 | 1 | 0 | 0 |
| CH106 | 0 | 1 | 1 | 0 | 1 | 0 | 0 | 1 | 38  | 0 | 0 | 1 | 0 | 0 | 1 | 1 | 0 |
| CH107 | 0 | 1 | 1 | 0 | 1 | 0 | 1 | 0 | 102 | 0 | 1 | 1 | 0 | 0 | 1 | 1 | 0 |
| CH108 | 0 | 1 | 1 | 0 | 1 | 0 | 1 | 1 | 166 | 1 | 0 | 1 | 0 | 0 | 1 | 1 | 0 |
| CH109 | 0 | 1 | 1 | 0 | 1 | 1 | 0 | 0 | 40  | 0 | 0 | 1 | 0 | 1 | 0 | 0 | 0 |
| CH110 | 0 | 1 | 1 | 0 | 1 | 1 | 0 | 1 | 104 | 0 | 1 | 1 | 0 | 1 | 0 | 0 | 0 |
| CH111 | 0 | 1 | 1 | 0 | 1 | 1 | 1 | 0 | 168 | 1 | 0 | 1 | 0 | 1 | 0 | 0 | 0 |
| CH112 | 0 | 1 | 1 | 0 | 1 | 1 | 1 | 1 | 42  | 0 | 0 | 1 | 0 | 1 | 0 | 1 | 0 |
| CH113 | 0 | 1 | 1 | 1 | 0 | 0 | 0 | 0 | 106 | 0 | 1 | 1 | 0 | 1 | 0 | 1 | 0 |
| CH114 | 0 | 1 | 1 | 1 | 0 | 0 | 0 | 1 | 170 | 1 | 0 | 1 | 0 | 1 | 0 | 1 | 0 |
| CH115 | 0 | 1 | 1 | 1 | 0 | 0 | 1 | 0 | 44  | 0 | 0 | 1 | 0 | 1 | 1 | 0 | 0 |
| CH116 | 0 | 1 | 1 | 1 | 0 | 0 | 1 | 1 | 108 | 0 | 1 | 1 | 0 | 1 | 1 | 0 | 0 |
| CH117 | 0 | 1 | 1 | 1 | 0 | 1 | 0 | 0 | 172 | 1 | 0 | 1 | 0 | 1 | 1 | 0 | 0 |
| CH118 | 0 | 1 | 1 | 1 | 0 | 1 | 0 | 1 | 46  | 0 | 0 | 1 | 0 | 1 | 1 | 1 | 0 |
| CH119 | 0 | 1 | 1 | 1 | 0 | 1 | 1 | 0 | 110 | 0 | 1 | 1 | 0 | 1 | 1 | 1 | 0 |
| CH120 | 0 | 1 | 1 | 1 | 0 | 1 | 1 | 1 | 174 | 1 | 0 | 1 | 0 | 1 | 1 | 1 | 0 |
| CH121 | 0 | 1 | 1 | 1 | 1 | 0 | 0 | 0 | 33  | 0 | 0 | 1 | 0 | 0 | 0 | 0 | 1 |
| CH122 | 0 | 1 | 1 | 1 | 1 | 0 | 0 | 1 | 97  | 0 | 1 | 1 | 0 | 0 | 0 | 0 | 1 |
| CH123 | 0 | 1 | 1 | 1 | 1 | 0 | 1 | 0 | 161 | 1 | 0 | 1 | 0 | 0 | 0 | 0 | 1 |
| CH124 | 0 | 1 | 1 | 1 | 1 | 0 | 1 | 1 | 35  | 0 | 0 | 1 | 0 | 0 | 0 | 1 | 1 |
| CH125 | 0 | 1 | 1 | 1 | 1 | 1 | 0 | 0 | 99  | 0 | 1 | 1 | 0 | 0 | 0 | 1 | 1 |
| CH126 | 0 | 1 | 1 | 1 | 1 | 1 | 0 | 1 | 163 | 1 | 0 | 1 | 0 | 0 | 0 | 1 | 1 |
| CH127 | 0 | 1 | 1 | 1 | 1 | 1 | 1 | 0 | 37  | 0 | 0 | 1 | 0 | 0 | 1 | 0 | 1 |
| CH128 | 0 | 1 | 1 | 1 | 1 | 1 | 1 | 1 | 101 | 0 | 1 | 1 | 0 | 0 | 1 | 0 | 1 |
| CH129 | 1 | 0 | 0 | 0 | 0 | 0 | 0 | 0 | 165 | 1 | 0 | 1 | 0 | 0 | 1 | 0 | 1 |
| CH130 | 1 | 0 | 0 | 0 | 0 | 0 | 0 | 1 | 39  | 0 | 0 | 1 | 0 | 0 | 1 | 1 | 1 |
| CH131 | 1 | 0 | 0 | 0 | 0 | 0 | 1 | 0 | 103 | 0 | 1 | 1 | 0 | 0 | 1 | 1 | 1 |
| CH132 | 1 | 0 | 0 | 0 | 0 | 0 | 1 | 1 | 167 | 1 | 0 | 1 | 0 | 0 | 1 | 1 | 1 |
| CH133 | 1 | 0 | 0 | 0 | 0 | 1 | 0 | 0 | 41  | 0 | 0 | 1 | 0 | 1 | 0 | 0 | 1 |
| CH134 | 1 | 0 | 0 | 0 | 0 | 1 | 0 | 1 | 105 | 0 | 1 | 1 | 0 | 1 | 0 | 0 | 1 |
| CH135 | 1 | 0 | 0 | 0 | 0 | 1 | 1 | 0 | 169 | 1 | 0 | 1 | 0 | 1 | 0 | 0 | 1 |
| CH136 | 1 | 0 | 0 | 0 | 0 | 1 | 1 | 1 | 43  | 0 | 0 | 1 | 0 | 1 | 0 | 1 | 1 |
| CH137 | 1 | 0 | 0 | 0 | 1 | 0 | 0 | 0 | 107 | 0 | 1 | 1 | 0 | 1 | 0 | 1 | 1 |
| CH138 | 1 | 0 | 0 | 0 | 1 | 0 | 0 | 1 | 171 | 1 | 0 | 1 | 0 | 1 | 0 | 1 | 1 |
| CH139 | 1 | 0 | 0 | 0 | 1 | 0 | 1 | 0 | 45  | 0 | 0 | 1 | 0 | 1 | 1 | 0 | 1 |
| CH140 | 1 | 0 | 0 | 0 | 1 | 0 | 1 | 1 | 109 | 0 | 1 | 1 | 0 | 1 | 1 | 0 | 1 |
| CH141 | 1 | 0 | 0 | 0 | 1 | 1 | 0 | 0 | 173 | 1 | 0 | 1 | 0 | 1 | 1 | 0 | 1 |
| CH142 | 1 | 0 | 0 | 0 | 1 | 1 | 0 | 1 | 47  | 0 | 0 | 1 | 0 | 1 | 1 | 1 | 1 |
| CH143 | 1 | 0 | 0 | 0 | 1 | 1 | 1 | 0 | 111 | 0 | 1 | 1 | 0 | 1 | 1 | 1 | 1 |
| CH144 | 1 | 0 | 0 | 0 | 1 | 1 | 1 | 1 | 175 | 1 | 0 | 1 | 0 | 1 | 1 | 1 | 1 |

Fig.73

ATM CELL SETTING CODE / NUMBER OF CH / NUMBER OF DTM TIME SLOT / NUMBER OF SPACE SW / ACM CELL CODE

| CH | ATM CELL SETTING CODE | | | | | | | | # | ACM CELL CODE | | | | | | | |
|---|---|---|---|---|---|---|---|---|---|---|---|---|---|---|---|---|---|
| CH145 | 1 | 0 | 0 | 1 | 0 | 0 | 0 | 0 | 48  | 0 | 0 | 1 | 1 | 0 | 0 | 0 | 0 |
| CH146 | 1 | 0 | 0 | 1 | 0 | 0 | 0 | 1 | 112 | 0 | 1 | 1 | 1 | 0 | 0 | 0 | 0 |
| CH147 | 1 | 0 | 0 | 1 | 0 | 0 | 1 | 0 | 176 | 1 | 0 | 1 | 1 | 0 | 0 | 0 | 0 |
| CH148 | 1 | 0 | 0 | 1 | 0 | 0 | 1 | 1 | 50  | 0 | 0 | 1 | 1 | 0 | 0 | 1 | 0 |
| CH149 | 1 | 0 | 0 | 1 | 0 | 1 | 0 | 0 | 114 | 0 | 1 | 1 | 1 | 0 | 0 | 1 | 0 |
| CH150 | 1 | 0 | 0 | 1 | 0 | 1 | 0 | 1 | 178 | 1 | 0 | 1 | 1 | 0 | 0 | 1 | 0 |
| CH151 | 1 | 0 | 0 | 1 | 0 | 1 | 1 | 0 | 52  | 0 | 0 | 1 | 1 | 0 | 1 | 0 | 0 |
| CH152 | 1 | 0 | 0 | 1 | 0 | 1 | 1 | 1 | 116 | 0 | 1 | 1 | 1 | 0 | 1 | 0 | 0 |
| CH153 | 1 | 0 | 0 | 1 | 1 | 0 | 0 | 0 | 180 | 1 | 0 | 1 | 1 | 0 | 1 | 0 | 0 |
| CH154 | 1 | 0 | 0 | 1 | 1 | 0 | 0 | 1 | 54  | 0 | 0 | 1 | 1 | 0 | 1 | 1 | 0 |
| CH155 | 1 | 0 | 0 | 1 | 1 | 0 | 1 | 0 | 118 | 0 | 1 | 1 | 1 | 0 | 1 | 1 | 0 |
| CH156 | 1 | 0 | 0 | 1 | 1 | 0 | 1 | 1 | 182 | 1 | 0 | 1 | 1 | 0 | 1 | 1 | 0 |
| CH157 | 1 | 0 | 0 | 1 | 1 | 1 | 0 | 0 | 56  | 0 | 0 | 1 | 1 | 1 | 0 | 0 | 0 |
| CH158 | 1 | 0 | 0 | 1 | 1 | 1 | 0 | 1 | 120 | 0 | 1 | 1 | 1 | 1 | 0 | 0 | 0 |
| CH159 | 1 | 0 | 0 | 1 | 1 | 1 | 1 | 0 | 184 | 1 | 0 | 1 | 1 | 1 | 0 | 0 | 0 |
| CH160 | 1 | 0 | 0 | 1 | 1 | 1 | 1 | 1 | 58  | 0 | 0 | 1 | 1 | 1 | 0 | 1 | 0 |
| CH161 | 1 | 0 | 1 | 0 | 0 | 0 | 0 | 0 | 122 | 0 | 1 | 1 | 1 | 1 | 0 | 1 | 0 |
| CH162 | 1 | 0 | 1 | 0 | 0 | 0 | 0 | 1 | 186 | 1 | 0 | 1 | 1 | 1 | 0 | 1 | 0 |
| CH163 | 1 | 0 | 1 | 0 | 0 | 0 | 1 | 0 | 60  | 0 | 0 | 1 | 1 | 1 | 1 | 0 | 0 |
| CH164 | 1 | 0 | 1 | 0 | 0 | 0 | 1 | 1 | 124 | 0 | 1 | 1 | 1 | 1 | 1 | 0 | 0 |
| CH165 | 1 | 0 | 1 | 0 | 0 | 1 | 0 | 0 | 188 | 1 | 0 | 1 | 1 | 1 | 1 | 0 | 0 |
| CH166 | 1 | 0 | 1 | 0 | 0 | 1 | 0 | 1 | 62  | 0 | 0 | 1 | 1 | 1 | 1 | 1 | 0 |
| CH167 | 1 | 0 | 1 | 0 | 0 | 1 | 1 | 0 | 126 | 0 | 1 | 1 | 1 | 1 | 1 | 1 | 0 |
| CH168 | 1 | 0 | 1 | 0 | 0 | 1 | 1 | 1 | 190 | 1 | 0 | 1 | 1 | 1 | 1 | 1 | 0 |
| CH169 | 1 | 0 | 1 | 0 | 1 | 0 | 0 | 0 | 49  | 0 | 0 | 1 | 1 | 0 | 0 | 0 | 1 |
| CH170 | 1 | 0 | 1 | 0 | 1 | 0 | 0 | 1 | 113 | 0 | 1 | 1 | 1 | 0 | 0 | 0 | 1 |
| CH171 | 1 | 0 | 1 | 0 | 1 | 0 | 1 | 0 | 177 | 1 | 0 | 1 | 1 | 0 | 0 | 0 | 1 |
| CH172 | 1 | 0 | 1 | 0 | 1 | 0 | 1 | 1 | 51  | 0 | 0 | 1 | 1 | 0 | 0 | 1 | 1 |
| CH173 | 1 | 0 | 1 | 0 | 1 | 1 | 0 | 0 | 115 | 0 | 1 | 1 | 1 | 0 | 0 | 1 | 1 |
| CH174 | 1 | 0 | 1 | 0 | 1 | 1 | 0 | 1 | 179 | 1 | 0 | 1 | 1 | 0 | 0 | 1 | 1 |
| CH175 | 1 | 0 | 1 | 0 | 1 | 1 | 1 | 0 | 53  | 0 | 0 | 1 | 1 | 0 | 1 | 0 | 1 |
| CH176 | 1 | 0 | 1 | 0 | 1 | 1 | 1 | 1 | 117 | 0 | 1 | 1 | 1 | 0 | 1 | 0 | 1 |
| CH177 | 1 | 0 | 1 | 1 | 0 | 0 | 0 | 0 | 181 | 1 | 0 | 1 | 1 | 0 | 1 | 0 | 1 |
| CH178 | 1 | 0 | 1 | 1 | 0 | 0 | 0 | 1 | 55  | 0 | 0 | 1 | 1 | 0 | 1 | 1 | 1 |
| CH179 | 1 | 0 | 1 | 1 | 0 | 0 | 1 | 0 | 119 | 0 | 1 | 1 | 1 | 0 | 1 | 1 | 1 |
| CH180 | 1 | 0 | 1 | 1 | 0 | 0 | 1 | 1 | 183 | 1 | 0 | 1 | 1 | 0 | 1 | 1 | 1 |
| CH181 | 1 | 0 | 1 | 1 | 0 | 1 | 0 | 0 | 57  | 0 | 0 | 1 | 1 | 1 | 0 | 0 | 1 |
| CH182 | 1 | 0 | 1 | 1 | 0 | 1 | 0 | 1 | 121 | 0 | 1 | 1 | 1 | 1 | 0 | 0 | 1 |
| CH183 | 1 | 0 | 1 | 1 | 0 | 1 | 1 | 0 | 185 | 1 | 0 | 1 | 1 | 1 | 0 | 0 | 1 |
| CH184 | 1 | 0 | 1 | 1 | 0 | 1 | 1 | 1 | 59  | 0 | 0 | 1 | 1 | 1 | 0 | 1 | 1 |
| CH185 | 1 | 0 | 1 | 1 | 1 | 0 | 0 | 0 | 123 | 0 | 1 | 1 | 1 | 1 | 0 | 1 | 1 |
| CH186 | 1 | 0 | 1 | 1 | 1 | 0 | 0 | 1 | 187 | 1 | 0 | 1 | 1 | 1 | 0 | 1 | 1 |
| CH187 | 1 | 0 | 1 | 1 | 1 | 0 | 1 | 0 | 61  | 0 | 0 | 1 | 1 | 1 | 1 | 0 | 1 |
| CH188 | 1 | 0 | 1 | 1 | 1 | 0 | 1 | 1 | 125 | 0 | 1 | 1 | 1 | 1 | 1 | 0 | 1 |
| CH189 | 1 | 0 | 1 | 1 | 1 | 1 | 0 | 0 | 189 | 1 | 0 | 1 | 1 | 1 | 1 | 0 | 1 |
| CH190 | 1 | 0 | 1 | 1 | 1 | 1 | 0 | 1 | 63  | 0 | 0 | 1 | 1 | 1 | 1 | 1 | 1 |
| CH191 | 1 | 0 | 1 | 1 | 1 | 1 | 1 | 0 | 127 | 0 | 1 | 1 | 1 | 1 | 1 | 1 | 1 |
| CH192 | 1 | 0 | 1 | 1 | 1 | 1 | 1 | 1 | 191 | 1 | 0 | 1 | 1 | 1 | 1 | 1 | 1 |

Fig. 74

| ATM CELL SETTING CH | | | NUMBER OF CH | WRITE CONTROL OF ACM | |
|---|---|---|---|---|---|
| NUMBER OF CELL | | | | ACMGPEN | ADDOUT |
| 0 | 0 | 0 | CH1 | 1 | 0h |
| 0 | 0 | 0 | CH2 | 1 | 4h |
| 0 | 0 | 0 | CH3 | 1 | 8h |
| 0 | 0 | 0 | CH4 | 3 | 0h |
| 0 | 0 | 0 | CH5 | 3 | 4h |
| 0 | 0 | 0 | CH6 | 3 | 8h |
| 0 | 0 | 0 | CH7 | 5 | 0h |
| 0 | 0 | 0 | CH8 | 5 | 4h |
| 0 | 0 | 0 | CH9 | 5 | 8h |
| 0 | 0 | 0 | CH10 | 7 | 0h |
| 0 | 0 | 0 | CH11 | 7 | 4h |
| 0 | 0 | 0 | CH12 | 7 | 8h |
| 0 | 0 | 0 | CH13 | 9 | 0h |
| 0 | 0 | 0 | CH14 | 9 | 4h |
| 0 | 0 | 0 | CH15 | 9 | 8h |
| 0 | 0 | 0 | CH16 | 11 | 0h |
| 0 | 0 | 0 | CH17 | 11 | 4h |
| 0 | 0 | 0 | CH18 | 11 | 8h |
| 0 | 0 | 0 | CH19 | 13 | 0h |
| 0 | 0 | 0 | CH20 | 13 | 4h |
| 0 | 0 | 0 | CH21 | 13 | 8h |
| 0 | 0 | 0 | CH22 | 15 | 0h |
| 0 | 0 | 0 | CH23 | 15 | 4h |
| 0 | 0 | 0 | CH24 | 15 | 8h |
| 0 | 0 | 1 | CH25 | 2 | 0h |
| 0 | 0 | 1 | CH26 | 2 | 4h |
| 0 | 0 | 1 | CH27 | 2 | 8h |
| 0 | 0 | 1 | CH28 | 4 | 0h |
| 0 | 0 | 1 | CH29 | 4 | 4h |
| 0 | 0 | 1 | CH30 | 4 | 8h |
| 0 | 0 | 1 | CH31 | 6 | 0h |
| 0 | 0 | 1 | CH32 | 6 | 4h |
| 0 | 0 | 1 | CH33 | 6 | 8h |
| 0 | 0 | 1 | CH34 | 8 | 0h |
| 0 | 0 | 1 | CH35 | 8 | 4h |
| 0 | 0 | 1 | CH36 | 8 | 8h |
| 0 | 0 | 1 | CH37 | 10 | 0h |
| 0 | 0 | 1 | CH38 | 10 | 4h |
| 0 | 0 | 1 | CH39 | 10 | 8h |
| 0 | 0 | 1 | CH40 | 12 | 0h |
| 0 | 0 | 1 | CH41 | 12 | 4h |
| 0 | 0 | 1 | CH42 | 12 | 8h |
| 0 | 0 | 1 | CH43 | 14 | 0h |
| 0 | 0 | 1 | CH44 | 14 | 4h |
| 0 | 0 | 1 | CH45 | 14 | 8h |
| 0 | 0 | 1 | CH46 | 16 | 0h |
| 0 | 0 | 1 | CH47 | 16 | 4h |
| 0 | 0 | 1 | CH48 | 16 | 8h |

Fig.75

| ATM CELL SETTING CH | | NUMBER OF CELL | NUMBER OF CH | WRITE CONTROL OF ACM | |
|---|---|---|---|---|---|
| | | | | ACMGPEN | ADDOUT |
| 0 | 1 | 0 | CH49 | 1 | 1h |
| 0 | 1 | 0 | CH50 | 1 | 5h |
| 0 | 1 | 0 | CH51 | 1 | 9h |
| 0 | 1 | 0 | CH52 | 3 | 1h |
| 0 | 1 | 0 | CH53 | 3 | 5h |
| 0 | 1 | 0 | CH54 | 3 | 9h |
| 0 | 1 | 0 | CH55 | 5 | 1h |
| 0 | 1 | 0 | CH56 | 5 | 5h |
| 0 | 1 | 0 | CH57 | 5 | 9h |
| 0 | 1 | 0 | CH58 | 7 | 1h |
| 0 | 1 | 0 | CH59 | 7 | 5h |
| 0 | 1 | 0 | CH60 | 7 | 9h |
| 0 | 1 | 0 | CH61 | 9 | 1h |
| 0 | 1 | 0 | CH62 | 9 | 5h |
| 0 | 1 | 0 | CH63 | 9 | 9h |
| 0 | 1 | 0 | CH64 | 11 | 1h |
| 0 | 1 | 0 | CH65 | 11 | 5h |
| 0 | 1 | 0 | CH66 | 11 | 9h |
| 0 | 1 | 0 | CH67 | 13 | 1h |
| 0 | 1 | 0 | CH68 | 13 | 5h |
| 0 | 1 | 0 | CH69 | 13 | 9h |
| 0 | 1 | 0 | CH70 | 15 | 1h |
| 0 | 1 | 0 | CH71 | 15 | 5h |
| 0 | 1 | 0 | CH72 | 15 | 9h |
| 0 | 1 | 1 | CH73 | 2 | 1h |
| 0 | 1 | 1 | CH74 | 2 | 5h |
| 0 | 1 | 1 | CH75 | 2 | 9h |
| 0 | 1 | 1 | CH76 | 4 | 1h |
| 0 | 1 | 1 | CH77 | 4 | 5h |
| 0 | 1 | 1 | CH78 | 4 | 9h |
| 0 | 1 | 1 | CH79 | 6 | 1h |
| 0 | 1 | 1 | CH80 | 6 | 5h |
| 0 | 1 | 1 | CH81 | 6 | 9h |
| 0 | 1 | 1 | CH82 | 8 | 1h |
| 0 | 1 | 1 | CH83 | 8 | 5h |
| 0 | 1 | 1 | CH84 | 8 | 9h |
| 0 | 1 | 1 | CH85 | 10 | 1h |
| 0 | 1 | 1 | CH86 | 10 | 5h |
| 0 | 1 | 1 | CH87 | 10 | 9h |
| 0 | 1 | 1 | CH88 | 12 | 1h |
| 0 | 1 | 1 | CH89 | 12 | 5h |
| 0 | 1 | 1 | CH90 | 12 | 9h |
| 0 | 1 | 1 | CH91 | 14 | 1h |
| 0 | 1 | 1 | CH92 | 14 | 5h |
| 0 | 1 | 1 | CH93 | 14 | 9h |
| 0 | 1 | 1 | CH94 | 16 | 1h |
| 0 | 1 | 1 | CH95 | 16 | 5h |
| 0 | 1 | 1 | CH96 | 16 | 9h |

Fig.76

| ATM CELL SETTING CH | | | NUMBER OF CH | WRITE CONTROL OF ACM | |
|---|---|---|---|---|---|
| NUMBER OF CELL | | | | ACMGPEN | ADDOUT |
| 1 | 0 | 0 | CH97 | 1 | 2h |
| 1 | 0 | 0 | CH98 | 1 | 6h |
| 1 | 0 | 0 | CH99 | 1 | Ah |
| 1 | 0 | 0 | CH100 | 3 | 2h |
| 1 | 0 | 0 | CH101 | 3 | 6h |
| 1 | 0 | 0 | CH102 | 3 | Ah |
| 1 | 0 | 0 | CH103 | 5 | 2h |
| 1 | 0 | 0 | CH104 | 5 | 6h |
| 1 | 0 | 0 | CH105 | 5 | Ah |
| 1 | 0 | 0 | CH106 | 7 | 2h |
| 1 | 0 | 0 | CH107 | 7 | 6h |
| 1 | 0 | 0 | CH108 | 7 | Ah |
| 1 | 0 | 0 | CH109 | 9 | 2h |
| 1 | 0 | 0 | CH110 | 9 | 6h |
| 1 | 0 | 0 | CH111 | 9 | Ah |
| 1 | 0 | 0 | CH112 | 11 | 2h |
| 1 | 0 | 0 | CH113 | 11 | 6h |
| 1 | 0 | 0 | CH114 | 11 | Ah |
| 1 | 0 | 0 | CH115 | 13 | 2h |
| 1 | 0 | 0 | CH116 | 13 | 6h |
| 1 | 0 | 0 | CH117 | 13 | Ah |
| 1 | 0 | 0 | CH118 | 15 | 2h |
| 1 | 0 | 0 | CH119 | 15 | 6h |
| 1 | 0 | 0 | CH120 | 15 | Ah |
| 1 | 0 | 1 | CH121 | 2 | 2h |
| 1 | 0 | 1 | CH122 | 2 | 6h |
| 1 | 0 | 1 | CH123 | 2 | Ah |
| 1 | 0 | 1 | CH124 | 4 | 2h |
| 1 | 0 | 1 | CH125 | 4 | 6h |
| 1 | 0 | 1 | CH126 | 4 | Ah |
| 1 | 0 | 1 | CH127 | 6 | 2h |
| 1 | 0 | 1 | CH128 | 6 | 6h |
| 1 | 0 | 1 | CH129 | 6 | Ah |
| 1 | 0 | 1 | CH130 | 8 | 2h |
| 1 | 0 | 1 | CH131 | 8 | 6h |
| 1 | 0 | 1 | CH132 | 8 | Ah |
| 1 | 0 | 1 | CH133 | 10 | 2h |
| 1 | 0 | 1 | CH134 | 10 | 6h |
| 1 | 0 | 1 | CH135 | 10 | Ah |
| 1 | 0 | 1 | CH136 | 12 | 2h |
| 1 | 0 | 1 | CH137 | 12 | 6h |
| 1 | 0 | 1 | CH138 | 12 | Ah |
| 1 | 0 | 1 | CH139 | 14 | 2h |
| 1 | 0 | 1 | CH140 | 14 | 6h |
| 1 | 0 | 1 | CH141 | 14 | Ah |
| 1 | 0 | 1 | CH142 | 16 | 2h |
| 1 | 0 | 1 | CH143 | 16 | 6h |
| 1 | 0 | 1 | CH144 | 16 | Ah |

Fig.77

| ATM CELL SETTING CH | | | NUMBER OF CH | WRITE CONTROL OF ACM | |
|---|---|---|---|---|---|
| NUMBER OF CELL | | | | ACMGPEN | ADDOUT |
| 1 | 1 | 0 | CH145 | 1 | 3h |
| 1 | 1 | 0 | CH146 | 1 | 7h |
| 1 | 1 | 0 | CH147 | 1 | Bh |
| 1 | 1 | 0 | CH148 | 3 | 3h |
| 1 | 1 | 0 | CH149 | 3 | 7h |
| 1 | 1 | 0 | CH150 | 3 | Bh |
| 1 | 1 | 0 | CH151 | 5 | 3h |
| 1 | 1 | 0 | CH152 | 5 | 7h |
| 1 | 1 | 0 | CH153 | 5 | Bh |
| 1 | 1 | 0 | CH154 | 7 | 3h |
| 1 | 1 | 0 | CH155 | 7 | 7h |
| 1 | 1 | 0 | CH156 | 7 | Bh |
| 1 | 1 | 0 | CH157 | 9 | 3h |
| 1 | 1 | 0 | CH158 | 9 | 7h |
| 1 | 1 | 0 | CH159 | 9 | Bh |
| 1 | 1 | 0 | CH160 | 11 | 3h |
| 1 | 1 | 0 | CH161 | 11 | 7h |
| 1 | 1 | 0 | CH162 | 11 | Bh |
| 1 | 1 | 0 | CH163 | 13 | 3h |
| 1 | 1 | 0 | CH164 | 13 | 7h |
| 1 | 1 | 0 | CH165 | 13 | Bh |
| 1 | 1 | 0 | CH166 | 15 | 3h |
| 1 | 1 | 0 | CH167 | 15 | 7h |
| 1 | 1 | 0 | CH168 | 15 | Bh |
| 1 | 1 | 0 | CH169 | 2 | 3h |
| 1 | 1 | 0 | CH170 | 2 | 7h |
| 1 | 1 | 0 | CH171 | 2 | Bh |
| 1 | 1 | 0 | CH172 | 4 | 3h |
| 1 | 1 | 0 | CH173 | 4 | 7h |
| 1 | 1 | 0 | CH174 | 4 | Bh |
| 1 | 1 | 0 | CH175 | 6 | 3h |
| 1 | 1 | 0 | CH176 | 6 | 7h |
| 1 | 1 | 1 | CH177 | 6 | Bh |
| 1 | 1 | 1 | CH178 | 8 | 3h |
| 1 | 1 | 1 | CH179 | 8 | 7h |
| 1 | 1 | 1 | CH180 | 8 | Bh |
| 1 | 1 | 1 | CH181 | 10 | 3h |
| 1 | 1 | 1 | CH182 | 10 | 7h |
| 1 | 1 | 1 | CH183 | 10 | Bh |
| 1 | 1 | 1 | CH184 | 12 | 3h |
| 1 | 1 | 1 | CH185 | 12 | 7h |
| 1 | 1 | 1 | CH186 | 12 | Bh |
| 1 | 1 | 1 | CH187 | 14 | 3h |
| 1 | 1 | 1 | CH188 | 14 | 7h |
| 1 | 1 | 1 | CH189 | 14 | Bh |
| 1 | 1 | 1 | CH190 | 16 | 3h |
| 1 | 1 | 1 | CH191 | 16 | 7h |
| 1 | 1 | 1 | CH192 | 16 | Bh |

Fig. 78

| ATM CELL SETTING CH | | | NUMBER OF CH | WRITE CONTROL OF ACM | |
|---|---|---|---|---|---|
| NUMBER OF CELL | | | | ACMGPEN | ADDOUT |
| 0 | 0 | 0 | CH1 | 1 | 0h |
| 0 | 0 | 0 | CH2 | 1 | 4h |
| 0 | 0 | 0 | CH3 | 1 | 8h |
| 0 | 0 | 0 | CH4 | 1 | 1h |
| 0 | 0 | 0 | CH5 | 1 | 5h |
| 0 | 0 | 0 | CH6 | 1 | 9h |
| 0 | 0 | 0 | CH7 | 1 | 2h |
| 0 | 0 | 0 | CH8 | 1 | 6h |
| 0 | 0 | 0 | CH9 | 1 | Ah |
| 0 | 0 | 0 | CH10 | 1 | 3h |
| 0 | 0 | 0 | CH11 | 1 | 7h |
| 0 | 0 | 0 | CH12 | 1 | Bh |
| 0 | 0 | 0 | CH13 | 2 | 0h |
| 0 | 0 | 0 | CH14 | 2 | 4h |
| 0 | 0 | 0 | CH15 | 2 | 8h |
| 0 | 0 | 0 | CH16 | 2 | 1h |
| 0 | 0 | 0 | CH17 | 2 | 5h |
| 0 | 0 | 0 | CH18 | 2 | 9h |
| 0 | 0 | 0 | CH19 | 2 | 2h |
| 0 | 0 | 0 | CH20 | 2 | 6h |
| 0 | 0 | 0 | CH21 | 2 | Ah |
| 0 | 0 | 0 | CH22 | 2 | 3h |
| 0 | 0 | 0 | CH23 | 2 | 7h |
| 0 | 0 | 0 | CH24 | 2 | Bh |
| 0 | 0 | 1 | CH25 | 2 | 0h |
| 0 | 0 | 1 | CH26 | 2 | 4h |
| 0 | 0 | 1 | CH27 | 2 | 8h |
| 0 | 0 | 1 | CH28 | 3 | 1h |
| 0 | 0 | 1 | CH29 | 3 | 5h |
| 0 | 0 | 1 | CH30 | 3 | 9h |
| 0 | 0 | 1 | CH31 | 3 | 2h |
| 0 | 0 | 1 | CH32 | 3 | 6h |
| 0 | 0 | 1 | CH33 | 3 | Ah |
| 0 | 0 | 1 | CH34 | 3 | 3h |
| 0 | 0 | 1 | CH35 | 3 | 7h |
| 0 | 0 | 1 | CH36 | 3 | Bh |
| 0 | 0 | 1 | CH37 | 4 | 0h |
| 0 | 0 | 1 | CH38 | 4 | 4h |
| 0 | 0 | 1 | CH39 | 4 | 8h |
| 0 | 0 | 1 | CH40 | 4 | 1h |
| 0 | 0 | 1 | CH41 | 4 | 5h |
| 0 | 0 | 1 | CH42 | 4 | 9h |
| 0 | 0 | 1 | CH43 | 4 | 2h |
| 0 | 0 | 1 | CH44 | 4 | 6h |
| 0 | 0 | 1 | CH45 | 4 | Ah |
| 0 | 0 | 1 | CH46 | 4 | 3h |
| 0 | 0 | 1 | CH47 | 4 | 7h |
| 0 | 0 | 1 | CH48 | 4 | Bh |

Fig.79

| ATM CELL SETTING CH | NUMBER OF CH | | WRITE CONTROL OF ACM | |
|---|---|---|---|---|
| NUMBER OF CELL | | | ACMGPEN | ADDOUT |
| 0 | 1 | 0 | CH49 | 5 | 0h |
| 0 | 1 | 0 | CH50 | 5 | 4h |
| 0 | 1 | 0 | CH51 | 5 | 8h |
| 0 | 1 | 0 | CH52 | 5 | 1h |
| 0 | 1 | 0 | CH53 | 5 | 5h |
| 0 | 1 | 0 | CH54 | 5 | 9h |
| 0 | 1 | 0 | CH55 | 5 | 2h |
| 0 | 1 | 0 | CH56 | 5 | 6h |
| 0 | 1 | 0 | CH57 | 5 | Ah |
| 0 | 1 | 0 | CH58 | 5 | 3h |
| 0 | 1 | 0 | CH59 | 5 | 7h |
| 0 | 1 | 0 | CH60 | 5 | Bh |
| 0 | 1 | 0 | CH61 | 6 | 0h |
| 0 | 1 | 0 | CH62 | 6 | 4h |
| 0 | 1 | 0 | CH63 | 6 | 8h |
| 0 | 1 | 0 | CH64 | 6 | 1h |
| 0 | 1 | 0 | CH65 | 6 | 5h |
| 0 | 1 | 0 | CH66 | 6 | 9h |
| 0 | 1 | 0 | CH67 | 6 | 2h |
| 0 | 1 | 0 | CH68 | 6 | 6h |
| 0 | 1 | 0 | CH69 | 6 | Ah |
| 0 | 1 | 0 | CH70 | 6 | 3h |
| 0 | 1 | 0 | CH71 | 6 | 7h |
| 0 | 1 | 0 | CH72 | 6 | Bh |
| 0 | 1 | 1 | CH73 | 7 | 0h |
| 0 | 1 | 1 | CH74 | 7 | 4h |
| 0 | 1 | 1 | CH75 | 7 | 8h |
| 0 | 1 | 1 | CH76 | 7 | 1h |
| 0 | 1 | 1 | CH77 | 7 | 5h |
| 0 | 1 | 1 | CH78 | 7 | 9h |
| 0 | 1 | 1 | CH79 | 7 | 2h |
| 0 | 1 | 1 | CH80 | 7 | 6h |
| 0 | 1 | 1 | CH81 | 7 | Ah |
| 0 | 1 | 1 | CH82 | 7 | 3h |
| 0 | 1 | 1 | CH83 | 7 | 7h |
| 0 | 1 | 1 | CH84 | 7 | Bh |
| 0 | 1 | 1 | CH85 | 8 | 0h |
| 0 | 1 | 1 | CH86 | 8 | 4h |
| 0 | 1 | 1 | CH87 | 8 | 8h |
| 0 | 1 | 1 | CH88 | 8 | 1h |
| 0 | 1 | 1 | CH89 | 8 | 5h |
| 0 | 1 | 1 | CH90 | 8 | 9h |
| 0 | 1 | 1 | CH91 | 8 | 2h |
| 0 | 1 | 1 | CH92 | 8 | 6h |
| 0 | 1 | 1 | CH93 | 8 | Ah |
| 0 | 1 | 1 | CH94 | 8 | 3h |
| 0 | 1 | 1 | CH95 | 8 | 7h |
| 0 | 1 | 1 | CH96 | 8 | Bh |

Fig. 80

| ATM CELL SETTING CH | | | NUMBER OF CH | WRITE CONTROL OF ACM | |
|---|---|---|---|---|---|
| NUMBER OF CELL | | | | ACMGPEN | ADDOUT |
| 1 | 0 | 0 | CH97 | 9 | 0h |
| 1 | 0 | 0 | CH98 | 9 | 4h |
| 1 | 0 | 0 | CH99 | 9 | 8h |
| 1 | 0 | 0 | CH100 | 9 | 1h |
| 1 | 0 | 0 | CH101 | 9 | 5h |
| 1 | 0 | 0 | CH102 | 9 | 9h |
| 1 | 0 | 0 | CH103 | 9 | 2h |
| 1 | 0 | 0 | CH104 | 9 | 6h |
| 1 | 0 | 0 | CH105 | 9 | Ah |
| 1 | 0 | 0 | CH106 | 9 | 3h |
| 1 | 0 | 0 | CH107 | 9 | 7h |
| 1 | 0 | 0 | CH108 | 9 | Bh |
| 1 | 0 | 0 | CH109 | 10 | 0h |
| 1 | 0 | 0 | CH110 | 10 | 4h |
| 1 | 0 | 0 | CH111 | 10 | 8h |
| 1 | 0 | 0 | CH112 | 10 | 1h |
| 1 | 0 | 0 | CH113 | 10 | 5h |
| 1 | 0 | 0 | CH114 | 10 | 9h |
| 1 | 0 | 0 | CH115 | 10 | 2h |
| 1 | 0 | 0 | CH116 | 10 | 6h |
| 1 | 0 | 0 | CH117 | 10 | Ah |
| 1 | 0 | 0 | CH118 | 10 | 3h |
| 1 | 0 | 0 | CH119 | 10 | 7h |
| 1 | 0 | 0 | CH120 | 10 | Bh |
| 1 | 0 | 1 | CH121 | 11 | 0h |
| 1 | 0 | 1 | CH122 | 11 | 4h |
| 1 | 0 | 1 | CH123 | 11 | 8h |
| 1 | 0 | 1 | CH124 | 11 | 1h |
| 1 | 0 | 1 | CH125 | 11 | 5h |
| 1 | 0 | 1 | CH126 | 11 | 9h |
| 1 | 0 | 1 | CH127 | 11 | 2h |
| 1 | 0 | 1 | CH128 | 11 | 6h |
| 1 | 0 | 1 | CH129 | 11 | Ah |
| 1 | 0 | 1 | CH130 | 11 | 3h |
| 1 | 0 | 1 | CH131 | 11 | 7h |
| 1 | 0 | 1 | CH132 | 11 | Bh |
| 1 | 0 | 1 | CH133 | 12 | 0h |
| 1 | 0 | 1 | CH134 | 12 | 4h |
| 1 | 0 | 1 | CH135 | 12 | 8h |
| 1 | 0 | 1 | CH136 | 12 | 1h |
| 1 | 0 | 1 | CH137 | 12 | 5h |
| 1 | 0 | 1 | CH138 | 12 | 9h |
| 1 | 0 | 1 | CH139 | 12 | 2h |
| 1 | 0 | 1 | CH140 | 12 | 6h |
| 1 | 0 | 1 | CH141 | 12 | Ah |
| 1 | 0 | 1 | CH142 | 12 | 3h |
| 1 | 0 | 1 | CH143 | 12 | 7h |
| 1 | 0 | 1 | CH144 | 12 | Bh |

Fig.81

| ATM CELL SETTING CH | NUMBER OF CELL | NUMBER OF CH | | WRITE CONTROL OF ACM | |
|---|---|---|---|---|---|
| | | | | ACMGPEN | ADDOUT |
| 1 | 1 | 0 | CH145 | 13 | 0h |
| 1 | 1 | 0 | CH146 | 13 | 4h |
| 1 | 1 | 0 | CH147 | 13 | 8h |
| 1 | 1 | 0 | CH148 | 13 | 1h |
| 1 | 1 | 0 | CH149 | 13 | 5h |
| 1 | 1 | 0 | CH150 | 13 | 9h |
| 1 | 1 | 0 | CH151 | 13 | 2h |
| 1 | 1 | 0 | CH152 | 13 | 6h |
| 1 | 1 | 0 | CH153 | 13 | Ah |
| 1 | 1 | 0 | CH154 | 13 | 3h |
| 1 | 1 | 0 | CH155 | 13 | 7h |
| 1 | 1 | 0 | CH156 | 13 | Bh |
| 1 | 1 | 0 | CH157 | 14 | 0h |
| 1 | 1 | 0 | CH158 | 14 | 4h |
| 1 | 1 | 0 | CH159 | 14 | 8h |
| 1 | 1 | 0 | CH160 | 14 | 1h |
| 1 | 1 | 0 | CH161 | 14 | 5h |
| 1 | 1 | 0 | CH162 | 14 | 9h |
| 1 | 1 | 0 | CH163 | 14 | 2h |
| 1 | 1 | 0 | CH164 | 14 | 6h |
| 1 | 1 | 0 | CH165 | 14 | Ah |
| 1 | 1 | 0 | CH166 | 14 | 3h |
| 1 | 1 | 0 | CH167 | 14 | 7h |
| 1 | 1 | 0 | CH168 | 14 | Bh |
| 1 | 1 | 0 | CH169 | 15 | 0h |
| 1 | 1 | 0 | CH170 | 15 | 4h |
| 1 | 1 | 0 | CH171 | 15 | 8h |
| 1 | 1 | 0 | CH172 | 15 | 1h |
| 1 | 1 | 0 | CH173 | 15 | 5h |
| 1 | 1 | 0 | CH174 | 15 | 9h |
| 1 | 1 | 0 | CH175 | 15 | 2h |
| 1 | 1 | 0 | CH176 | 15 | 6h |
| 1 | 1 | 1 | CH177 | 15 | Ah |
| 1 | 1 | 1 | CH178 | 15 | 3h |
| 1 | 1 | 1 | CH179 | 15 | 7h |
| 1 | 1 | 1 | CH180 | 15 | Bh |
| 1 | 1 | 1 | CH181 | 16 | 0h |
| 1 | 1 | 1 | CH182 | 16 | 4h |
| 1 | 1 | 1 | CH183 | 16 | 8h |
| 1 | 1 | 1 | CH184 | 16 | 1h |
| 1 | 1 | 1 | CH185 | 16 | 5h |
| 1 | 1 | 1 | CH186 | 16 | 9h |
| 1 | 1 | 1 | CH187 | 16 | 2h |
| 1 | 1 | 1 | CH188 | 16 | 6h |
| 1 | 1 | 1 | CH189 | 16 | Ah |
| 1 | 1 | 1 | CH190 | 16 | 3h |
| 1 | 1 | 1 | CH191 | 16 | 7h |
| 1 | 1 | 1 | CH192 | 16 | Bh |

Fig.82

| CH No. | ACM Code |
|---|---|
| 1 | "00000000" |
| 2 | "00000001" |
| 3 | "00000010" |
| 4 | "00000011" |
| 5 | "00000100" |
| 6 | "00000101" |
| 7 | "00000110" |
| 8 | "00000111" |
| 9 | "00001000" |
| 10 | "00001001" |
| 11 | "00001010" |
| 12 | "00001011" |
| 13 | "00001100" |
| 14 | "00001101" |
| 15 | "00001110" |
| 16 | "00001111" |
| ⋮ | ⋮ |
| 190 | "10111101" |
| 191 | "10111110" |
| 192 | "10111111" |
| STS-1 UNEQ | "110*****" |
| STS-Nc UNEQ | "1110****" |
| PAIS | "1111****" | note : * = don't care

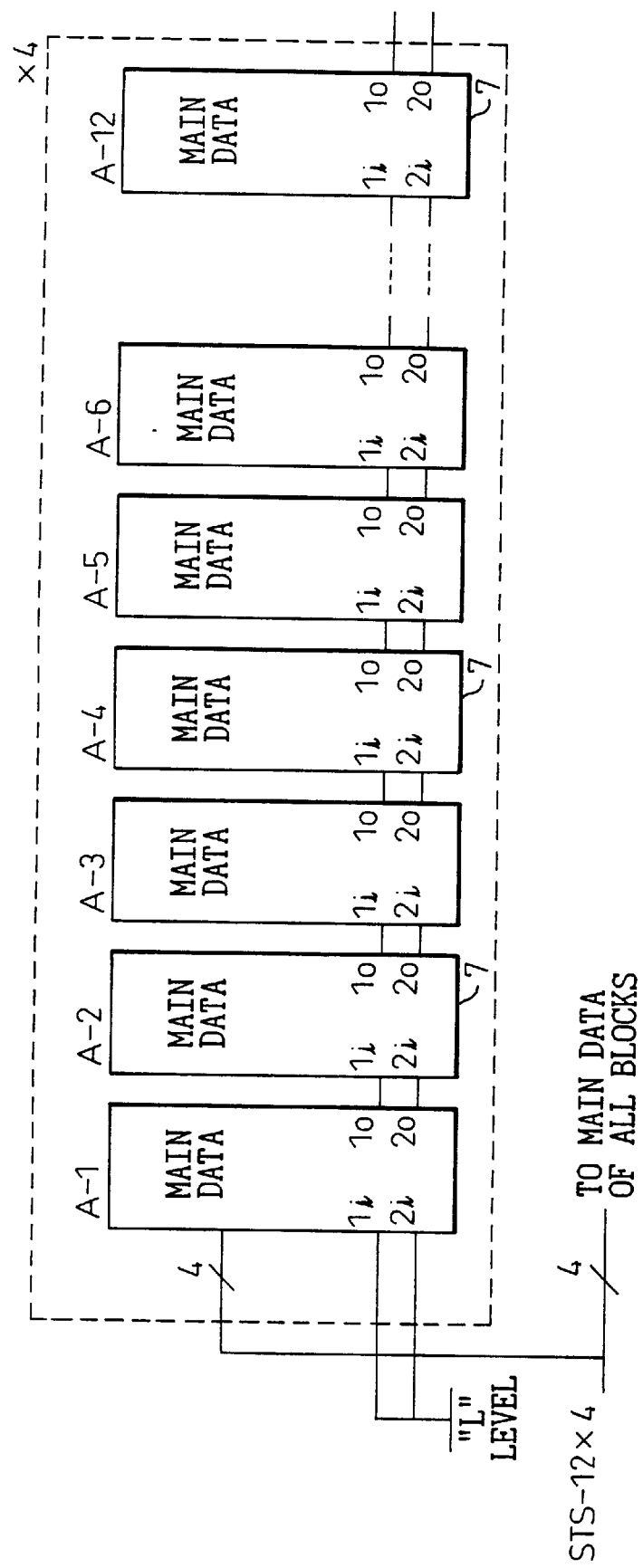

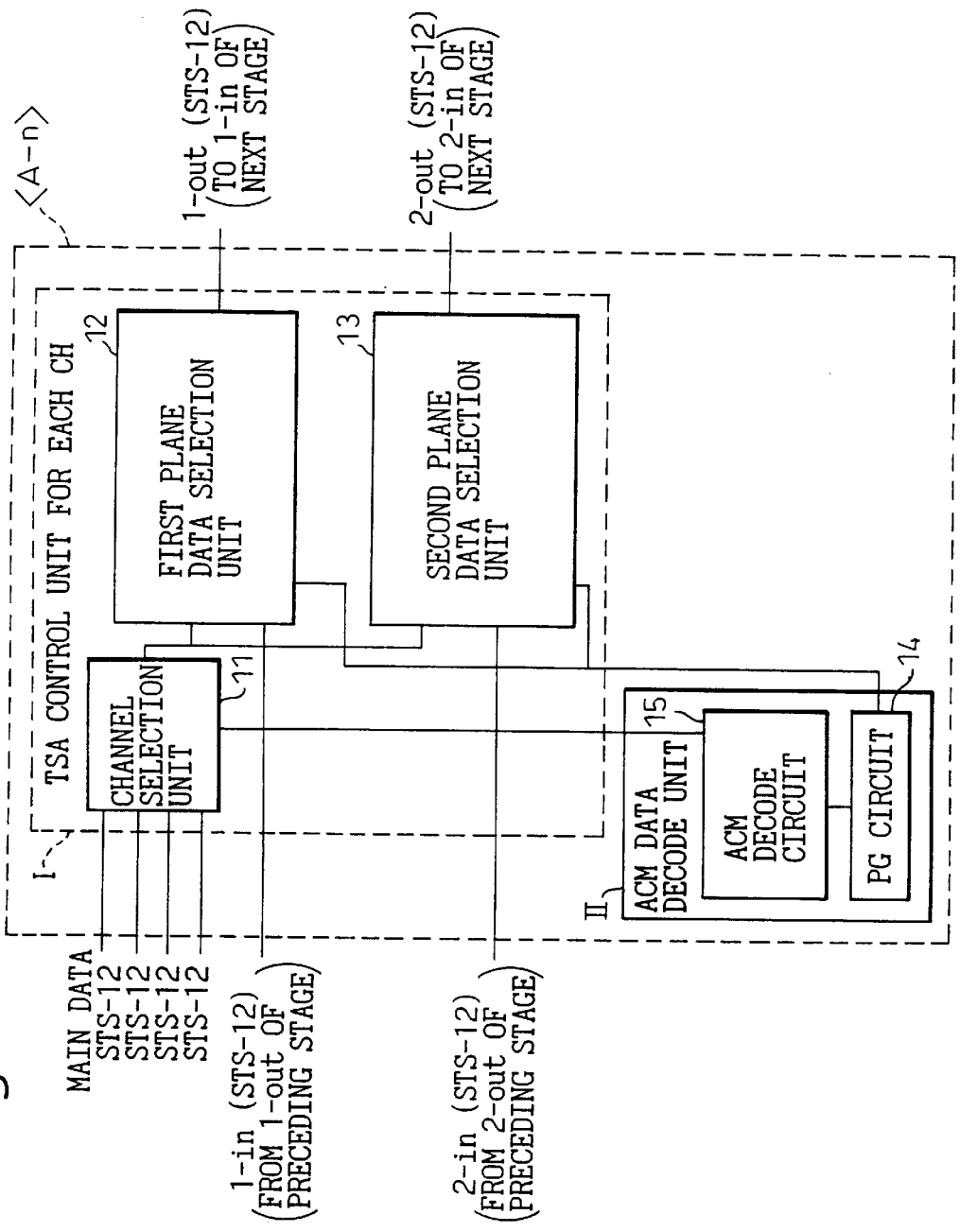

TIME SLOT ASSIGNMENT CIRCUIT

BACKGROUND OF THE INVENTION

1. Field of the Invention

The present invention relates to multiplex conversion equipment in a digital synchronization network, more particularly a time slot assignment circuit (hereinafter also referred to as a TSA circuit) for performing channel setting in multiplex conversion equipment.

In digital synchronization networks, it has become possible to perform channel setting in a time domain (interchanging positions of channels in a time slot train) by assignment of time slots on a digital multiplex level (for example STS-12 and STS-48). As a result, it has become possible to realize multiplex conversion equipment. The present invention relates to a TSA circuit, more particularly a TSA circuit which can easily realize a rise in transmission rates and enlargement of capacity and which has a high efficiency and a high degree of freedom in the combinations of the channel settings.

2. Description of the Related Art

As will be explained in detail later by using the drawings, the TSA circuit of the related art had two combining circuits and registers for each channel (CH) and realized the TSA of all channels (CH) by performing TSA (channel setting) for each block (CH) and serially connecting them.

In addition, since the transmission capacity was relatively low speed data signals of, for example, the STS-48 (2.4 Gb/s) level compared with the STS-192 (10 Gb/s) level, a TSA circuit could be realized by a multistage connection of simple circuits (shift registers) configured by the channel (CH) units.

In a rise of transmission rates and increase of capacity expected in the future, a transmission method of high efficiency offering a high degree of freedom in the combination of channel settings has been sought. However, the increase of capacity has been accompanied by not only an increase in the circuit scale, but also the number of channel numbers, therefore the number of combinations of channel settings has increased. If trying to realize this by the circuit of the related art, the number of nets would become enormous, there would be insufficient timing margins, the layout on the chip would become difficult, and there would be other possible obstacles to development.

There has been dazzling progress made in the integration technology for LSIs in recent years, but there are still various limitations. These limitations have become obstacles to realization of a TSA function in circuit design. More specifically, in the TSA (channel setting) of the STS-48 (2.4 Gb/s) level of the related art, that is, the STS-48-TSA, it is sufficient to realize 2,304 types of combinations of channels, but in the STS-192-TSA planned by the present invention, up to 36,864 types of combinations of channels must be realized, therefore a circuit 16 times the size in the case of the STS-48-TSA becomes necessary.

In addition to this increase of circuit size, since the transmission rate (bit rate of signals to be processed) becomes high, the power consumption naturally becomes larger.

Accordingly, there is a problem of disadvantageous circuit size, power consumption, timing margin, and degree of integration to a chip (number of nets) if a TSA circuit structure comprising only logics of the related art is applied as it is to the TSA circuit of the STS-192 level.

SUMMARY OF THE INVENTION

Accordingly, an object of the present invention is to realize a TSA circuit capable of transmitting a large volume of data with a high efficiency and having a high degree of freedom in channel setting. For this purpose, the invention provides a general use TSA circuit which achieves a reduction of the number of nets and circuit sizee, which has a low power consumption, and in addition which can reliably perform the data transfer.

To attain the above object, a TSA circuit of the present invention includes a time switch provided with a transmission data memory into which transmission data is sequentially written and performing switching in the time domain with respect to the transmission data; a space switch for performing switching in the space domain with respect to an output thereof; an address control memory which outputs a channel setting address for controlling the two switches; and a channel setting information converting unit for converting channel setting information from the outside to a channel setting address and an accessing address for the memory.

Thus, the time slot assignment circuit of the present invention is a circuit which can perform channel setting at a high efficiency and with a high degree of freedom in channel setting with respect to large volumes of transmission data and which has a small circuit scale and low power consumption.

BRIEF DESCRIPTION OF THE DRAWINGS

The above object and features of the present invention will be more apparent from the following description of the preferred embodiments with reference to the accompanying drawings, wherein:

FIG. 8 is a first part of a view concretely illustrating a conversion of frame format and a situation of channel setting;

FIG. 11 is a first part of a view of the frame format for signals of STS-12;

FIG. 12 is a second part of a view of the frame format for signals of STS-12;

FIG. 13 is a first part of a view of the frame format for signals of STS-192;

FIG. 14 is a second part of a view of the frame format for signals of STS-192;

FIG. 34 is an enlarged view of a data memory 31 in FIG. 31;

FIG. 35 is an enlarged view of a data memory 32 in FIG. 31;

FIG. 36 is an enlarged view of the data memory 31 in FIG. 32;

FIG. 37 is an enlarged view of the data memory 32 in FIG. 32;

FIG. 41 is an enlarged view of the data memory 31 in FIG. 38;

FIG. 42 is an enlarged view of the data memory 32 in FIG. 38;

FIG. 43 is an enlarged view of the data memory 31 in FIG. 39;

FIG. 44 is an enlarged view of the data memory 32 in FIG. 39;

FIG. 48 shows timing charts showing signals in relation to a space switch (SSW) 22 and a switch control unit (SWCNT) 34 shown in FIG. 28;

Figure 51:
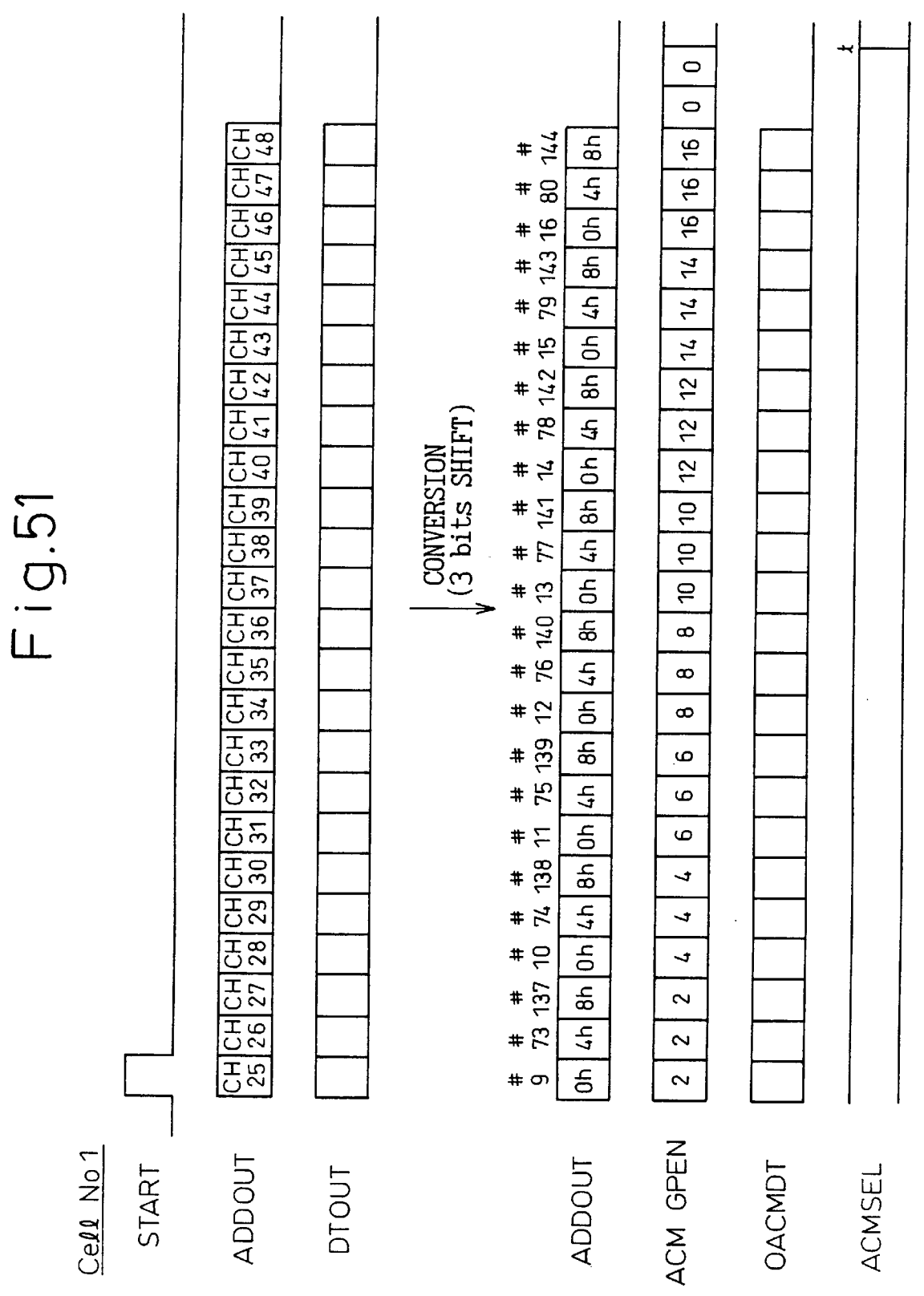

FIG. 51 shows timing charts showing signals appearing in FIG. 27, FIG. 28, and FIG. 49 for Cell No. 1;

Figure 53:
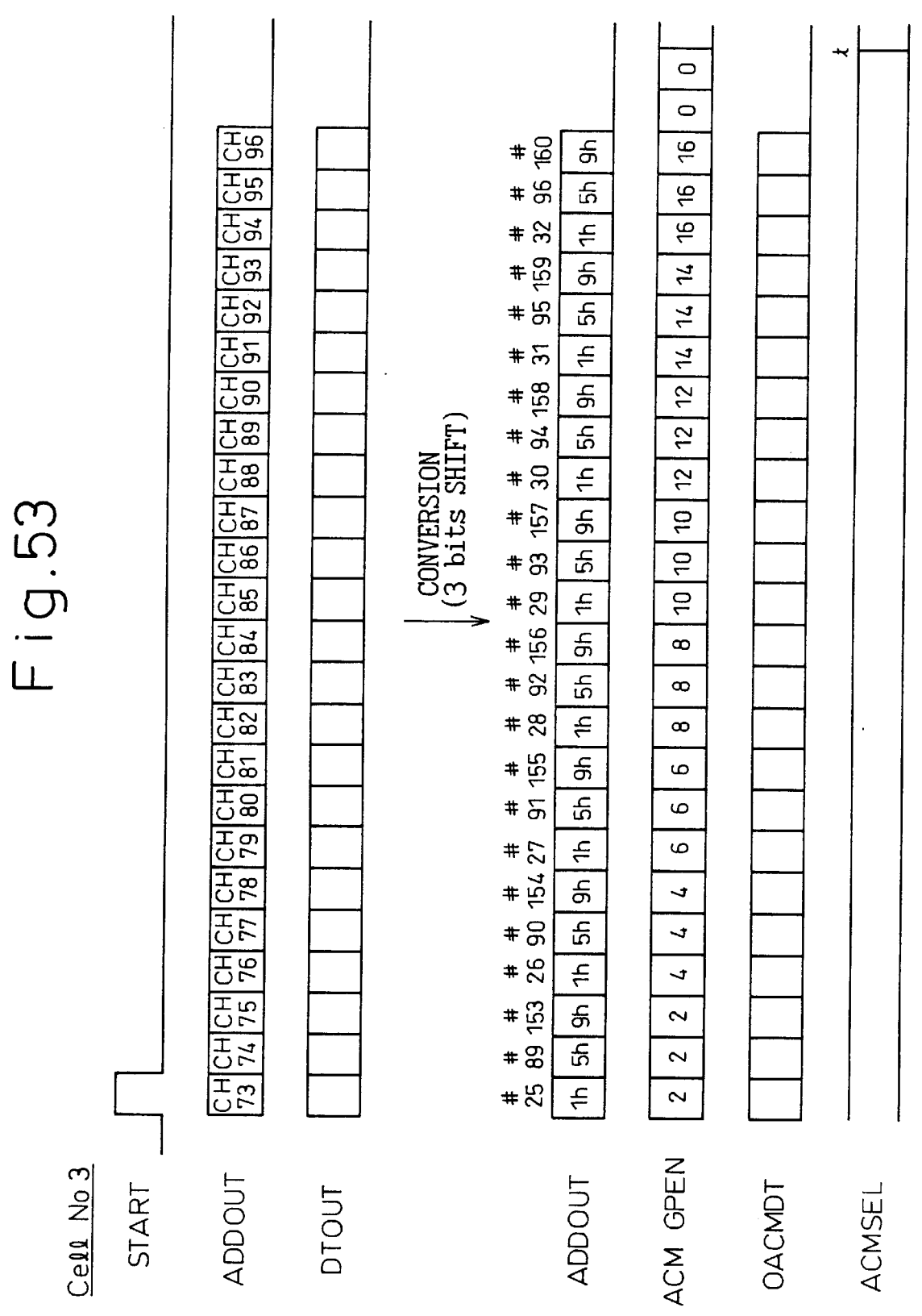

FIG. 53 shows timing charts showing signals appearing in FIG. 27, FIG. 28, and FIG. 49 for Cell No. 3;

Figure 54:
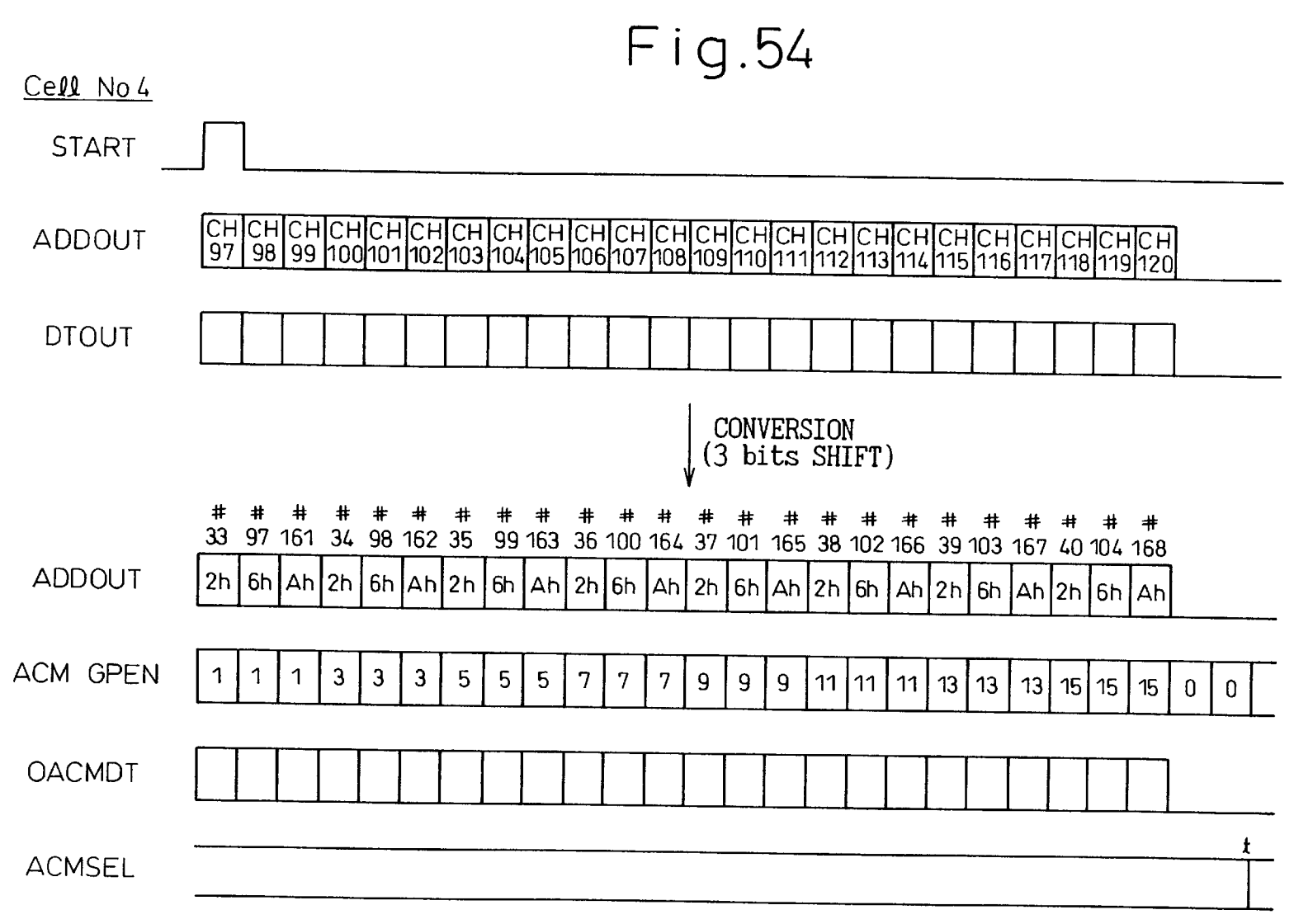

FIG. 54 shows timing charts showing signals appearing in FIG. 27, FIG. 28, and FIG. 49 for Cell No. 4;

Figure 56:
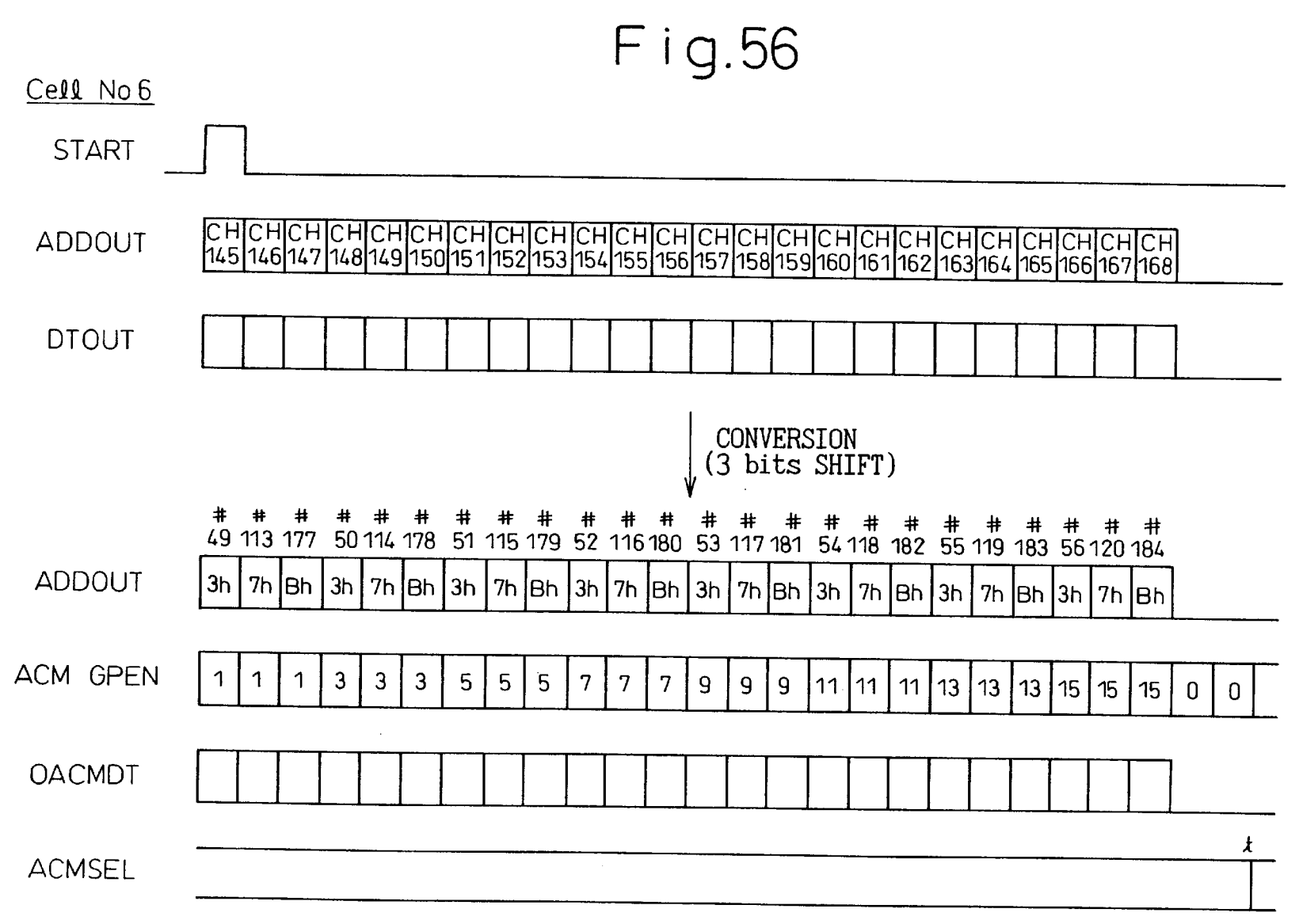

FIG. 56 shows timing charts showing signals appearing in FIG. 27, FIG. 28, and FIG. 49 for Cell No. 6;

Figure 57:
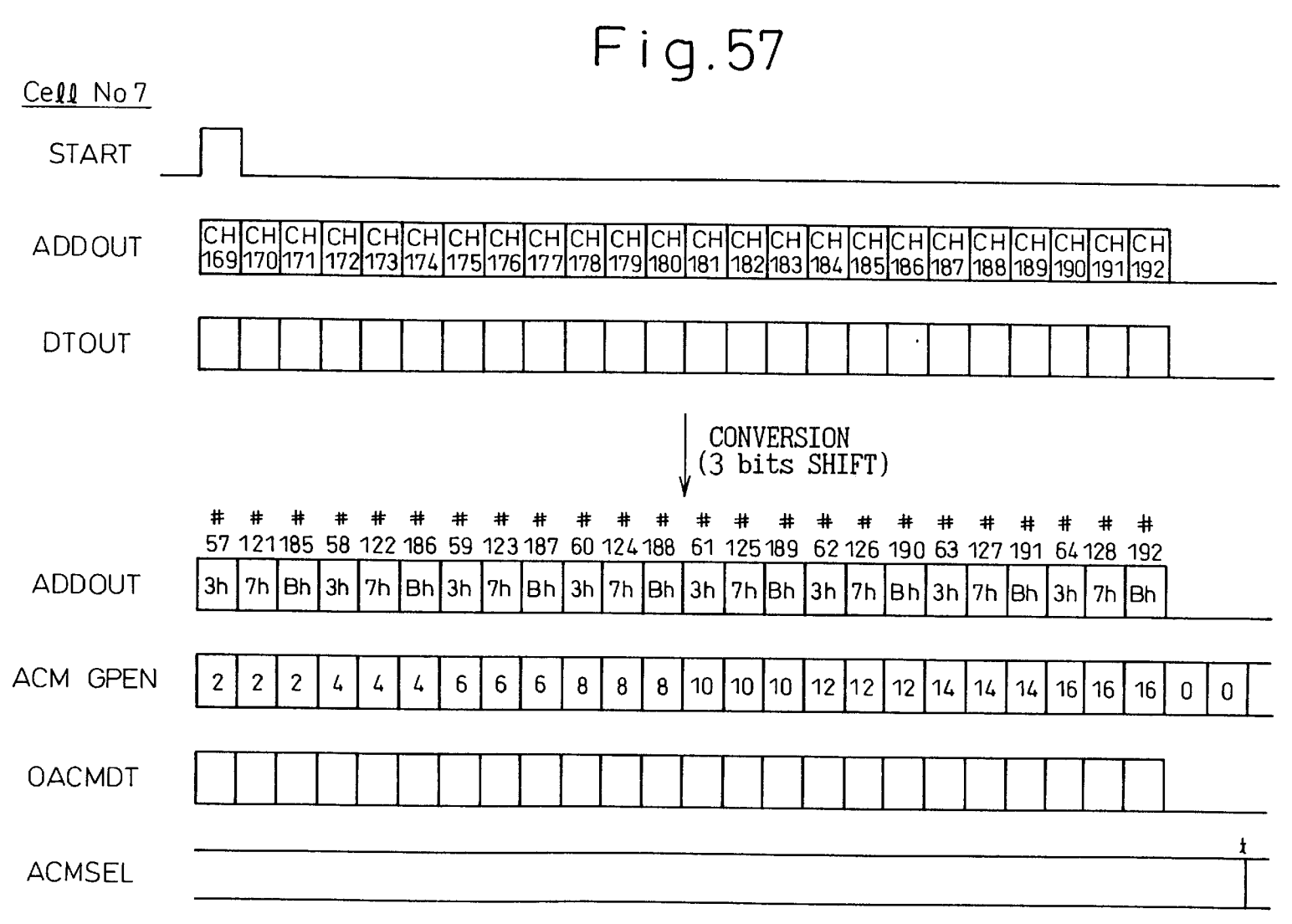

FIG. 57 shows timing charts showing signals appearing in FIG. 27, FIG. 28, and FIG. 49 for Cell No. 7;

Figure 63:
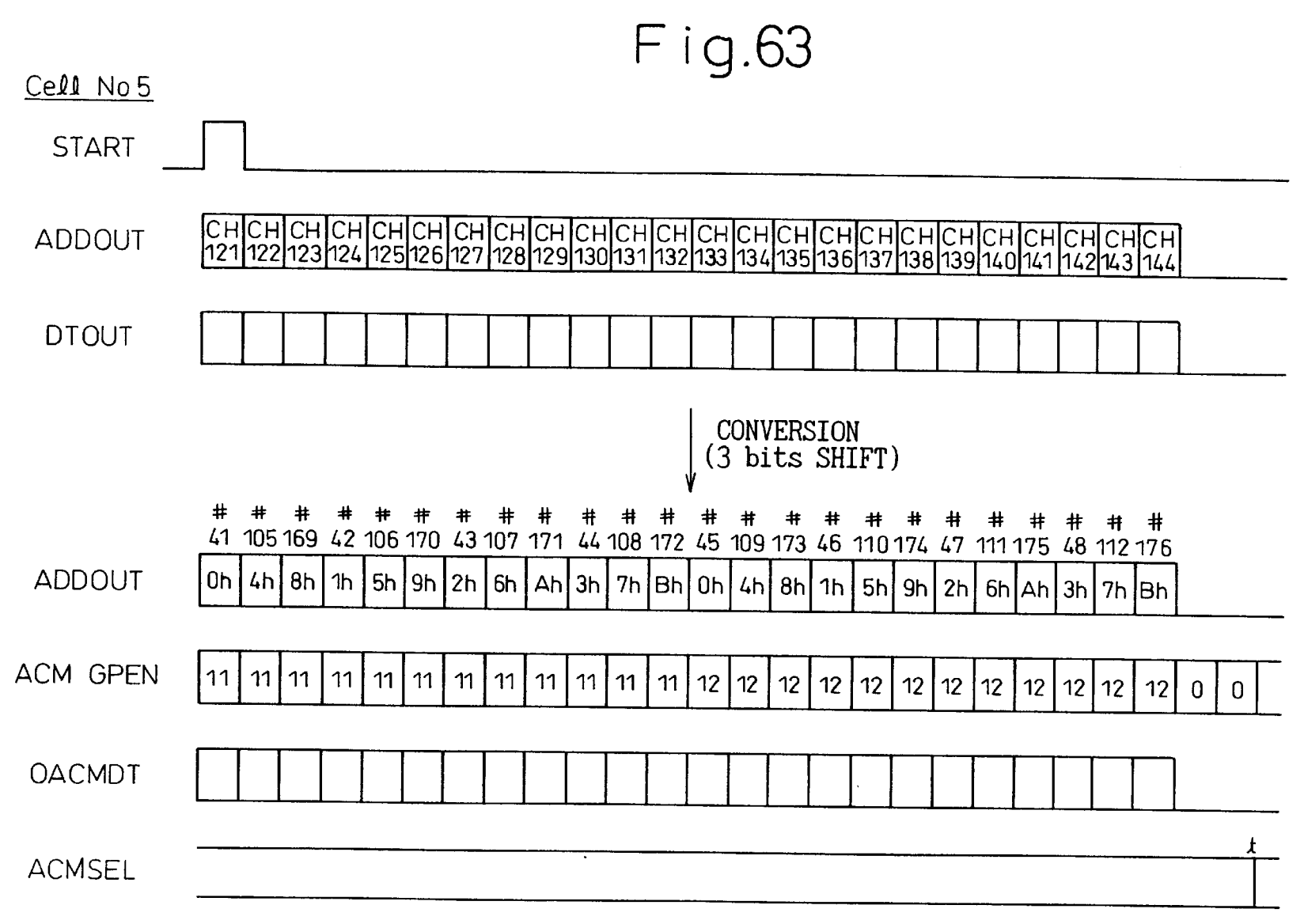

FIG. 63 shows timing charts showing signals appearing in FIG. 27, FIG. 28, and FIG. 49 for Cell No. 5;

Figure 64:
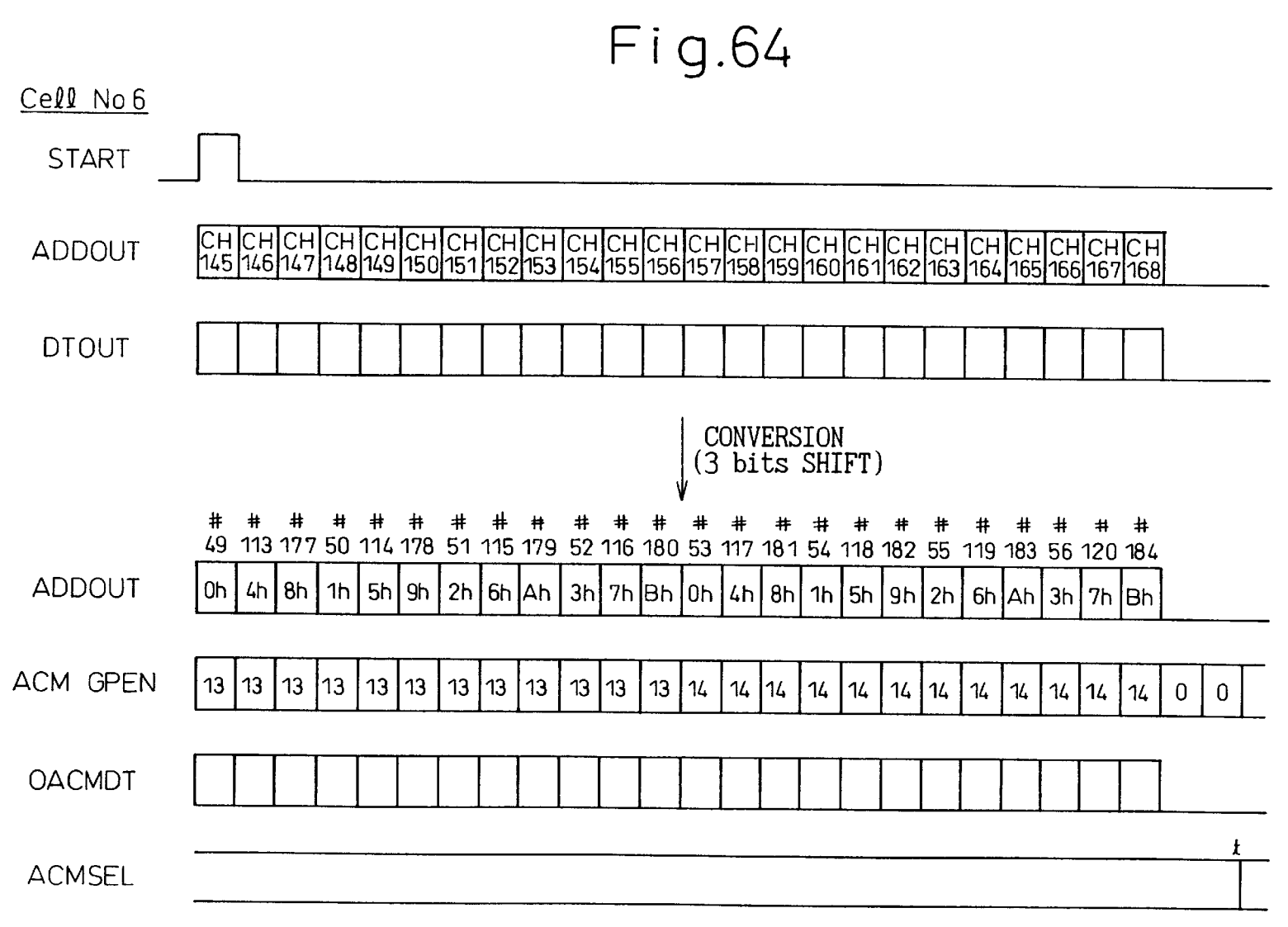

FIG. 64 shows timing charts showing signals appearing in FIG. 27, FIG. 28, and FIG. 49 for Cell No. 6;

Figure 65:
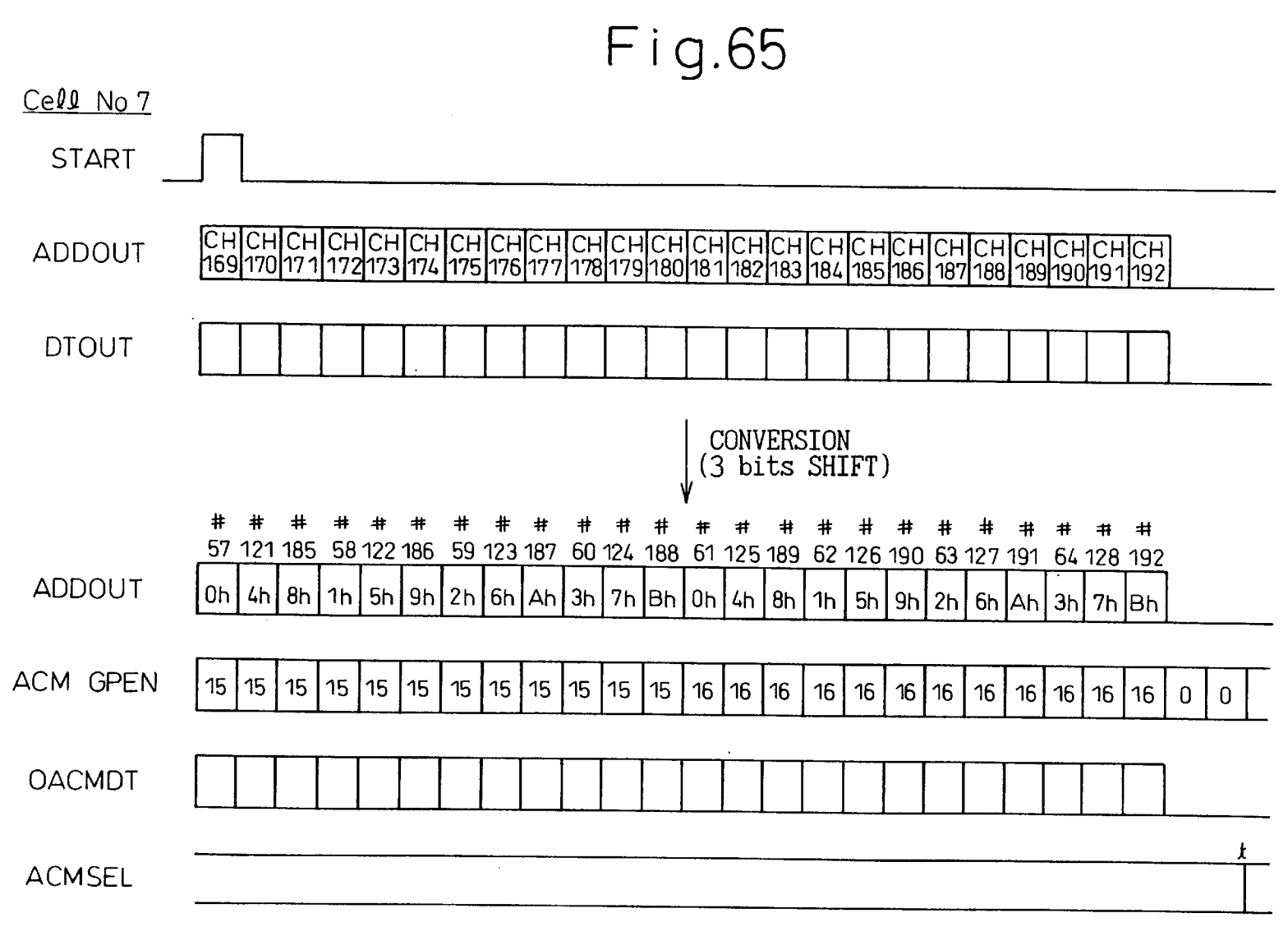

FIG. 65 shows timing charts showing signals appearing in FIG. 27, FIG. 28, and FIG. 49 for Cell No. 7;

FIG. 66 is a first part of a table showing a converting operation (ADD side) in a data converting unit 35;

FIG. 67 is a second part of a table showing the converting operation (ADD side) in the data converting unit 35;

FIG. 68 is a third part of a table showing the converting operation (ADD side) in the data converting unit 35;

FIG. 69 is a fourth part of a table showing the converting operation (ADD side) in the data converting unit 35;

FIG. 70 is a first part of a table showing the converting operation (DROP side) in the data converting unit 35;

FIG. 71 is a second part of a table showing the converting operation (DROP side) in the data converting unit 35;

FIG. 72 is a third part of a table showing the converting operation (DROP side) in the data converting unit 35;

FIG. 73 is a fourth part of a table showing the converting operation (DROP side) in the data converting unit 35;

FIG. 74 is a first part of a table showing the converting operation (ADD side) in an address converting unit 36;

FIG. 75 is a second part of a table showing the converting operation (ADD side) in the address converting unit 36;

FIG. 76 is a third part of a table showing the converting operation (ADD side) in the address converting unit 36;

FIG. 77 is a fourth part of a table showing the converting operation (ADD side) in the address converting unit 36;

FIG. 78 is a first part of a table showing the converting operation (DROP side) in the address converting unit 36;

FIG. 79 is a second part of a table showing the converting operation (DROP side) in the address converting unit 36;

FIG. 80 is a third part of a table showing the converting operation (DROP side) in the address converting unit 36;

FIG. 81 is a fourth part of a table showing the converting operation (DROP side) in the address converting unit 36;

FIG. 82 is a table showing an example of an output code from an address control memory (ACM) 23;

FIG. 92 is a schematic view of the TSA circuit of the related art; and

FIG. 93 is a view showing one stage <A-n> in the circuit shown in FIG. 92 in detail.

DESCRIPTION OF THE PREFERRED EMBODIMENTS

Before describing the embodiments of the present invention, the related art and the disadvantages therein will be described with reference to the related figures.

Figure 90:
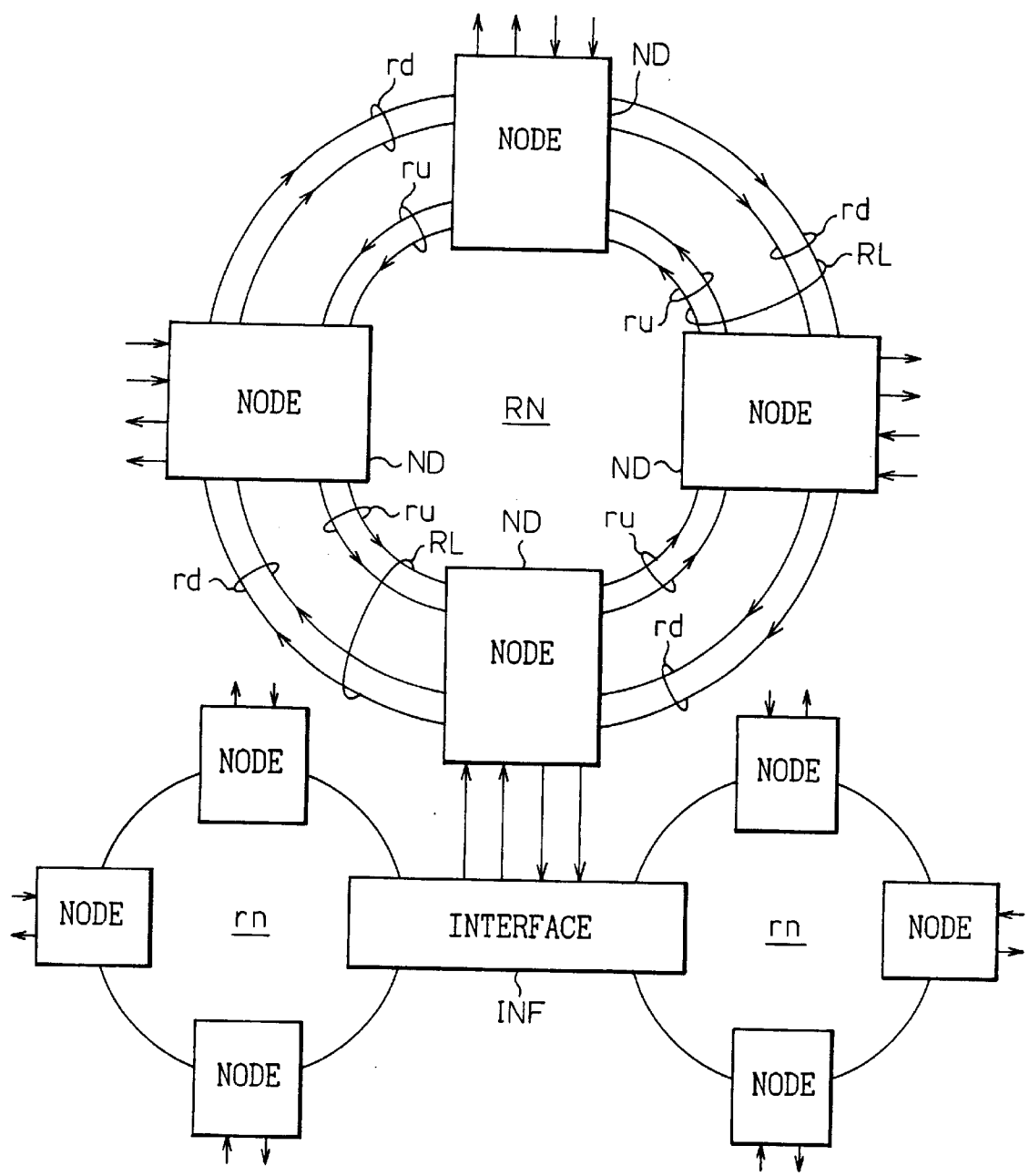
FIG. 90 is a view of a ring network as an example to which the present invention is applied.

FIG. 90 is a view of a ring network as an example to which the present invention is applied. In the figure, rn is a high speed ring network. A plurality of nodes are inserted along this ring. The ring constitutes an add drop multiplexer (ADM) ring as a whole. In the figure, for simplification, only two such high speed ring networks rn are shown. Here, the high speed ring network rn is operated with a data transmission rate of for example 2.4 Gb/s.

Recently, there has been remarkable advances made in multi-media. Along with this, it has become required to put together a number of such high speed ring networks rn so as to further enlarge the ring networks. The ultra high speed ring network RN was introduced for this purpose. This is connected to the above high speed ring networks rn via interface INF.

The ultra high speed ring network RN is constituted by a ring transmission line RL. This ring transmission line RL comprises an upstream pair of optical fibers ru and a downstream pair of optical fibers rd. A plurality of nodes ND are inserted into these pair of optical fibers. These constitute an ADM ring as a whole. The data transmission rate of this ultra high speed ring network RN is for example 10 Gb/s. The present invention can be applied to particularly each node ND in the ultra high speed ring network RN.

Figure 91:
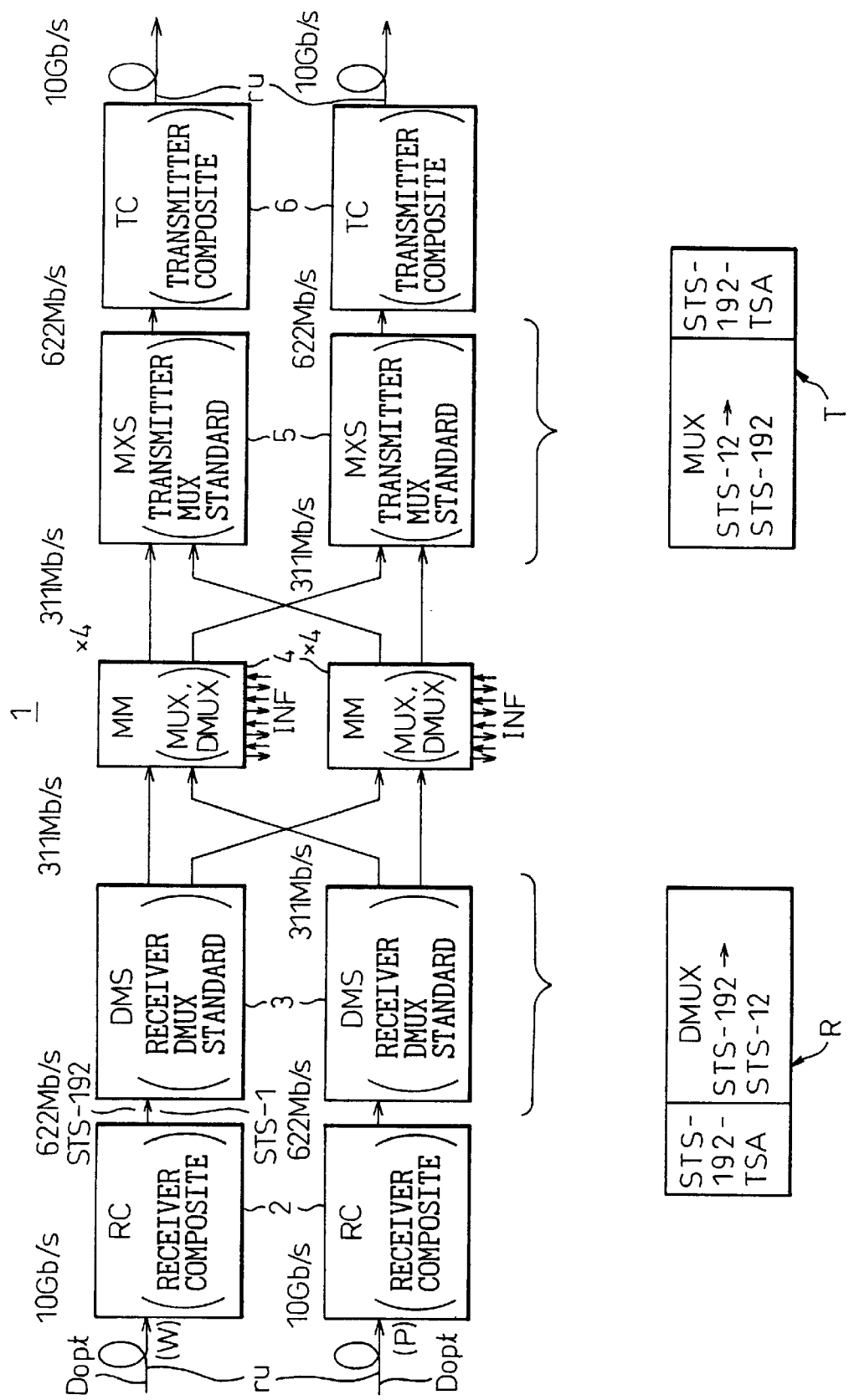
FIG. 91 is a block diagram of the principal parts of the nodes shown in FIG. 90.

FIG. 91 is a block diagram of the principal parts of the nodes shown in FIG. 90. This principle parts are multiplex conversion equipment 1.

There are two units of the multiplex conversion equipment 1: one connected to the upstream pair of optical fibers ru and one connected to the downstream pair of optical fibers rd, but both have the same configuration, therefore, in the figure, the example of the former (ru) is shown. Note that one of the pair of optical fibers ru is a current side (working) fiber and the other is a stand-by (protection) fiber.

An optical data signal Dopt of for example 10 Gb/s input from the left end of FIG. 91 is subjected to optical/electrical conversion (O/E) in a receiver unit (RC) 2 to become an electrical signal, for example, an STS-192 (Synchronous Transport Signal-192) signal. This STS-192 signal is a signal obtained by multiplexing 192 channels' worth of STS-1 signals (51.48 Mb/s). Here, the STS-192 signal is converted in format to an STS-12 signal (622 Mb/s). Note that a group of 16 STS-12 signals from 16 paths are put together to form the STS-192 signal.

The signal obtained by assembly of a group of 16 STS-12 signals is demultiplexed into a group of 16 STS-12 signals at a demultiplex unit (DMS) 3 of the next stage and further applied to a multiplex/demultiplex unit (MUX DMUX) 4 after removal of overhead (OH) etc. Here, the reason why the lines are crossing at the working side (W) and protection side (P) is that switching is sometimes performed between the working and protection sides due to failures etc.

This multiplex/demultiplex unit (MM) 4 performs a DROP (branching) operation of the data signal to the interface INF side shown in FIG. 90 and an ADD (insertion) operation of the data signal from the interface INF side.

The multiplex unit (MXS) 5 on the transmission side multiplexes the data signal subjected to the ADD and DROP operation at the multiplex/demultiplex unit 4 and the data signal subjected to neither the ADD nor DROP operation passing through (THROUGH) the related node as it is again, further converts the group of 16 STS-12 signals in format to a STS-192 signal, and inputs the same to a transmitter unit (TC) 6. The transmitter unit (TC) 6 performs electrical/optical (E/O) conversion with respect to the STS-192 electrical signal and transmits this to the pair of optical fibers ru again.

Showing the characteristic feature of the present invention in advance by referring to the block diagram of FIG. 91 mentioned above, it can be diagrammatically represented as the blocks R and T of lower part of the figure.

First, the block R means that at least TSA (channel setting) is carried out in a hypermultiplex level of for example the 10 Gb/s STS-192 signal at a reception side (Drop side) and that preferably format conversion such as STS-192→STS-12 is carried out simultaneously with this TSA. On the other hand, the block T means that at least TSA (channel setting) is carried out in a hypermultiplex level of for example a 10 Gb/s STS-192 signal at a transmission side (Add side) and that preferably format conversion such as STS-12→STS-192 is carried out simultaneously with this TSA.

When it is attempted to perform the above operations (R and T) according to the related art, there arises problems in the circuit size, power consumption, timing margin, degree of integration to the chip (number of nets), etc. Below, the related art will be explained in more detail.

FIG. 92 is a schematic view of the TSA circuit of the related art; and FIG. 93 is a view showing one stage <A-n> in the circuit shown in FIG. 92 in detail. The explanation will be made by referring to these FIG. 92 and FIG. 93. Note that, the TSA circuit of the related art shown here is a TSA circuit incorporated in each node to be inserted into the 2.4 Gb/s (that is STS-48) high speed ring network rn shown in FIG. 90.

As already mentioned, the TSA circuit of the related art had two combining circuits and registers for each channel (CH) and realized the TSA of all channels (CH) by performing TSA (channel setting) for each block (CH) and serially connecting them.

In addition, since the transmission capacity was relatively low speed data signals of, for example, the STS-48 (2.4 Gb/s) level compared with the STS-192 (10 Gb/s) level, a TSA circuit could be realized by a multistage connection of simple circuits (shift registers 7) as shown in FIG. 92 and FIG. 93 configured by the channel (CH) units.

In FIG. 93, I is a TSA control unit for each CH and is constituted by a channel selection circuit 11 for performing 4:1 selection in a vertical direction of a main signal (Main Data) by the (TSA) channel setting from the outside; a first plane data selection unit 12 for selecting the data from the channel selection unit 11 or the data from the TSA control I for each CH of the former stage and holding the same; and a second plane data selection unit 13 for selecting the data from the channel selection circuit 11 or the data from the TSA control I for each CH of the former stage and holding the same in the same way as this first plane data selection unit 12. The two circuits of the first plane data selection unit 12 and the second plane data selection unit 13 have complementary circuit structures, that is, when the first plane data selection unit 12 is reading data, the second plane data selection unit 13 is writing data, and conversely when the first plane data selection unit 12 is writing data, the second plane data selection unit 13 is reading data.

II is an address control memory (ACM) data decode unit and is constituted by a pulse generator (PG) circuit 14 for generating the timing for TSA control unit for each CH and an address control memory (ACM) decode circuit 15 for decoding the address control memory (ACM) code input from the outside.

By serially connecting 12 pairs A of the TSA control unit I for each CH and address control memory (ACM) data decode unit II as A-1, A-2, . . . , A12 of FIG. 92, channel setting (TSA) of STS-12 signals becomes possible. By providing a group of four of these for the main signal (Main Data), TSA of all channels (CH) is realized. Note that 1$i$, 1$o$, 2$i$, 2$o$, etc. shown in FIG. 92 are indicated as 1-in, 1-out, 2-in, 2-out, etc. in FIG. 93.

As already mentioned, in the rise of transmission rates and increase of capacity expected in the future, a transmission method of high efficiency offering a high degree of freedom in the combination of channel settings has been sought. However, the increase of capacity has been accompanied by not only an increase in the circuit scale, but also the number of channel numbers, therefore the number of combinations of channel settings has increased. If trying to realize this by the circuit of the related art, the number of nets would become enormous, there would be insufficient timing margins, the layout on the chip would become difficult, and there would be other possible obstacles to development.

Further, as already mentioned, there has been dazzling progress made in the integration technology for LSIs in recent years, but there are still various limitations. These limitations have become obstacles to realization of a TSA function in circuit design. More specifically, in the TSA (channel setting) of the STS-48 (2.4 Gb/s) level of the related art, that is, the STS-48-TSA, it is sufficient to realize 2,304 types of combinations of channels, but in the STS-192-TSA planned by the present invention, up to 36,864 types of combinations of channels must be realized, therefore a circuit 16 times the size in the case of the STS-48-TSA becomes necessary.

Further, as already mentioned, in addition to this increase of circuit size, since the transmission rate (bit rate of signals to be processed) becomes high, the power consumption naturally becomes larger.

Accordingly, there is the above problem of disadvantageous circuit size, power consumption, timing margin, and degree of integration to a chip (number of nets) if a TSA circuit structure comprising only logics of the related art is applied as it is to the TSA circuit of the STS-192 level.

Accordingly, an object of the present invention is to realize a TSA circuit capable of transmitting a large volume of data with a high efficiency and having a high degree of freedom in channel setting. For this purpose, the invention provides a general use TSA circuit which achieves a reduction of the number of nets and circuit sizee, which has a low power consumption, and in addition which can reliably perform the data transfer.

Figure 1:
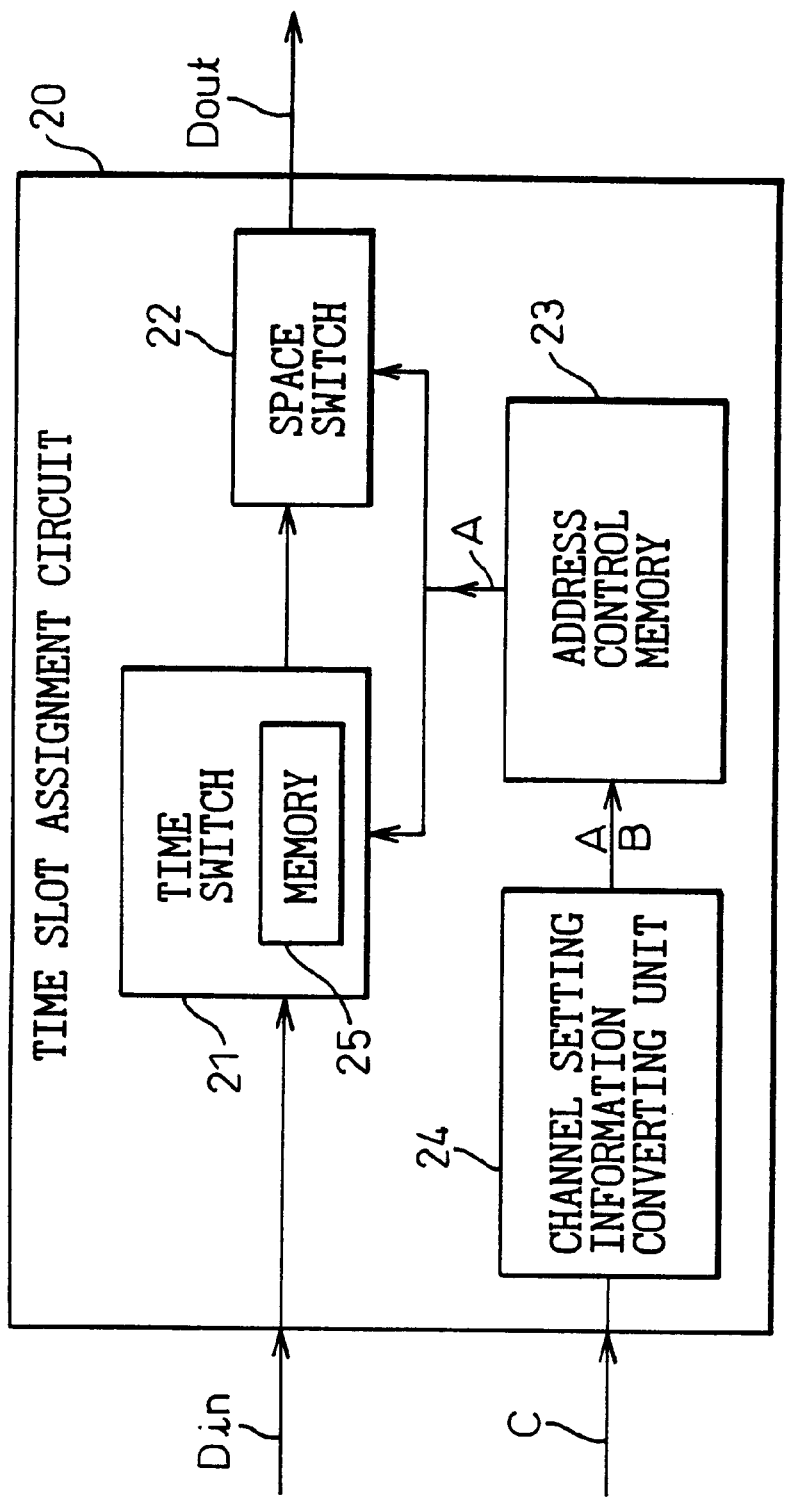
FIG. 1 is a view of the principle and configuration of a TSA circuit according to the present invention.

FIG. 1 is a view illustrating the principle and configuration of the TSA circuit according to the present invention. A TSA circuit 20 according to the present invention has a time switch 21, a space switch (SSW) 22, a channel setting information converting unit 24, and an address control memory 23 as illustrated.

The time switch 21 is provided with a transmission data memory 25 into which transmission data Din is sequentially written and performs switching in the time domain with respect to the transmission data Din.

The space switch (SSW) 22 performs switching in the space domain with respect to the output from the time switch 21.

The address control memory 23 outputs a channel setting address A for controlling both the time switch 21 and space switch (SSW) 22.

The channel setting information converting unit 24 converts channel setting information C from the outside to a channel setting address A and an accessing address B for the address control memory 23.

The time slot assignment (TSA) circuit 20 shown in FIG. 1 can be incorporated as part of the demultiplex unit (DMS) 3 on the DROP side and can be incorporated as part of the multiplex unit (MXS) 5 on the ADD side when referring to for example FIG. 91.

The constituent elements 21, 22, and 23 constituting such a TSA circuit 20 are preferably constituted as follows.

Looking at the time switch 21, the transmission data memory 25 comprises a random access memory (RAM). Regarding a first transmission data and a second transmission data, the second transmission data obtained by multiplexing a plurality of the first transmission data of a first multiplex level is written into the RAM as the transmission data Din and read from the RAM in accordance with the channel setting address A. Here, the first transmission data of the first multiplex level is the STS-12 signal according to the above example, while the second transmission data of the second multiplex level is the STS-192 signal obtained by multiplexing a group of 16 of this.

Next, viewing the space switch (SSW) 22, the second transmission data obtained by multiplexing a plurality of the first transmission data of the first multiplex level is output from the time switch 21 as the transmission data Din. From this output, the space switch (SSW) 22 selects one first transmission data (STS-12) from the group of 16 signals based on the channel setting address A.

Viewing the address control memory 23, this address control memory 23 comprises a RAM.

The second transmission data obtained by multiplexing a plurality of the first transmission data of the first multiplex level is written into the transmission data memory 25 as the transmission data Din. The channel setting addresses A from the channel setting information converting unit 24 for reading this from the transmission data memory 25 and selecting one first transmission data (STS-12) from among outputs from the time switch 21 in the space switch (SSW) 22 are written into the address control memory 23 at random by the accessing address B for the address control memory 23 from the channel setting information converting unit 24 and further serially read out for the time switch 21 and the space switch (SSW) 22.

By the introduction of the memories (24, 25) mentioned above, the present invention enables realization of channel setting with a high degree of Was freedom and high efficiency on an ultra high speed ring network RN of for example 10 Gb/s without enlarging the circuit scale.

Figure 2:
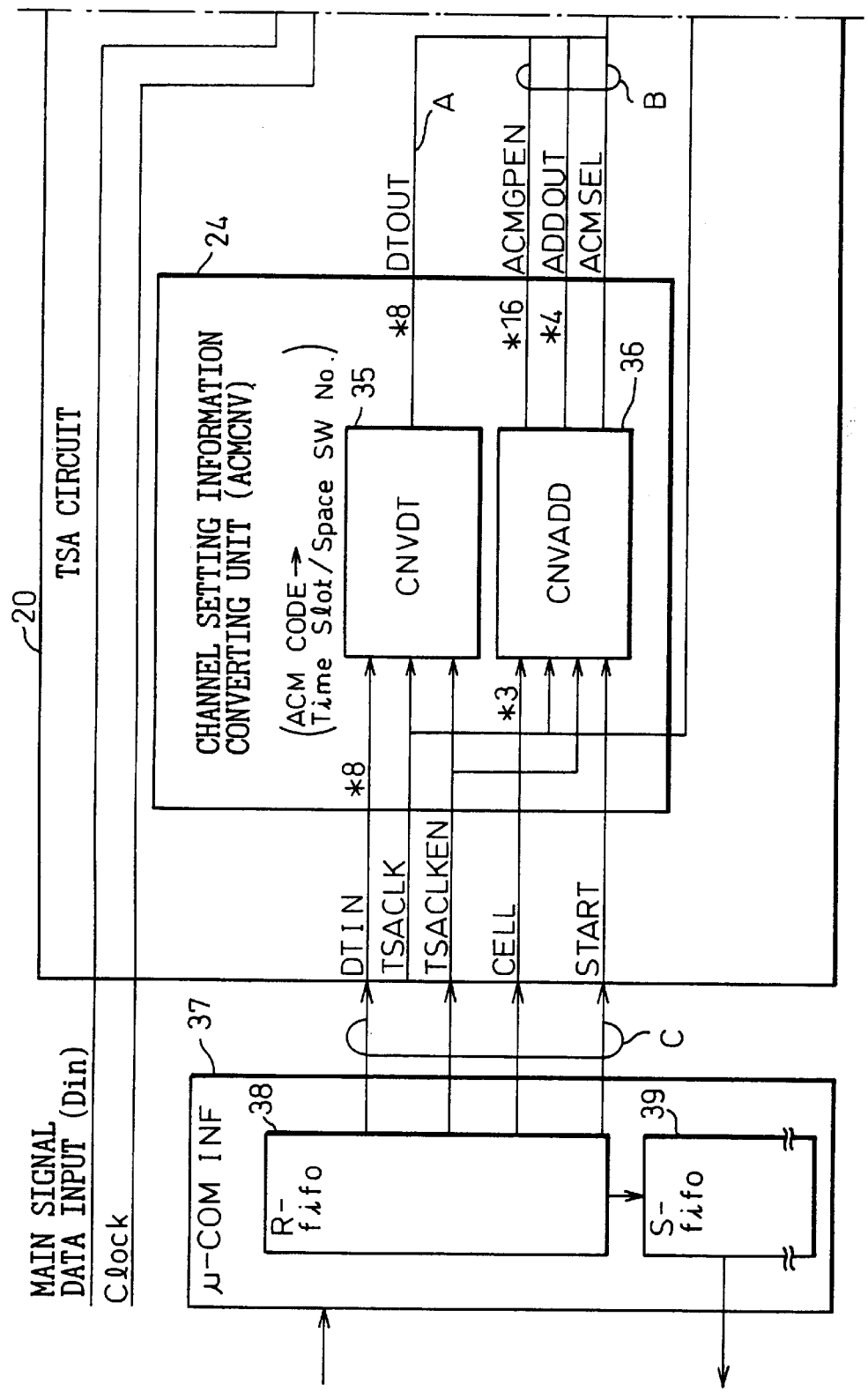
FIG. 2 is a first part of a view of a first embodiment of the present invention.
Figure 3:
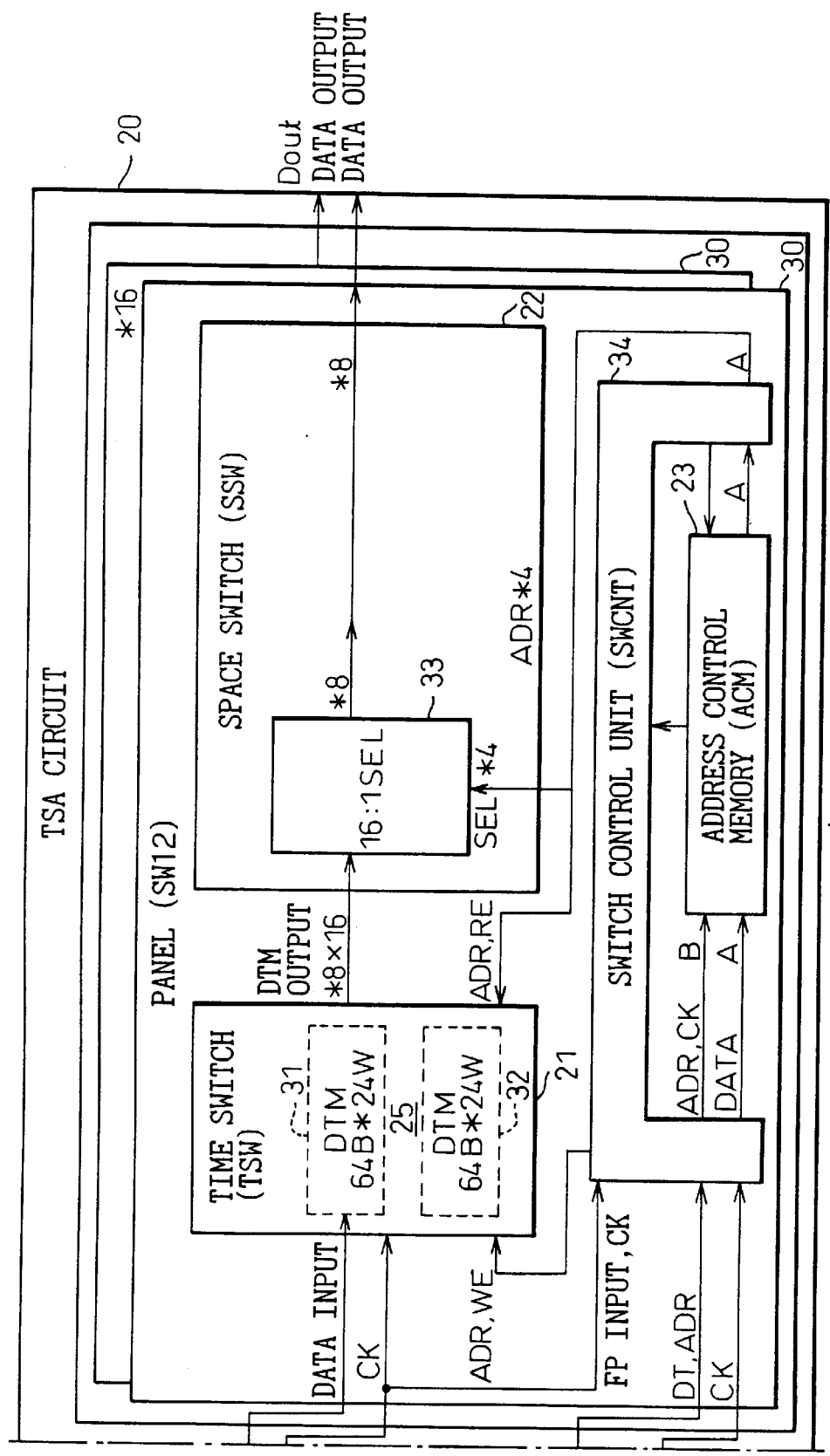
FIG. 3 is a second part of a view of the first embodiment of the present invention.

FIG. 2 and FIG. 3 are parts of a view of a first embodiment. Note that similar constituent elements are indicated by the same reference numerals or symbols throughout all of the drawings.

Referring to FIG. 2 and FIG. 3, the main signal data input (above transmission data Din) indicated at the left top of FIG. 2 is serially input to the time switch (TSW) 21 in the TSA circuit 20 (FIG. 3). At this time switch 21, switching in the time domain, that is, channel switching, is carried out, then the output of the time switch 21 is input to the space switch (SSW) 22 where switching in the space domain, that is, path switching, is carried out. Further, it is transmitted as the data output (above transmission data Dout).

The switching control at the time switch 21 and the space switch (SSW) 22 is carried out by the switch control unit (SWCNT) 34 according to the channel setting addresses A serially read from the address control memory (ACM).

The address control memory (ACM) 23 is given the channel setting address A and the accessing address B for the address control memory 23 from the channel setting information converting unit (hereinafter also referred to as the ACMCNV: ACM converter) (FIG. 2) via the switch control unit (SWCNT) 34.

The channel setting address A and the accessing address B for the address control memory are generated by the channel setting information converting unit 24 in accordance with channel setting information C (FIG. 2) from the outside.

The channel setting information C (FIG. 2) from the outside is given from for example a microcomputer interface ($\mu$-COM INF) 37. This interface 37 comprises a receiving fifo (R-fifo: Receiving First-in First-out) 38 for receiving and storing the channel setting code supplied from the microcomputer (not illustrated) and a sending fifo (S-fifo: Sending fifo) 39 for checking the suitability of the channel setting code and returning the result of the check to the microcomputer. The channel setting code stored in the receiving fifo 38 (FIG. 2) is input to the channel setting information converting unit (ACMCNV) 24 as the channel setting information C.

The channel setting information converting unit (ACMCNV) 24 (FIG. 2) is constituted by a data converting unit (CNVDT) 35 and an address converting unit (CNVADD) 36. The data converting unit 35 converts the channel setting information C to the channel setting address A (channel setting data) (DTOUT in the figure), while the address converting unit 36 converts the channel setting information C to the accessing address B (ACMGPEN, ADDOUT, ATMSEL) of the control memory 23.

The channel setting address A and the accessing address B are supplied to the address control memory (ACM) 23 via the switch control unit (SWCNT) 34 in FIG. 3. The channel setting addresses A (channel setting data) are written at random into the address control memory 23 in accordance with the accessing address B.

Note that, in FIG. 2, an example of conversion of the channel setting address A is represented as ACM CODE→Time Slot/Space SW No., where ACM CODE indicates the channel setting information, and Time Slot No. and Space SW No. indicate the setting information with respect to the time switch (TSW) 21 and the setting information with respect to the space switch (SSW) 22 shown in FIG. 3, respectively.

Referring to FIG. 3 again, 16 (first to sixteenth) panels 30 are provided in total in the same way as the first panel 30 of FIG. 3 on which the time switch (TSW) 21, space switch (SSW) 22, address control memory (ACM) 23, and the switch control unit (SWCNT) 34 are mounted. In the present invention, an explanation will be made by taking as an example a case where the first transmission data of the first multiplex level is the STS-12 signal, and the second transmission data of the second multiplex level is the STS-192 signal. Accordingly, the 16 planes mentioned above correspond to 16 STS-12 signals comprising a STS-192 signal. All of these 16 panels 30 have the same structure, therefore will be explained by referring to the illustrated first panel 30 (the same below). Each panel 30 is described as SW12 since there are 12 outgoing channels among incoming 192 channels.

Looking first at the time switch (SW) 21, the principal part thereof is the transmission data memory 25 mentioned above preferably comprising a RAM. In the example of the figure, it is constituted by two data memories (DTM) 31 and 32. Each has a structure of 63 bits (B)×24 words (W). The main signal data inputs (transmission data Din) input to the time switch 21 are 128-bit parallel signals, but usually the size of a RAM is 64 bits at maximum, therefore two data memories 31 and 32 (64×2=128) are provided. Further, each data memory (31, 32) has a two plane structure (12 W per plane). When the first plane is in a write operation, the data is read from the second plane, while conversely, when the first plane is in a read operation, the data is written into the second plane. Accordingly, it has 24 words (24 W) in total.

The writing of the transmission data Din to the data memories (DTM) 31 and 32 is carried out by sequential write addresses (ADR, WE: WE is Write Enable) from the switch control unit (SWCNT) 34, and the reading thereof is carried out by read addresses (ADR, RE), that is, the channel setting address A mentioned above.

Thus, the 128-bit parallel output (DTM output) read from the data memories 31 and 32 is input to the space switch (SSW) 22 of the next stage, where only the required transmission data is selected from among the 192 channels of signals by a selector (SEL) 33. The number of channels per plane (among 16 planes) is 12, so the selector 33 is described as a 16:1 SEL. Each of the channels exhibiting these 12 channels is an 8-bit parallel signal and becomes data output (transmission data Dout) of the 128 (=8×16)-bit parallel format by bringing all of the 16 planes into parallel. Which of the selectors (16:1 SEL) 33 is selected is determined by a 4-bit selection signal SEL. This signal SEL is contained in the channel setting address A (Space SW No.)

Figure 4:
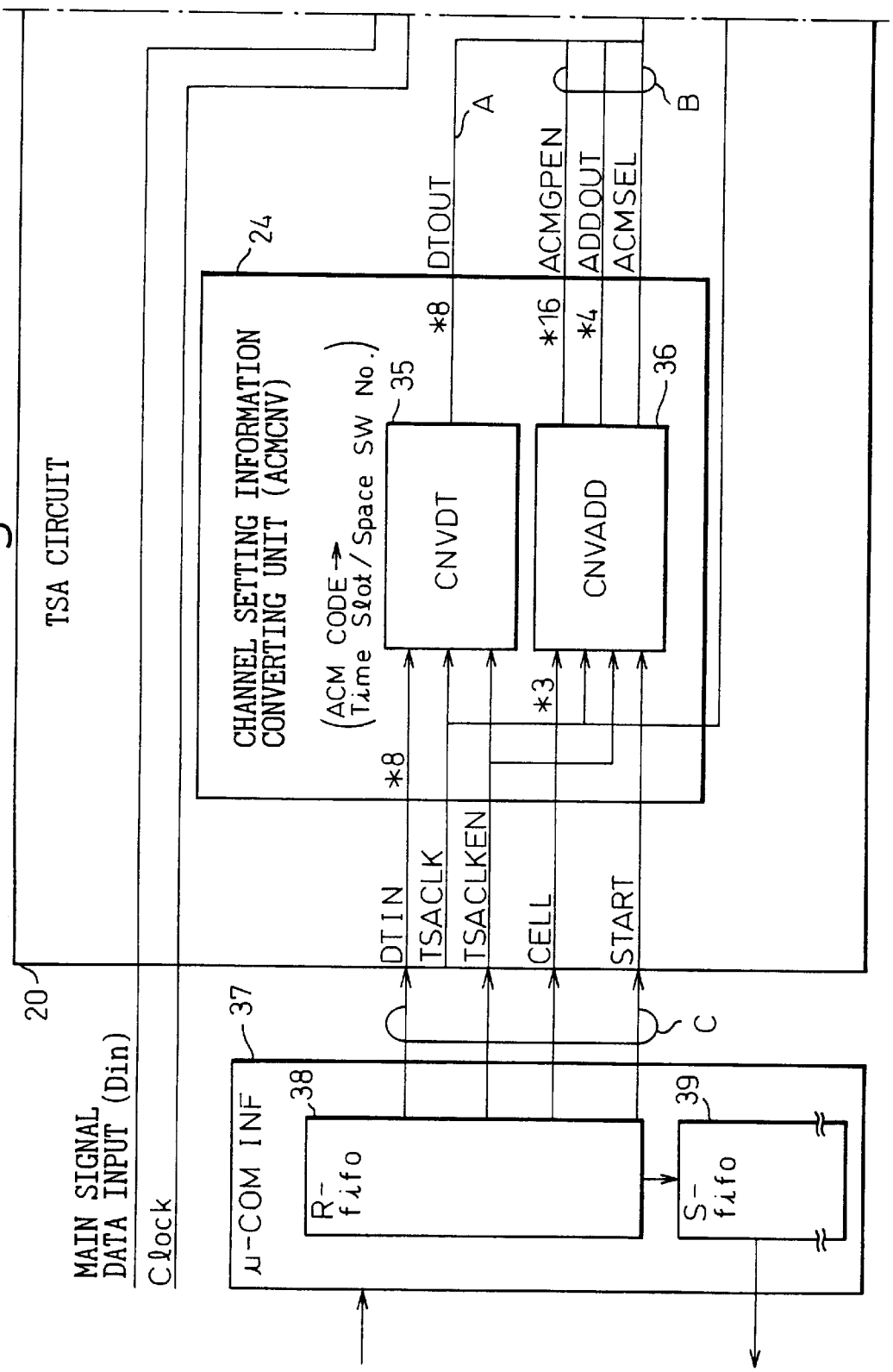
FIG. 4 is a first part of a view of a second embodiment of the present invention.
Figure 5:
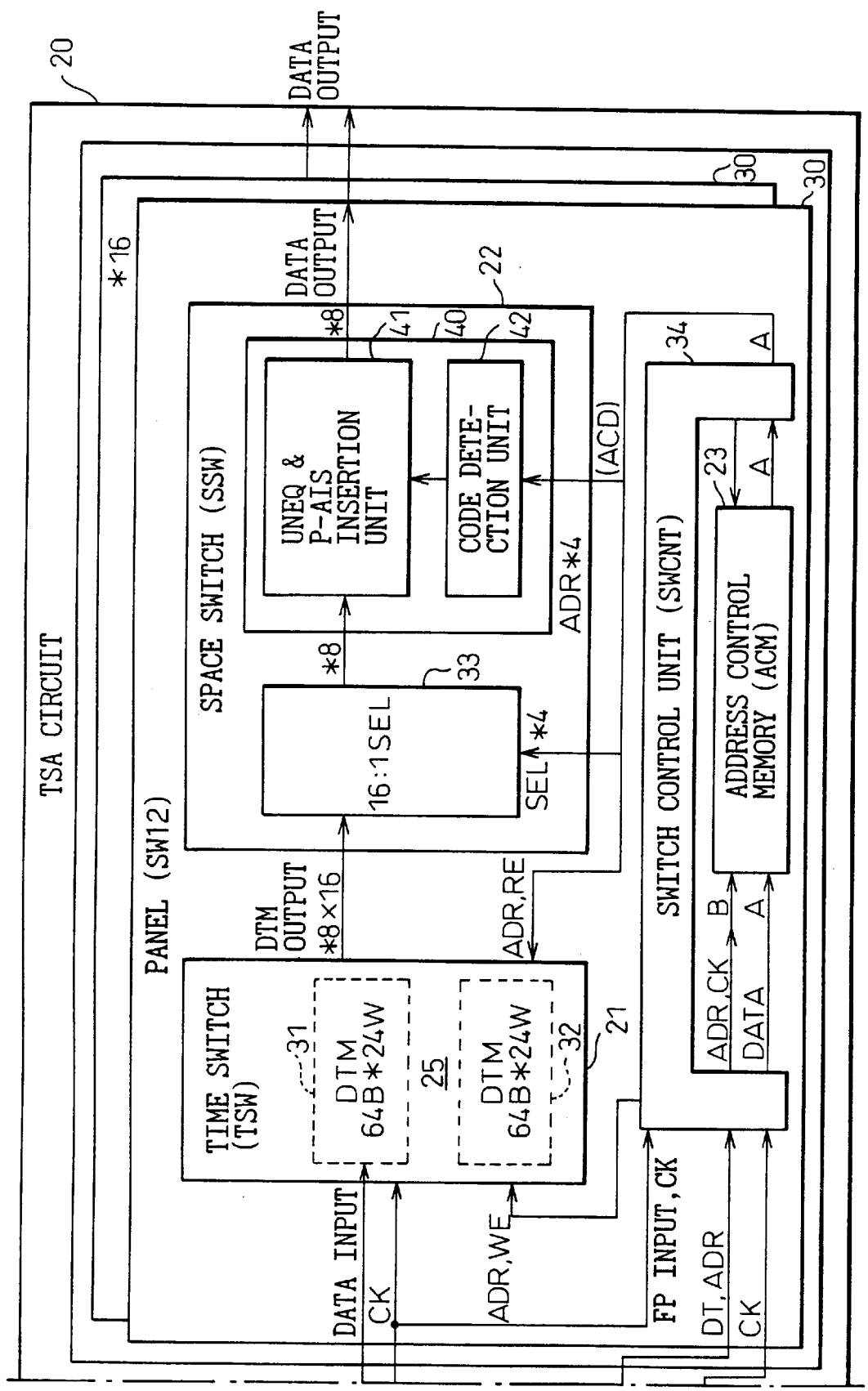
FIG. 5 is a second part of a view of the second embodiment of the present invention.

FIG. 4 and FIG. 5 are first and second parts of a view of a second embodiment of the present invention. The characteristic feature of the second embodiment resides in that an auxiliary signal generating means 40 (FIG. 5) is provided in the space switch (SSW) 22.

In the present embodiment, the auxiliary signal generating means 40 inserts an auxiliary signal into the corresponding channel among a plurality of channels (12 channels if it is a STS-12 signal) comprising each first transmission data of the first multiplex level in response to an auxiliary signal inserting code ACD contained in the channel setting address A from the address control memory 23.

Examples of the auxiliary signal include a first auxiliary signal usually referred to as a UNEQ indicating that the corresponding channel is unused and a second auxiliary signal usually referred to as a P-AIS indicating that a fault occurs in the corresponding channel.

In this case, the auxiliary signal generating means 40 has a code detection unit 42 for detecting the auxiliary signal inserting code ACD and an auxiliary signal insertion unit (UNEQ & P-AIS insertion unit) 41 for generating the first auxiliary signal (UNEQ) and the second auxiliary signal (P-AIS) when the auxiliary signal inserting code ACD is detected and inserting the same into the corresponding channel.

Figure 6:
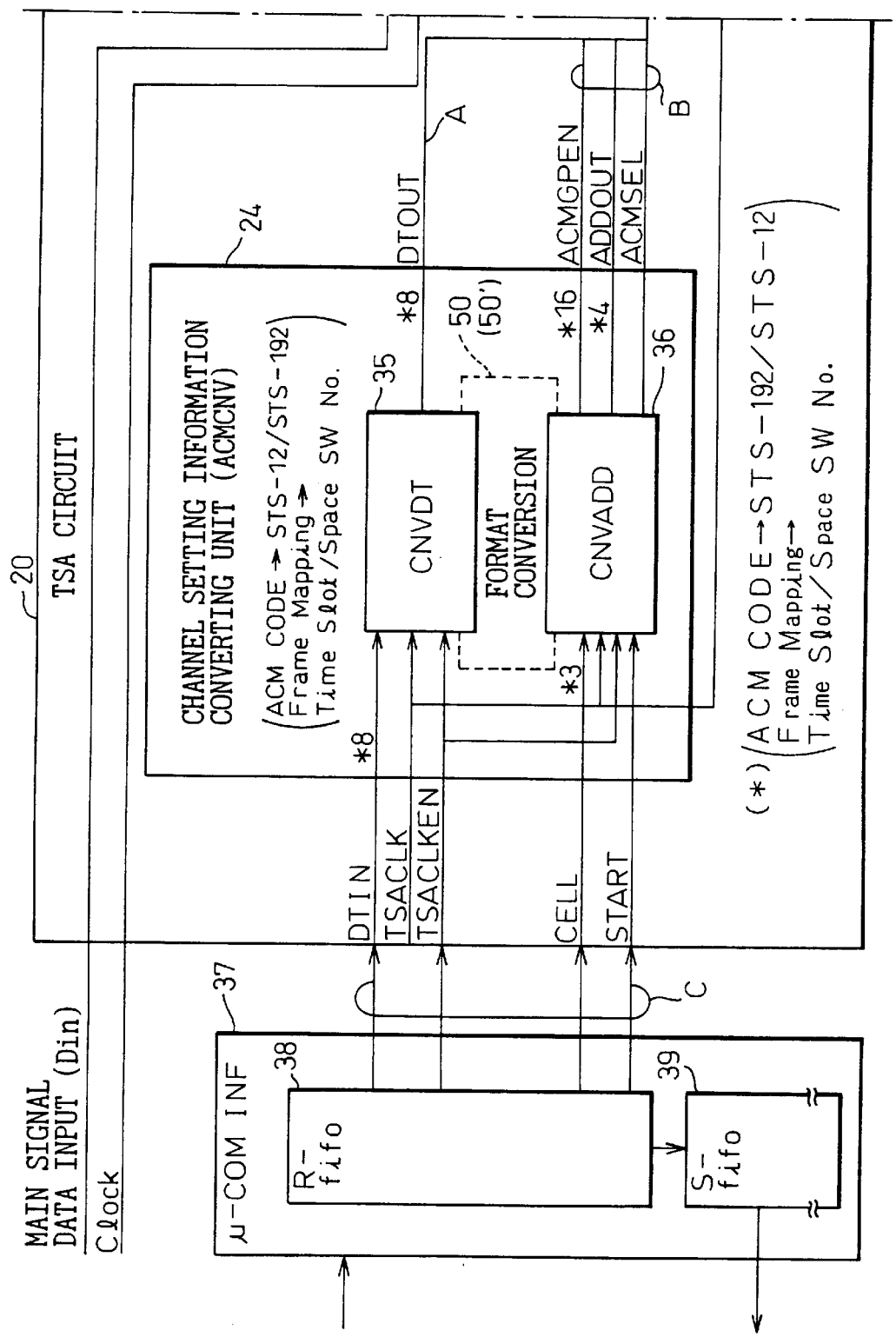
FIG. 6 is a first part of a view of a third embodiment of the present invention.
Figure 7:
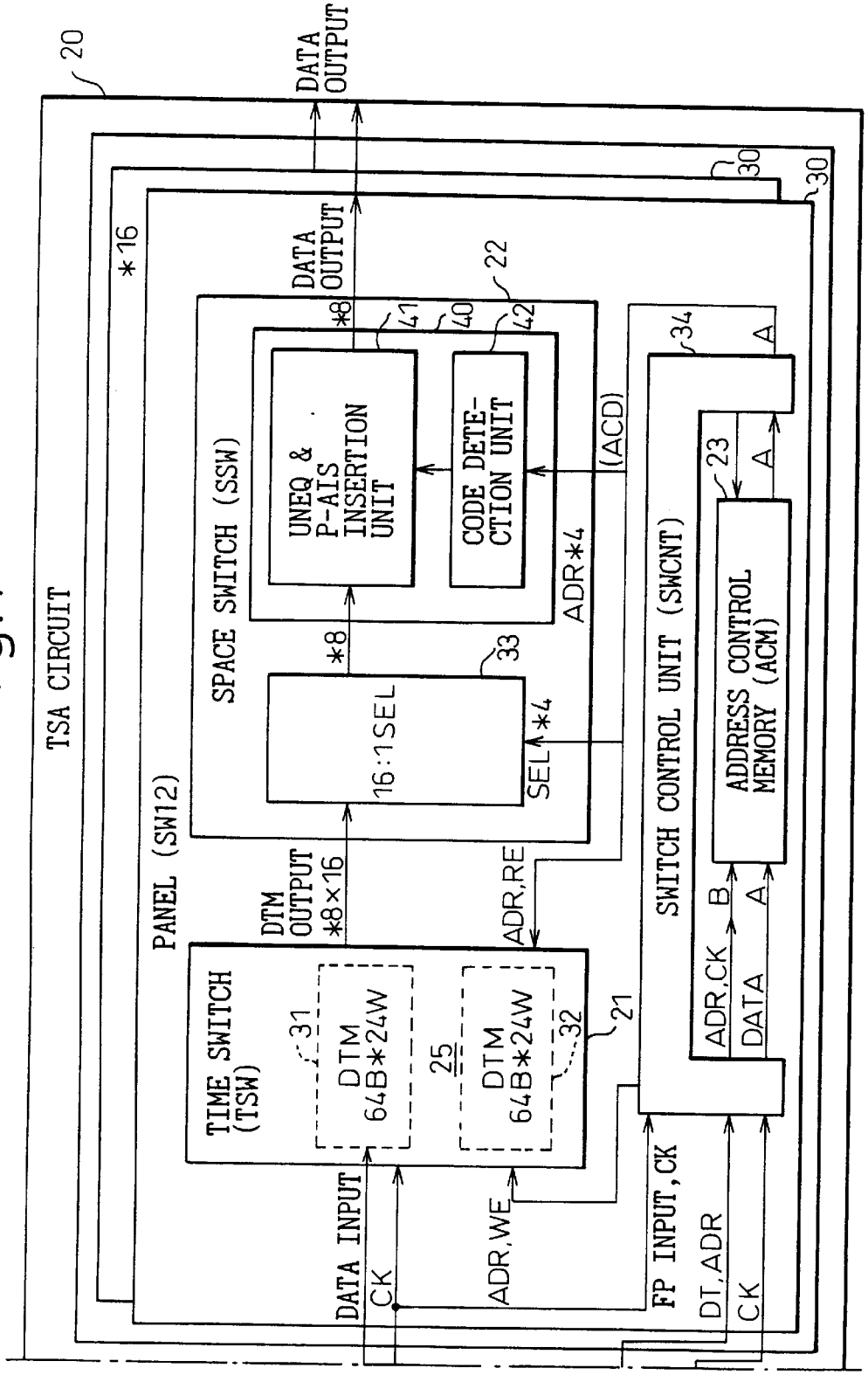
FIG. 7 is a second part of a view of the third embodiment of the present invention.

FIG. 6 and FIG. 7 are first and second parts of a view of a third embodiment of the present invention. Note that the third embodiment represented by FIG. 6 and FIG. 7 is illustrated by a combination with the second embodiment, but may be realized by a combination with the first embodiment or another embodiment mentioned later.

The characteristic feature of the present embodiment resides in that a format converting means 50 (50') is formed inside the channel setting information converting unit 24. Note that this format converting means 50 can be realized by also a simple signal control without introducing special hardware, therefore the present means 50 is represented by a block shown by a dotted line.

In FIG. 6, the format converting means 50 performs format conversion control for controlling the conversion of the frame format obtained by multiplexing the first transmission data of the first multiplex level (STS-12 signal) to the frame format of the second transmission data of the second multiplex level (STS-192 signal).

Alternatively, the format converting means 50' controls the conversion of the frame format of the second transmission data of the second multiplex level (STS-192 signal) to the frame format obtained by multiplexing the first transmission data of the first multiplex level (STS-12 signal).

Accordingly, ACM CODE→Time Slot/Space SW No. described in the channel setting information converting unit 24 of FIG. 2 becomes the ACM CODE→STS-12/STS-192 Frame mapping→Time Slot/Space SW No. shown in FIG. 6 when the format converting means 50 of FIG. 6 is introduced and becomes ACM CODE→STS-192/STS-12 Frame mapping→Time Slot/Space SW No. shown in the lower (*) when the format converting means 50' of FIG. 6 is introduced.

The TSA circuit 20 formed with the format converting means 50 is incorporated into the ADD side multiplex unit (MXS) 5 of FIG. 91.

On the other hand, the TSA circuit 20 formed with the format converting means 50' is incorporated into the DROP side demultiplex unit (DXS) 3 of FIG. 91.

Thus, when the format converting means 50 is introduced, mapping to the second transmission data (STS-192) is realized simultaneously with the channel setting (TSA). Further, when the format converting means 50' is introduced, mapping to the first transmission data (STS-12) is realized simultaneously with the channel setting (TSA). The above format conversion (mapping) and channel setting are diagrammatically shown by FIGS. 8, 9, and 10.

Figure 9:
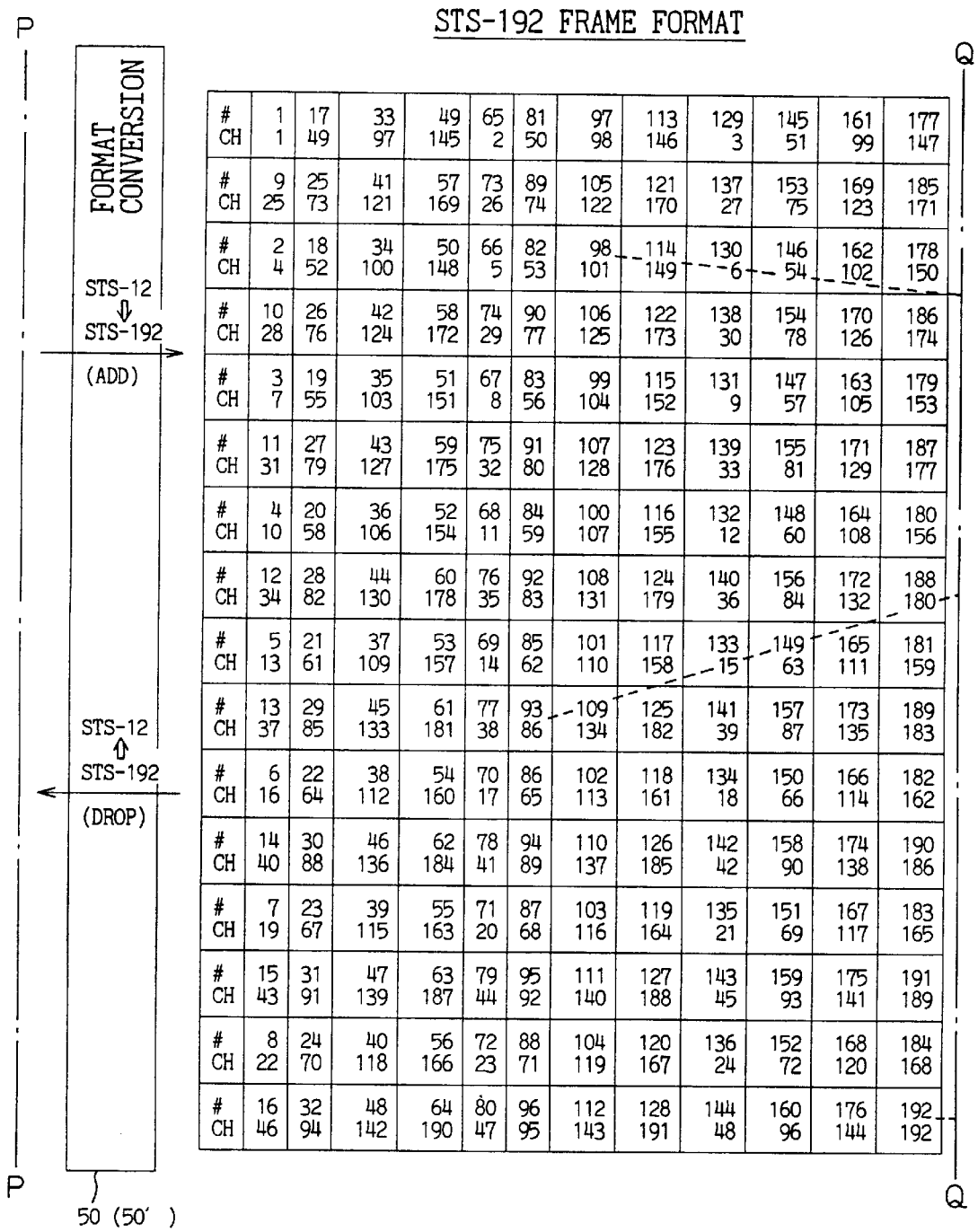
FIG. 9 is a second part of a view concretely illustrating a conversion of frame format and a situation of channel setting.
Figure 10:
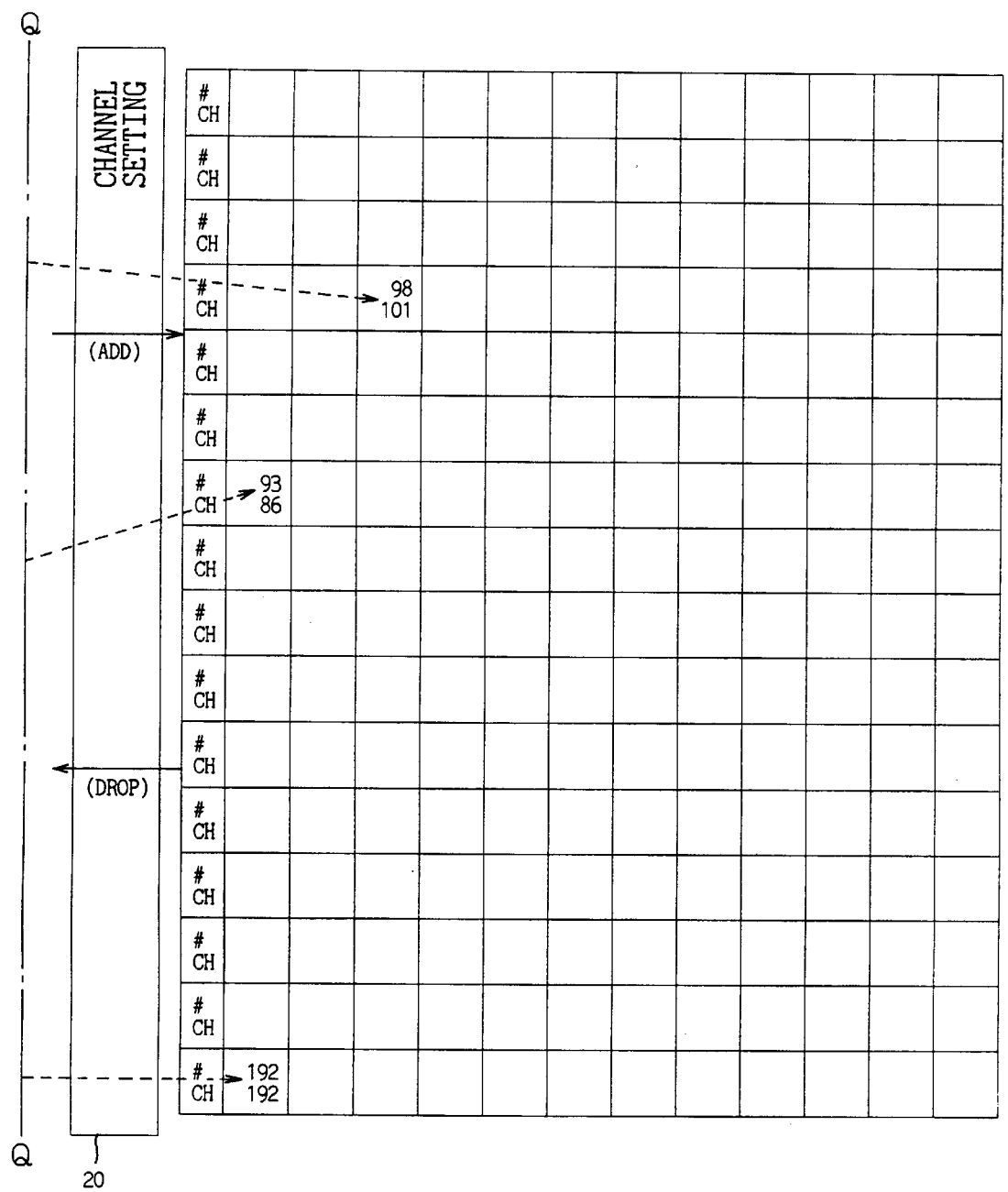
FIG. 10 is a third part of a view concretely illustrating a conversion of frame format and a situation of channel setting.

FIG. 8 to FIG. 10 are parts of a view concretely showing situation of both the conversion of the frame format and the channel setting.

FIG. 8 shows the frame format of the STS-12 signal; FIG. 9 shows the frame format of the STS-192 signal and the format conversion part (corresponding to the format converting means 50 (50') mentioned above); and FIG. 10 shows an example of the channel setting, that is, channel (CH) switching, and a channel setting unit (principal function of the TSA circuit 20).

Referring to FIG. 8, the smallest block corresponds to a channel (CH). In the embodiment of the present invention, an STS-1 signal (51.84 Mb/s) comprises one channel (CH). The STS-1 signal has a structure of 9 rows×900 bytes consisting of a SLOH (section line overhead) and payload.

In FIG. 8, 12 channels CH comprised by the STS-1 signals are arranged in a horizontal direction and comprise one STS-12 signal. A group of 16 STS-12 signals are arranged in a vertical direction in the figure and become 192 (=12×16) channels as a whole. Namely, they are mapped with a predetermined arrangement pattern from CH1 to CH192. Note that, in the figure, #1, #2, and #3 to #192 are time slot numbers, that is, time slot numbers on the transmission line (pairs of optical fibers ru and rd) (same also in FIG. 9 and FIG. 10).

Referring to FIG. 9, the figure shows the frame format of a STS-192 signal (10 Gb/s). In the same way as FIG. 8, it comprises the channels CH1 to CH192, but the arrangement pattern thereof is different from that of FIG. 8. In FIG. 9, the format converting unit is shown on the left side, and the format conversion is carried out between the STS-12 signal (FIG. 8) and STS-192 (FIG. 9) signal via this. In the figure, each arrow in the right direction shows the format conversion of STS-12→STS-192, and each arrow in the left direction shows the format conversion of STS-192→STS-12. Referring to FIG. 91 mentioned above, each arrow of the right direction corresponds to the format conversion on the ADD side carried out in the TSA circuit 20 in the multiplex unit (MXS) 5, and each arrow of the left direction corresponds to the format conversion on the DROP side carried out in the TSA circuit 20 in the demultiplex unit (DMS) 3.

Referring to FIG. 10 again, this pattern shows a pattern when channel switching is carried out with respect to the STS-192 signal or a pattern when the channel switching is carried out so as to shift to the STS-192 signal. Note, in the present figure, an example where the channel switching was carried out among three channels (CH101, CH86, CH192) is shown. These three channels are placed at different channel positions in FIG. 9.

The channel setting unit shown on the left side of FIG. 10 executes this channel switching and corresponds to the principal function of the TSA circuit 20.

FIG. 11 and FIG. 12 are parts of a view of the frame format of the STS-12 signal. It is substantially the same as the frame format of FIG. 8, but will be further concretely shown in correspondence with the transmission data Din.

The input data DATAIN of the first low group (LGP1) of the transmission data Din corresponds to the 71st to 64th bit lines (eight) in the transmission data Din input in the 128-bit parallel format. Similarly, the input data DATAIN in the ninth low group (LGP9) of the transmission data Din corresponds to the 0-th to seventh bit lines (eight) in the transmission data Din input in the 128-bit parallel format.

On the right end of FIG. 12, it is shown that the data (DATA) input to each data memory (DTM) in the time switch 21 is an 8-bit parallel format. Further, the numbers "176", "160", . . . , shown in the lower part of each channel indicate numbers (ACM DATA designation No.) for specifying the channel setting data written into the address control memory (ACM)23 at random.

FIG. 13 and FIG. 14 are parts of a view of the frame format of the STS-192 signal. It is substantially the same as the frame format of FIG. 9, but will be further concretely shown in correspondence with the transmission data Dout.

The output data DATAOUT of the first high group (HGP1) of the transmission data Dout corresponds to the seventh to 0-th bit lines (eight) in the transmission data Dout output in the 128-bit parallel format. Similarly, the output data DATAOUT of the ninth high group (HGP9) of the transmission data Dout corresponds to the eighth to 15th bit lines (eight) in the transmission data Dout output in the 128-bit parallel format.

Figure 15:
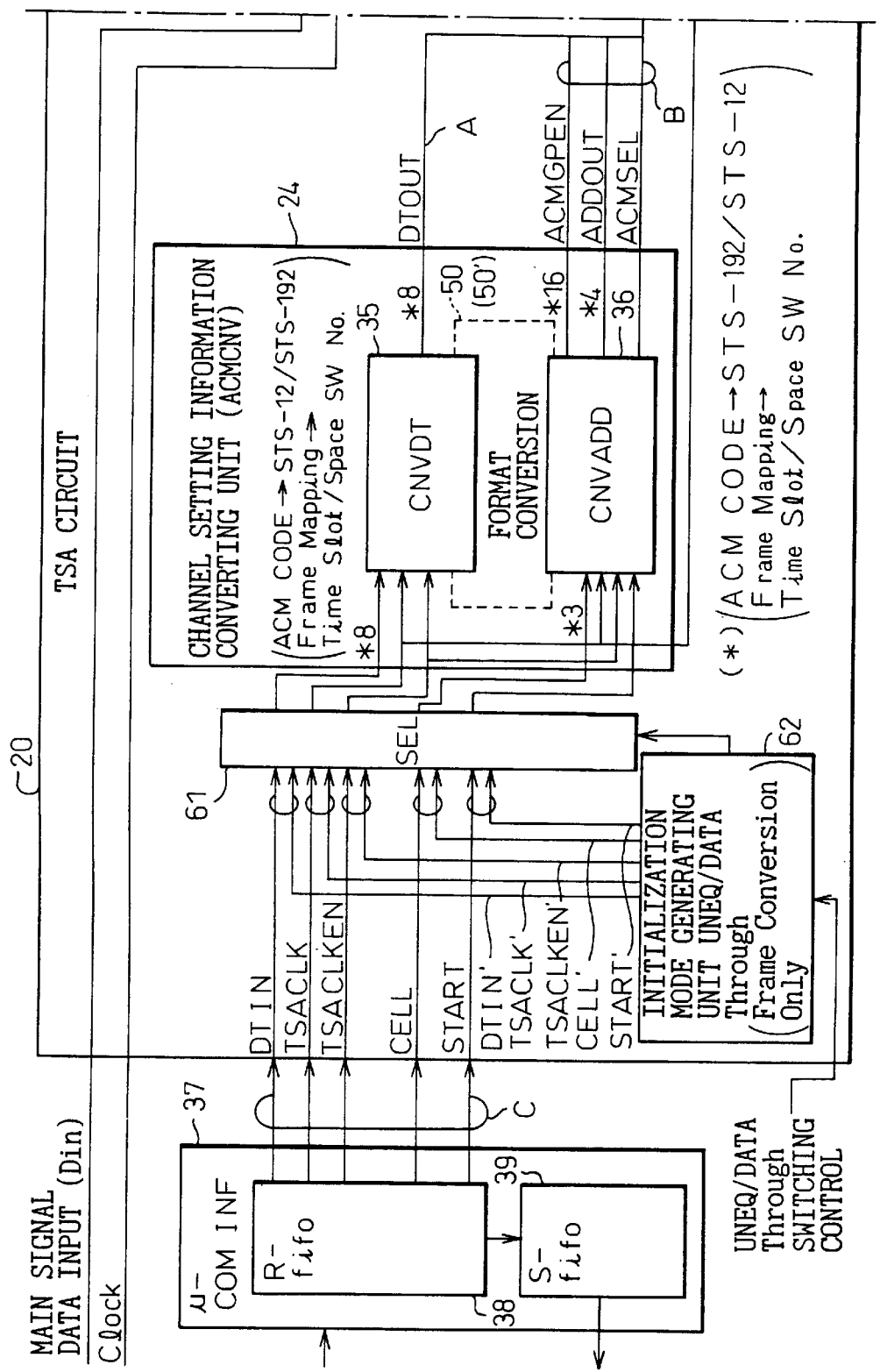
FIG. 15 is a first part of a view of a fourth embodiment of the present invention.
Figure 16:
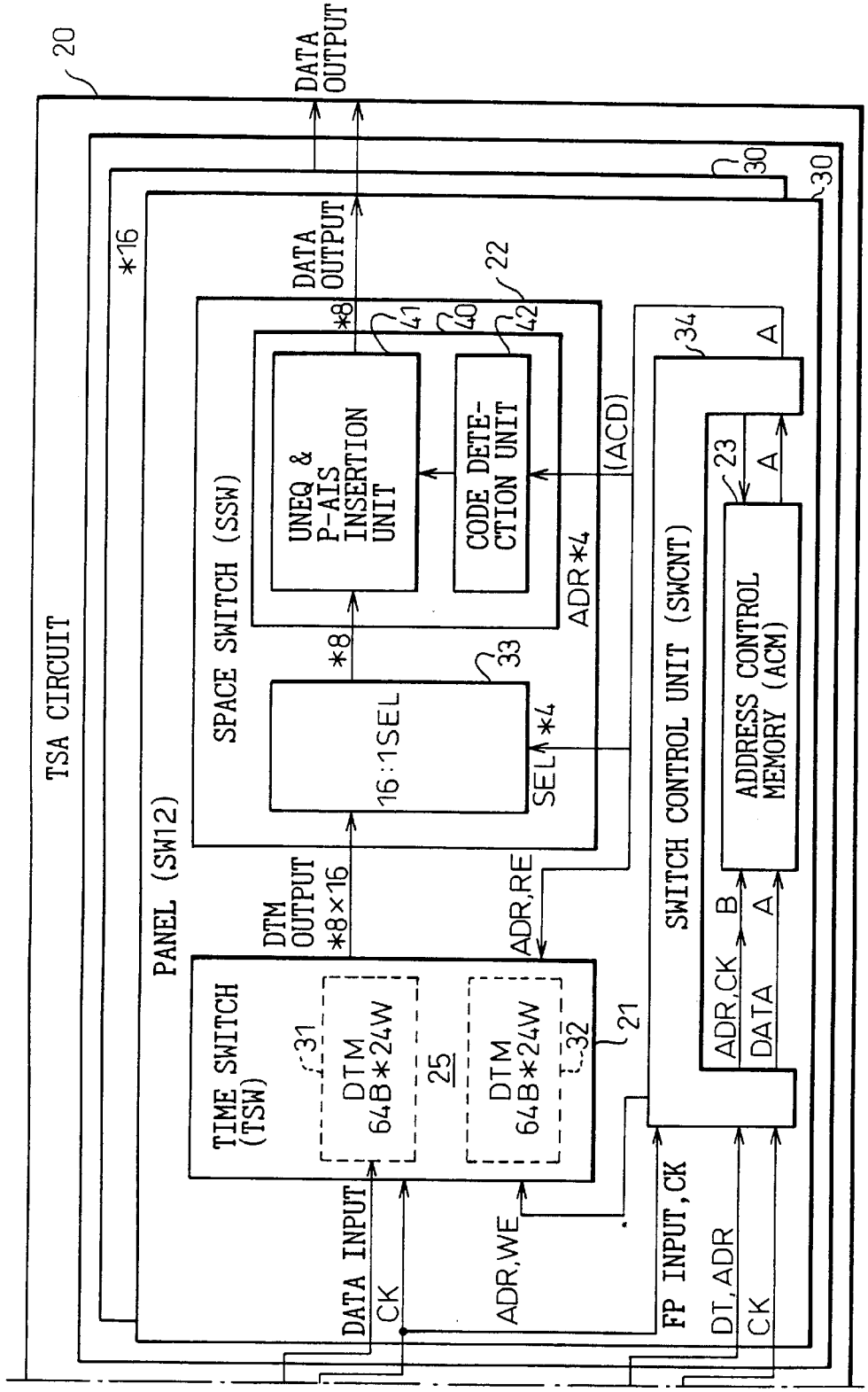
FIG. 16 is a second part of a view of the fourth embodiment of the present invention.

FIG. 15 and FIG. 16 are parts of a view of a fourth embodiment of the present invention. Note that, the fourth embodiment represented by FIG. 15 and FIG. 16 is illustrated by a combination with the above third embodiment, but may also realized by a combination with the first or second embodiment or another embodiment mentioned later.

The present embodiment is characterized in that an initialization mode generating unit 62 for inputting an initialization command (DTIN') for initializing the TSA circuit per se to the channel setting information converting unit 24 at startup of the entire equipment containing the TSA circuit 20, for example, the multiplex converting unit 1 shown in FIG. 91, is provided.

When initialization is required, the initialization mode generating unit 62 sends a switching signal to the selector (SEL) 61 shown in FIG. 15, switches from the usual lines (DTIN to START) to lines at initialization (DTIN' TSACLK', TSACLKEN', CELL', and START'), and inputs the signal from the initialization mode generating unit 62 to the channel setting information converting unit 24.

When the TSA circuit 20 slowly rises at the startup of the entire equipment, the unrequired data is output from the TSA circuit 20 within a time up to the end of rising. There is concern that this unrequired data will prevent quick stabilization of the entire equipment.

Therefore, in order to quickly activate the TSA circuit 20, the TSA circuit itself is initialized. This is the initialization command (DTIN') mentioned above. In this stage, channel setting has not yet been carried out, therefore, it is necessary to generate, in the TSA circuit, an adequate initialization mode not inconsistent with the conditions where the channel setting is not made. As a preferred example, the initialization command is (i) a command for outputting the auxiliary signal (UNEQ), from the time slot assignment circuit 20, indicating that each channel composing the second transmission data of the second multiplex level mentioned above is unused or (ii) a command for outputting the auxiliary signal (DATA THROUGH), from the TSA circuit 20, indicating that the input transmission data Din must be passed through the TSA circuit 20 as it is.

The initialization command is output from the initialization mode generating unit 62 after for example a power on reset.

Thus, at the initialization of the TSA circuit, undefined channel setting due to the unrequired data is prevented and, at the same time, the start of service becomes possible immediately after the initialization.

Figure 17:
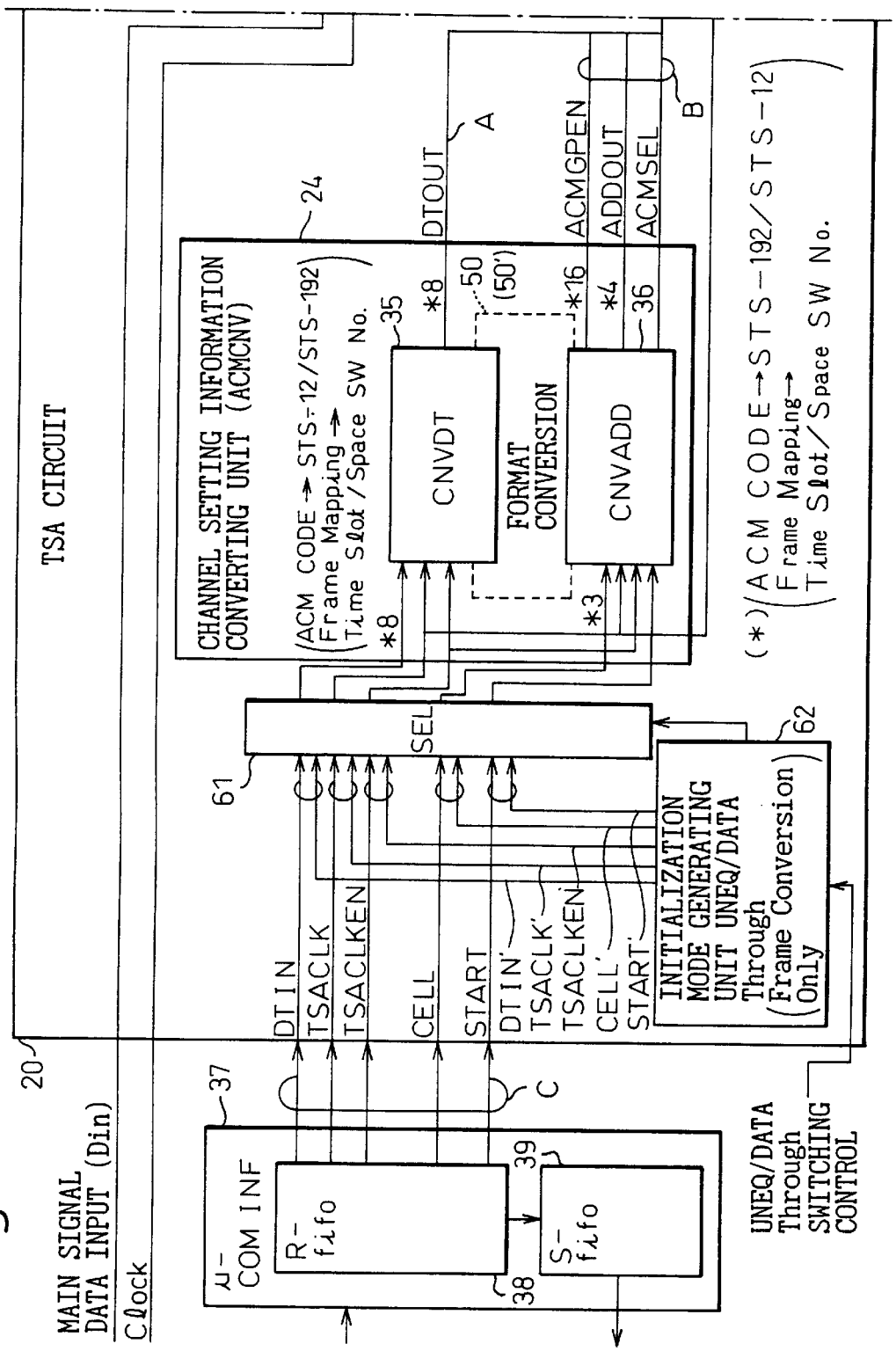
FIG. 17 is a first part of a view of a fifth embodiment of the present invention.
Figure 18:
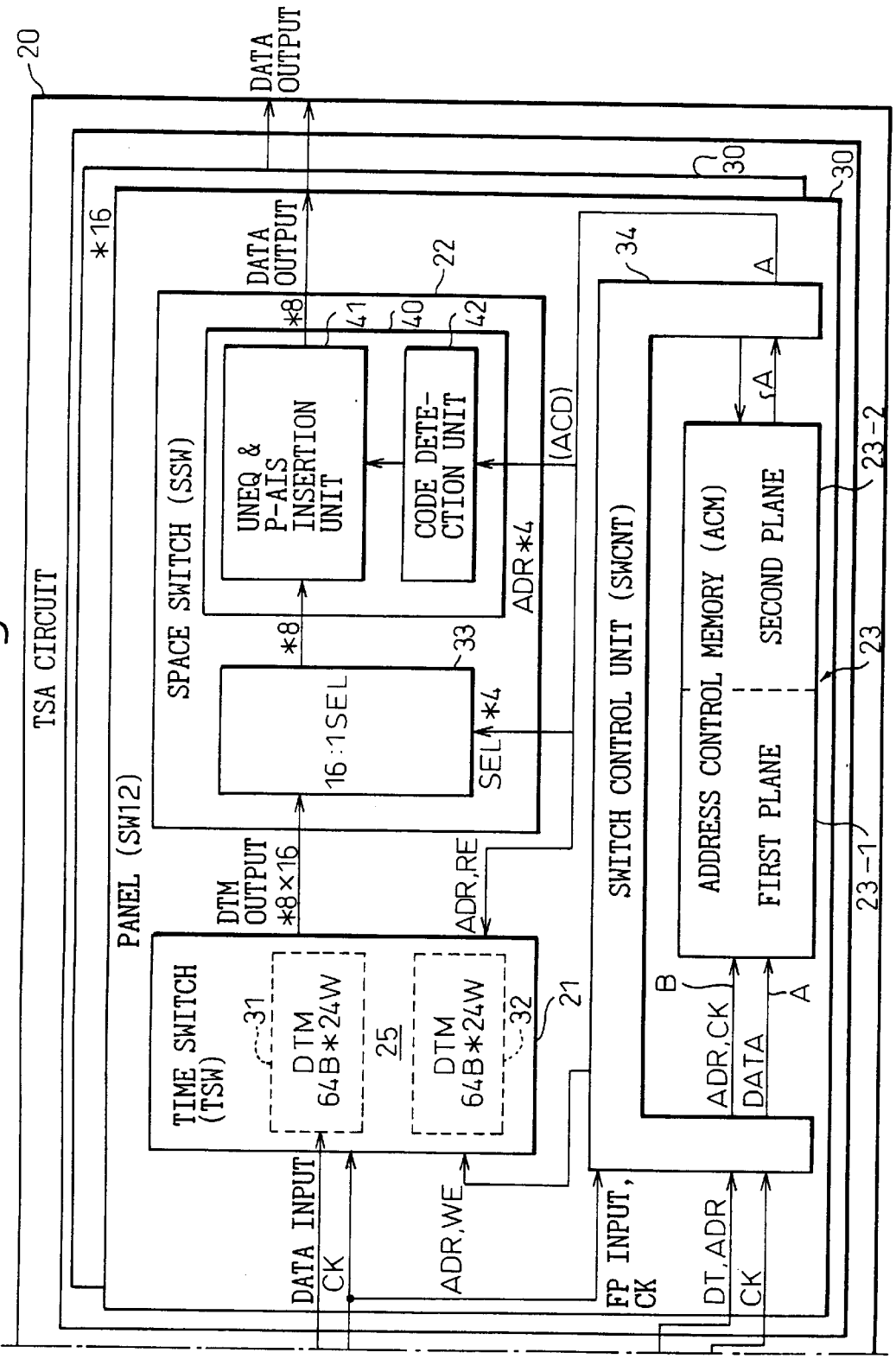
FIG. 18 is a second part of a view of the fifth embodiment of the present invention.

FIG. 17 and FIG. 18 are parts of a view of a fifth embodiment of the present invention. Note that, the fifth embodiment represented by FIG. 17 and FIG. 18 is illustrated by a combination with the above fourth embodiment, but it may also be realized by a combination with the first, second, or third embodiment or another embodiment mentioned later.

In the present embodiment, the address control memory 23 has two-plane structure having a first memory plane 23-1 and a second memory plane 23-2. Here, the writing of the channel setting address A to the address control memory 23 and the reading of the written channel setting address A from the address control memory 23 are alternately carried out with respect to the first memory plane 23-1 and the second memory plane 23-2. Namely, when the first memory plane 23-1 operates as the plane for reading, the second memory plane 23-2 operates as the plane for writing, and conversely when the first memory plane 23-1 operates as the plane for writing, the second memory plane operates as the plane for reading.

Assume that a certain fault occurs in the former stage of the address control memory 23 and that erroneous data is further overwritten during the reading of the data (channel setting address A) from the address control memory 23 (here, having the first plane structure). Then, of course, erroneous channel setting is carried out and leads to the malfunction of the system.

The address control memory is operated so that the plane for reading the data is completely isolated from the plane for writing the data so that the channel setting during servicing does not exert a direct influence upon the running line, even though the above falfunction has occurred.

Thus, according to the fifth embodiment, the possibility of mistaken channel setting can be made small.

Figure 19:
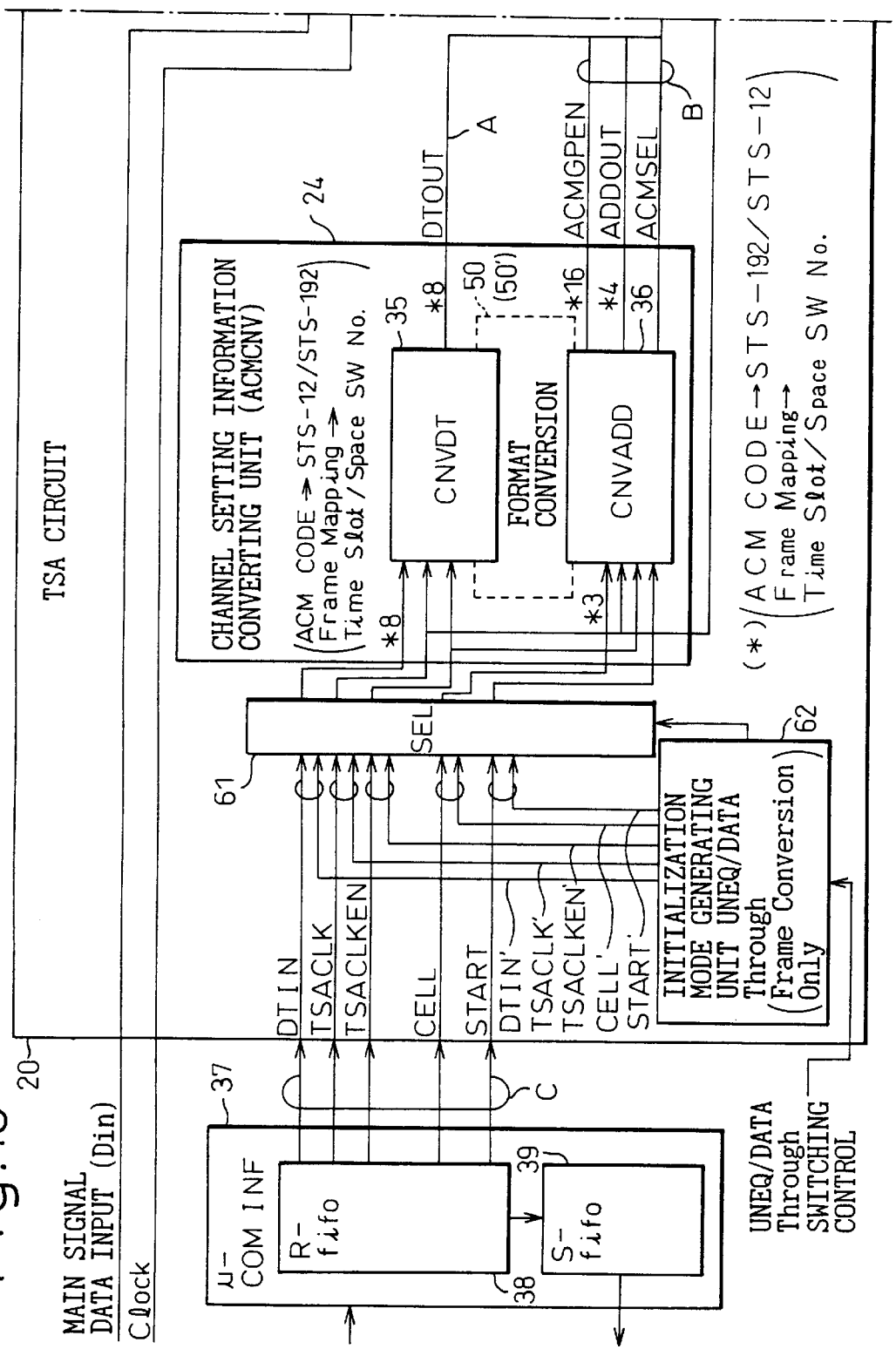
FIG. 19 is a first part of a view of a sixth embodiment of the present invention.
Figure 20:
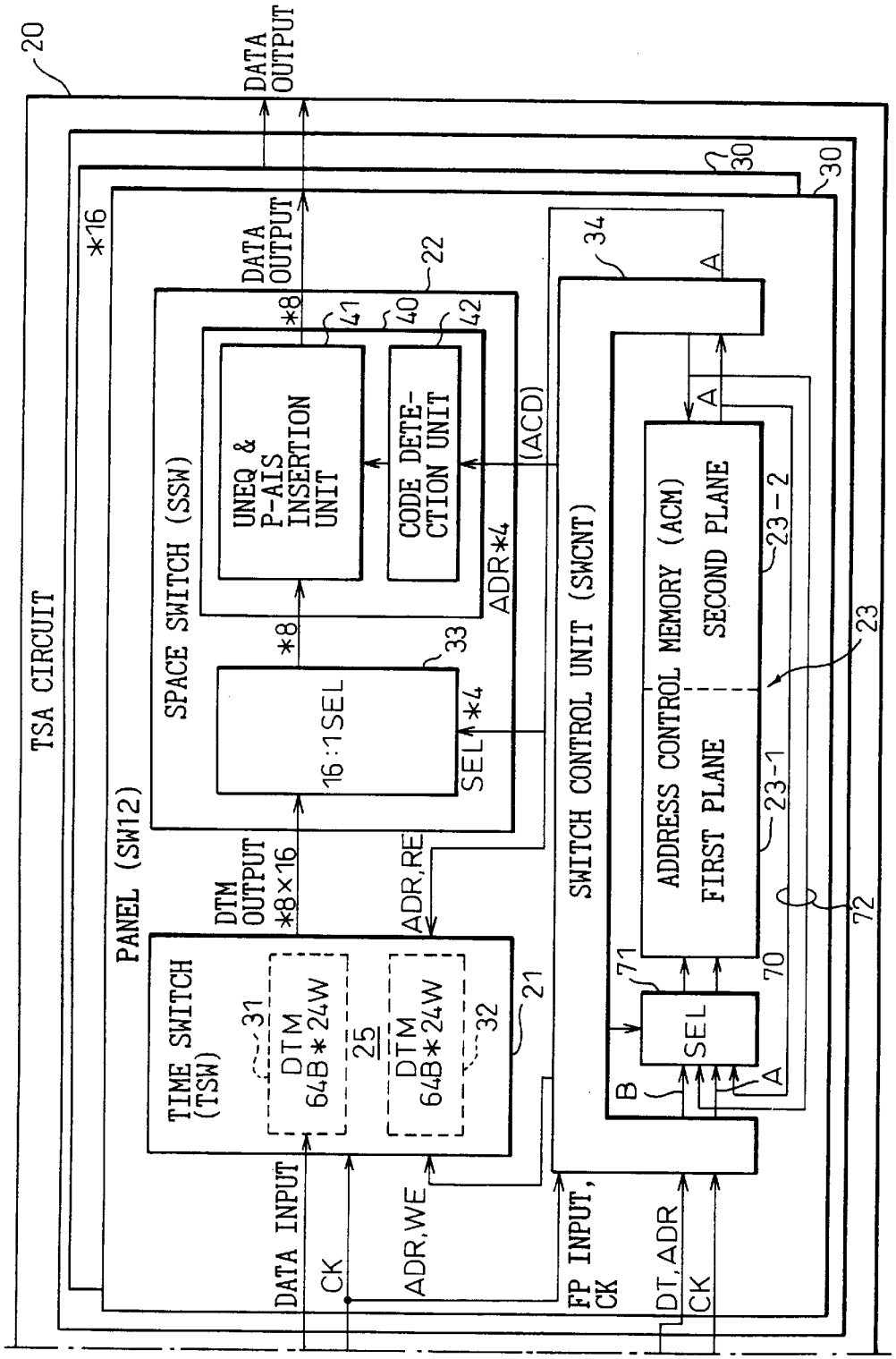
FIG. 20 is a second part of a view of the sixth embodiment of the present invention.

FIG. 19 and FIG. 20 are parts of a view of a sixth embodiment of the present invention. Note that the sixth embodiment represented by FIG. 19 and FIG. 20 is illustrated by a combination with the above fifth embodiment, but it may also be realized by a combination with the first, second, third, or fourth embodiment or another embodiment mentioned later.

In the sixth embodiment, first, in the same way as the fifth embodiment, the address control memory (ACM) 23 has a two-plane structure having the first memory plane 23-1 and the second memory plane 23-2. Further, a copy means 70 cooperating with the address control memory 23 is provided. This copy means 70 copies the channel setting address A finished being written to the other plane of the first memory plane 23-1 and the second memory plane 23-2 when the writing with respect to one plane of the first memory plane 23-1 and the second memory plane 23-2 is terminated. When a new channel setting address A is given, the writing to the other plane is carried out for only the part changed with respect to the channel setting address A immediately before this.

According to this sixth embodiment, at the next channel setting, that is, when the above new channel setting address A is given, it is sufficient to rewrite the memory for only the part having a change between a previous channel setting address A and a present channel setting address A, therefore the channel setting time will be greatly shortened.

The copy means 70 is realized by a selector (SEL) 71 and a feedback loop 72 according to the present embodiment. The feedback loop 72 acts so as to return the data (channel setting address A) written into the memory plane (for example 23-1) for which the writing is terminated to the selector 71 side.

The selector 71 writes the returned data to the memory plane (for example 23-2) opposite to the memory plane for which the writing is terminated and completes the copying.

Figure 21:
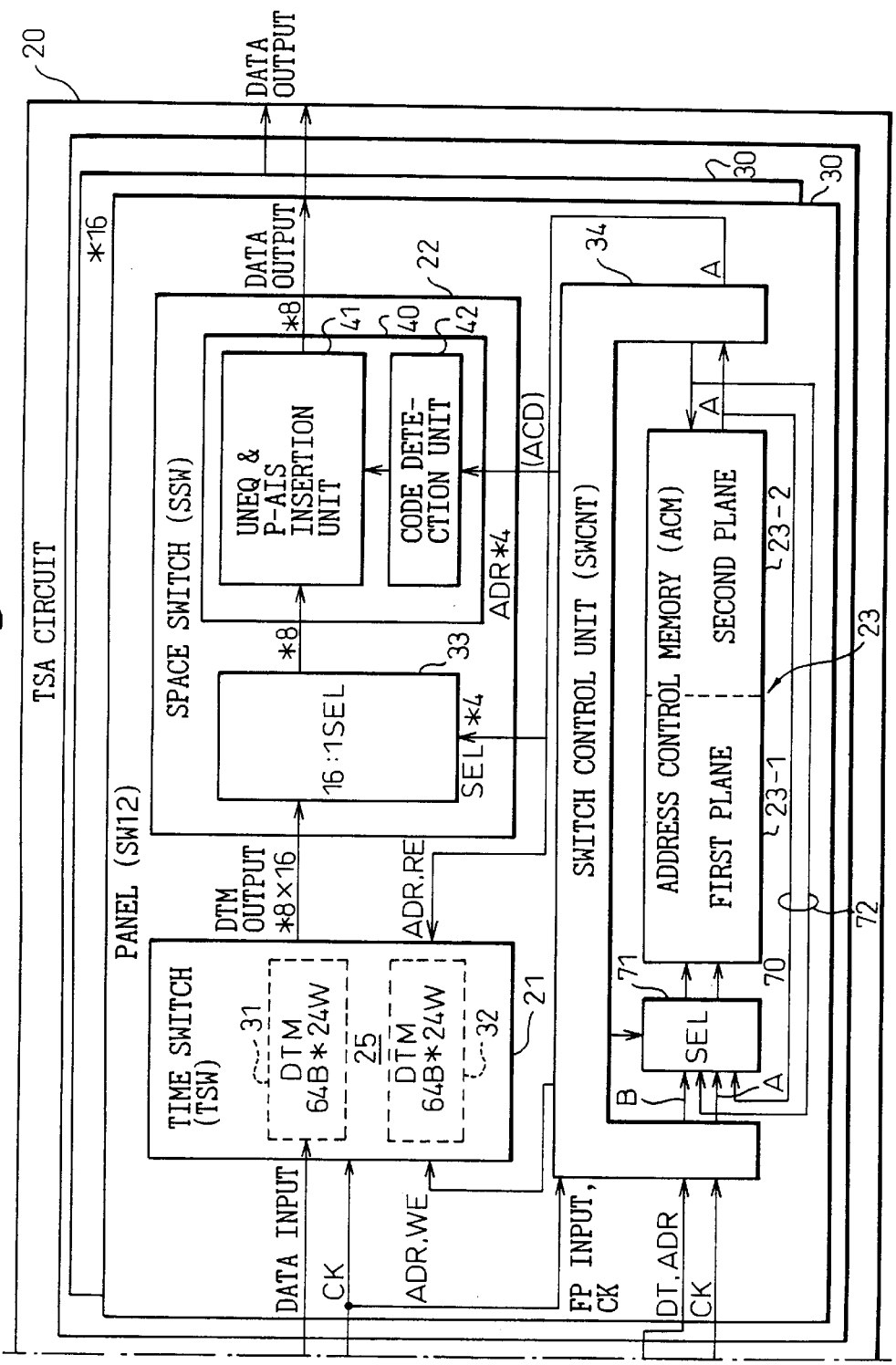
FIG. 21 is a first part of a view of a seventh embodiment of the present invention.
Figure 22:
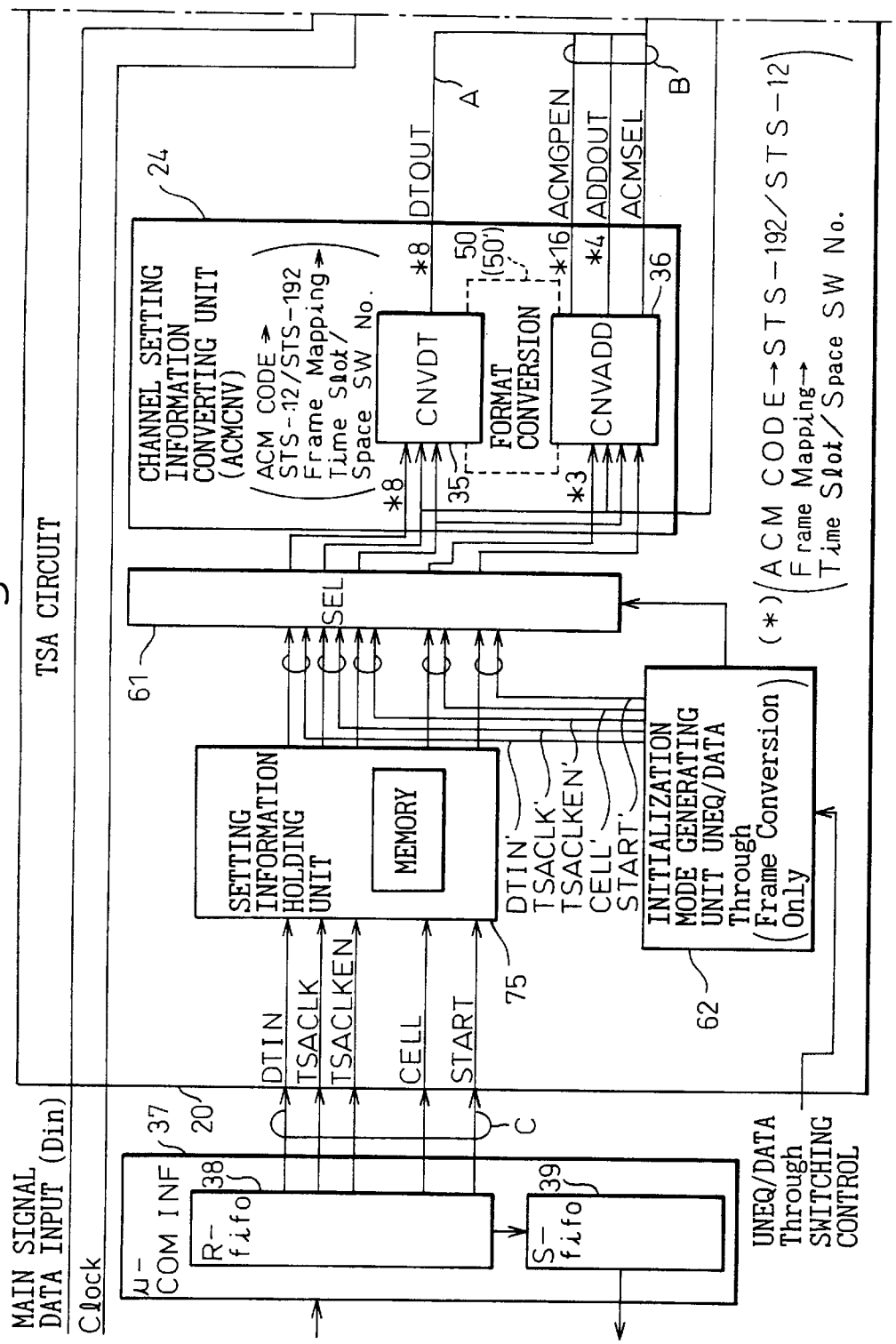
FIG. 22 is a second part of the view of the seventh embodiment of the present invention.

FIG. 21 and FIG. 22 are parts of a view of a seventh embodiment of the present invention. Note that the seventh embodiment represented by FIG. 21 and FIG. 22 is illustrated by a combination with the above sixth embodiment, but it may be realized by a combination with the first, second, third, fourth, or fifth embodiment or another embodiment mentioned later.

The present embodiment is characterized in that a setting information holding unit 75 for storing the channel setting information C from the outside such as the microcomputer interface 37 and, at the same time, supplying the stored information to the channel address control memory 24 is provided.

Further preferably, the setting information holding unit 75 operates by a clock in the TSA circuit 20 asynchronous to the clock of the system for transmission of the transmission data Din.

The address control memory (ACM) 23 and the switch control unit (SWCNT) 34 operate in synchronization with the clock of the system for transmission of the transmission data Din (clock on left top of FIG. 22). However, this clock sometimes stops due to a fault occurred in the transmission system (clock stoppage).

In this case, in the case of for example the above sixth embodiment, when assuming that a clock stoppage occurs on the middle of copying the channel setting address A which has been already written to the other memory plane, the content of the memory plane becomes completely different from the address A and, at the next channel setting, a completely erroneous channel setting will be carried out.

Therefore, the channel setting information C is once stored at the closest site to the information source (microcomputer interface 37) of the channel setting information C from the outside. The channel information holding unit 75 performs this. Here, the information C stored is continuously input (written) to the address control memory 23.

Further preferably, the setting information holding unit 75 is made to operate by the clock (TSACLK of FIG. 22) in the TSA circuit 20 completely asynchronous to the clock of the transmission system described above, so as to cause no fault in the writing to the address control memory 23 even if the clock stops.

Thus, the reliability of the supply of the channel setting information to the address control memory 23 is greatly raised. This is because the clock (TSACLK) almost never stops.

Figure 23:
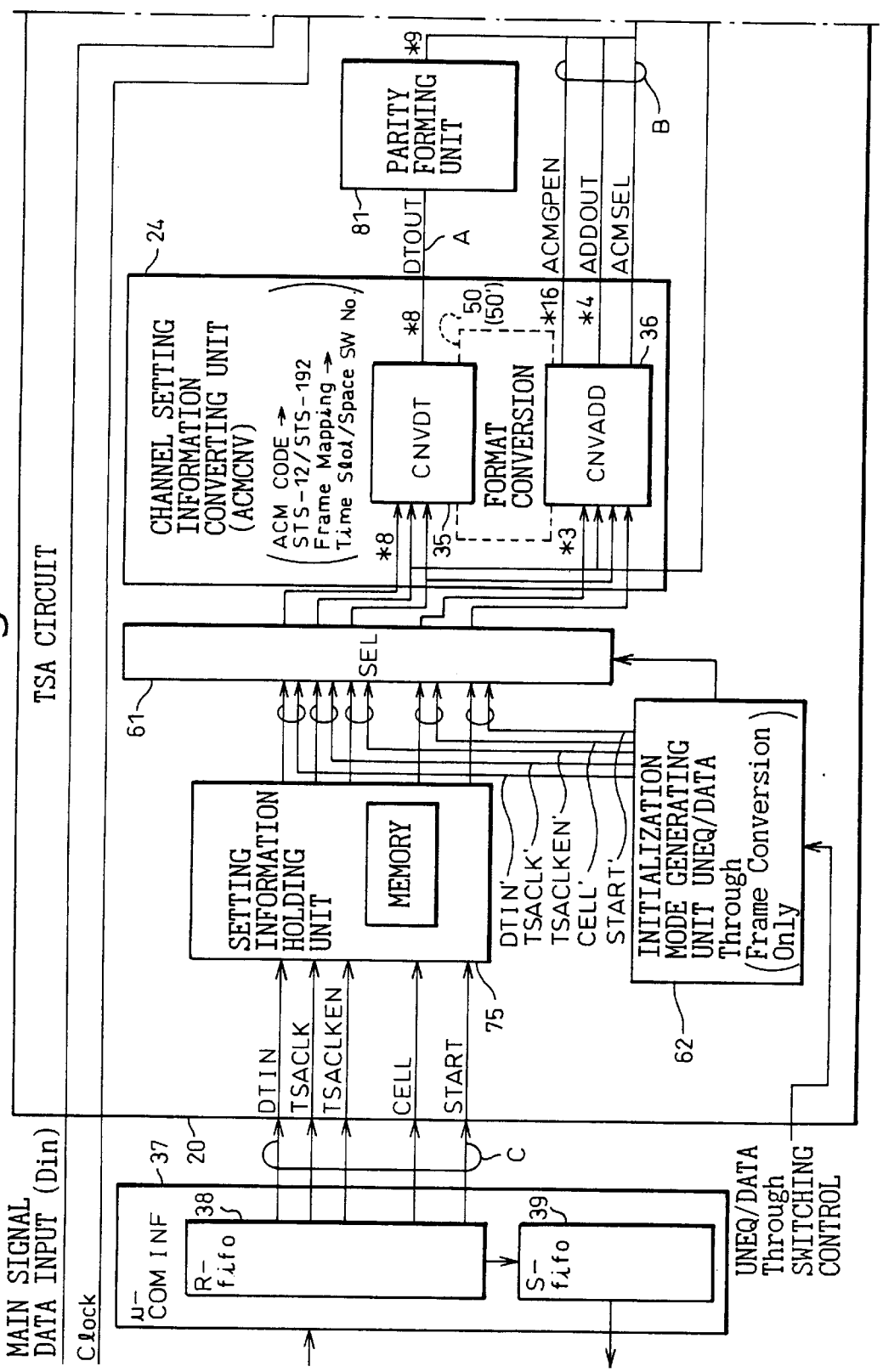
FIG. 23 is a first part of a view of an eighth embodiment of the present invention.
Figure 24:
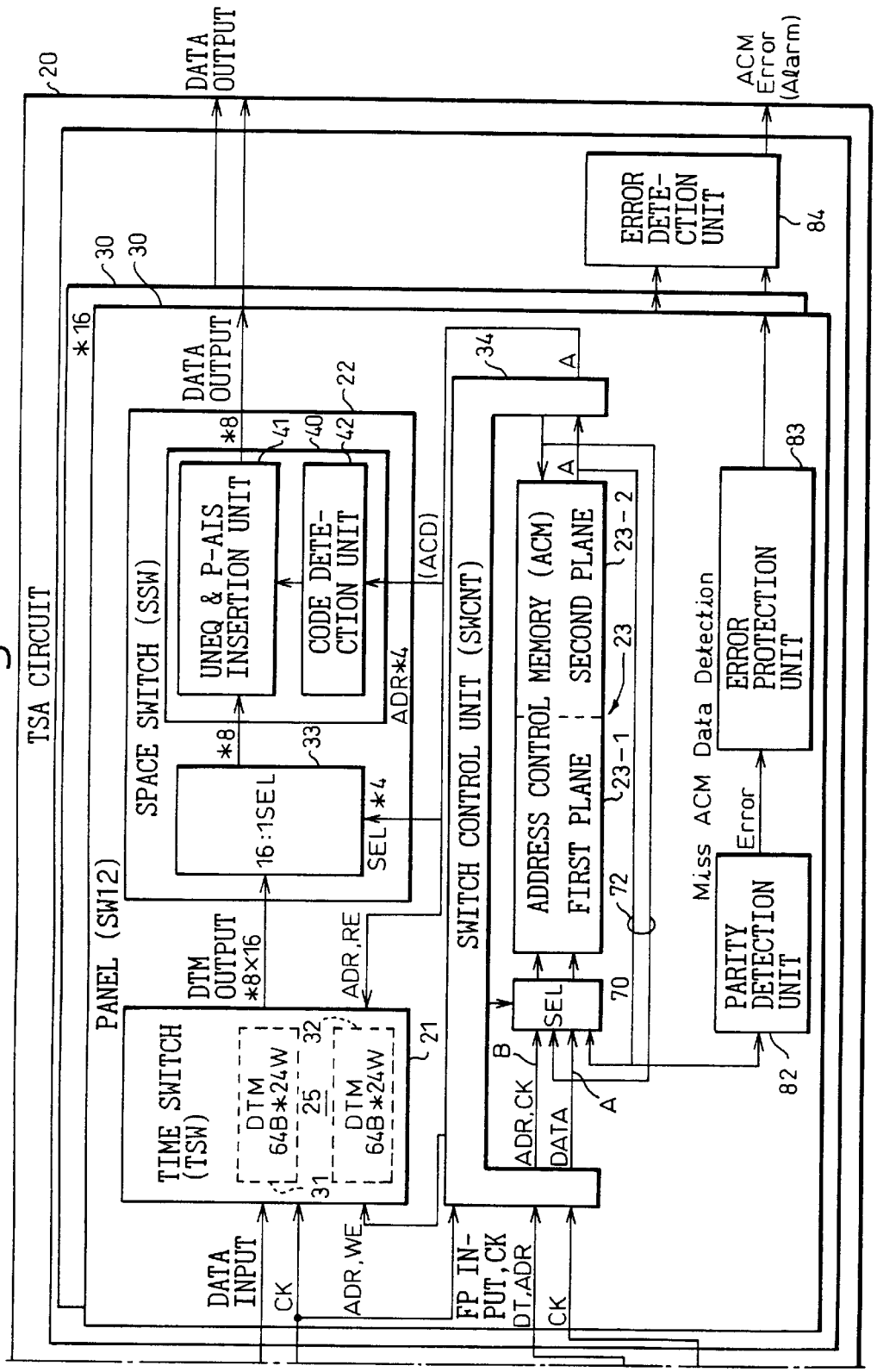
FIG. 24 is a second part of a view of the eighth embodiment of the present invention.

FIG. 23 and FIG. 24 are parts of a view of an eighth embodiment of the present invention. Note that the eighth embodiment represented by FIG. 23 and FIG. 24 is illustrated by a combination with the above seventh embodiment, but may be realized by a combination with the first, second, third, fourth, fifth, or sixth embodiment or a ninth embodiment mentioned later.

The present invention is characterized in that provision is made of a parity forming unit 81 for adding parity bits to the channel setting address A from the channel setting information converting unit 24 and of a parity detection unit 82 for reading the channel setting address A added with the related parity bits written, through this parity forming unit 81, in the address control memory 23 and performing a parity check with respect to this.

By the utilization of the parity bits, it becomes possible to raise the quality of the channel setting information (channel setting address A) and maintain a high reliability of the channel setting.

In the present embodiment, provision is further made of an error protection unit 83 and an error detection unit 84 for effectively processing the result of the parity check.

The error protection unit 83 judges whether there is parity error or not for each of a plurality of channels (CH1 to CH12) comprising each first transmission data (STS-12) by the result of detection from the parity detection unit 82. The error detection unit 84 generates an alarm when a result indicating there is parity error is output from one or more outputs from a plurality of (16) error protection units 83 individually provided for the group (group of 16) of the first transmission data comprising the second transmission data (STS-192).

Figure 25:
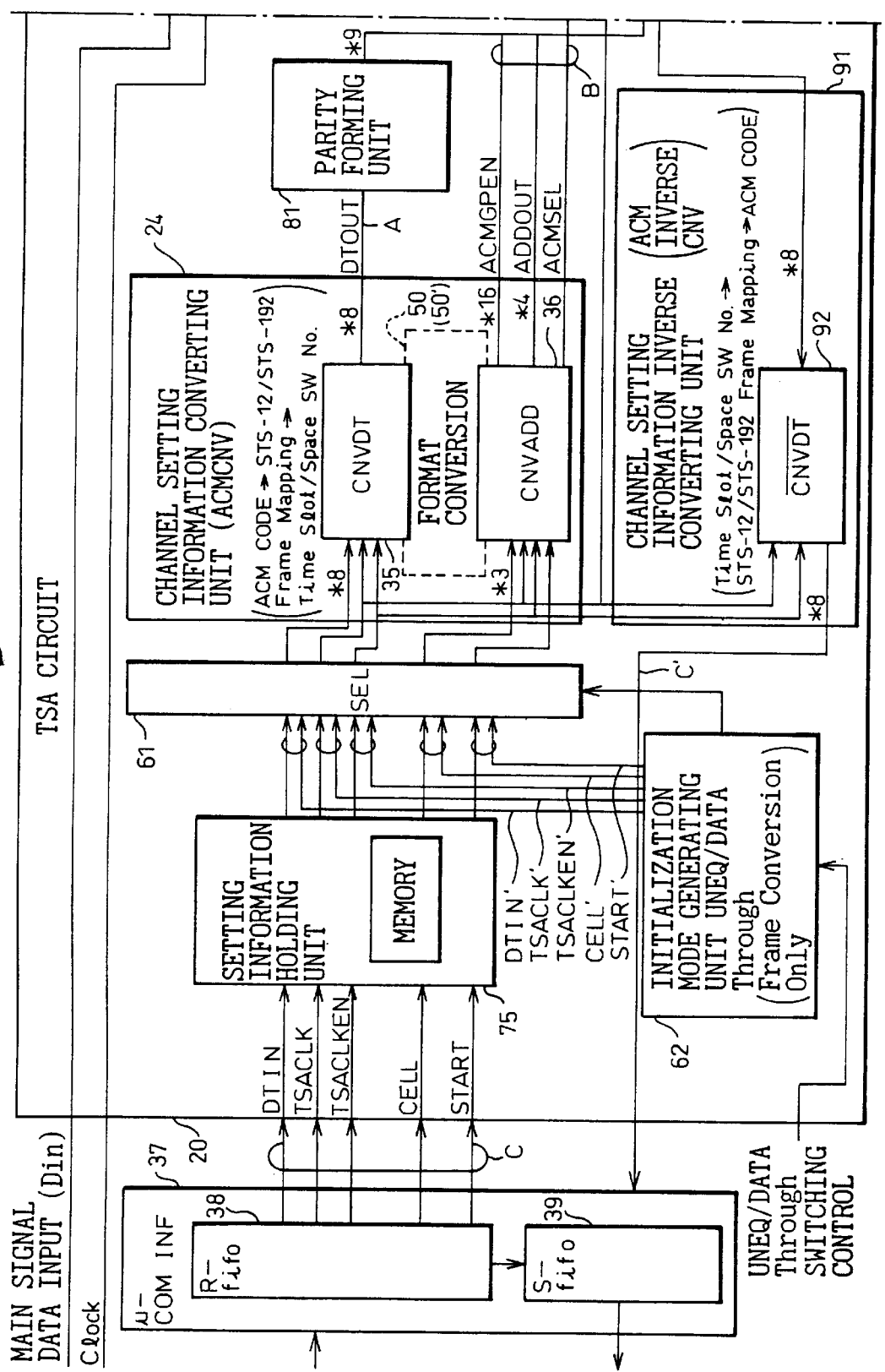
FIG. 25 is a first part of a view of a ninth embodiment of the present invention.
Figure 26:
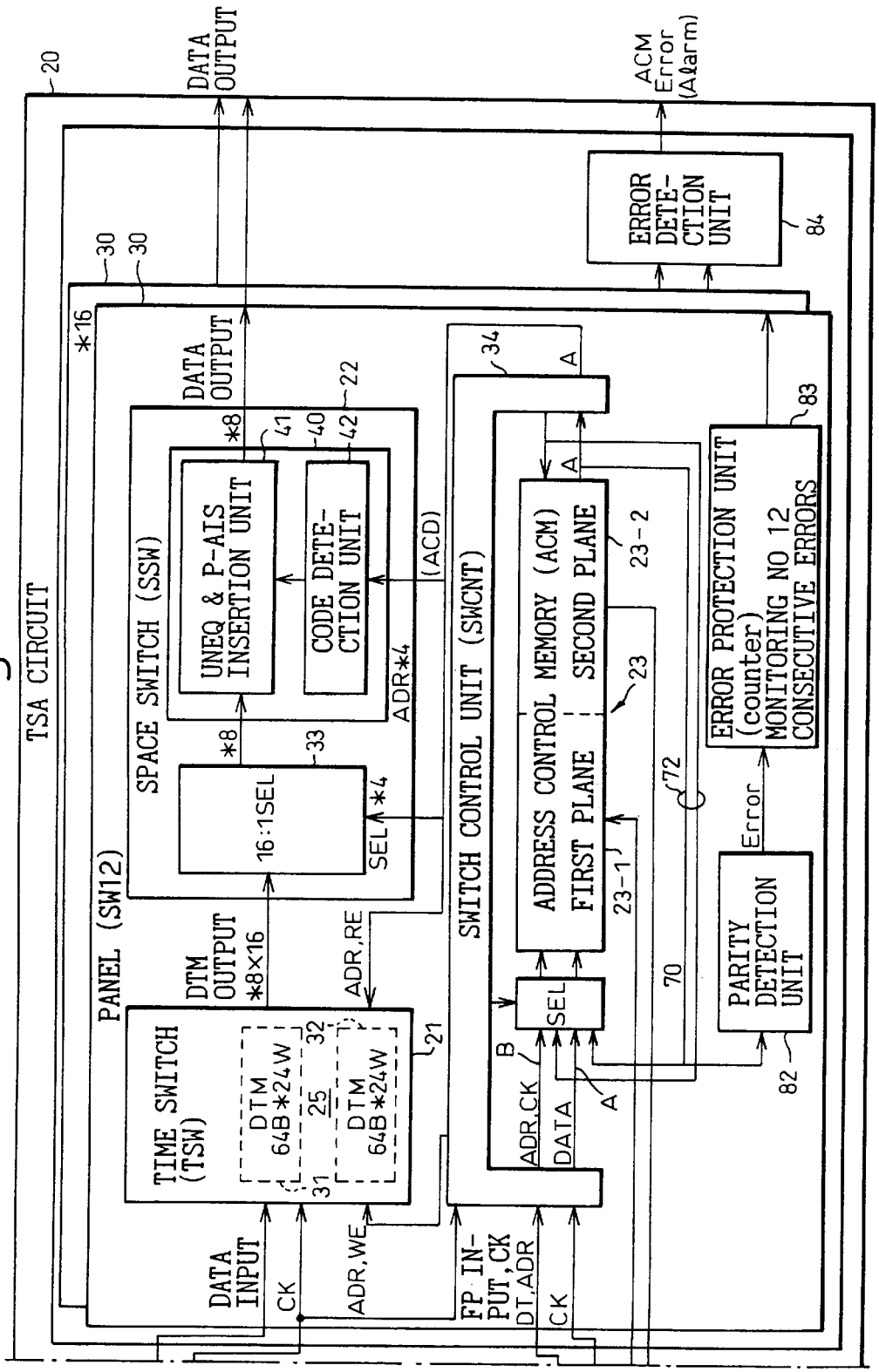
FIG. 26 is a second part of a view of the ninth embodiment of the present invention.

FIG. 25 and FIG. 26 are parts of a view of a ninth embodiment according to the present invention. Note that the ninth embodiment represented by FIG. 25 and FIG. 26 is illustrated by a combination with the above eighth embodiment, but may be realized by a combination with any of the first to seventh embodiments.

In the present embodiment, a channel setting information inverse converting unit 91 performing an inverse operation to that of the channel setting information converting unit 24 is provided so as to monitor if the channel setting information C given from the external microcomputer (not illustrated) connected via the microcomputer interface ($\mu$-COM INF) 37 was correctly converted to the channel setting address A at the channel setting information converting unit 24 and in addition correctly written into the address control memory (ACM) 23. This inverse converting unit 91 reproduces the original channel setting information C' by feeding back the channel setting address A written in the address control memory 23 to the channel setting information inverse converting unit. Further, it is transferred to the microcomputer mentioned above. The microcomputer confirms if the returned channel setting information C' coincides with the sent original channel setting information C.

The channel setting information inverse converting unit 91 need only reproduces the channel setting address A, therefore does not have to be constituted in exactly the same way as the channel setting information converting unit 24. It is sufficient so far as a constituent element corresponding to the data converting unit (CNVDT) 35 among constituent elements of the converting unit 24 exists. This is the data inverse converting unit (CNVDT) 92.

Thus, according to the present embodiment, error of the channel setting can be reliably monitored and the reliability of the channel setting can be enhanced.

Representative embodiments of the present invention were explained above, so below an explanation will be made of detailed examples of the principal parts in these embodiments.

Figure 27:
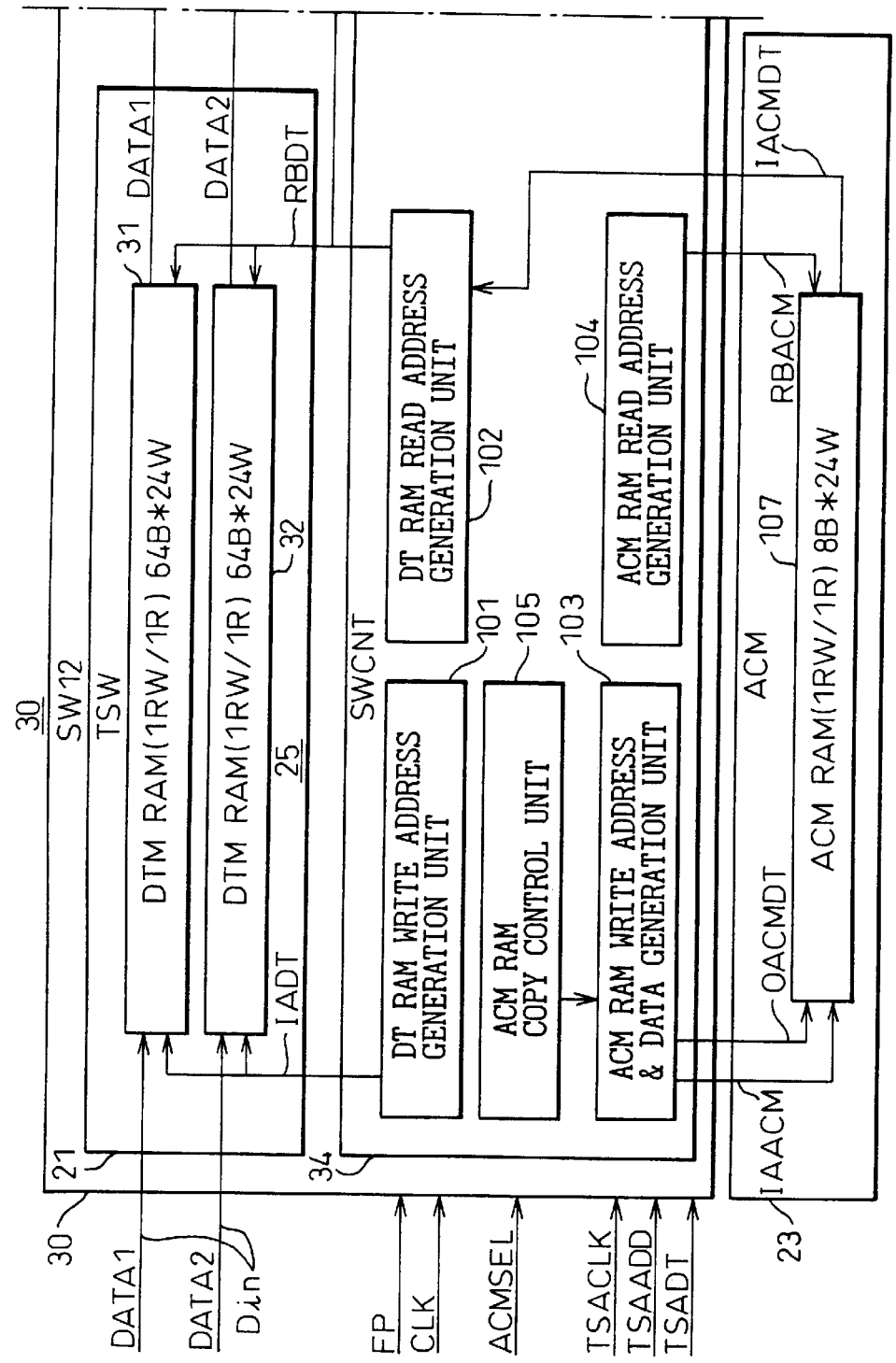
FIG. 27 is a first part of a view of a detailed example of a panel 30 shown in each embodiment.
Figure 28:
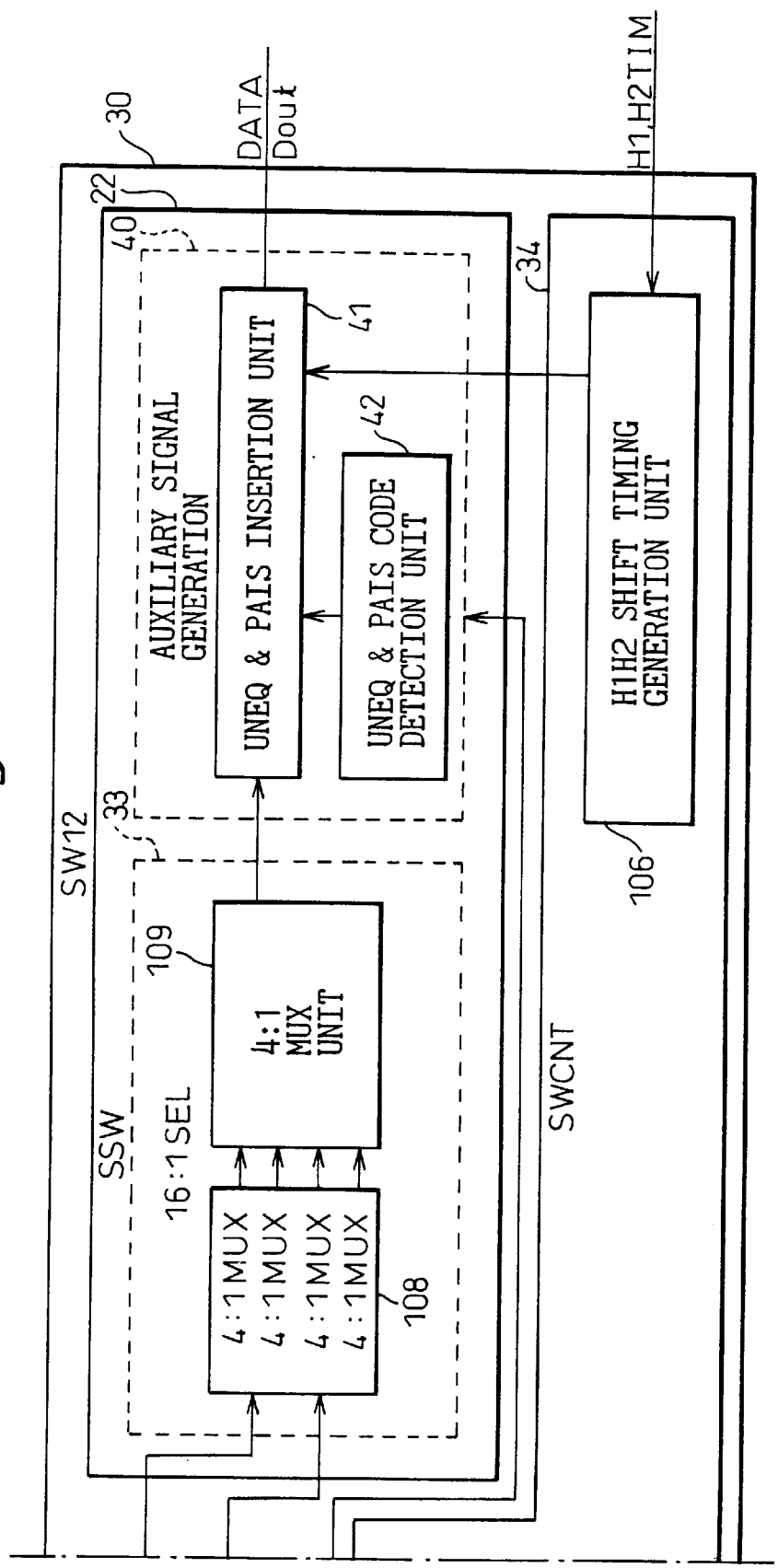
FIG. 28 is a second part of a view of the detailed example of the panel 30 shown in each embodiment.

FIG. 27 and FIG. 28 are parts of a view of a detailed example of the panel 30 shown in the embodiments.

Referring to the two figures, the input transmission data Din is a 128-bit parallel signal. First and second transmission data (DATA1, DATA2) each consisting of 64 bits are respectively input to the first and second data memories (DTM-RAM) 31 and 32. The write address thereof is given as IADT from the DT RAM write address generating unit 101 in the switch control unit (SWCNT) 34. This is a sequential writing.

On the other hand, the data (Din) from the first and second data memories 31 and 32 are read as RBDT at random from the DT RAM read address generation unit 102. This RBDT is generated from the address control memory (ACM) based on the address IACMDT sequentially read from the ACM RAM 107 in the address control memory 23 by the ACM RAM read address generation unit 104. Note, the DT RAM read address generation unit 102 actually comprises a waveform shaping flip-flop (FF).

The writing of the data (channel setting address A) to the ACM RAM 107 and the random writing of the data are given as OACMDT and IAACM by the ACM RAM write address and data generation unit 103. Note that, the ACM RAM copy control unit 105 is used for the copy control in the case of the sixth embodiment of FIG. 20.

Referring to FIG. 28, the above selector (16:1 SEL) 33 is constituted by a 4:1 multiplex unit 108 and a 4:1 MUX unit 109 connected to this. It performs 16:1 selection divided into two stages.

Further, the auxiliary signal generating means 40 is controlled by the timing signal output from an H1H2 shift timing generation unit 106 in the switch control unit (SWCNT) 34. Particularly where the above UNEQ code is output, it operates with the location of the so-called H1 byte and H2 byte as the reference, therefore the generation unit 106 generates the timing signal for this purpose and is constituted by for example a counter.

Figure 29:
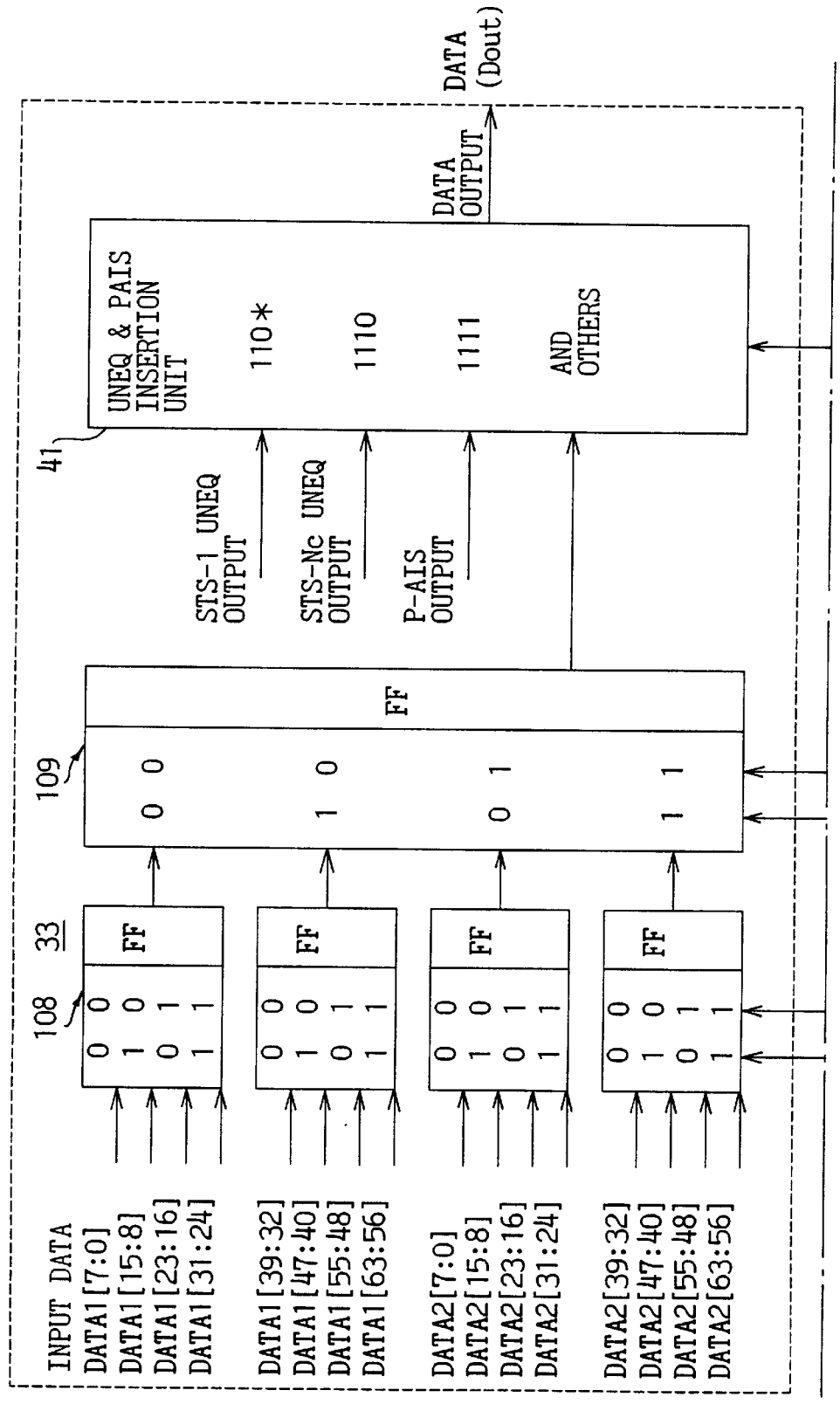
FIG. 29 is first part of a view of a detailed example of an auxiliary signal generating means 40 shown in FIG. 28.
Figure 30:
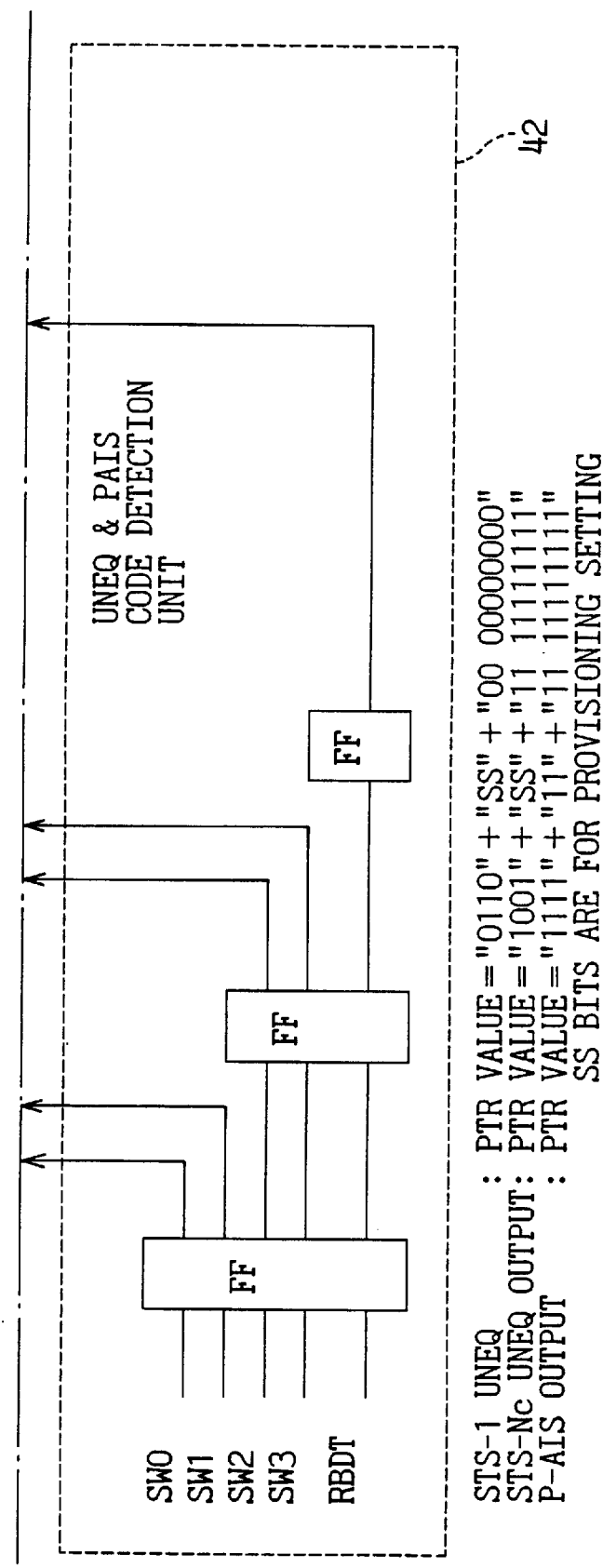
FIG. 30 is second part of a view of the detailed example of the auxiliary signal generating means 40 shown in FIG. 28.

FIG. 29 and FIG. 30 are parts of a view of a detailed example of the auxiliary signal generating means 40 shown in FIG. 28.

First, in FIG. 29, the MUX units 108 and 109 comprise two stages of cascade-connected flip-flops. The flip-flops (FF) of the first stage (four flip-flops) receive the transmission data after the switching of the time domain from the time switch 22 mentioned above as the input data in the figure, and 16:1 selection is carried out as a whole. This selection is carried out by the 4-bit addresses ADR (shown in FIG. 3 etc.) output from the address control memory 23 mentioned above. These 4-bit addresses are indicated as SW0 to SW3 in FIG. 30. RBDT is the read address used for reading the data from an auxiliary signal insertion unit 41 shown in FIG. 29. The insertion unit 41 outputs any of the corresponding illustrated codes each consisting of 3 bits in accordance with whether the illustrated STS-1 UNEQ output is generated, STS-Nc UNEQ (c is concatenated) output is generated, or P-AIS output is generated. Details of these three outputs are shown in the lower part of FIG. 30. The PTR value is the pointer value. An SS bit can be arbitrarily written from the outside. Note that, in FIG. 30, three stages of flip-flops (FF) are used in order to shift output timings of signals supplied from the lower side in FIG. 29 to the MUX unit 108, MUX unit 109, and UNEQ & PAIS insertion unit 41 in correspondence with respective portions.

Returning to FIGS. 27 and 28 again, the panel 30 will be explained in further detail.

Figure 31:
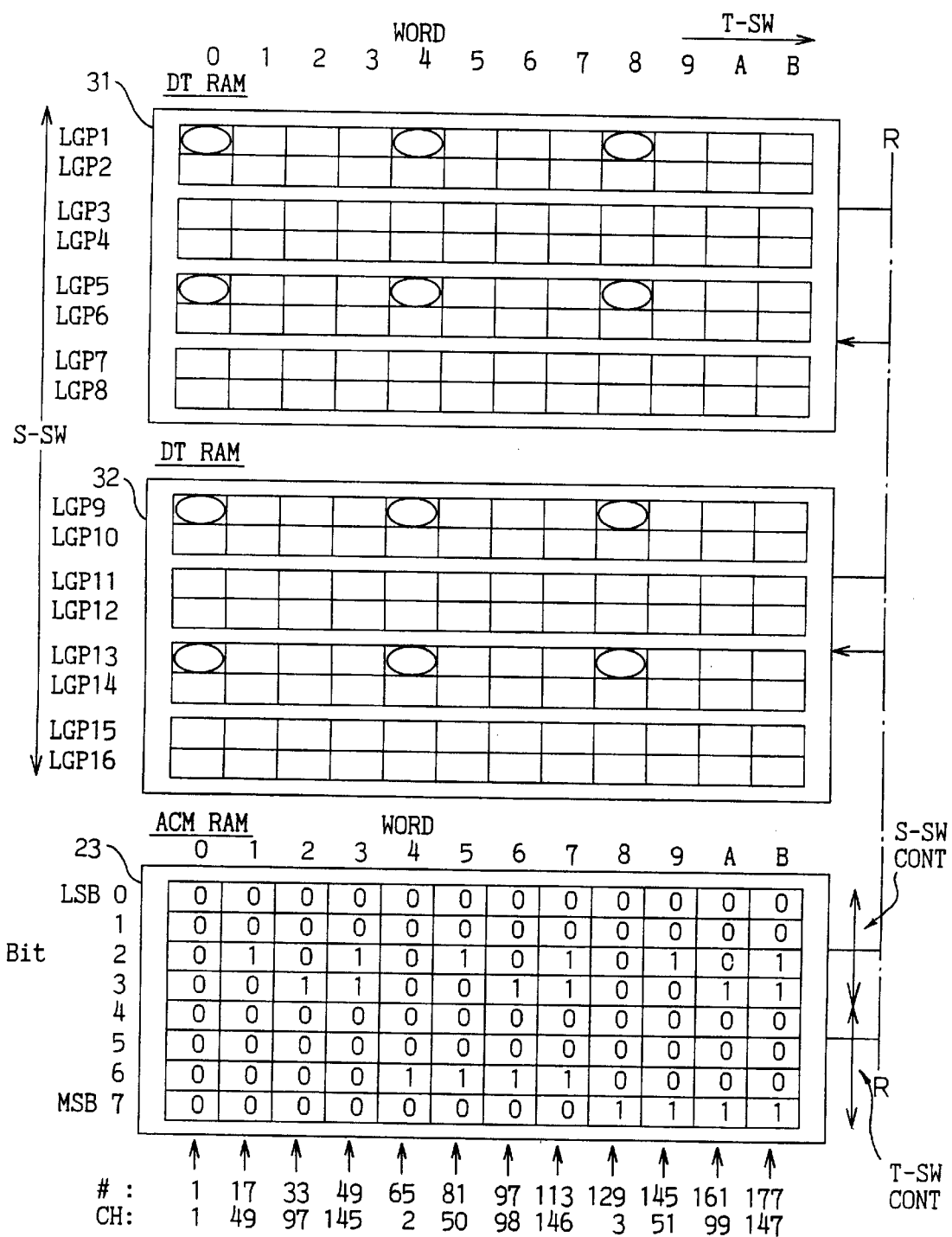
FIG. 31 is a first part of a view of a concrete example of the data for the panel 30 shown in FIG. 27 and FIG. 28.
Figure 32:
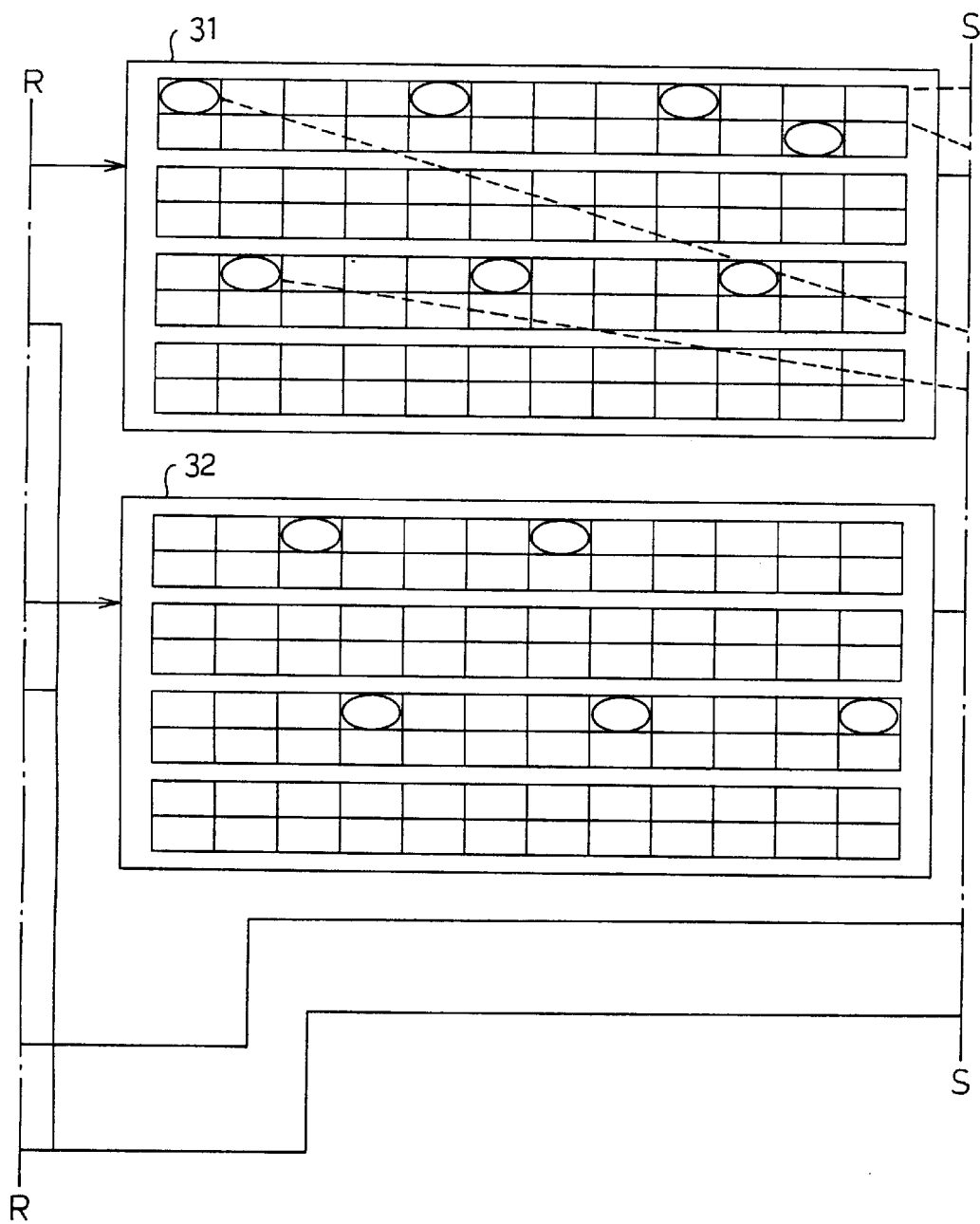
FIG. 32 is a second part of the view of the concrete example of the data example for the panel 30 shown in FIG. 27 and FIG. 28.
Figure 33:
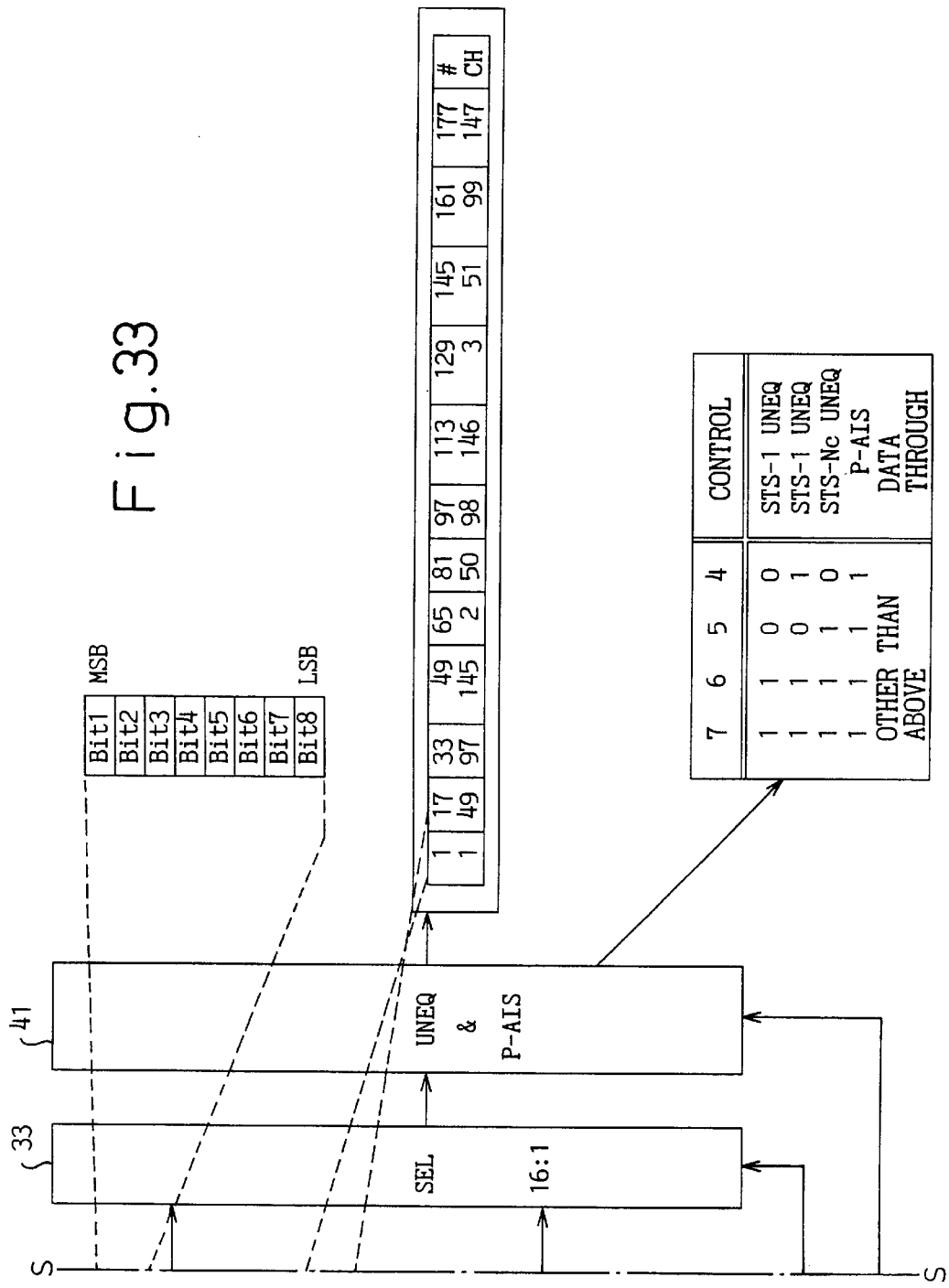
FIG. 33 is a third part of the view of the concrete example of the data for the panel 30 shown in FIG. 27 and FIG. 28.

FIG. 31 to FIG. 33 are parts of a view of a concrete example of the data for the panel 30 shown in FIG. 27 and FIG. 28. Further, FIG. 34 is an enlarged view of the data memory 31 in FIG. 31; FIG. 35 is an enlarged view of the data memory 32 in FIG. 31; FIG. 36 is an enlarged view of the data memory 31 in FIG. 32; and FIG. 37 is an enlarged view of the data memory 32 in FIG. 32.

FIG. 31 to FIG. 37 show examples of data where the format conversion of STS-12→STS-192 is carried out, that is, examples of data of the case where the panel 30 is provided in the multiplex unit (MXS) 5 of FIG. 91 (ADD side) (note, case of data THROUGH setting).

When looking at FIG. 31, the upper part indicates the data written in the data memory (DTM) 31 (LPG1 to LPG8×0 to B words); the middle part indicates the data written in the data memory (DTM) 32 (LPG9 to LPG16×0 to B words); and the lower part indicates an example of the data written in the address control memory (ACM) 23 (channel setting address).

S-SW shown on left end of FIG. 31 shows so-called longitudinal switching by the space switch, and T-SW on the upper end shows so-called transverse switching by the time switch.

S-SW CONT shown on the right end of the lower part shows the control output side of the longitudinal switching, and T-SW CONT indicates the control output side of the transverse switching.

Next, looking at FIG. 32, the upper part shows an example of the data read from the data memory 31, and the lower part shows an example of the data read from the data memory 32. The selector (16:1 SEL) 33 of FIG. 33 determines which of the 16 transverse columns is to be selected.

Looking at FIG. 33, the selector 33 thereof is controlled by the S-SW CONT (FIG. 31). The T-SW CONT (FIG. 31) performs access control for the data memories 31 and 32 (FIG. 31) and controls also the auxiliary signal insertion unit 41 of FIG. 33 according to need. Finally, the output from the panel 30 becomes as indicated in the middle part of FIG. 33. The lower part of FIG. 33 shows an example of the codes which should be adopted by the variety of auxiliary signals shown in FIG. 29. The upper significant 4 bits (7 to 4) are used. Further, the upper part of FIG. 33 shows details (8-bit structure) of one channel in FIG. 32 (CH3 (#129) located on the top right of enlarged FIG. 36). Note that the time slot numbers (#1 to #192) represent time slot numbers of the transmission data on the transmission line.

Figure 38:
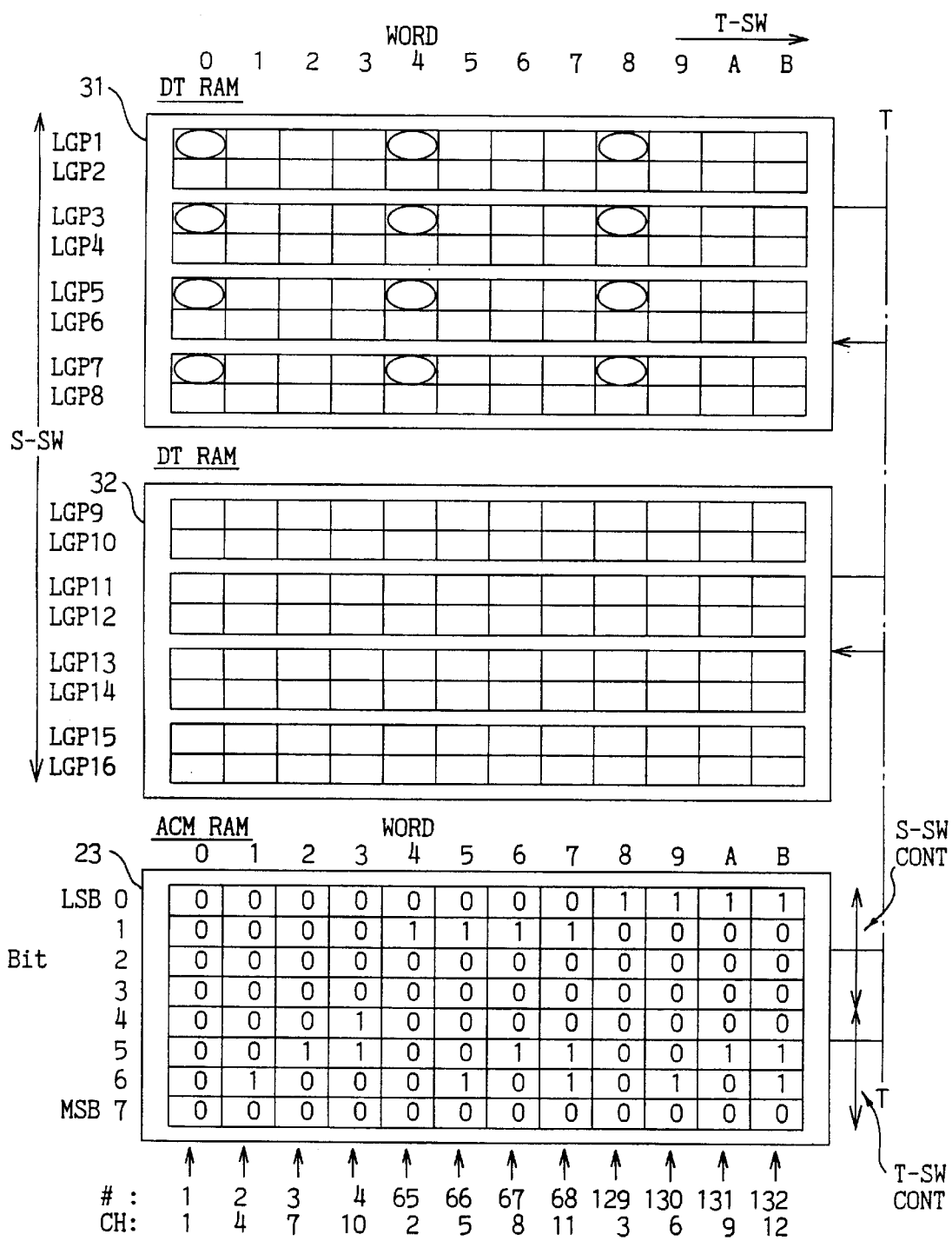
FIG. 38 is a first part of a view of a concrete example of the data for the panel 30 shown in FIG. 27 and FIG. 28.
Figure 39:
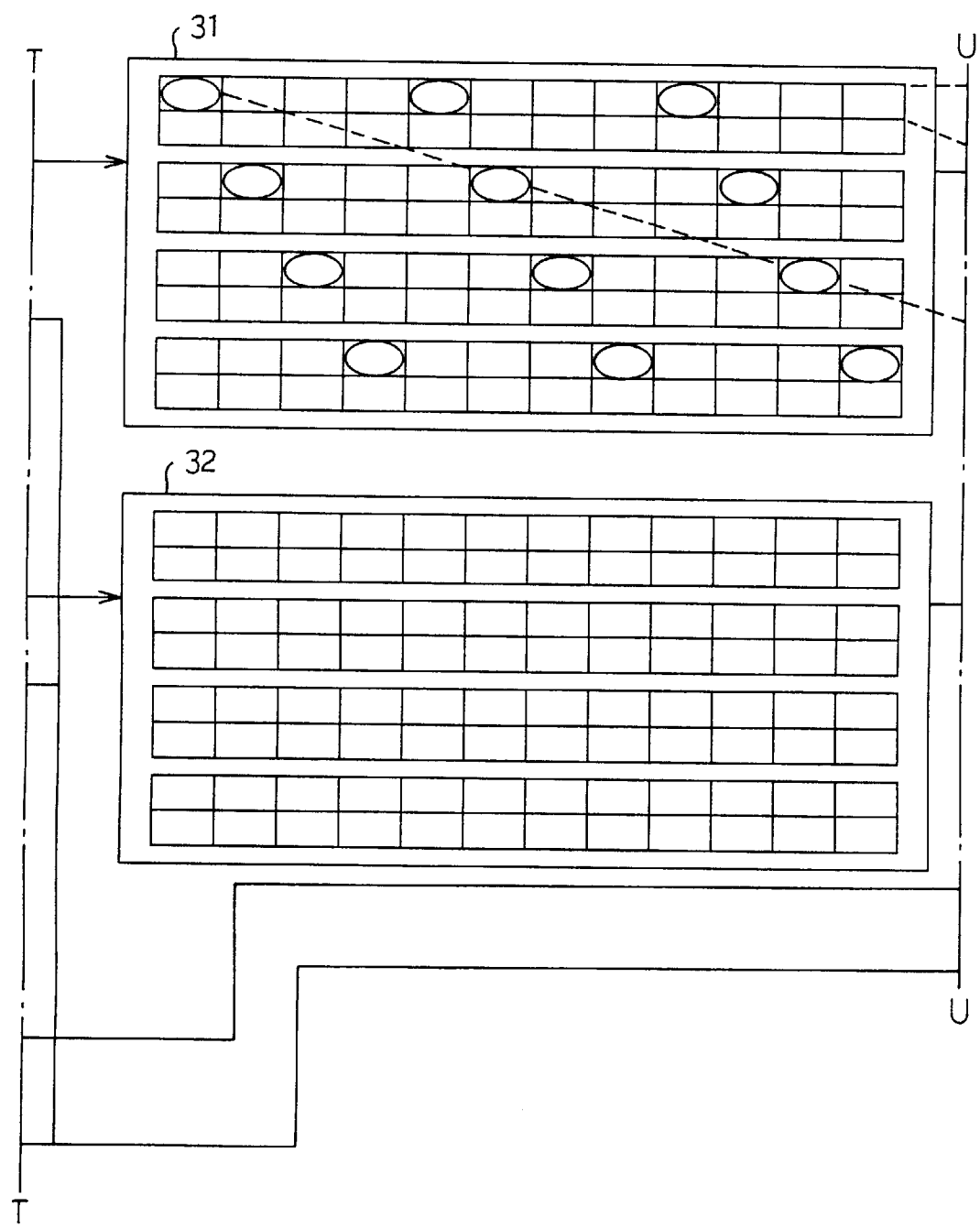
FIG. 39 is a second part of the view of the concrete example of the data for the panel 30 shown in FIG. 27 and FIG. 28.
Figure 40:
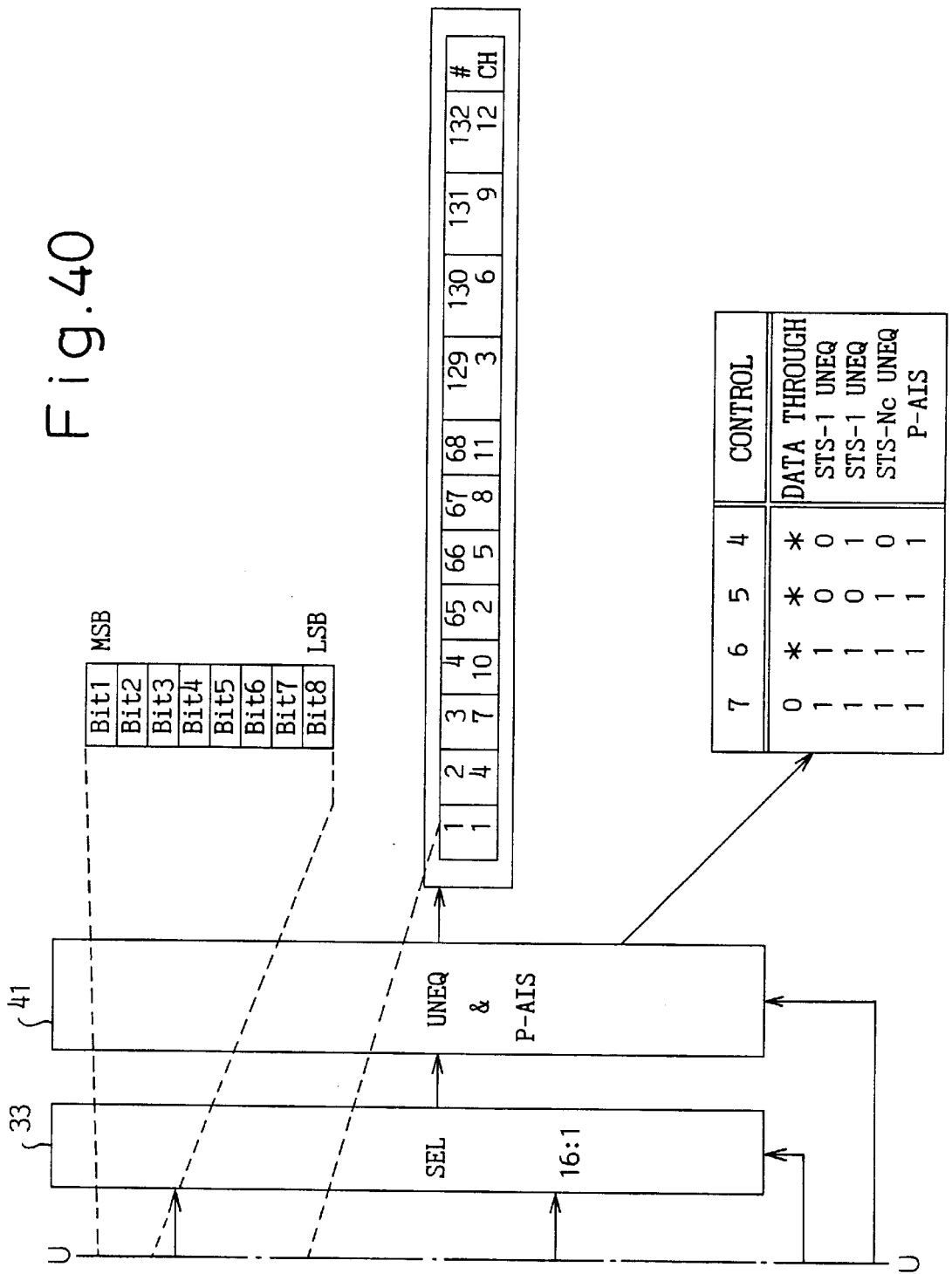
FIG. 40 is a third part of the view of the concrete example of the data for the panel 30 shown in FIG. 27 and FIG. 28.

FIG. 38 to FIG. 40 are parts of a view of a concrete example of the data for the panel 30 shown in FIG. 27 and FIG. 28. Further, FIG. 41 is an enlarged view of the data memory 31 in FIG. 38; FIG. 42 is an enlarged view of the data memory 32 in FIG. 38; FIG. 43 is an enlarged view of the data memory 31 in FIG. 39; and FIG. 44 is an enlarged view of the data memory 32 in FIG. 39.

FIG. 38 to FIG. 44 show examples of data where the format conversion of STS-192→STS-12 is carried out, that is, examples of data where the panel 30 is provided in the demultiplex unit (DMS) 4 of FIG. 91 (DROP side) (note, the case of data THROUGH setting).

The rest of the details are exactly the same as those explained for FIG. 31 to FIG. 37.

Next, the operation in the panel 30 shown in FIG. 27 and FIG. 28 is shown by the timing charts of signals appearing at respective portions.

Figure 45:
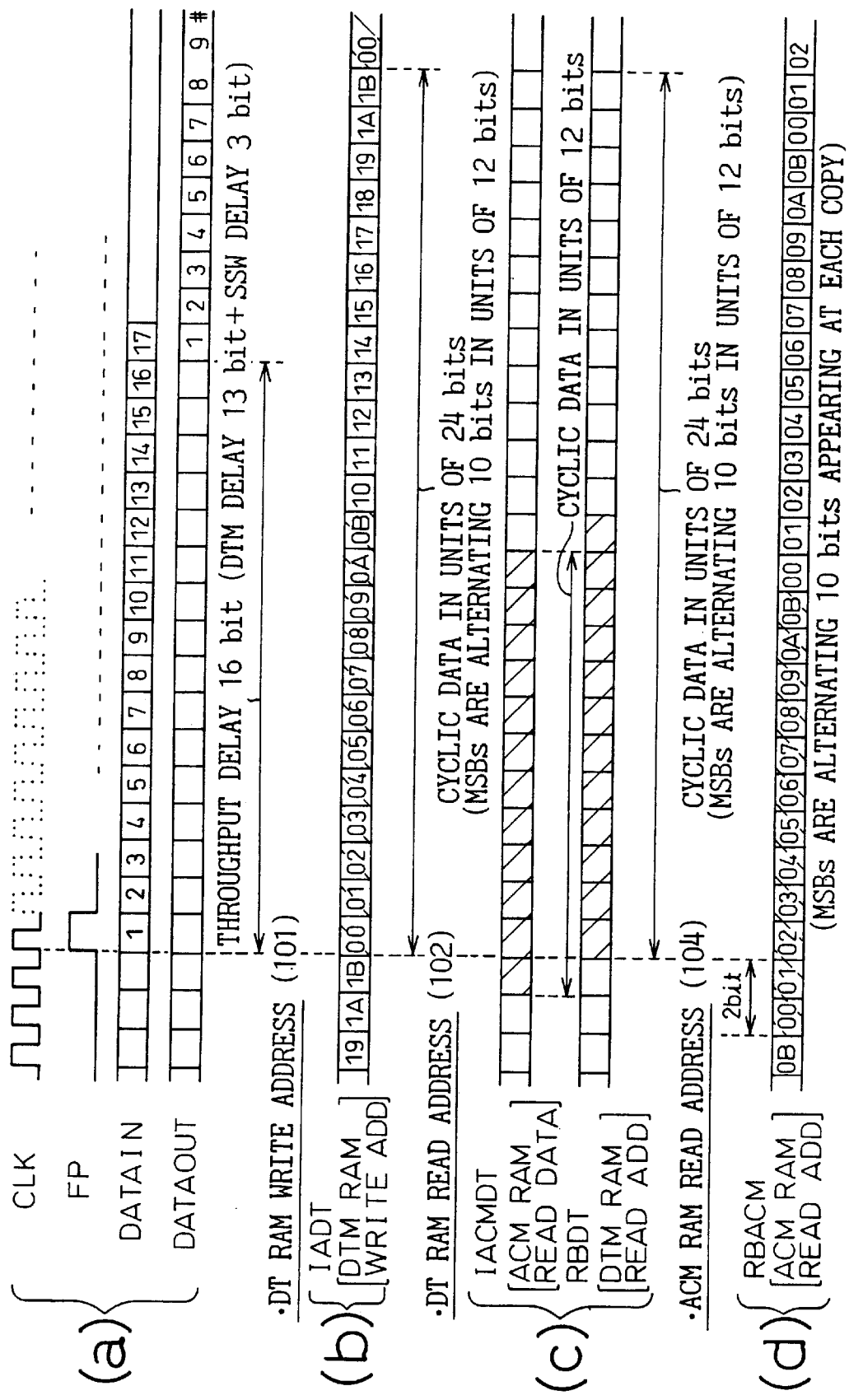
FIG. 45 shows timing charts showing signals appearing at principal parts shown in FIG. 27.

FIG. 45 shows timing charts showing signals appearing at principal portions shown in FIG. 27. First, timing charts of CLK, FP, DATAIN, and DATAOUT are shown in part (a) of FIG. 45.

CLK is the clock shown on the left end of FIG. 27 and is for example 78 MHz. FP is a frame pulse FP shown in the left end thereof and indicates the header position of the transmission data of a frame structure.

DATAIN corresponds to the transmission data Din (DATA1+DATA2) on the left end of FIG. 27. Both DATA1 and DATA2 are input in 64-bit parallel formats (128 bits in total).

DATAOUT shows the output timing of the transmission data Dout (DATA) finally output from the the space switch (SSW) 22 of FIG. 28.

Part (b) of FIG. 45 is the timing chart of the signal in relation to the DT RAM write address generation unit 101 of FIG. 27. IADT is the signal IADT shown in FIG. 27, and indicates a sequential alternate writing to the data memories (31, 32), that is, the write address at the writing (WRITE ADDress), and repeated data.

Part (c) of FIG. 45 is the timing chart of two signals in relation to the DT RAM read address generation unit 102 of FIG. 27. IACMDT indicates the random data reading from the data memories (31, 32). The address thereof is transmitted from the RAM 107 in the address control memory (ACM) 23 as READ DATA.

RBDT is the signal RBDT shown in FIG. 27 and is output to the data memories (31, 32) as the read address after passing through the flip-flops (FF) at the generation unit 102.

Part (d) of FIG. 45 shows the timing chart of the signal RBACM shown in FIG. 27. This signal shows the read address for alternately switching the first memory plane and the second memory plane of the ACM RAM 107 where the copy means 70 (FIG. 20) mentioned above is used and contains also the instruction bit (MSB).

Figure 46:
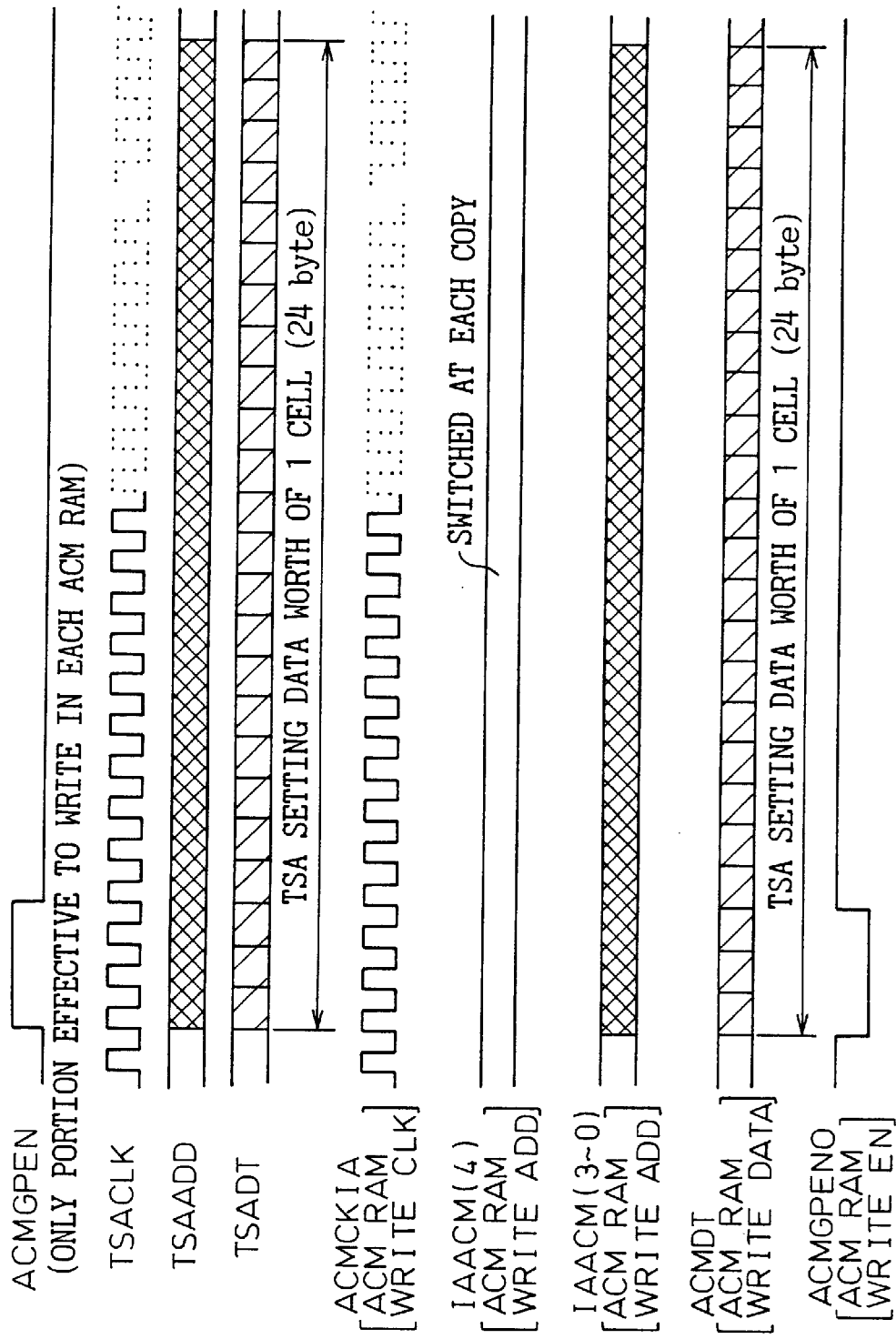
FIG. 46 shows timing charts of the variety of signals used for achieving write control to an ACM RAM 107 shown in FIG. 27.

FIG. 46 is a view of the timing charts of a variety of signals regarding the writing control to the ACM RAM 107 shown in FIG. 27. Particularly shown are the timing charts at the time of channel setting (TSA setting). ACMGPEN showing the write valid time, TSACLK (clock for TSA) shown on left end of FIG. 27, TSAADD (address for TSA setting), and TSADT (TSA setting data (channel setting address A)) are shown.

Further, the write clock ACMCKIA to the ACM RAM 107, IAACM (4) switched for every copy at the copy means 70, IAACM (3 to 0) as write addresses to the ACM RAM 107, ACMDT as the write data to the ACM RAM 107, and ACMGPENO for making the ACM RAM 107 write enable are respectively shown. Note that, the cell in the present figure is a unit showing one channel setting data. The amount of each channel setting data is large, therefore is divided into a plurality of cells (for example Cell No. 0 to Cell No. 7) and stored in the ACM RAM 107.

Figure 47:
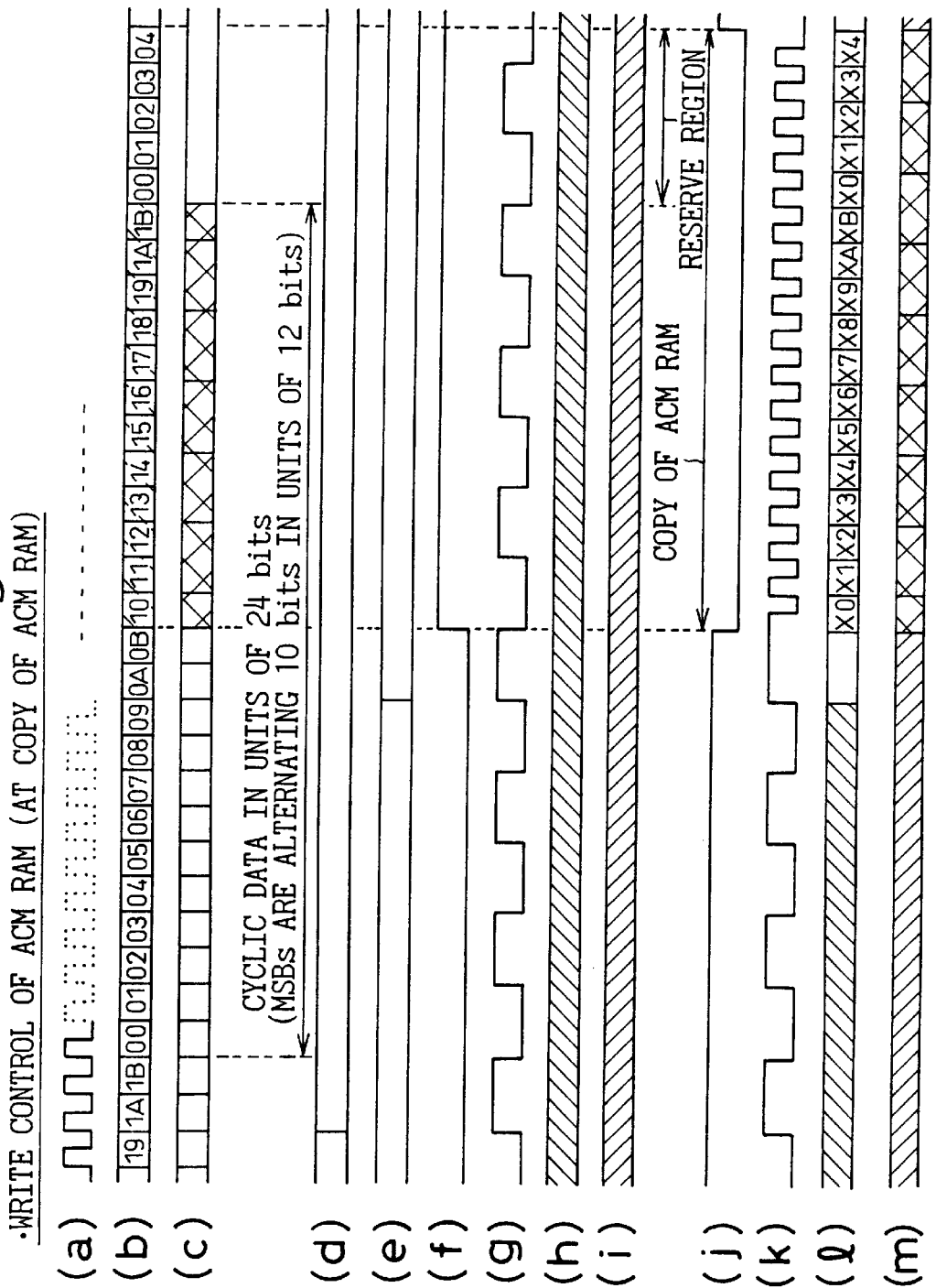
FIG. 47 shows other timing charts of the variety of signals used for achieving the write control to the ACM RAM 107 shown in FIG. 27.

FIG. 47 is a view of timing charts of a variety of signals regarding the writing control to the ACM RAM 107 shown in FIG. 27. It particularly shows the timing charts when using the copy means 70 (FIG. 20) (when copying ACM RAM).

From the top of the figure, timing charts of the clock CKL as mentioned above, IADT as the write address to the DTM RAM (31, 32), RBDT specifying the read address from the DTM RAM (31, 32), ACMSEL showing the valid write position at the ACM RAM 107 (left end of FIG. 27), s_ACMSEL showing the plane switching of an address control memory (ACM) having a two-plane structure, s_ACOMCOPY showing the copy timing by the copy means 70, clock TSACLK for TSA setting, address TSAADD for TSA setting, data TSADT for TSA setting, ACMGPENO showing the write enable to the ACM RAM 107, ACMCKAI as the write clock to the ACM RAM 107, and IAACM as the write address to the ACM RAM 107 are shown.

FIG. 48 shows timing charts showing signals in relation to the space switch (SSW) 22 and the switch control unit (SWCNT) 34 shown in FIG. 28. Particularly it shows the timing charts for the switching control of the switch (SSW) 22 (part (a) of the same figure) and the timing charts of the signal in relation to the operation of the H1H2 shift timing generation unit 106 in the switch control unit (SWCNT) 34 (part (b) of the same figure).

Figure 49:
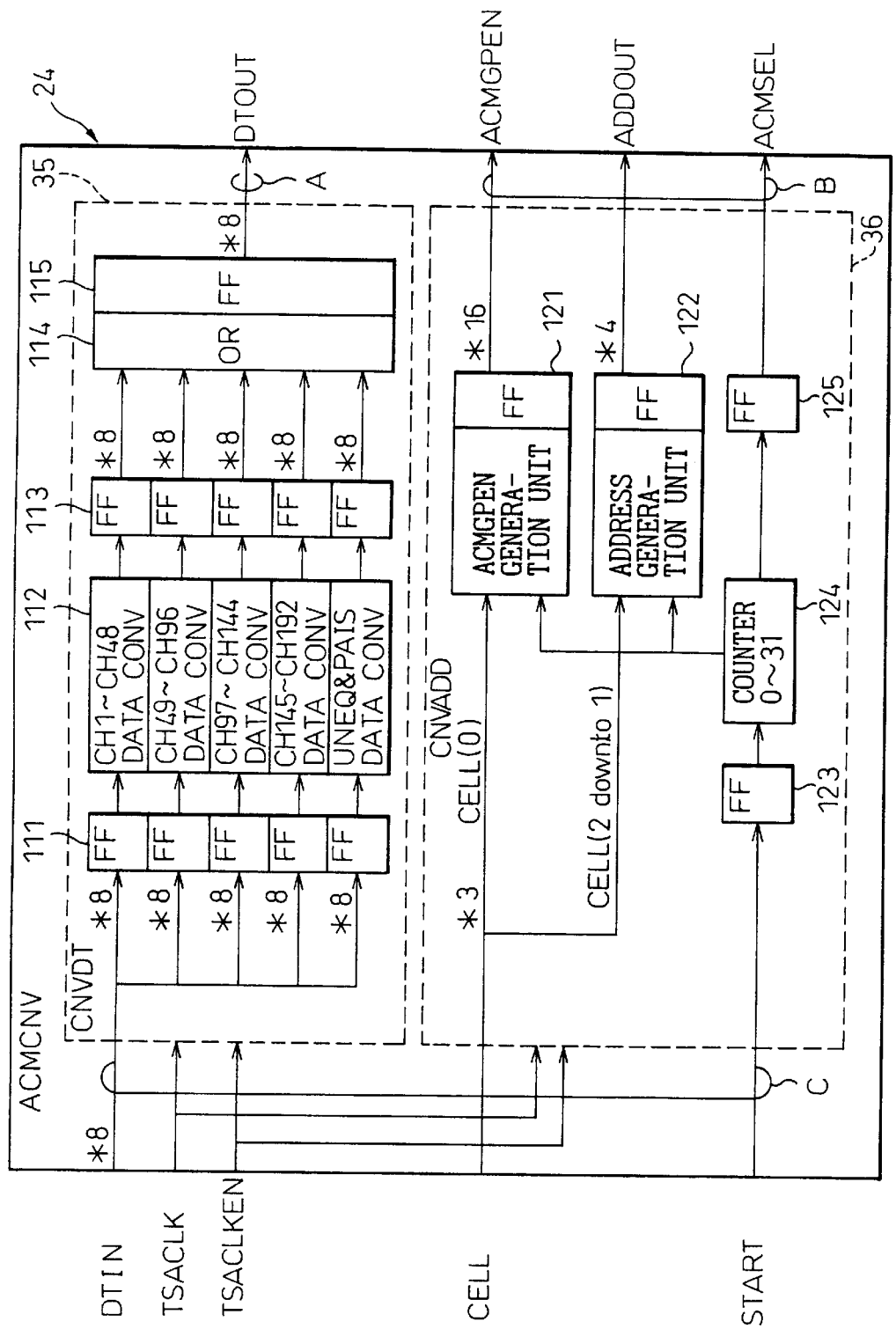
FIG. 49 is a view of a detailed example of a channel setting information converting unit 24 shown in the embodiments.

FIG. 49 is a view of a detailed example of the channel setting information converting unit 24 shown in the embodiments. For example, as explained by referring to FIG. 2, the channel setting information converting unit (ACMCNV) 24 comprises the data converting unit (CNVDT) 35 and the address converting unit 36. The data converting unit 35 and the address converting unit 36 receive the channel setting information C from the microcomputer interface 37 and respectively output the channel setting address A and the accessing address B for the control memory.

The data converting unit 35 comprises the former stage flip-flips (FF) 111, data converting elements (DATACNV) 112, rear stage flip-flops (FF) 113, OR gate 114, and an output stage flip-flop (FF) 115.

Each of the flip-flops (FF) 111, flip-flops (FF) 113, and the element 112 is constituted by five blocks. It is difficult to process 192 channels of the transmission data Din at once, therefore the information C is processed divided into five blocks in parallel. Five blocks share (CH1 to CH48) . . . (CH145 to CH192) and (UNEQ & PAIS).

On the other hand, the converting unit (CNVADD) 36 for the accessing address B shown in the lower part of FIG. 49 receives the two signals shown on the left side of the present figure and outputs three signals (B) shown on the right side of the figure. The roles of the signals are as follows.

The signal START is a header pulse for establishing a synchronization.

The signal CELL instructs the division of the data (Cell No. 0 to Cell No. 7 mentioned above) for dividing and processing a large volume of data (DTIN).

The signal ACMGPEN is the enable signal of the write address to the ACM RAM 107 as already mentioned. Further, it shows which signal among the group of 16 STS-12 signals too.

The signal ADDOUT shows the address at the writing to the ACM RAM 107.

The signal ACMSEL is a signal indicating the timing of switching the planes when the ACM RAM 107 has a two-plane structure (for example the first memory plane 23-1 and second memory plane 23-2 shown in FIG. 18).

The signal ACMGPEN is output from the ACMPGEN generation unit 121 equipped with a flip-flop (FF) by receiving as its input the signal CELL (0).

The signal ADDOUT is output from the address generation unit 122 equipped with a flip-flop (FF) by receiving as its input the signal CELL (2 down to 1).

The signal ACMSEL is generated by counters (0 to 31) for counting one plane's worth of bits (32 bits) of the 64-bit ACM RAM 107. The flip-flop (FF) 123 and the flip-flop (FF) 125 for timing adjustment are provided at the front and rear stages thereof.

Figure 50:
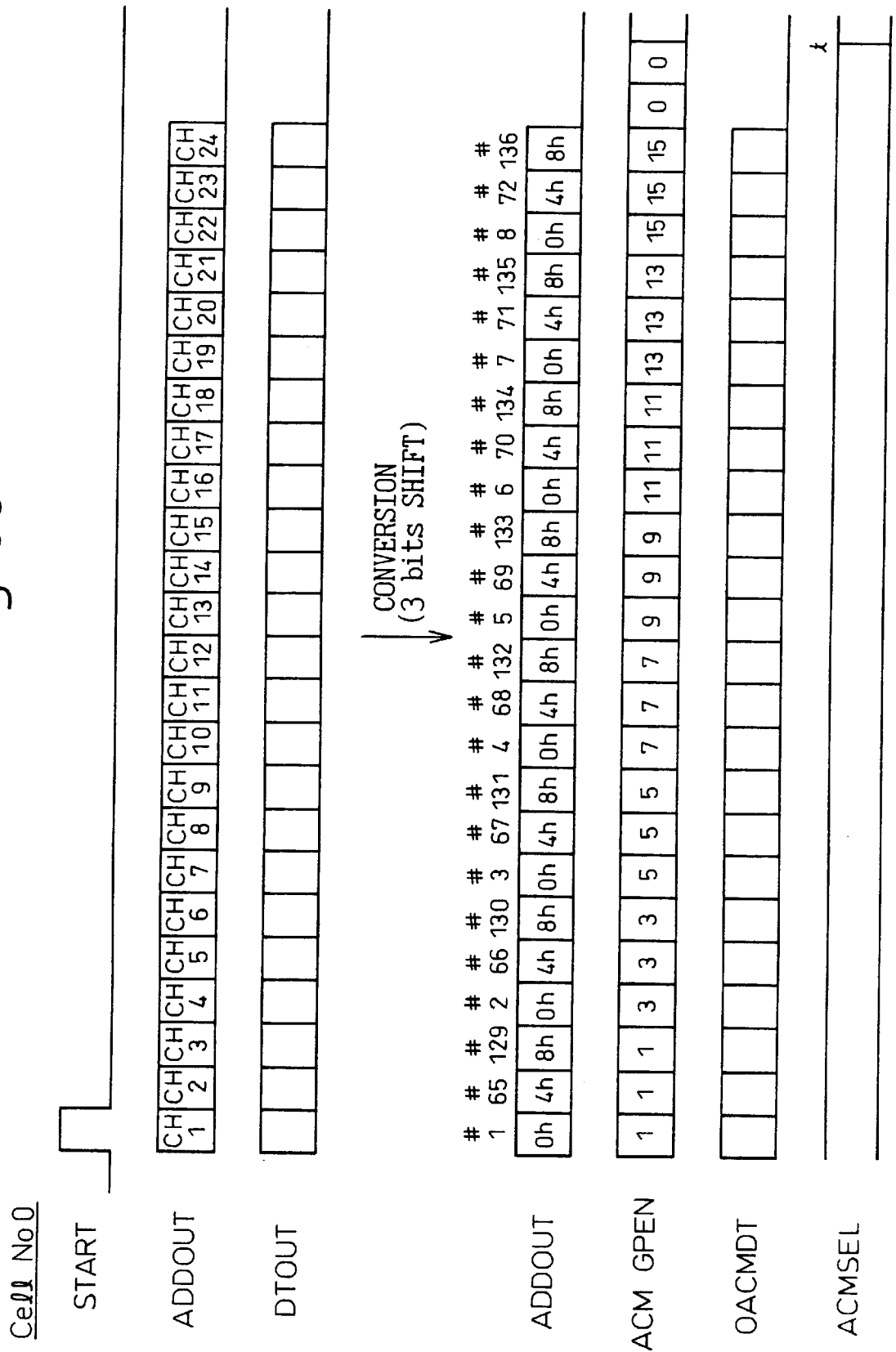
FIG. 50 shows timing charts showing signals appearing in FIG. 27, FIG. 28, and FIG. 49 for Cell No. 0.
Figure 52:
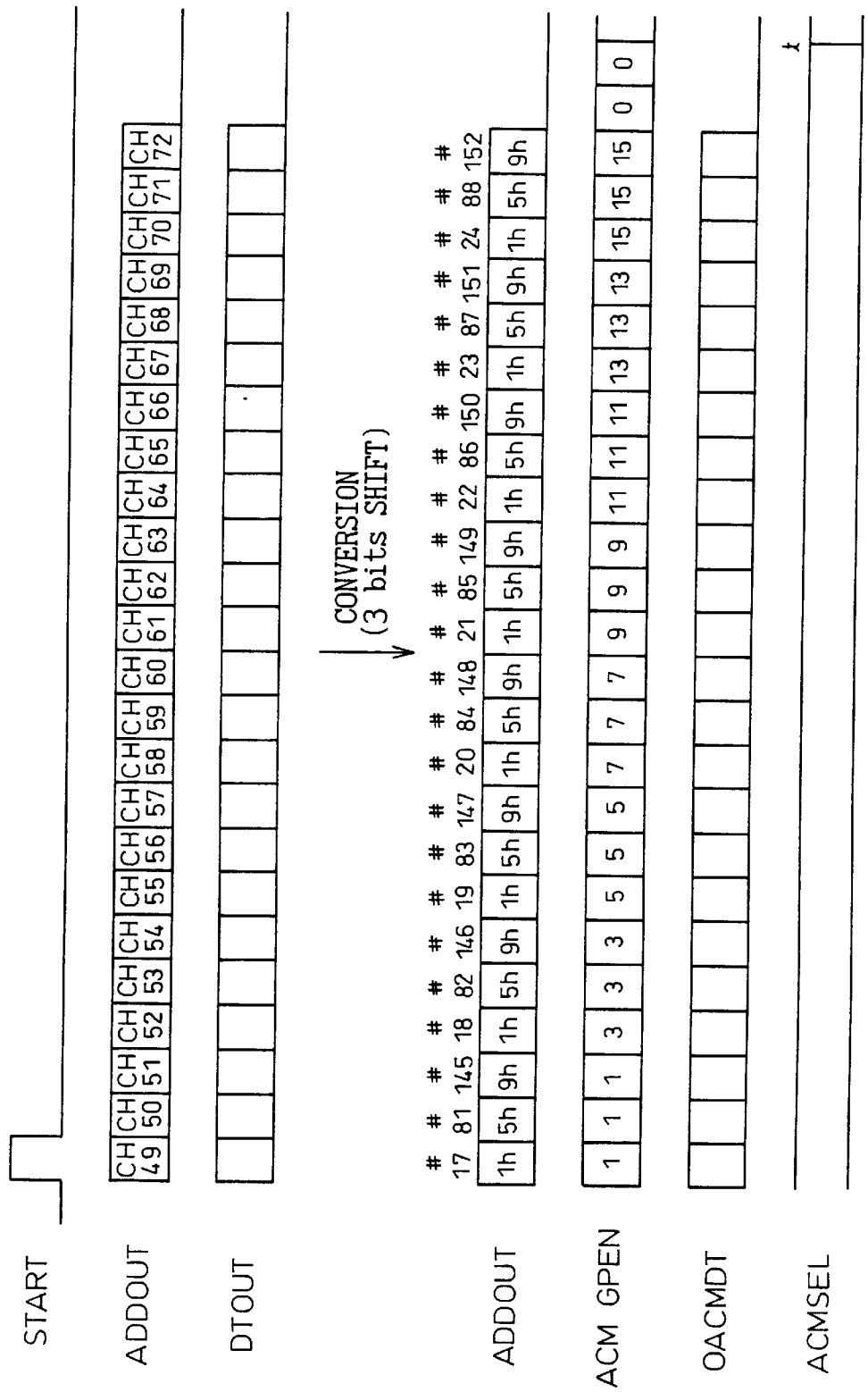
FIG. 52 shows timing charts showing signals appearing in FIG. 27, FIG. 28, and FIG. 49 for Cell No. 2.
Figure 55:
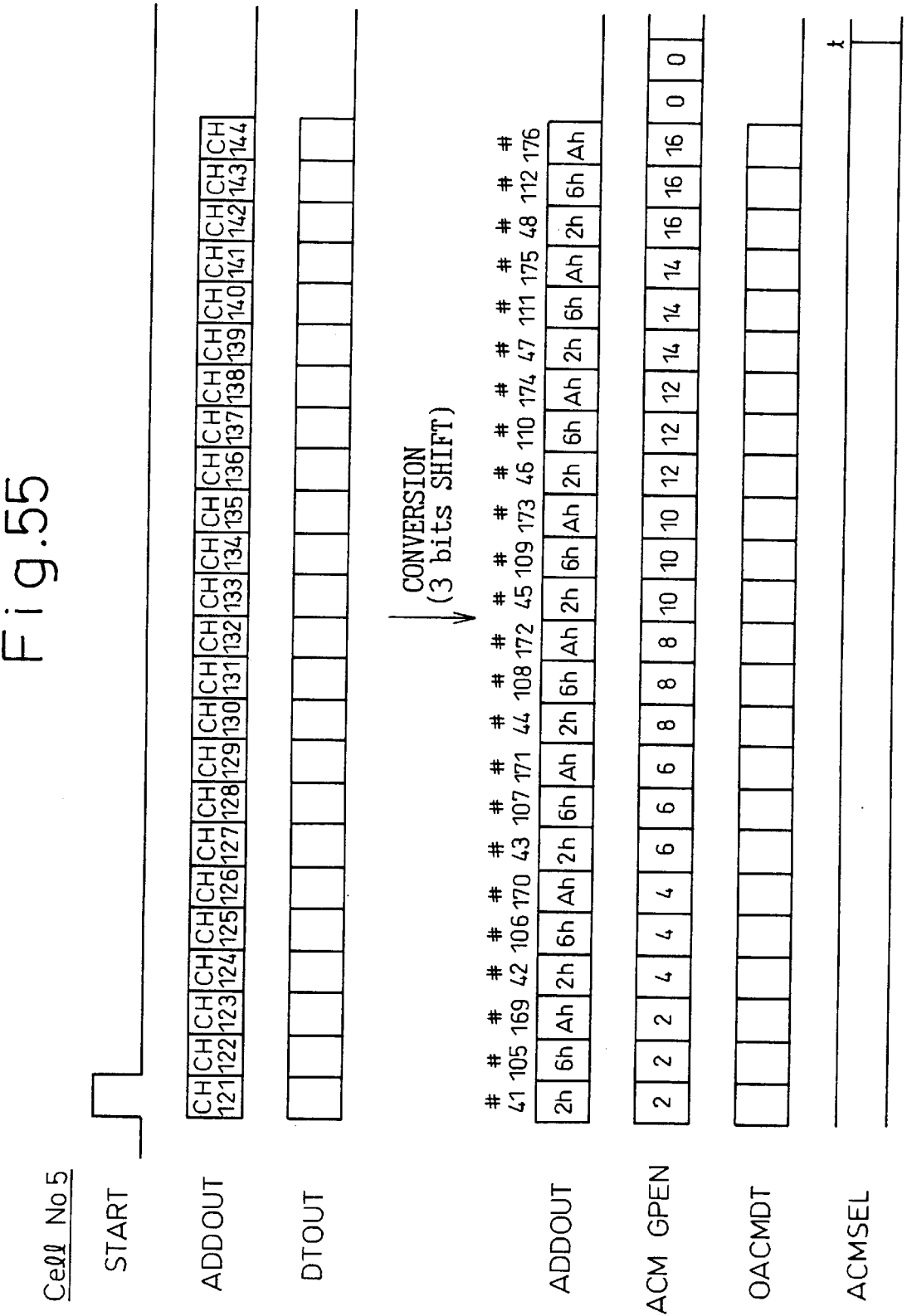
FIG. 55 shows timing charts showing signals appearing in FIG. 27, FIG. 28, and FIG. 49 for Cell No. 5.

FIG. 50 shows timing charts showing signals appearing in FIG. 27, FIG. 28, and FIG. 49 for Cell No. 0; FIG. 51 shows timing charts showing signals appearing in FIG. 27, FIG. 28, and FIG. 49 for Cell No. 1; FIG. 52 shows timing charts showing signals appearing in FIG. 27, FIG. 28, and FIG. 49 for Cell No. 2; FIG. 53 shows timing charts showing signals appearing in FIG. 27, FIG. 28, and FIG. 49 for Cell No. 3; FIG. 54 shows timing charts showing signals appearing in FIG. 27, FIG. 28, and FIG. 49 for Cell No. 4; FIG. 55 shows timing charts showing signals appearing in FIG. 27, FIG. 28, and FIG. 49 for Cell No. 5; FIG. 56 shows timing charts showing signals appearing in FIG. 27, FIG. 28, and FIG. 49 for Cell No. 6; and FIG. 57 shows timing charts showing signals appearing in FIG. 27, FIG. 28, and FIG. 49 for Cell No. 7.

Note, they show the case where the TSA circuit 20 is provided on the ADD side, that is, in the multiplex unit (MXS) 5 of FIG. 91. Further, as signals appearing in FIG. 27, FIG. 28, and FIG. 49, seven signals shown in FIGS. 50 to 57 are selected.

In FIG. 50, the first cell of the 8-divided channel setting information C, that is, Cell No. 0, is processed for each of the 24 channels (CH1 to CH24). Since there are eight cells (FIG. 50 to FIG. 57), the signal CELL consists of 3 bits for discriminating them. Each cell has 24 channels (ch), so the amount of eight cells becomes 192 channels.

The signal DTOUT changes in various ways in accordance with the channel setting, therefore is shown blank in the figure.

A concrete value is shown for the signal ADDOUT. Other than this, there are signals ACMGPEN, OACMDT, and ACMSEL (switching from one memory plane to the other memory plane at t at the right end in the figure).

Note that, the term "conversion (3 bits shift)" in the figure means that output processings of ADDOUT and DTOUT are subjected to decentralized processing while shifting the time by using flip-flops (FF) etc.

FIG. 51 to FIG. 57 will be similarly explained.

Figure 58:
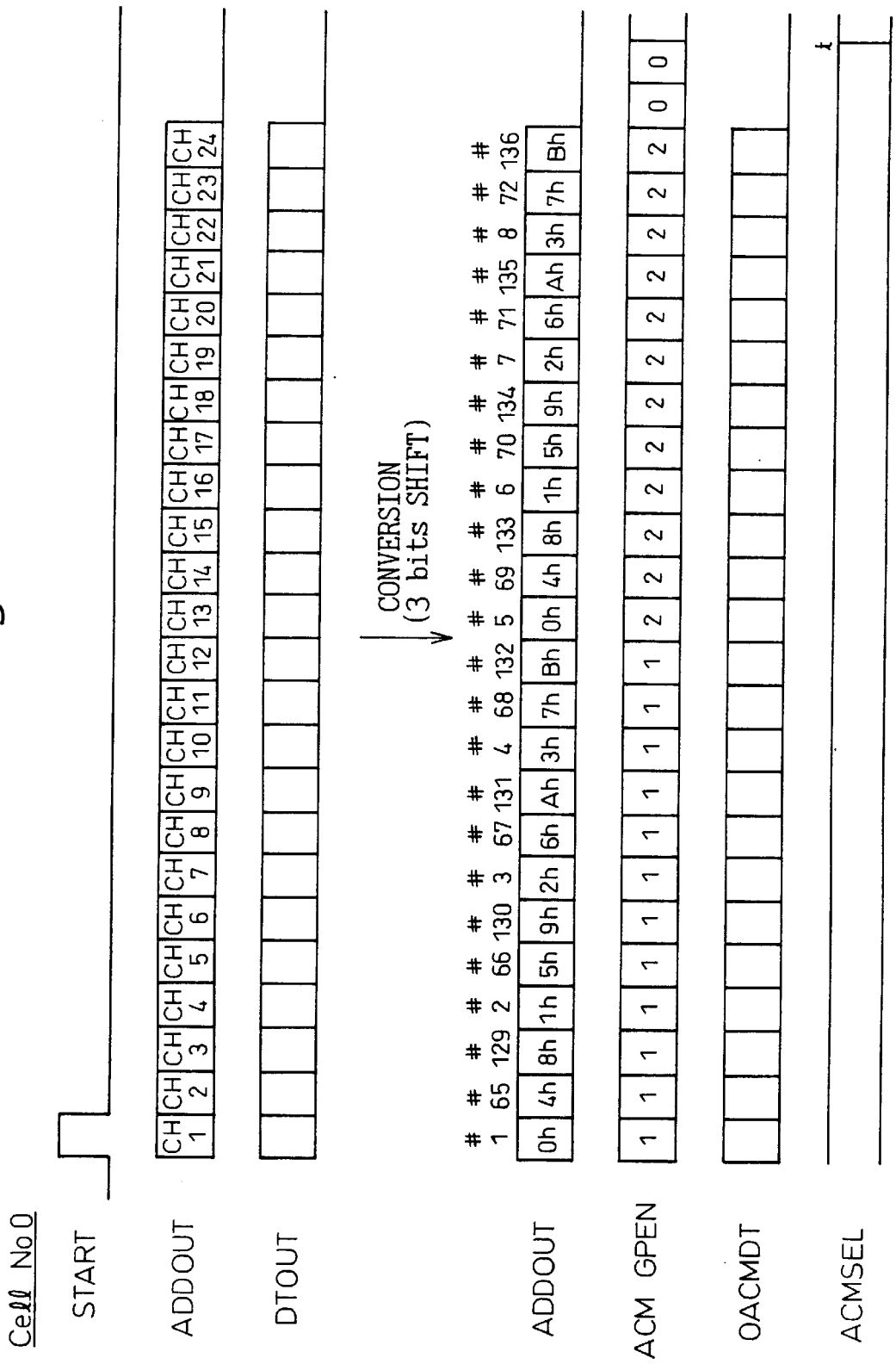
FIG. 58 shows timing charts showing signals appearing in FIG. 27, FIG. 28, and FIG. 49 for Cell No. 0.
Figure 59:
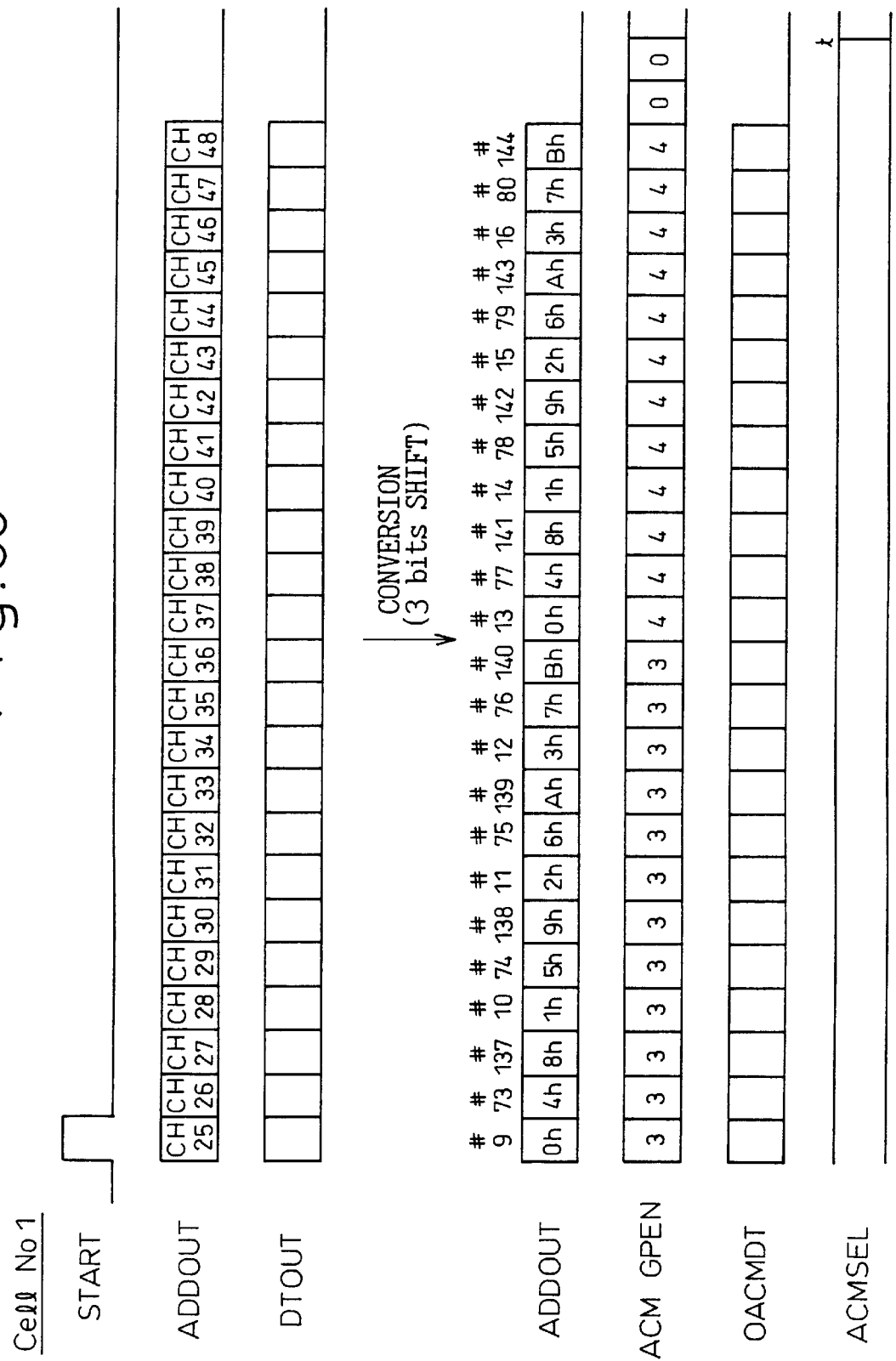
FIG. 59 shows timing charts showing signals appearing in FIG. 27, FIG. 28, and FIG. 49 for Cell No. 1.
Figure 60:
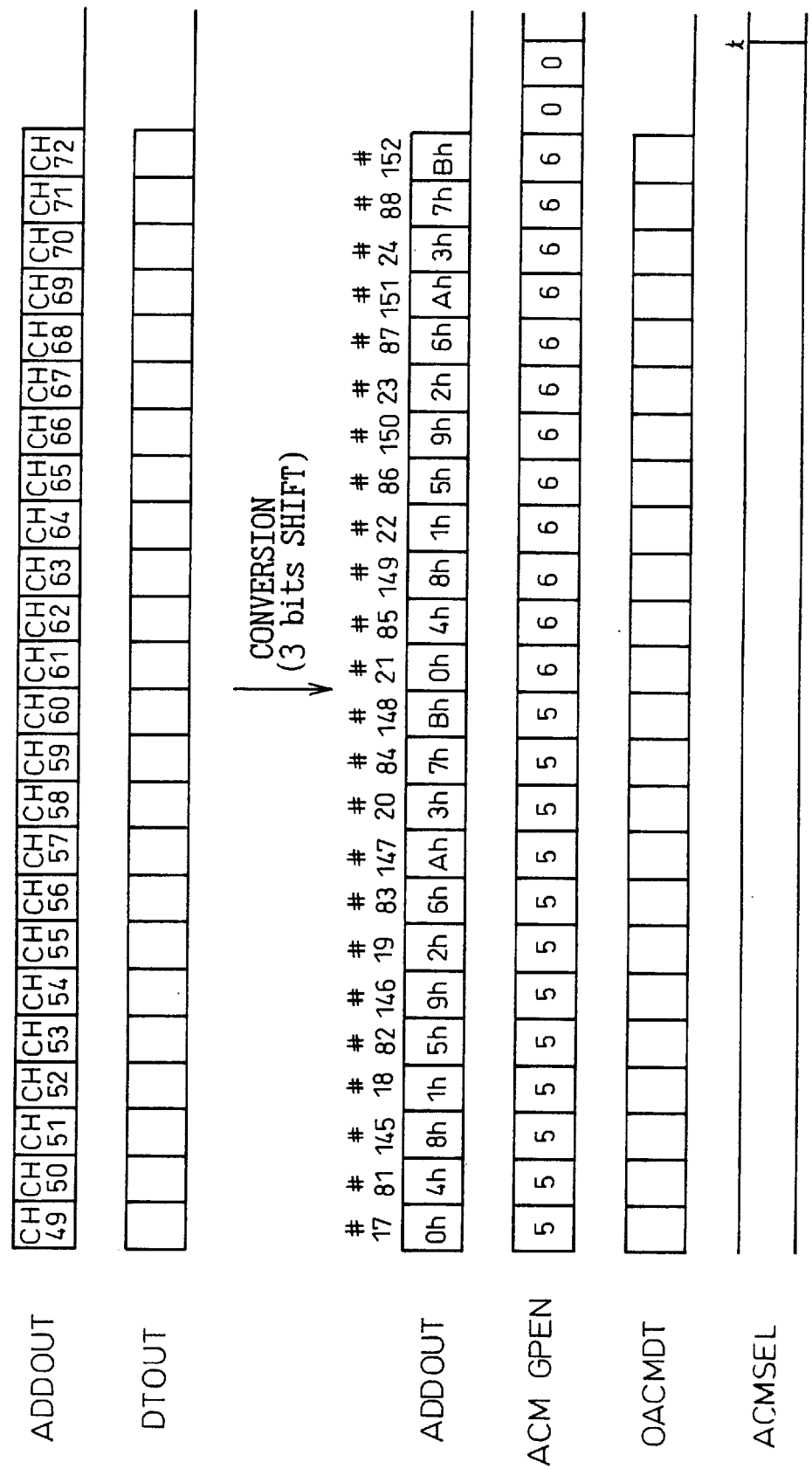
FIG. 60 shows timing charts showing signals appearing in FIG. 27, FIG. 28, and FIG. 49 for Cell No. 2.
Figure 61:
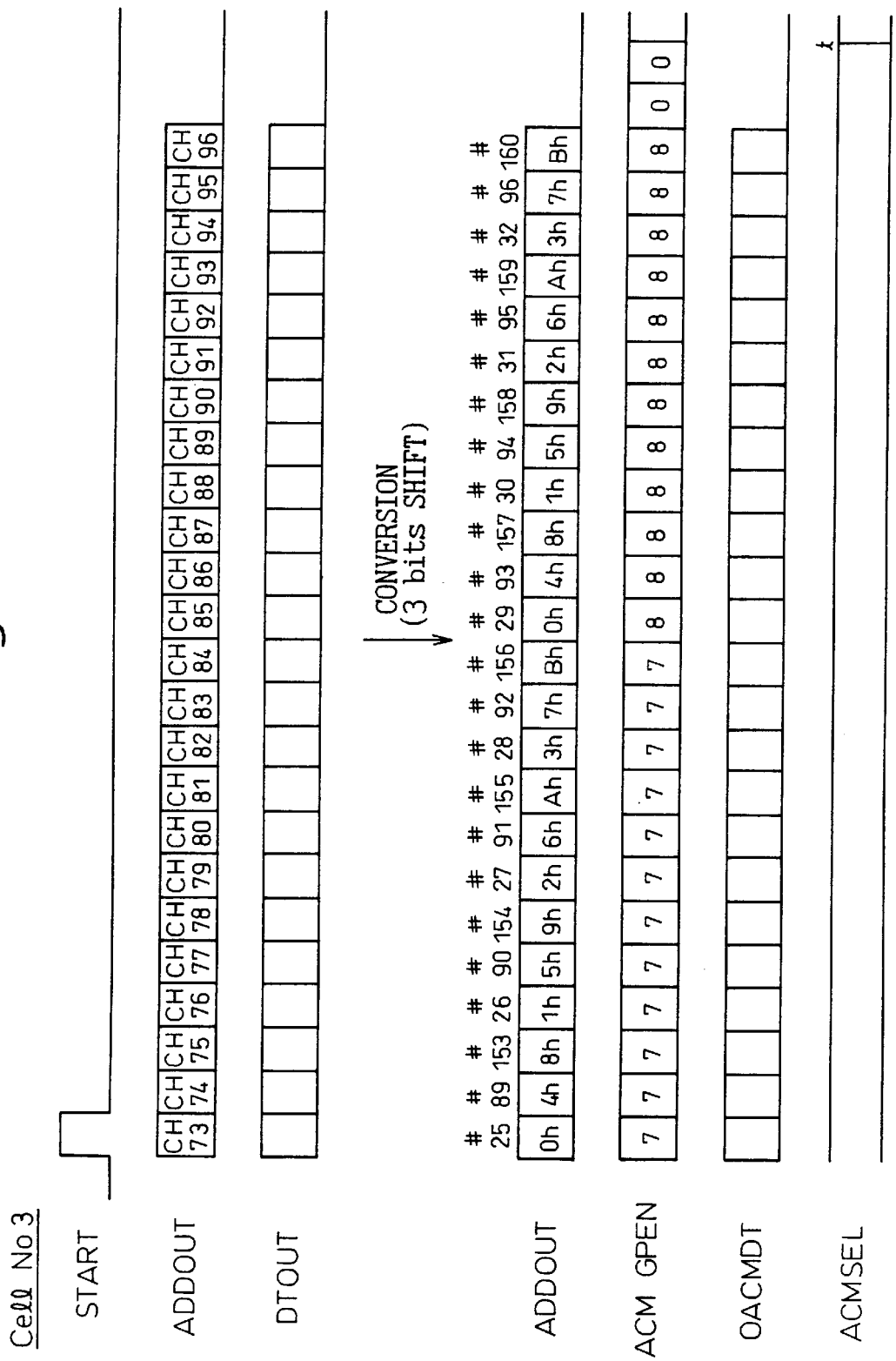
FIG. 61 shows timing charts showing signals appearing in FIG. 27, FIG. 28, and FIG. 49 for Cell No. 3.
Figure 62:
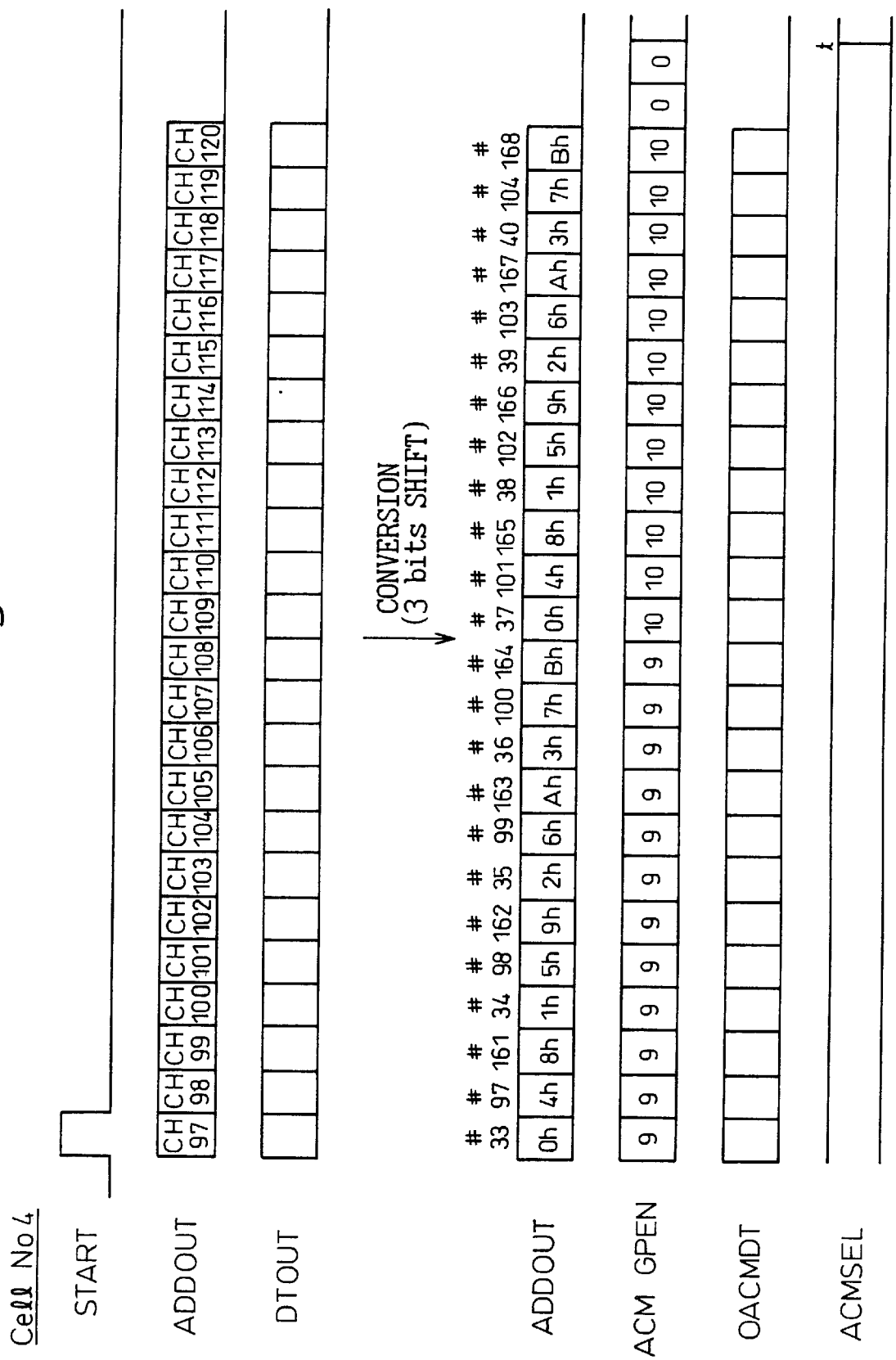
FIG. 62 shows timing charts showing signals appearing in FIG. 27, FIG. 28, and FIG. 49 for Cell No. 4.

FIG. 58 shows timing charts showing signals appearing FIG. 27, FIG. 28, and FIG. 49 for Cell No. 0; FIG. 59 shows timing charts showing signals appearing FIG. 27, FIG. 28, and FIG. 49 for Cell No. 1; FIG. 60 shows timing charts showing signals appearing FIG. 27, FIG. 28, and FIG. 49 for Cell No. 2; FIG. 61 shows timing charts showing signals appearing FIG. 27, FIG. 28, and FIG. 49 for Cell No. 3; FIG. 62 shows timing charts showing signals appearing FIG. 27, FIG. 28, and FIG. 49 for Cell No. 4; FIG. 63 shows timing charts showing signals appearing FIG. 27, FIG. 28, and FIG. 49 for Cell No. 5; FIG. 64 shows timing charts showing signals appearing FIG. 27, FIG. 28, and FIG. 49 for Cell No. 6; and FIG. 65 shows timing charts showing signals appearing FIG. 27, FIG. 28, and FIG. 49 for Cell No. 7.

Note, they show the case where the TSA circuit 20 is provided on the DROP side, that is, in the demultiplex unit (DMS) 3 of FIG. 91. The content thereof is similar to the explanation for FIG. 50 to FIG. 57 mentioned above.

Returning to FIG. 49 again, the data converting unit (CNVDT) 35 will be further concretely explained.

FIG. 66 is a table showing the conversion operation (ADD side) in the data converting unit 35 (first); FIG. 67 is a table of the same (second); FIG. 68 is a table of the same (third); and FIG. 69 is a table of the same (fourth).

FIG. 66 shows the conversion operation for channel (CH) 1 to channel (CH) 48; FIG. 67 shows the conversion operation for CH49 to CH96; FIG. 68 shows the conversion operation for CH97 to CH144; and FIG. 69 shows the conversion operation for CH145 to CH192. Since the explanation is the same for all of these figures, the explanation will be made by referring to FIG. 66 as a representative case.

In FIG. 66, the left part (ATM CELL SETTING CODE) shows the input data DTIN (channel setting address A) in the channel setting information C from the microcomputer interface 37 and corresponds to the switching information in the time switching and space switching in the panel 30 in correspondence with each channel. Since the setting code is input in the form of an ATM (asynchronous transfer mode) CELL, it will be referred to as an "ATM CELL setting CODE".

The right part of FIG. 66 (ACM CELL CODE) shows the 4-bit control code (number of Space SW) with respect to the time switch (TSW) 21 and the 4-bit control code (number of DTM time slots) with respect to space switch (SSW) 22. These codes are once stored in the ACM RAM 107 and control the time switch (TSW) 21 and space switch (SSW) 22 as mentioned above, so are referred to as an ACM CELL CODE. Note that data of channels other than channels CH1 to CH192 are passed through the converting unit 24 without a conversion operation. Further, the center part of FIG. 66 (0 (00h), 64 (40h), 128 . . . ) is for distinguishing 1 to 192 by decimal notation.

FIG. 70 to FIG. 73 are parts of a table showing the conversion operation (DROP side) in the data converting unit 35.

FIG. 70 shows the conversion operation for channel (CH) 1 to channel (CH) 48; FIG. 71 shows the conversion operation for CH49 to CH96; FIG. 72 shows the conversion operation for CH97 to CH144; and FIG. 73 shows the conversion operation for CH145 to CH192. The explanation of these figures is the same as the above explanation of FIG. 66.

Returning to FIG. 49 again, the address converting unit (CNVADD) 36 will be further concretely explained.

FIG. 74 to FIG. 77 are parts of a table showing the conversion operation (ADD side) in the address converting unit 36.

FIG. 74 shows the conversion operation for channel (CH) 1 to channel (CH) 48; FIG. 75 shows the conversion operation for CH49 to CH96; FIG. 76 shows the conversion operation for CH97 to CH144; and FIG. 77 shows the conversion operation for CH145 to CH192. Since the explanation is the same for all of the figures, the explanation will be made by referring to FIG. 74 as a representative case.

In FIG. 74, the left part (ATM CELL SETTING CH) corresponds to the input side (CELL and START) of the circuit of FIG. 49. The above-mentioned 3-bit cell numbers (Cell No. 0 to Cell No. 7) incremented for every 24 channels are input. The address conversion is carried out corresponding to the set of the cell number and the channel number (CH number). This is shown in the right part of FIG. 74 (WRITE CONTROL OF ACM). Namely, it is converted to the set of the signal ACMGPEN and signal ADDOUT corresponding to the above set. These signal ACMGPEN and signal ADDOUT were already explained.

FIG. 75 to FIG. 77 are the same too.

FIG. 78 to FIG. 81 are parts of a table showing the conversion operation (DROP side) in the address converting unit 36.

FIG. 78 shows the address conversion operation for channel (CH) 1 to channel (CH) 48; FIG. 79 shows the conversion operation for CH49 to CH96; FIG. 80 shows the conversion operation for CH97 to CH144; and FIG. 81 shows the conversion operation for CH145 to CH192. The content thereof is similar to the above explanation for FIG. 74 to FIG. 77.

Next, viewing the second embodiment (FIG. 4 and FIG. 5), the characteristic feature of this second embodiment resides in that the auxiliary signal generating means 40 is provided. Details of this means 40 were shown in FIG. 28, FIG. 29, and FIG. 30. An explanation will be made of the address (ADDR*4 of FIG. 5) from the address control memory (ACM) 23 to be applied to this means 40.

FIG. 82 is a table showing an example of the output code from the address control memory (ACM) 23. The left part of the figure indicates the channel number (CH No.). 192 channels (CH1 to CH192) mentioned above are assigned thereto. The right part of the figure indicates the bit pattern of the output code (ACM Code) from the address control memory (ACM) 23 for specifying each of CH1 to CH192. Each bit pattern is 8-bit signal.

The number of bit patterns which can be represented by 8 bits exceeds 192. Therefore, as the preferred example of the second embodiment, in the bit pattern group (BP+bp of FIG. 82) comprising the channel setting address A from the address control memory (ACM) 23, an idle bit pattern (bp of FIG. 82) which is not used for the channel setting address thereof is assigned to the above auxiliary signal insertion code (STS-1, UNEQ, P-AIS, etc.). These auxiliary signal insertion codes were shown in FIG. 29. 110*, 1110, etc. shown in this FIG. 29 correspond to the bit pattern bp shown in the lower part of FIG. 82, particularly the upper 4 bits thereof.

By utilizing the idle bit pattern bp as described above, an advantage is obtained that it is not necessary to prepare different independent codes as the auxiliary signal insertion codes.

Next, the fourth embodiment (FIG. 15 and FIG. 16) will be explained in a little more detail. The characteristic feature of this fourth embodiment resides in that the initialization mode generating unit 62 is provided.

Figure 83:
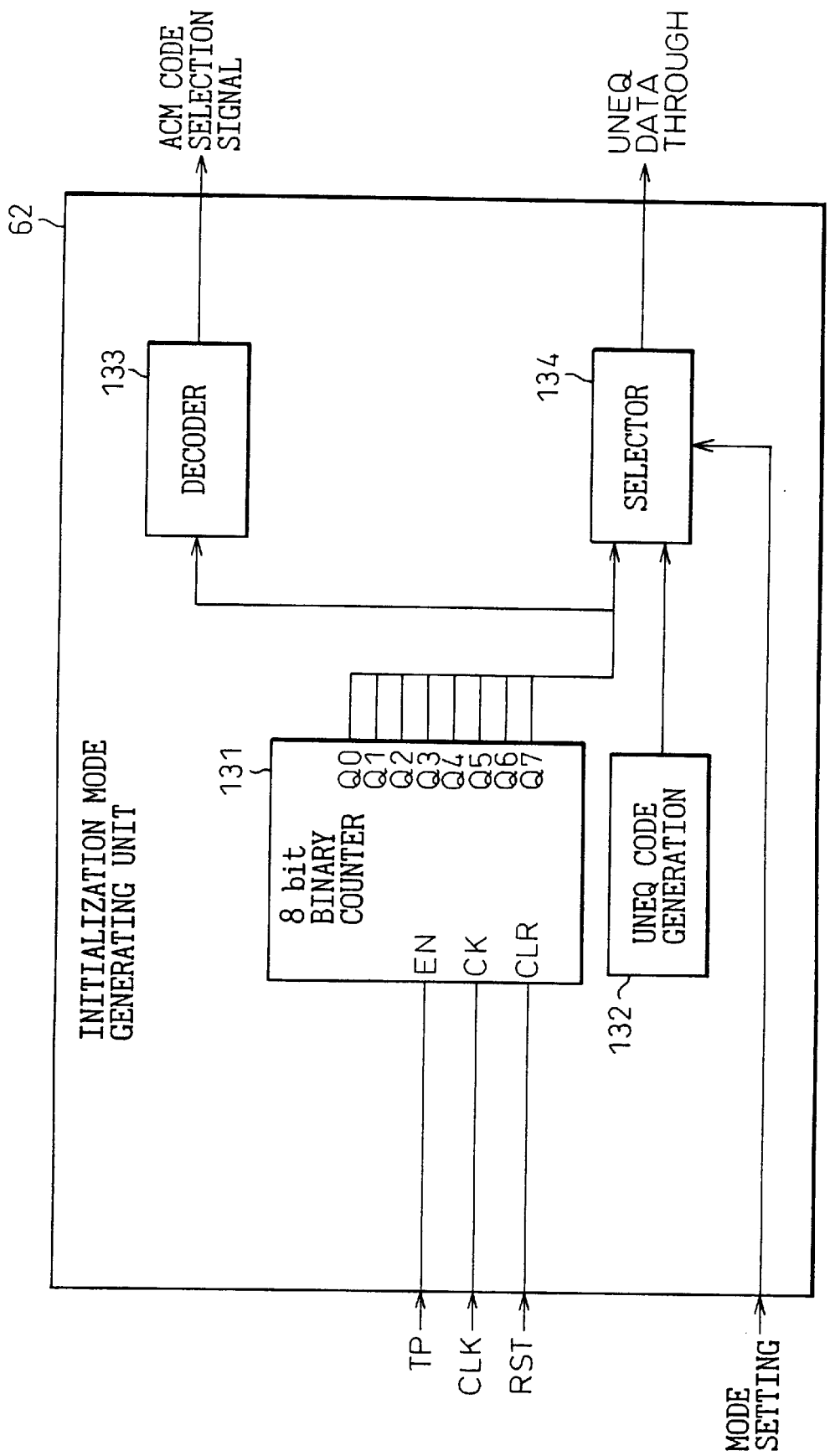
FIG. 83 is a view of a concrete example of an initialization mode generating unit 62.

FIG. 83 is a view of a concrete example of the initialization mode generating unit 62. In the figure, TP on the left end is the timing pulse. When there is the input of the reset signal RST, it divides the clock CLK of for example 78 MHz by the binary counter 131. In synchronization with this divided clock, a decoder 133 and a selector 134 operate. The decoder 133 outputs the ACM code selection signal for selecting any of the ACM codes shown in FIG. 82.

On the other hand, the above-mentioned microcomputer gives a mode setting command indicating whether it is the UNEQ mode or DATA THROUGH mode. This mode setting command controls the selector 134 to select the output from the UNEQ code generating unit 132 and transmits the same to the panel 30 side when it is the UNEQ mode. When it is the DATA THROUGH mode, it transmits the signal showing this to the panel 30 side.

Next, looking at the sixth embodiment (FIG. 19 and FIG. 20), the characteristic feature of this sixth embodiment resides in that the address control memory (ACM)23 is given a two-plane structure (23-1 and 23-2) and, at the same time, the copy means 70 is introduced.

Figure 84:
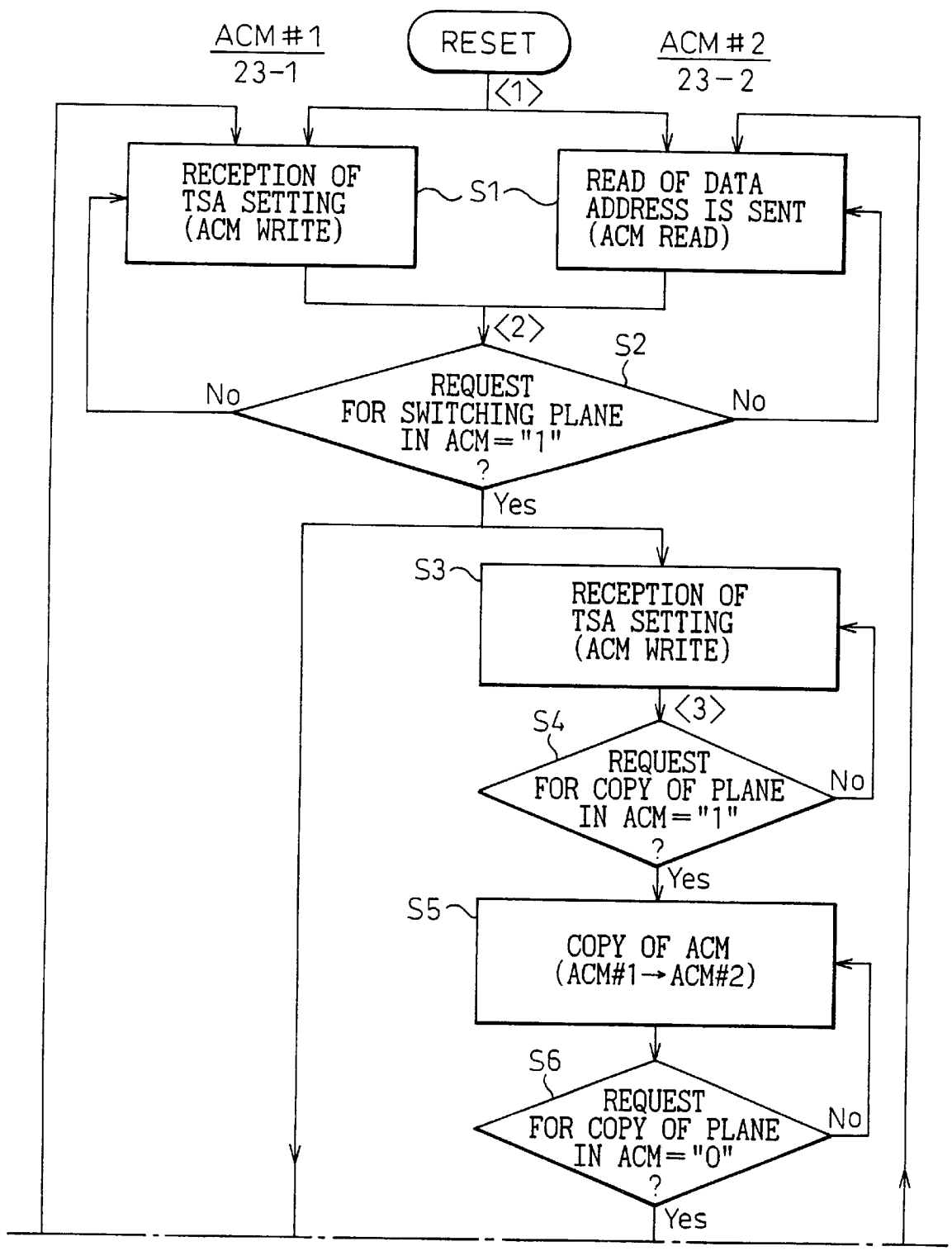
FIG. 84 is a first part of a flowchart of an operation for switching memory plates and an operation for copying in the structure of FIG. 20.
Figure 85:
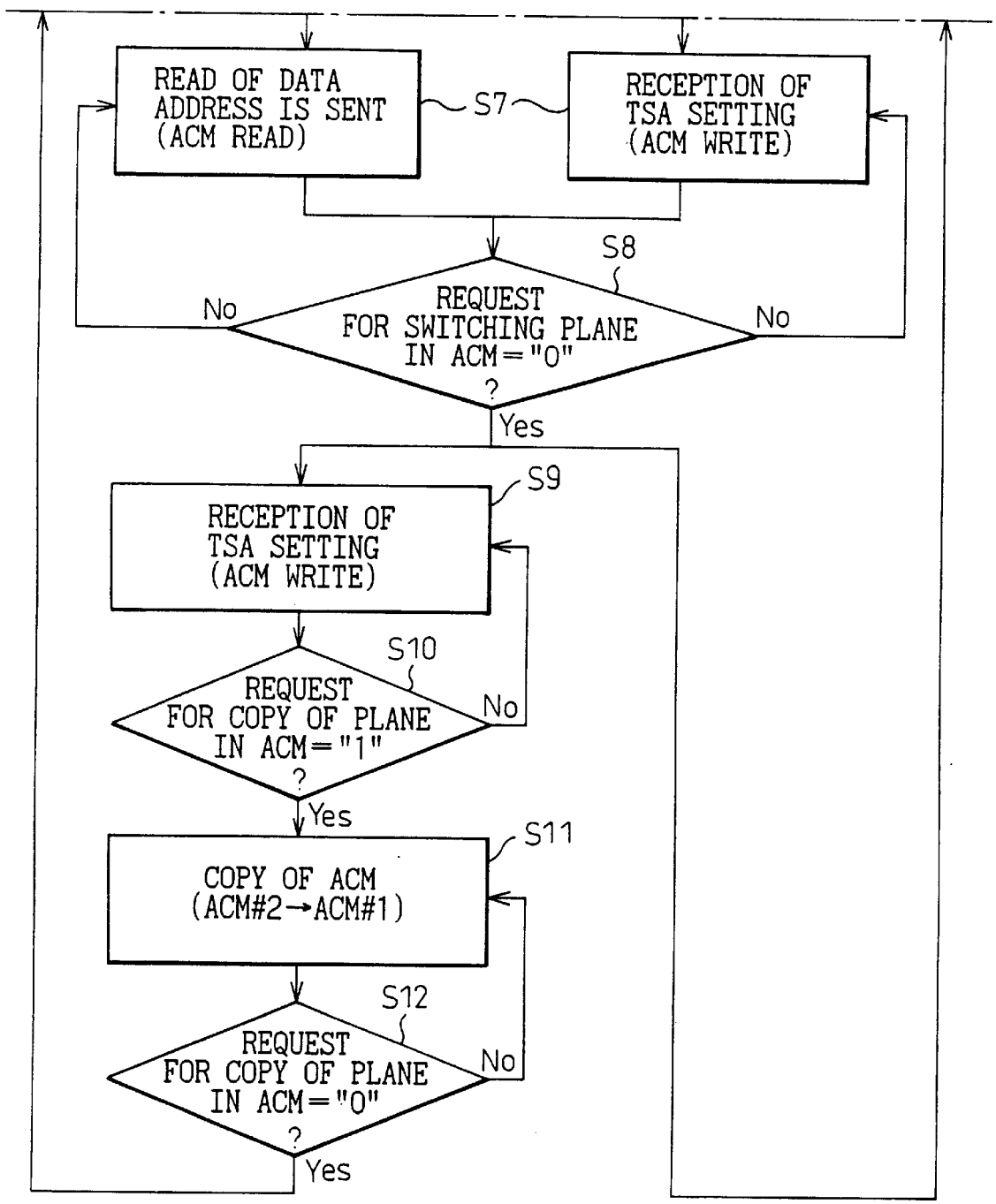
FIG. 85 is a second part of the flowchart of the operation for switching memory plates and the operation for copying in the structure of FIG. 20.

FIG. 84 and FIG. 85 are parts of a flowchart of the operation for the switch and copy of the memory planes in the structure of FIG. 20.

ACM#1 and ACM#2 shown in the upper part of FIG. 84 denote the first ACM plane (23-1) and second ACM plane (23-2), respectively. All of the group of steps located beneath the ACM#1 represent the operation of the ACM#1 per se, and all of the group of steps located beneath the ACM#2 represent the operation of the ACM#2 per se.

In FIG. 84, at <1>, the ACM#1 is set to the write mode, and the ACM#2 is set to the read mode at the power on reset.

At step S1, the ACM#1 receives the TSA setting (channel setting) information and writes this into it, while the ACM#2 executes the reading of its own data (TSA setting data).

At <2>, retiming is carried out at the read timing of the address control memory (ACM). This retiming is introduced for inhibiting the switching of planes during the reading of ACM#1 (or #2) or writing of ACM#2 (or #1).

When ACMSEL="0", the ACM#1 is placed in the writing mode, and the ACM#2 is placed in the reading mode. When ACMSEL="1", the ACM#1 is placed in the reading mode, and the ACM#2 is placed in the writing mode.

At step S2, it is checked whether or not a switch request of the ACM plane is generated (="1"). If the answer is No, the current state is held. When the answer is Yes, the ACM#1 proceeds to step S7 (FIG. 85).

On the other hand, the ACM#2 proceeds to steps S3 to S6.

At step S3, the ACM#2 receives the TSA setting information and write this into it.

At <3>, after the switching of the ACM plane, the copy mode by the copy means 70 is created for a 12-bit period at a 78 MHz clock (CLK). Note that the TSA setting at the time of the copy is invalidated.

At step S4, a copy request (="1") is issued.

At step S5, the information written in the ACM#1 is copied from the ACM#1 of the ACM plane to the ACM#2.

At step S6, when the copy request disappears (="0"), the operation routine proceeds to step S7 of FIG. 85.

At step S7, the ACM#2 receives a new TSA setting information and writes this into it. On the other hand, the ACM#1 waits for the end of the copying and reads its own data (channel setting data).

At step S8, the state heretofore is held until the switch request of the ACM plane disappears. When the switch request disappears, the ACM#1 proceeds to step S9 to step S12.

At step S9, the ACM#1 receives the TSA setting information and write this into it.

At step S10, it is checked whether or not the copy request is issued (="1"). When it is issued, the ACM#1 proceeds to step S11.

At step S11, the information written in the ACM#2 is copied from the ACM#2 to the ACM#1 of the ACM plane.

At step S12, when the copy request disappears (="0"), the ACM#1 returns to the initial step S1.

Next, the eighth embodiment (FIG. 23 and FIG. 24) will be explained in a little more detail. This eighth embodiment is characterized in that the error detection facility comprising the parity forming unit 81, parity detection unit 82, error protection unit 83, error detection unit 84, etc. is further provided so as to maintain the channel setting address from the address control memory (ACM) 23 at a high quality.

Figure 86:
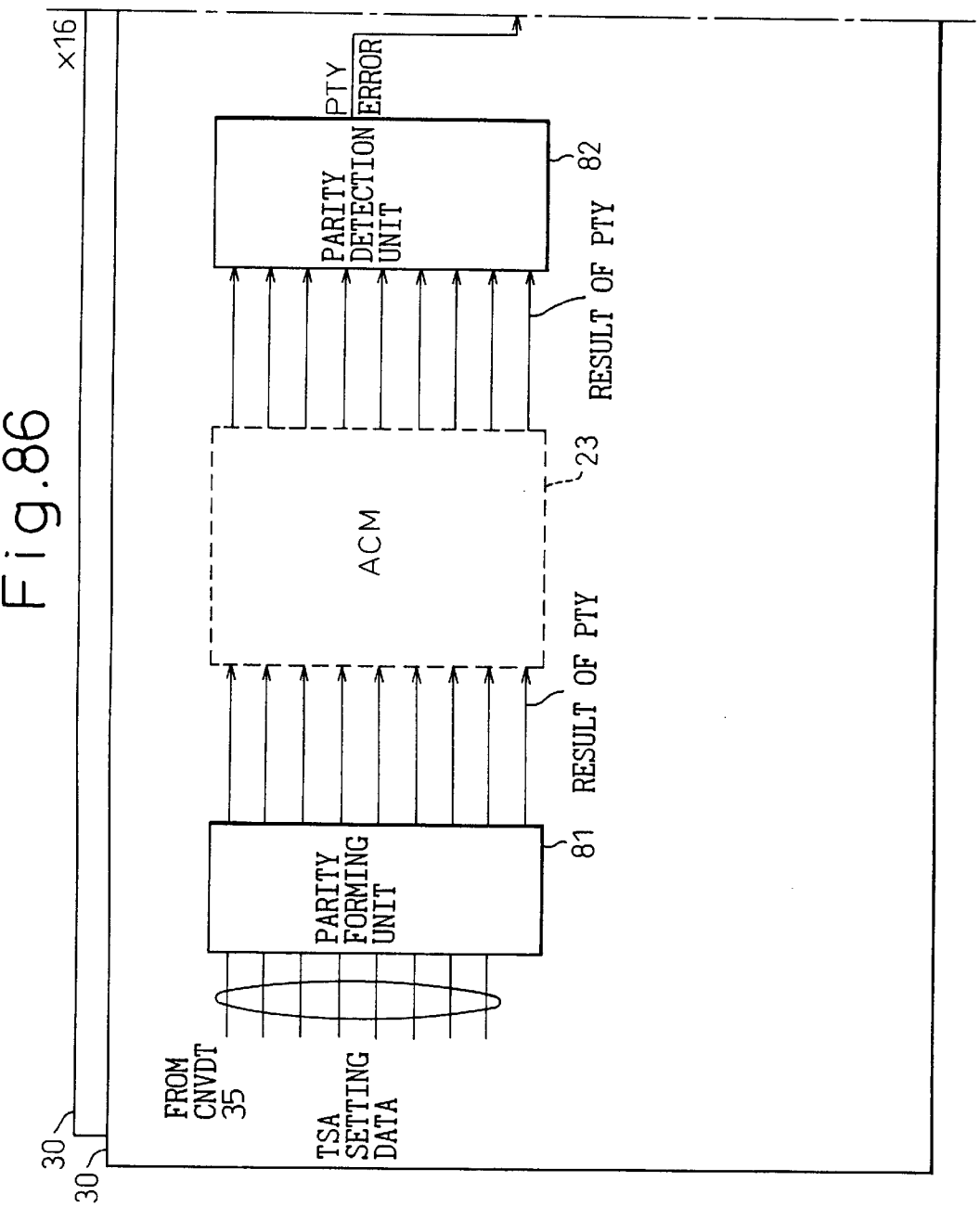
FIG. 86 is a first part of a view of a concrete example of an error detection facility in an eighth embodiment (FIG. 23, FIG. 24)
Figure 87:
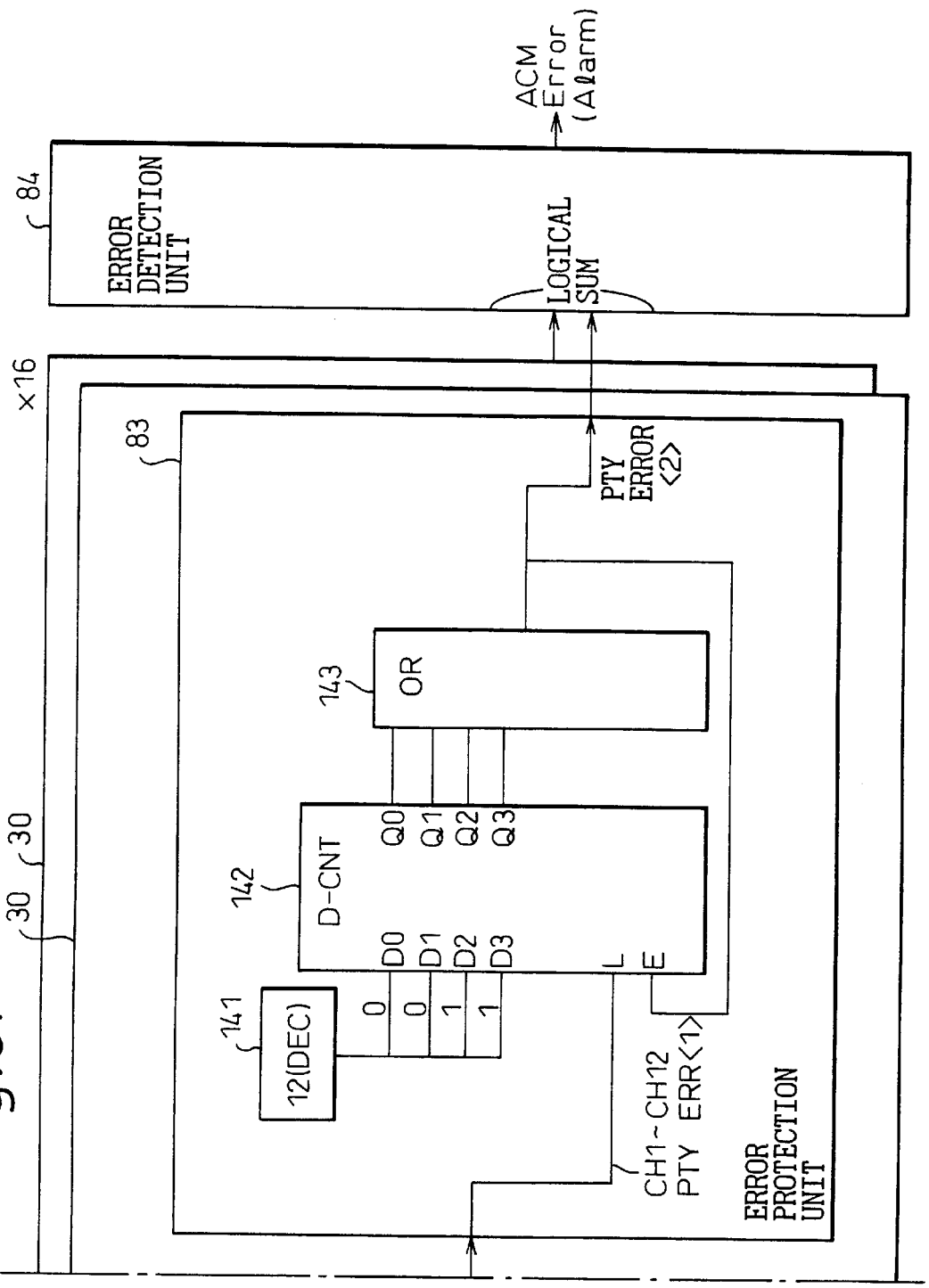
FIG. 87 is a second part of the view of the concrete example of the error detection facility in the eighth embodiment (FIG. 23, FIG. 24)

FIG. 86 and FIG. 87 are parts of a view of a concrete example of the error detection facility in the eighth embodiment (FIG. 23, FIG. 24).

Referring to FIG. 86 and FIG. 87, the TSA setting data supplied from the data converting unit (CNVDT) 35 is input to the parity forming unit 81 (FIG. 86), and for example, a vertical parity bit (result of PTY) is added thereto here.

The TSA setting data having the result of PTY is stored once in the address control memory (ACM) 23 and is input once to the parity detection unit 82 after being read again by the reading operation already mentioned in detail. Existence of PTY (parity) error is determined by the result of this parity detection.

The PTY error result is input to the error protection unit 83 (FIG. 87) next.

The conditions for detecting and releasing the PTY error state are as follows.

Condition for detecting PTY error state <2>: Where there is error in even one of the channels CH1 to CH12, that is, where there is CH1 to CH12 PTY ERROR <1>, the state is immediately detected.

Condition for releasing PTY error state <2>: Where none of the channels CH1 to CH12 has error, if there is no error continuously 12 times, the PTY error state <2> is released.

The circuit operation of the error protection unit 83 is as follows.

Case of "Detection"

When there is CH1 to CH12 PTY ERR <1>, 12 ("1100") indicating the CH number is loaded in a "0" down counter 142, and PTY error state <2> is immediately generated.

Case of "Release"

When there is no CH1 to CH12 PTY ERR <1> continuously 12 times and accordingly all of the outputs Q0 to Q3 of the down counter 142 are "0", the state is released.

Here, the operation of each portion is as follows.

A presetter 141 generates the fixed value of "1100" and supplies this to the D-input of the down counter 142.

The down counter 142 is 4-bit down counter (15 to 0) and performs only the down operation of counter values 12 to 0 in the circuit operation of the present invention.

The OR gate 143 takes a logical sum with respect to the Q-output (Q0 to Q3) of the down counter 142. If there is "1" in even one of Q0 to Q3, a PTY error is determined. Further, in the state of ALL "0", that is, no PTY error, the down control of the down counter 142 is prevented. That is, the control to the down counter values 0 to 15 is prevented, and "0" hold is carried out.

Figure 88:
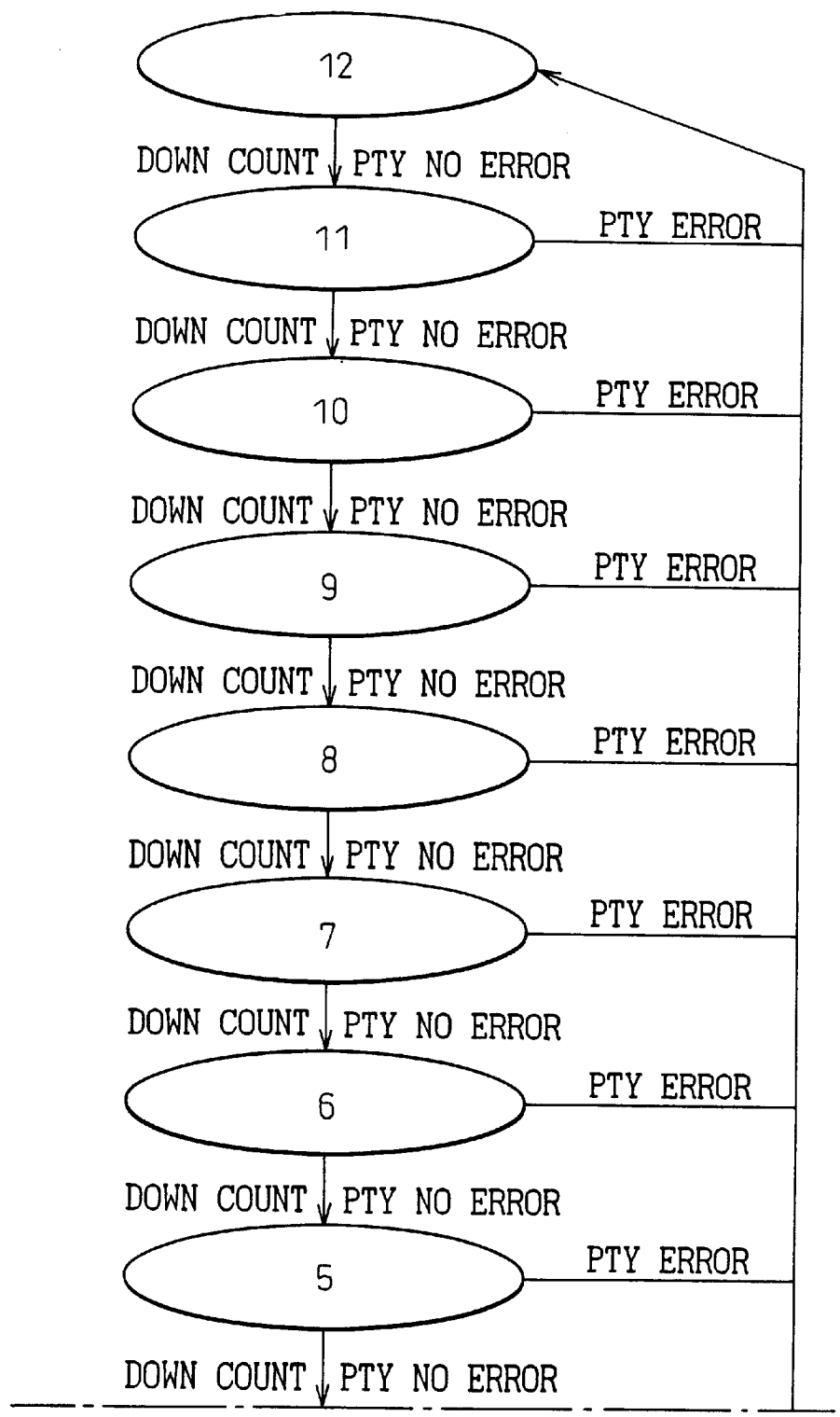
FIG. 88 is a first part of a flowchart showing the operation of an error protection unit 83 of FIG. 87.
Figure 89:
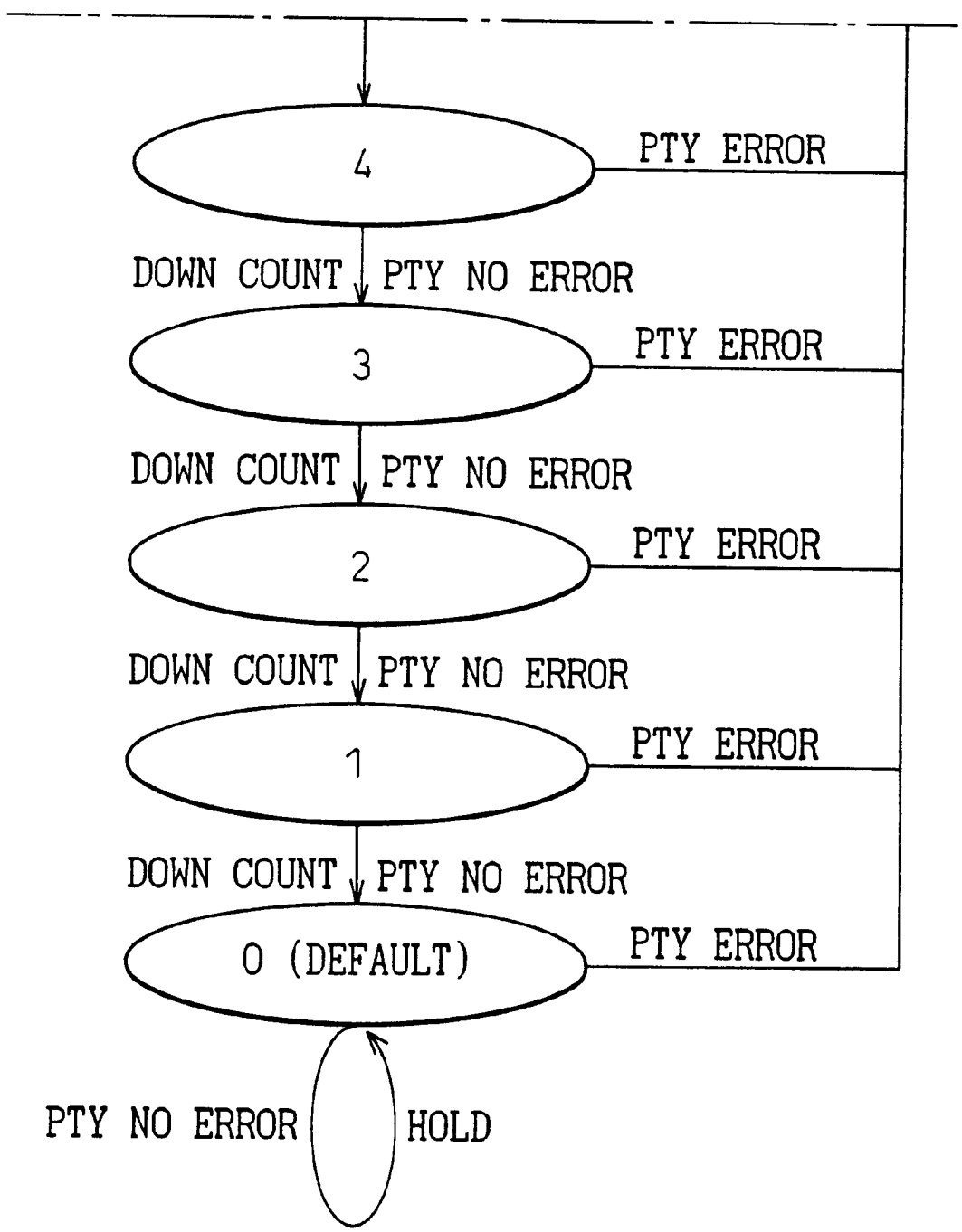
FIG. 89 is a second part of a flowchart showing the operation of the error protection unit 83 of FIG. 87.

FIG. 88 and FIG. 89 are parts of a flowchart showing the operation of the error protection unit 83 of FIG. 87.

In FIG. 88 and FIG. 89, the numerals in the oval blocks denotes the count value in the down counter 142.

First, when PTY error is generated, the count value 12 is loaded in the counter 142. Whenever no PTY error occurs, it is counted down like 12→11→10→ . . . . During this time, if PTY error is generated even one time, it returns to the first count value (12).

When no PTY error is generated 12 or more continuous times, the count value continuously holds at 0.

As explained in detail above, according to the present invention, a TSA circuit using logic circuits, the main stream of the related art, is constituted instead by utilizing a memory, for example, a RAM, whereby a large volume of transmission data can be transmitted with a high efficiency and with a high degree of freedom of channel setting.

Further, simultaneously, the number of nets and circuit scale can be reduced, so a TSA circuit of a low power consumption can be realized.

What is claimed is:

1. A time slot assignment circuit comprising:
a pair of single time switch and single space switch, where said time switch is provided with a transmission data memory into which transmission data is sequentially written and performs switching in a time domain with respect to the transmission data and said space switch performs switching in a space domain with respect to the output from said time switch;
an address control memory for outputting a channel setting address for controlling both said time switch and said space switch; and
a channel setting information converting unit for converting a channel setting information from the outside to said channel setting address and an accessing address for said address control memory,
further, said address control memory comprises a RAM (random access memory), and
said channel setting address from said channel setting information converting unit for,
first, reading second transmission data from said transmission data memory, which second transmission data is obtained by multiplexing a plurality of the first transmission data of the first multiplex level written into said transmission data memory as said transmission data and for,
second, selecting one of said first transmission data, in said space switch, from among outputs from said time switch,
is written into the address control memory at random by the accessing address, from said channel setting information converting unit, for said address control memory and further serially read out to said time switch and said space switch.

2. A time slot assignment circuit according to claim 1, wherein:
an auxiliary signal generating means is provided in said space switch; and
the auxiliary signal generating means inserts the related auxiliary signal into the corresponding channel among a plurality of channels comprising each said first transmission data in response to an auxiliary signal inserting code contained in said channel setting address from said address control memory.

3. A time slot assignment circuit according to claim 2, wherein:
said auxiliary signals are a first auxiliary signal (UNEQ) indicating that said channel is unused and a second auxiliary signal (P-AIS) indicating that a fault occurs in said channel; and
said auxiliary signal generating means has a code detection unit for detecting said auxiliary signal inserting code and an auxiliary signal insertion unit for generating said first auxiliary signal (UNEQ) and second auxiliary signal (P-AIS) and inserting the same into the corresponding channel when the auxiliary signal inserting code is detected.

4. A time slot assignment circuit according to claim 1, wherein:
a format converting means is formed inside said channel setting information converting unit; and
the format converting means controls the conversion of the frame format obtained by multiplexing said first transmission data of the first multiplex level to the frame format of said second transmission data of the second multiplex level.

5. A time slot assignment circuit according to claim 1, wherein:
a format converting means is formed inside said channel setting information converting unit; and
the format converting means controls the conversion of the frame format of said second transmission data of the second multiplex level to the frame format obtained by multiplexing said first transmission data of the first multiplex level.

6. A time slot assignment circuit according to claim 1, wherein an initialization mode generating unit is provided for inputting an initialization command for initializing the time slot assignment circuit per se to said channel setting information converting unit at a startup of the entire equipment containing the related time slot assignment circuit.

7. A time slot assignment circuit according to claim 6, wherein:

said initialization command is a command for outputting an auxiliary signal (UNEQ), from the related time slot assignment circuit, indicating that each channel comprising said second transmission data is unused or a command for outputting an auxiliary signal (DATA THROUGH), from the related time slot assignment circuit, indicating that said input transmission data must be passed through the related time slot assignment circuit as it is.

8. A time slot assignment circuit according to claim 1, wherein:

said address control memory has two-plane structure having a first memory plane and a second memory plane; and the writing of said channel setting address to the address control memory and the reading of the written channel setting address from the address control memory are alternately carried out with respect to the first memory plane and the second memory plane.

9. A time slot assignment circuit according to claim 1, wherein:

said address control memory is given a two-plane structure having a first memory plane and a second memory plane and, at the same time, a copy means cooperating with the address control memory is provided; and the copy means copies the channel setting address at which the writing is terminated to the other plane of the first memory plane and the second memory plane when the writing with respect to one plane of the first memory plane and the second memory plane is terminated and, when a new channel setting address is given, carries out the writing to the other plane for only the part changed with respect to said channel setting address immediately before this.

10. A time slot assignment circuit according to claim 1, wherein a setting information holding unit for storing said channel setting information from the outside and, at the same time, supplying the stored information to said address control memory is provided.

11. A time slot assignment circuit according to claim 10, wherein said setting information holding unit is made to operate by a clock in the time slot assignment circuit completely asynchronous to the clock of the system for transmitting said transmission data.

12. A time slot assignment circuit according to claim 1, wherein further provision is made:

a parity forming unit for adding parity bits to said channel setting address from said channel setting information converting unit and a parity detection unit for reading the channel setting address added with the parity bits written, through the parity forming unit, in said address control memory and performing a parity check with respect to this.

13. A time slot assignment circuit according to claim 12, wherein provision is further made of:

an error protection unit for judging if there is parity error for each of a plurality of channels comprising each said first transmission data by the detection result from said parity detection unit and an error detection unit for generating an alarm when a result indicating there is parity error is output from at least one of the outputs from the plurality of error protection units individually provided for the group of said first transmission data comprising said second transmission data.

14. A time slot assignment circuit according to claim 1, wherein:

a channel setting information inverse converting unit is provided for performing an inverse operation to that of the channel setting information converting unit so as to monitor if said channel setting information given from an external microcomputer was correctly converted to said channel setting address at said channel setting information converting unit and in addition correctly written into said address control memory; and the circuit reproduces said original channel setting information by feeding back the channel setting address written in the address control memory to the channel setting information inverse converting unit and further transfers this to said microcomputer.

15. A time slot assignment circuit according to claim 2, wherein in a bit pattern group comprising said channel setting address from said address control memory, an idle bit pattern which is not used for the channel setting address is assigned to said auxiliary signal insertion code.

* * * * *